US008681243B2

(12) United States Patent
Nozaki et al.

(10) Patent No.: US 8,681,243 B2
(45) Date of Patent: Mar. 25, 2014

(54) DIGITAL CAMERA

(75) Inventors: Hirotake Nozaki, Koto-ku (JP);
Norikazu Yokonuma, Adachika (JP);
Masahide Tanaka, Kawasaki (JP);
Tadashi Ohta, Yokohama (JP); Akira Ohmura, Shibuya-ku (JP)

(73) Assignee: Nikon Corporation, Tokyo (JP)

( * ) Notice: Subject to any disclaimer, the term of this patent is extended or adjusted under 35 U.S.C. 154(b) by 209 days.

(21) Appl. No.: 13/137,556

(22) Filed: Aug. 25, 2011

(65) Prior Publication Data

US 2011/0310272 A1 Dec. 22, 2011

Related U.S. Application Data

(63) Continuation of application No. 10/501,048, filed as application No. PCT/JP03/00134 on Jan. 9, 2003, now abandoned.

(30) Foreign Application Priority Data

Jan. 11, 2002  (JP) .................................. 2002-004096
Feb. 18, 2002  (JP) .................................. 2002-040285
Feb. 18, 2002  (JP) .................................. 2002-040287

(51) Int. Cl.
*H04N 5/76* (2006.01)
(52) U.S. Cl.
USPC ...................................................... 348/231.7
(58) Field of Classification Search
USPC ............... 348/231.99–231.9, 333.01, 333.02, 348/333.04; 396/396, 374
See application file for complete search history.

(56) References Cited

U.S. PATENT DOCUMENTS

| 4,887,234 | A | 12/1989 | Iijima |
| 5,153,729 | A | 10/1992 | Saito |
| 5,321,663 | A | 6/1994 | Nishi |
| 5,642,458 | A | 6/1997 | Fukushima et al. |
| 5,648,816 | A | 7/1997 | Wakui |
| 5,917,542 | A | 6/1999 | Moghadam et al. |
| 6,067,398 | A | 5/2000 | Sato |
| 6,249,313 | B1 | 6/2001 | Nishi |
| 6,381,405 | B1 | 4/2002 | Yamagishi |
| 6,424,581 | B1 | 7/2002 | Bosch et al. |
| 6,445,460 | B1 * | 9/2002 | Pavley ........................ 358/1.15 |
| 6,460,095 | B1 | 10/2002 | Ueno et al. |
| 6,661,454 | B1 | 12/2003 | Hwang et al. |

(Continued)

FOREIGN PATENT DOCUMENTS

CN         1302062 A    7/2001
JP         A-3-191680   8/1991

(Continued)

OTHER PUBLICATIONS

Mar. 30, 2011 Office Action issued in U.S. Appl. No. 12/078,854.

(Continued)

*Primary Examiner* — Aung S Moe
(74) *Attorney, Agent, or Firm* — Oliff PLC

(57) ABSTRACT

A digital camera includes an insertion unit for inserting a storage medium, an image pickup unit, a control unit for storing an image picked up by the image pickup unit onto a storage medium inserted into the insertion unit, and a medium detection unit for detecting whether the storage medium inserted into the insertion unit is a storage medium in which rewrite is limited.

8 Claims, 78 Drawing Sheets

(56) References Cited

U.S. PATENT DOCUMENTS

| | | | |
|---|---|---|---|
| 6,683,650 B1 | 1/2004 | Yamamoto et al. | |
| 6,786,417 B1 * | 9/2004 | Kondo et al. | 235/492 |
| 6,816,190 B1 | 11/2004 | Miyazawa | |
| 6,845,069 B2 | 1/2005 | Nakahara et al. | |
| 6,959,115 B2 | 10/2005 | Itokawa | |
| 7,038,724 B2 | 5/2006 | Satoh et al. | |
| 7,215,371 B2 | 5/2007 | Fellegara et al. | |
| 7,362,961 B2 | 4/2008 | Takeshita et al. | |
| 7,593,035 B2 | 9/2009 | Okamoto | |
| 7,612,806 B2 * | 11/2009 | Kazami et al. | 348/231.1 |
| 8,149,295 B2 * | 4/2012 | Nozaki et al. | 348/231.7 |
| 2001/0000969 A1 | 5/2001 | Ohta et al. | |
| 2001/0005223 A1 | 6/2001 | Tsunoda et al. | |
| 2002/0021359 A1 | 2/2002 | Okamoto | |
| 2002/0123990 A1 | 9/2002 | Abe et al. | |
| 2002/0144160 A1 | 10/2002 | Odaohhara et al. | |
| 2002/0184459 A1 | 12/2002 | Taussig et al. | |
| 2003/0007189 A1 | 1/2003 | Kusaka et al. | |
| 2003/0099456 A1 | 5/2003 | Ohmura et al. | |
| 2003/0112347 A1 | 6/2003 | Wyman | |
| 2003/0117505 A1 * | 6/2003 | Sasaki et al. | 348/231.99 |
| 2004/0201734 A1 | 10/2004 | Malloy Desormeaux et al. | |
| 2005/0094522 A1 * | 5/2005 | Yokokawa | 369/53.2 |
| 2005/0104977 A1 * | 5/2005 | Nozaki et al. | 348/231.7 |
| 2005/0151858 A1 * | 7/2005 | Nozaki et al. | 348/231.9 |
| 2006/0152599 A1 * | 7/2006 | Yokonuma et al. | 348/231.99 |
| 2007/0109426 A1 | 5/2007 | Satoh et al. | |
| 2008/0211927 A1 * | 9/2008 | Nozaki et al. | 348/231.7 |
| 2011/0310272 A1 * | 12/2011 | Nozaki et al. | 348/231.7 |
| 2012/0162468 A1 * | 6/2012 | Nozaki et al. | 348/231.1 |

FOREIGN PATENT DOCUMENTS

| | | |
|---|---|---|
| JP | A-4-268990 | 9/1992 |
| JP | A-4-367834 | 12/1992 |
| JP | A-5-56322 | 3/1993 |
| JP | A 5-91452 | 4/1993 |
| JP | A 6-189251 | 7/1994 |
| JP | A-7-95517 | 4/1995 |
| JP | A 7-295866 | 11/1995 |
| JP | A 8-163492 | 6/1996 |
| JP | A-9-182010 | 7/1997 |
| JP | A-9-284695 | 10/1997 |
| JP | A-10-248046 | 9/1998 |
| JP | A 10-285525 | 10/1998 |
| JP | A-10-289144 | 10/1998 |
| JP | A-10-336572 | 12/1998 |
| JP | A-11-27616 | 1/1999 |
| JP | A 11-27627 | 1/1999 |
| JP | A-11-296462 | 10/1999 |
| JP | A 2000-253344 | 9/2000 |
| JP | A-2000-295517 | 10/2000 |
| JP | A-2000-295577 | 10/2000 |
| JP | A-2001-78061 | 3/2001 |
| JP | A 2001-128094 | 5/2001 |
| JP | A-2001-186459 | 7/2001 |
| JP | A-2001-197412 | 7/2001 |
| JP | A-2001-245249 | 9/2001 |
| JP | A 2001-251544 | 9/2001 |
| JP | A-2001-285758 | 10/2001 |
| JP | A 2001-292367 | 10/2001 |
| JP | A-2001-298645 | 10/2001 |
| JP | A-2002-16865 | 1/2002 |
| JP | A-2002-42448 | 2/2002 |
| JP | A-2002-44577 | 2/2002 |
| WO | WO 99/04368 A1 | 1/1999 |
| WO | WO 01/69395 A1 | 9/2001 |

OTHER PUBLICATIONS

Dec. 23, 2008 Office Action issued in U.S. Appl. No. 10/501,048.
Aug. 18, 2009 Office Action issued in U.S. Appl. No. 10/501,048.
Jun. 7, 2010 Office Action issued in U.S. Appl. No. 10/501,048.
Feb. 25, 2011 Office Action issued in U.S. Appl. No. 10/501,048.
Notification of Reason(s) for Refusal dated Jun. 1, 2010 from Japanese Patent Application No. 2008-257026 (with English-language translation).
U.S. Office Action dated Jun. 6, 2013 from U.S. Appl. No. 13/412,095.

* cited by examiner

FIG.28
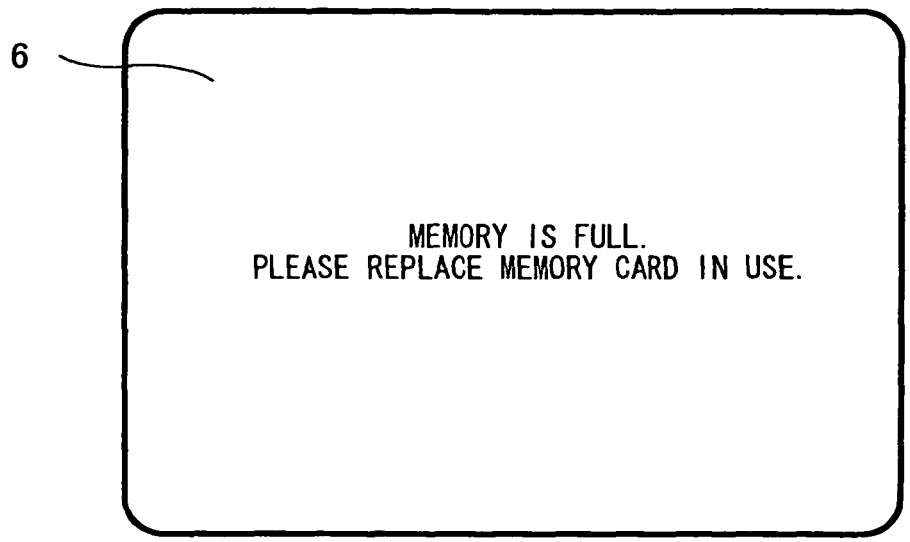
(a)
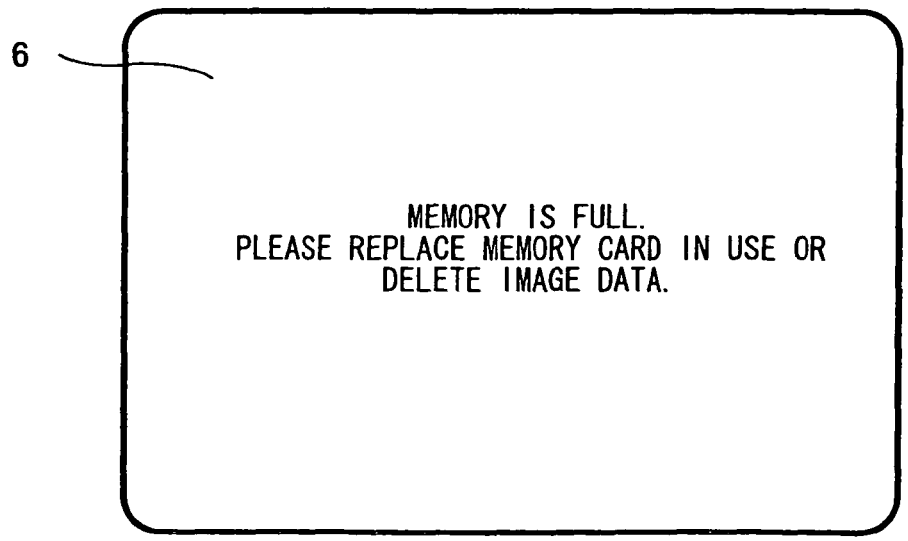
(b)

FIG.29
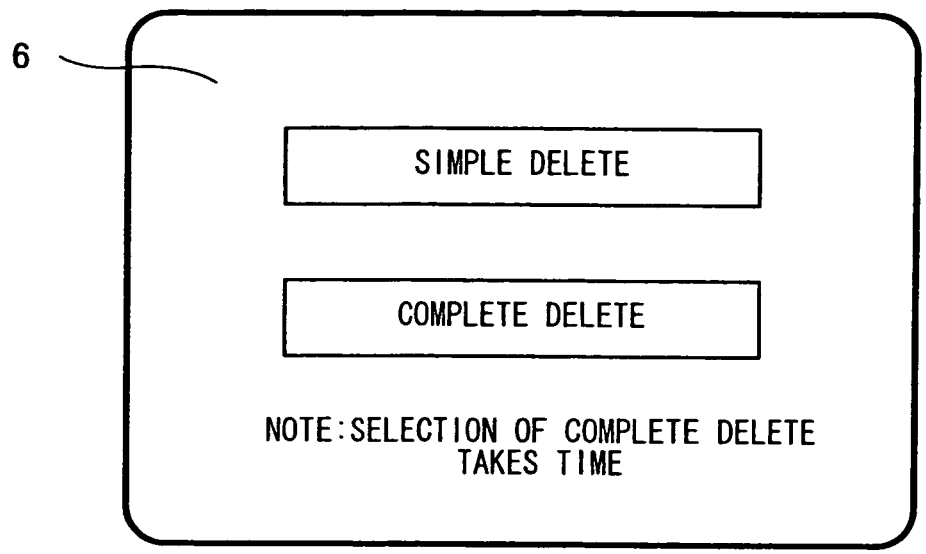
(a)
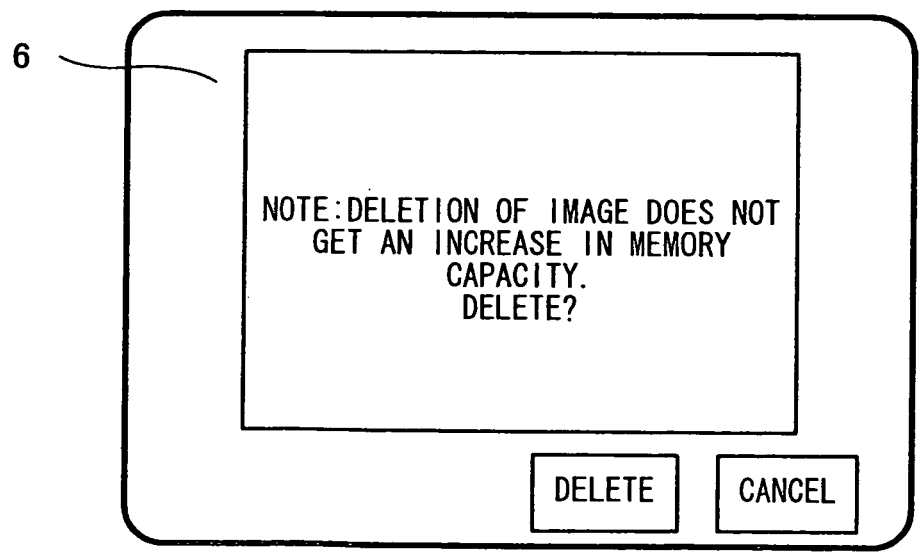
(b)

FIG.78

OVERWRITABLE MEDIUM

☑ STORE IMAGE DATA AT THE SAME WHEN CONNECTING

STORAGE LOCATION: C:¥

☑ DELETE IMAGE DATA AFTER STORAGE

[OK] [CANCEL]

(a)

WRITE-ONCE MEDIUM

☑ STORE IMAGE DATA AT THE SAME WHEN CONNECTING

STORAGE LOCATION: C:¥

☐ DELETE IMAGE DATA AFTER STORAGE (NOTE: DELETION DOES NOT INCREASE CAPACITY)

[OK] [CANCEL]

(b)

DIGITAL CAMERA

INCORPORATION BY REFERENCE

This is a Continuation of application Ser. No. 10/501,048 filed Jul. 9, 2004 now abandoned, which is a National Phase of PCT/JP03/00134 filed Jan. 9, 2003, which in turn claims the benefit of Japan Patent Applications No. 2002-4096 filed on Jan. 11, 2002, No. 2002-40285 filed on Feb. 18, 2002, and No. 2002-40287 filed on Feb. 18, 2002. The disclosures of the prior applications are hereby incorporated by reference herein in their entirety.

BACKGROUND OF THE INVENTION

1. Field of the Invention

This invention relates to a digital camera with a function to record taken image data in a recording medium and, more particularly, to an image storage apparatus that stores image data recorded in the recording medium.

2. Description of Related Art

A digital camera records image information about a taken image in a changeable recording medium like a memory card etc. But, capacity of the recording medium recording the image information and cost performance are not satisfactory. Especially, a problem a overwritable recording medium has is its high price.

SUMMARY OF THE INVENTION

A present invention is aimed at providing a digital camera using a recording medium efficiently and an image storage apparatus.

A digital camera of this invention includes an insertion port into which a storage medium is inserted, an imaging device, a controller that stores an image taken by the imaging device in the storage medium inserted into the insertion port and a medium detector that detects if the storage medium inserted into the insertion port is a storage medium limiting overwrite.

It is preferable that the digital camera further includes a display device that displays what the storage medium limiting overwrite is detected by the medium detector. It is also preferable that the medium detector detects if the storage medium is the storage medium limiting overwrite based upon information entered from the storage medium inserted into the insertion port. The insertion port may include a connector device to be connected to a plurality of connectors of the storage medium to be inserted and the medium detector may detect if the storage medium is the storage medium limiting overwrite based upon a difference in connectors of the storage medium to be connected to the connector device. The insertion port may include a detecting device that detects a difference in an external shape of the storage medium to be inserted and the medium detector may detect if the storage medium is the storage medium limiting overwrite based upon a detecting result of the detecting device.

When the medium detector detects that the storage medium limiting overwrite is inserted into the insertion port, it is preferable that the digital camera further includes a delete disable processing device that lets all images to be stored in the storage medium become unable to be deleted.

It is preferable that the digital camera further includes a delete instruction device that instructs to delete an image stored in the storage medium and a nullification processing device that nullifies an instruction from the delete instruction device when the medium detector detect that the storage medium limiting overwrite is inserted into the insertion port.

It is preferable that the digital camera further includes a delete disable release instruction device that lets an image stored in the storage medium disable to be deleted become capable of being deleted and a nullification processing device that nullifies an instruction from the delete disable release instruction device when the medium detector detects that the storage medium limiting overwrite is inserted into the insertion portion.

The digital camera may further include a display device that displays an executable instruction in the digital camera and a display change processing device that changes a display of the display device based upon a kind of the storage medium detected by the medium detector. It is preferable that the display device displays the instruction including a delete instruction to delete an image stored in the storage medium and the display change processing device changes a display of the display device so as not to display the delete instruction when the medium detector detects that the storage medium limiting overwrite is inserted into the insertion port. It is preferable that the display device displays the instruction including a delete disable release instruction that lets an image to be stored in the storage medium disabled to be deleted become capable of being deleted and, when the medium detector detects that the storage medium limiting overwrite is inserted into the insertion portion, the display change processing device changes a display of the display device so as not to display the delete disable release instruction. When the medium detector detects that the storage medium limiting overwrite is inserted into the insertion port, the display change processing device may change a display of the display device so as to display a delete instruction dedicated for the storage medium limiting overwrite.

It is preferable that the digital camera further includes a delete instruction device that instructs to delete an image stored in the storage medium and a delete method change processing device that changes a method of deleting the image based upon an instruction of the delete instruction device corresponding to a kind of the storage medium detected by the medium detector. It is preferable that, when the medium detector detects that the storage medium limiting overwrite is inserted into the insertion port and also deletion of the image is instructed by the delete instruction device, the delete method change processing device writes data in a storage area of information about an image to be deleted in the storage medium limiting overwrite. It is preferable that, when the medium detector detects that the storage medium limiting overwrite is inserted into the insertion port and also deletion of the image is instructed by the delete instruction device, the delete method change processing device changes management information corresponding to a storage area of information about an image to be deleted in the storage medium limiting overwrite to information indicating a non-vacant area.

It is preferable that the digital camera further includes a delete instruction device that deletes an image stored in the storage medium and a pre-announcement information display device that displays pre-announcement information on an image deletion to be performed by the delete instruction device when the medium detector detects that the storage medium limiting overwrite is inserted into insertion port. The pre-announcement info display device may display a notification notifying that the image to be deleted by the delete instruction device is unable to be restored. Also, the pre-announcement information display device may display a notice notifying that deletion of an image by the delete instruction device cannot get an increase in storage capacity of the storage medium.

It is preferable that the digital camera further includes a residual capacity detector that detects residual capacity of the storage medium and a display device that a display prompting to change a storage medium based upon a detecting result of the residual capacity detector when the medium detector detects that the storage medium limiting overwrite is inserted into the insertion port.

It is preferable that the digital camera further includes a delete instruction device that instructs to delete image data stored in the storage medium, wherein, when the medium detector detects that the storage medium limiting overwrite is inserted into the insertion port, it is preferable that the delete instruction device instructs so as to nullify an image data area of the storage medium limiting overwrite.

It is preferable that the digital camera further includes a delete instruction device that instructs to delete image data stored in the storage medium and a selection device that selects any of a first delete method deleting the image data by nullifying an image data area of the storage medium limiting overwrite or a second delete method assuming that the image data is deleted by changing data management information of the image data when the medium detector detects that the storage medium limiting overwrite is inserted into the insertion port.

The delete instruction device may instruct so as to nullify the image data by overwriting the image data area of the storage medium limiting overwrite with data. It is preferable that the medium detector detects if the storage medium inserted into the insertion port is overwritable storage medium and the delete instruction device instructs so as to change only data management information corresponding to the image data stored in the overwritable storage medium when the medium detector detects that the overwritable storage medium is inserted into the insertion port. The data management information may be information identifying where to record the image data stored in the storage medium.

It is preferable that, when the medium detector detects that the storage medium limiting overwrite is inserted into the insertion port, the delete instruction device instructs so as to nullify a record area of data management information corresponding to the image data and also record new data management information.

The delete instruction device may instruct so as to nullify at least a portion of the image data area. Also, the delete instruction device may instruct so as to nullify all of the image data area.

The digital camera further includes a delete instruction device that instructs to delete image data stored in the storage medium, wherein it is preferable that the delete instruction device instructs a different delete method corresponding to a kind of the storage medium detected by the medium detector.

The digital camera further includes a delete instruction device that instructs to delete image data stored in the storage medium and a capacity detector that detects memory capacity of the storage medium inserted into the insertion port, wherein it is preferable that, when the medium detector detects that the storage medium limiting overwrite is inserted into the insertion port, the delete instruction device instructs a different delete method corresponding to memory residual capacity of the storage medium limiting overwrite detected by the capacity detector. The delete instruction device may instruct so as to nullify the image data area when the capacity detector detects that the storage medium limiting overwrite has not memory residual capacity enough to record new data management information in the storage medium limiting overwrite.

The digital camera further includes a format instruction device that instructs to format the storage medium inserted into the insertion port, wherein it is preferable that the format instruction device instructs a different format corresponding to a kind of the storage medium detected by the medium detector. It is preferable that, when the medium detector detects that the storage medium limiting overwrite is inserted into the insertion port, the digital camera further includes a notification device that notifies that formatting cannot get an increase in capacity.

It is preferable that the digital camera further includes an optimization processing device that instructs so as to optimize data in the storage medium inserted into the insertion port and an optimization processing nullification processing device that nullifies an instruction to process an optimization by the optimization processing device when the medium detector detects that the storage medium limiting overwrite is inserted into the insertion port.

An image storage apparatus of this invention includes a connecting device that connects to any of a storage medium limiting overwrite and a overwritable storage medium, an image management setting device that executes independently a first image management setting that manages image data recorded in the storage medium limiting overwrite and a second image management setting that manages image data recorded in the overwritable storage medium and a management control device that implements an image management control in accordance with the first image management setting when the storage medium limiting overwrite is connected to the connecting device and implements an image management control in accordance with the second image management setting when the overwritable storage medium is connected to the connecting device.

It is preferable that the management control device performs a delete control to delete the image data recorded in the storage medium connected to the connecting device □ as the image management control. The image storage apparatus further includes an image storage memory that stores the image data, wherein it is preferable that the image management control device may include a storage control to store the image data recorded in the storage medium connected to the connecting device in the image storage memory as the image management control.

It is preferable that the image management setting device performs a setting change of the first image management setting and the second image management setting depending upon a kind of the storage medium connected to the connecting device. It is preferable that the image management setting device permits to perform a setting change of the first image management setting when the storage medium limiting overwrite is connected to the connecting device and the image management setting device permits to perform a setting change of the second image management setting when the overwritable storage medium is connected to the connecting device.

It is preferable that the connecting device is an attachment device that attaches any of the storage medium limiting overwrite and the overwritable storage medium. The connecting device may connect to any of the storage medium limiting overwrite and the overwritable storage medium via an apparatus attaching any of the storage medium limiting overwrite and overwritable storage medium to an attachment device.

It is preferable that a digital camera of this invention includes a connecting device that connects to any of a storage medium limiting overwrite and a overwritable storage medium, an image management setting device that executes independently a first image management setting that controls image data recorded in the storage medium limiting overwrite and a second image management setting that controls image data recorded in the overwritable storage medium and a management control device that implements an image management control in accordance with the first image management setting when the storage medium limiting overwrite is connected to the connecting device and implements an image management control in accordance with the second image management setting when the overwritable storage medium is connected to the connecting device.

It is preferable that the image management setting device performs a setting change of the first image management setting and the second image management setting depending upon a kind of the storage medium connected to the connecting device. It is preferable that the image management setting device permits to perform a setting change of the first image management setting when the storage medium limiting overwrite is connected to the connecting device and the image management setting device permits to perform a setting change of the second image management setting when the overwritable storage medium is connected to the connecting device.

A control program of this invention that runs in a computer includes a step of implementing an image management control in accordance with the first image management setting controlling image data recorded in the storage medium limiting overwrite when the storage medium limiting overwrite is connected to the connecting device connecting to any of a storage medium limiting overwrite and a overwritable storage medium and a step of implementing an image management control in accordance with the second image management setting controlling image data recorded in the overwritable storage medium when the overwritable storage medium is connected to the connecting device.

An image storage apparatus of this invention includes a connecting device that connects to a storage medium recording image data, a delete instruction device that instructs so as to delete image data recorded in the storage medium connected to the connecting device, a medium detector that detects if the storage medium connected to the connecting device is a storage medium limiting overwrite and a notification device that notifies that deletion of the image data cannot get an increase in memory capacity when the medium detector detects that the storage medium limiting overwrite is connected to the connecting device.

An image storage apparatus of this invention includes a connecting device that connects to a storage medium recording image data, a delete instruction device that instructs so as to delete image data recorded in the storage medium connected to the connecting device, a medium detector that detects if the storage medium connected to the connecting device is a storage medium limiting overwrite, an image storage memory and a delete control device that controls so as to receive image data recorded in the storage medium connected to the connecting device, store the received image data in the image storage memory and delete the image data of the storage medium automatically after storage thereof, wherein it is preferable that, when the medium detector detects that the storage medium limiting overwrite is connected to the connecting device, the delete control device halts automatic deletion of the image data after storage thereof.

When the medium detector detects that the storage medium limiting overwrite is connected to the connecting device, the delete control device may prohibit the image data from being deleted automatically after storage thereof. The delete control device may inquiry whether the image data is deleted when the medium detector detects that the storage medium limiting overwrite is connected to the connecting device.

A control program that runs in a computer includes a step of instructing so as to delete image data recorded in a storage medium connected to a connecting device, a step of detecting whether a storage medium connected to a connecting device is a storage medium limiting overwrite, a step of receiving image data recorded in the storage medium connected to the connecting device and stores the received image data in the image storage memory, a step of deleting the image data of the storage medium automatically after storage of the image data and a step of halting an automatic deletion of the image data after storage thereof when the storage medium limiting overwrite is connected to the connecting device.

A storage medium of this invention that is capable of being inserted into a digital camera implementing a different function by detecting a kind of a storage medium and that also limits overwrite includes an information device that change a function of the digital camera. The information device may be property information of the storage medium to be inputted into the digital camera. The information device is a connector device that has a plurality of connectors capable of being connected to the digital camera and the connector device may be different from the one of an overwritable storage medium. The information device is an external shape of the storage medium interfacing with the digital camera and may be different from the one of an overwritable storage medium.

BRIEF DESCRIPTION OF THE DRAWINGS

FIGS. 28 (a) and (b) are views showing a display example displayed on a LCD display panel.

FIG. 29 (a) is a view showing a display example of the delete menu displayed on a LCD display panel.

FIG. 29 (b) is a view showing a display example of a warning displayed on a LCD display panel.

FIGS. 78 (a) and (b) 77 are views showing a display example of a setting menu in the fifth embodiment.

DETAILED DESCRIPTION OF THE PREFERRED EMBODIMENTS

Figure 1:
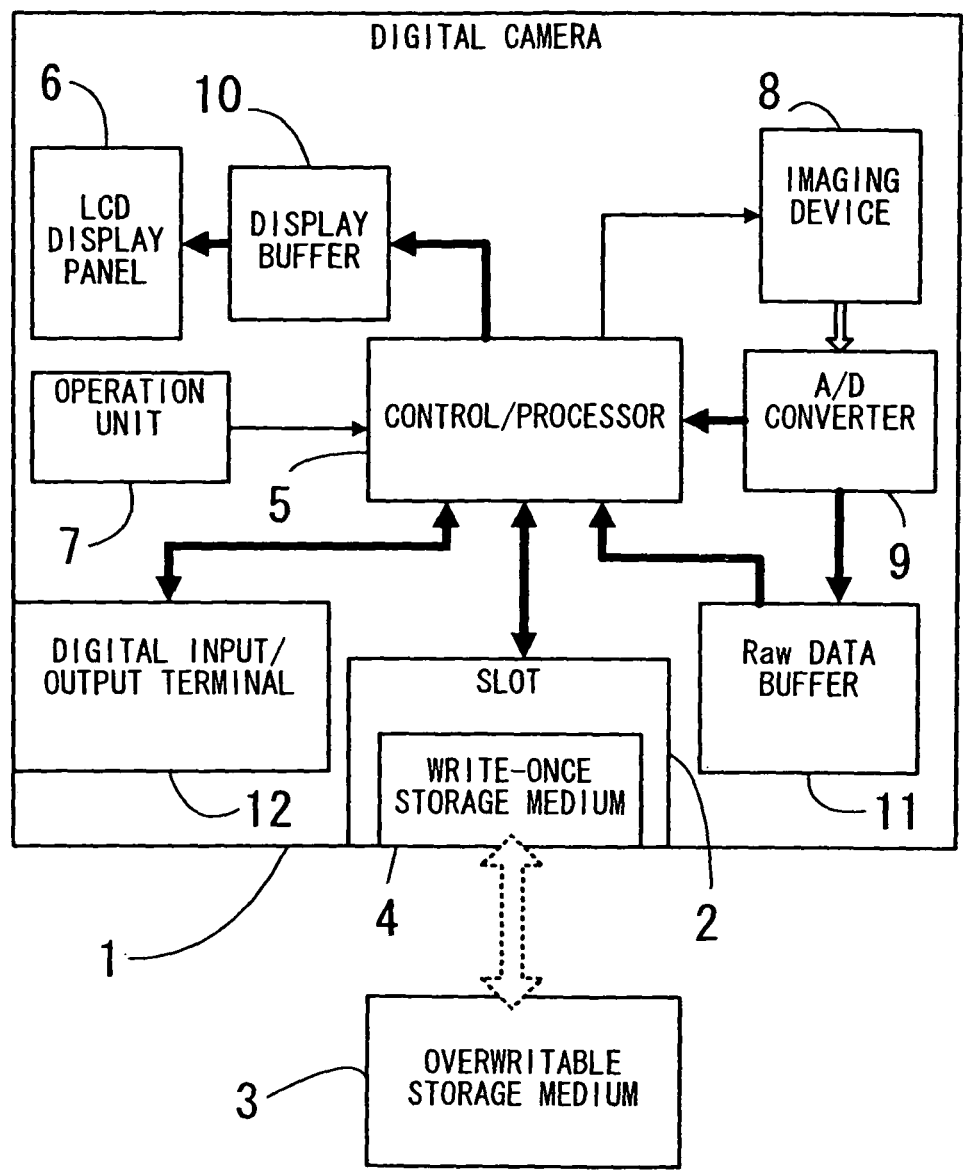
FIG. 1 is a block diagram showing a configuration of a digital camera in a first embodiment of this invention.

A digital camera in accordance with a first embodiment of this invention will be described hereinafter. FIG. 1 is a block diagram showing a digital camera system of the first embodiment in accordance with this invention. As FIG. 1 shows, digital camera 1 consists of control/processor unit 5, LCD display panel 6, operation unit 7, imaging device 8, A/D converter 9, display buffer 10, Raw data buffer 11, digital input/output terminal 12 and the like. Operation unit 7 is a unit whereby a user selects any of operations of digital camera 1, for instance, including a mode selection switch and a shutter release button. Imaging device 8 has an image sensor of approximately 3 million pixels and converts a subject image through a taking lens (not shown) electrically.

Digital camera 1 is provided with card slot 2 for inserting a storage medium of a solid-state memory card. Digital camera 1 can accept selectively overwritable storage medium 3 that is typically used as a storage medium of a digital camera and write-once storage medium 4 capable of writing once as a storage medium. Overwritable storage medium 3 and write-once storage medium 4 can be inserted into card slot 2. FIG. 1 shows what write-once storage medium 4 is inserted into card slot 2. A user operates operation unit 7 to select a shooting mode or a reproduction mode while viewing a menu displayed on LCD display panel 6. When the shooting mode is selected, an optical image through a taking lens (not shown) is successively converted into an electric image signal by imaging device 8. Until a shutter is released in response to an operation of operation unit 7, control/processor unit 5 controls imaging device 8 and skips/reads converted electric image data. Skipped/read electric image data is digitally converted to skipped image data by A/D converter 9 and then sent to control/processor unit 5.

Control/processor unit 5 converts skipped image data from A/D converter 9 to display image data and sends the display image data to display buffer 10. When the shooting mode is set, as imaging device 8 successively takes photographs, the skipped image data is also successively sent to control/processor unit 5 and then display buffer 10 is successively overwritten one after another by new display image data. Accordingly, An image successively taken by imaging device 8 is displayed as a moving image via LCD display panel 6 and LCD display panel 6 functions as a finder of digital camera 1.

When a shutter release button is pressed, control/processor unit 5 reads out all pixels of an electric image signal controlling imaging device 8 and digitally converts the read-out electric image signal by A/D converter 9. Digital data obtained in this way is Raw data outputted from an image sensor of imaging device 8. Raw data from A/D converter 9 is sent to Raw data buffer 11 and is temporally stored therein. When storage of Raw data is finished, imaging device 8 performs skip/read-out processing again and LCD display panel 6 displays a moving image based upon skipped image data.

As Raw data buffer 11 has capacity equivalent to about 10 images, it can store up to 10 images at maximum in response to an operation of a shutter release button. By the operation of the shutter release button, Raw data stored in Raw data buffer 11 is immediately sent to control/processor unit 5 wherein image processing such as an interpolation and a white balance adjustment and compression process is performed. Data processed by the image processing and compression process is stored in write-once storage medium 4 inserted into card slot 2. When storage in write-once storage medium 4 is complete and the complete storage is confirmed, the Raw data already sent to control/processor unit 5 is deleted from Raw data buffer 11 or gets ready for being overwritten by new Raw data. Capacity of approx. 10 images at Raw data buffer 11 is for storing plural Raw data at the same time when a subsequent image is taken before processing on an image at control/processor unit 5 is not complete in a continuous shooting mode.

A residual capacity amount of write-once storage medium 4 is detected by control/processor unit 5 and displayed on LCD panel 6. When the residual capacity amount of write-once storage medium 4 becomes empty, a message prompting to update the storage medium is displayed on LCD panel 6. A user acknowledges a necessity to update it with a fresh medium via a display screen of LCD display panel 6. Write-once storage medium 4 is pulled out from digital camera 1, then an image stored in write-once storage medium 4 is retrieved using PCs and the like. Or, with write-once storage medium 4 inside card slot 2, a digital communication cable is connected to digital input/output terminal 12 and then the image can be retrieved too over the digital communication cable.

When overwritable storage medium 3 instead of write-once storage medium 4 is inserted into card slot 2, digital camera 1 works almost the same way as the foregoing. In this case, however, it is possible to select an unwanted image from the image displayed on LCD display panel 6 and delete the unwanted image from storage medium 3 via an operation of operation unit 7. Thus, when overwritable storage medium 3 is used, new memory capacity for storing new image data can be secured by deleting the unwanted image even when residual capacity of a storage medium gets empty.

Contrary to this, in the event that write-once storage medium 4 is used, it is necessary to update the storage medium with a fresh medium when residual capacity of the storage medium gets empty. In order that a difference in usage due to its characteristics of each storage medium does not confuse a user, LCD display panel 6 displays so as to show that any of write-once storage medium 4 or overwritable storage medium 3 is inserted into card slot 2.

So far, a configuration of digital camera 1 in accordance with the first embodiment of this invention has been described. An explanation about work of digital camera 1 will be given hereinafter.

Figure 2:
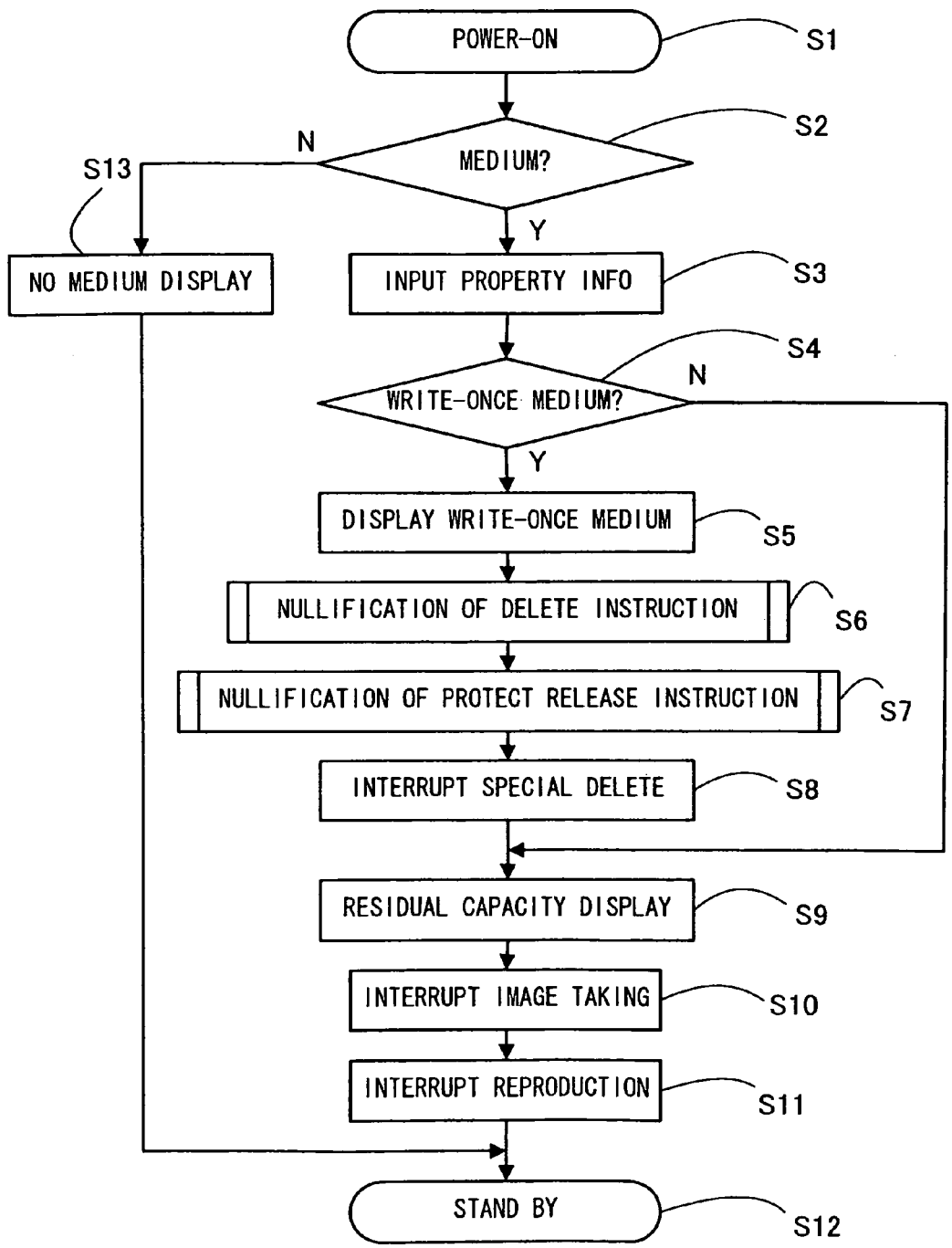
FIG. 2 is a main flow chart of control processing to be executed in the first embodiment.

FIG. 2 is a main flow chart showing a control processing of control/processor unit 5 according to the first embodiment.

In step S1, when a power switch is turned on via operation unit 7, it is boot digital camera 1 in a record mode. In step S2, it is checked whether or not a storage medium is inserted into card slot 2 and when the storage medium is inserted into card slot 2, the flow proceeds to step S3. In step S3, property information on the storage medium is read in via a connector of card slot 2. The property information is information that refers to a kind and capacity of a storage medium and also includes information on which a medium is in use, write-once storage medium 4 or overwritable storage medium 3.

In step S4, it is checked whether or not a medium inserted into card slot 2 is write-once storage medium 4 based upon property information inputted. When it is detected that write-once storage medium 4 is inserted, the flow proceeds to step S5. In step S5, LCD display panel 6 displays that the storage medium in use is write-once storage medium 4. This display is kept on as long as the power switch is on.

In step S6, it is to process nullification of a delete instruction. With overwritable storage medium 3 in use, it is possible to give a delete instruction of a stored image and secure capacity for new image data by deleting the image. Processing of nullifying the delete instruction is processing to make the delete instruction invalid even if the instruction to delete an image is given. The deletion instruction is performed through an operation of operation unit 7 with a display of an image in question on LCD display panel 6. And also, it is possible to automatically give a delete instruction from an outside via digital input/output terminal 12 after an image is automatically read out outside via digital input/output terminal 12. When processing of nullifying the delete instruction is performed, the delete instruction becomes null and void, and then processing to delete an image is not executed.

In step S7, processing of nullifying a protect release instruction is performed. As described above, it is possible to instruct a deletion of an image in case of overwritable storage medium 3. But, to avoid an inadvertent deletion, an instruction to protect an image from a delete operation and an instruction to release this protect every each image can be given via operation unit 7. Processing of nullifying the protect release instruction is processing to make the protect release instruction invalid if the protect release is instructed. Herein, write-once storage medium 4 is configured in such a way that an image cannot be overwritten owing to protect processing, so it is to make sure such that processing of nullifying the protect release instruction does not inadvertently release the protect processing.

In step S8, it is to enable an interrupt special delete. As overwriting cannot be performed on write-once storage medium 4, new memory capacity cannot be secured even if a stored image is deleted. However, there is a case where images that a user does not want to keep by all means or show to anyone happen to be stored in write-once storage medium 4. Thus, processing of an interrupt special delete makes it possible to delete these images stored in write-once storage medium 4. A detail of processing of nullifying the interrupt special delete will be described later.

In step S9, after processing the foregoing, it is to detect residual capacity of a storage medium and display the detected capacity on LCD display panel 6. In step S4, when it is detected that the storage medium is not write-once storage medium 4, the flow proceeds to step S9. When residual capacity of overwritable storage medium 3 is detected, the detected capacity is displayed on LCD display panel 6.

In step S10, it is to enable an interrupt image taking corresponding to an operation of a shutter release button in operation unit 7. In step S11, it is to make an interrupt reproduction enabled corresponding to a reproduction mode selection in operation unit 7. In step S12, the flow is put on a standby.

On the other hand, when the storage medium is not inserted into card slot 2 in step S2, the flow proceeds to step S13. In step S13, LCD display panel 6 displays that there is no storage medium inserted into card slot 2. Then, the flow proceeds to step S12. Accordingly, when there is no storage medium inserted into card slot 2, the interrupt imaging taking and the interrupt reproduction become disable.

According to the first embodiment, based upon the property information inputted via the connector of card slot 2 in step S3, a kind of the storage medium is detected in step S4. But, the first embodiment is not limited to this example. For example, let a given connector pin out of a plurality of connector pins, provided at a storage medium, connecting to the storage medium and card slot 2 be for checking the medium. There is provided the given pin in overwritable storage medium 3, whereas write-once storage medium 4 has no given pin. In this case, in step S4, detection of whether the given pin is connected to the connector on a side of slot card 2 permits to judge whether write-once storage medium 4 is inserted. Or, an exterior shape of the storage medium is so configured as to be different between overwritable storage medium 3 and write-once storage medium 4, so a kind of the storage medium can be detected. For example, a notch is provided at a part of the exterior shape of write-once storage medium 4. In this case, by providing a switch or so to detect presence or absence of a notch or so provided on the side of the storage medium, it can be judged whether or not write-once storage medium 4 is inserted.

Figure 3:
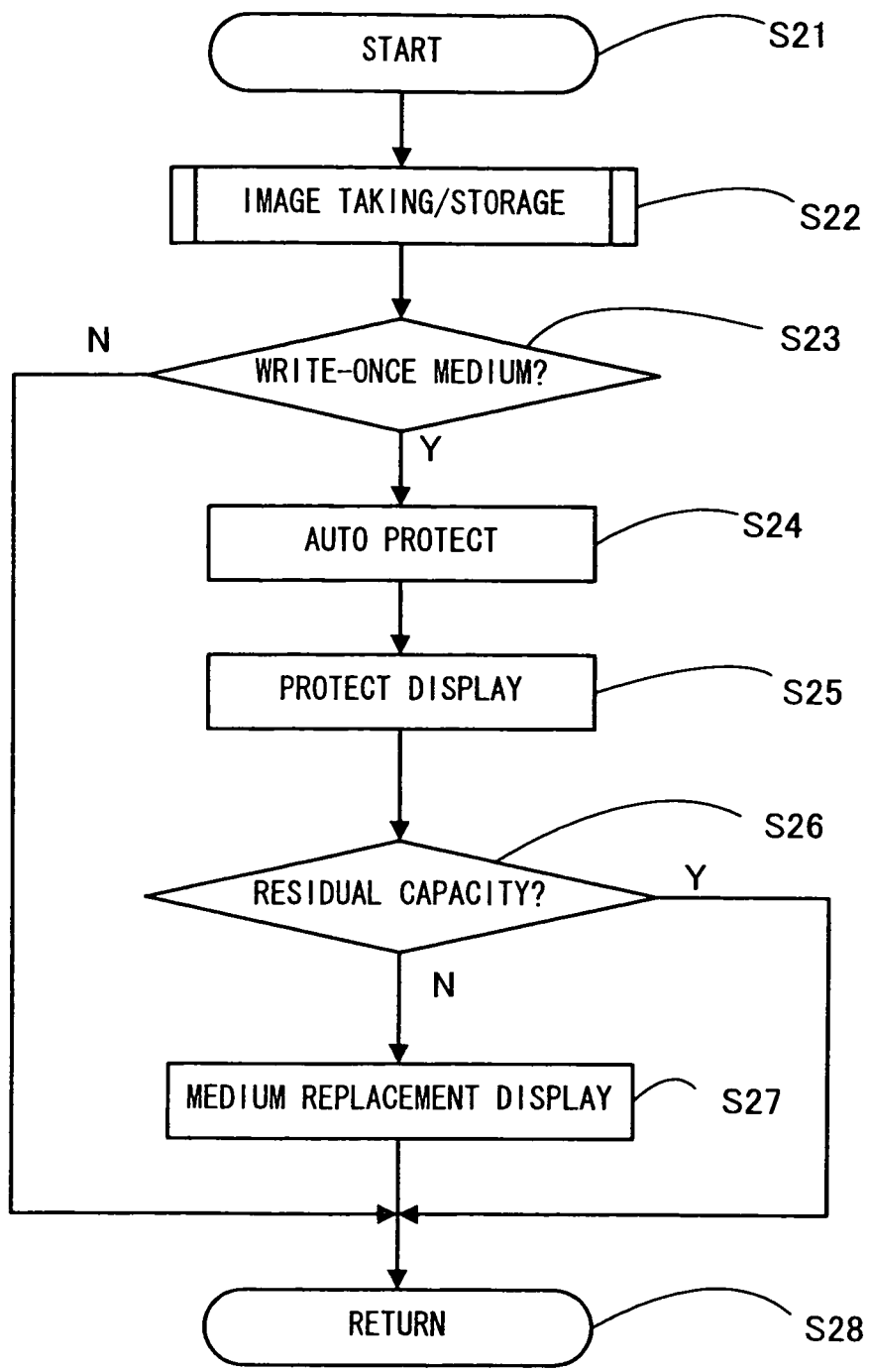
FIG. 3 is a flow chart of interrupt image taking processing to be executed in the first embodiment.

Next, a detail of work of digital camera 1 in accordance with the first embodiment will be described.
(Processing of the Interrupt Image Taking: FIG. 3)

First, work in a case where a shooting operation is performed with processing of the interrupt image taking in step S10 of the flow chart in FIG. 1 will be described using a flow chart of FIG. 3. FIG. 3 is the flow chart showing a processing procedure of the interrupt image taking to be executed in control/processor unit 5. Pressing a shutter release button in operation unit 7 lets this processing start from step S21.

In step S22, it is to perform image taking processing and storage processing. Control/processor unit 5 retrieves an image via imaging device 8, A/D converter 9 and Raw data buffer 11. Further, after processing such an image interpolation and an image compression is performed, the image is stored in the storage medium via card slot 2.

In step S23, it is judged whether or not write-once storage medium 4 is inserted into card slot 2. This judgment can be made based upon the property information inputted in step S3 of FIG. 2. When it is judged that write-once storage medium 4 is inserted, the flow proceeds to step S24. In step S24, the image stored in write-once storage medium 4 in step S22 is automatically protected so as not to be overwritten. In step S25, LCD display panel 6 displays that the image appearing on a display screen is protected.

In step S26, it is checked if there is residual capacity in write-once storage medium 4. When it is judged that there is no capacity or no enough capacity to store a new image, the flow proceeds to step S27. In step S27, LCD display panel 6 displays that the storage medium in use is to be updated. Then, in step S28, the flow gets back to the main flow. In step S26, when it is judged that there is residual capacity, the flow proceeds to step S28 and gets back to the main flow.

On the other hand, when it is judged in step S23 that the storage medium is overwritable storage medium 3, not write-once storage medium 4, the flow proceeds to step S28 and gets back to the main flow.

Like this, when overwritable storage medium 3 is inserted, processing in steps 26 and 27 are not performed, so LCD display panel 6 does not display that the storage medium in use is to be updated even when residual capacity of the storage medium becomes less.

Figure 4:
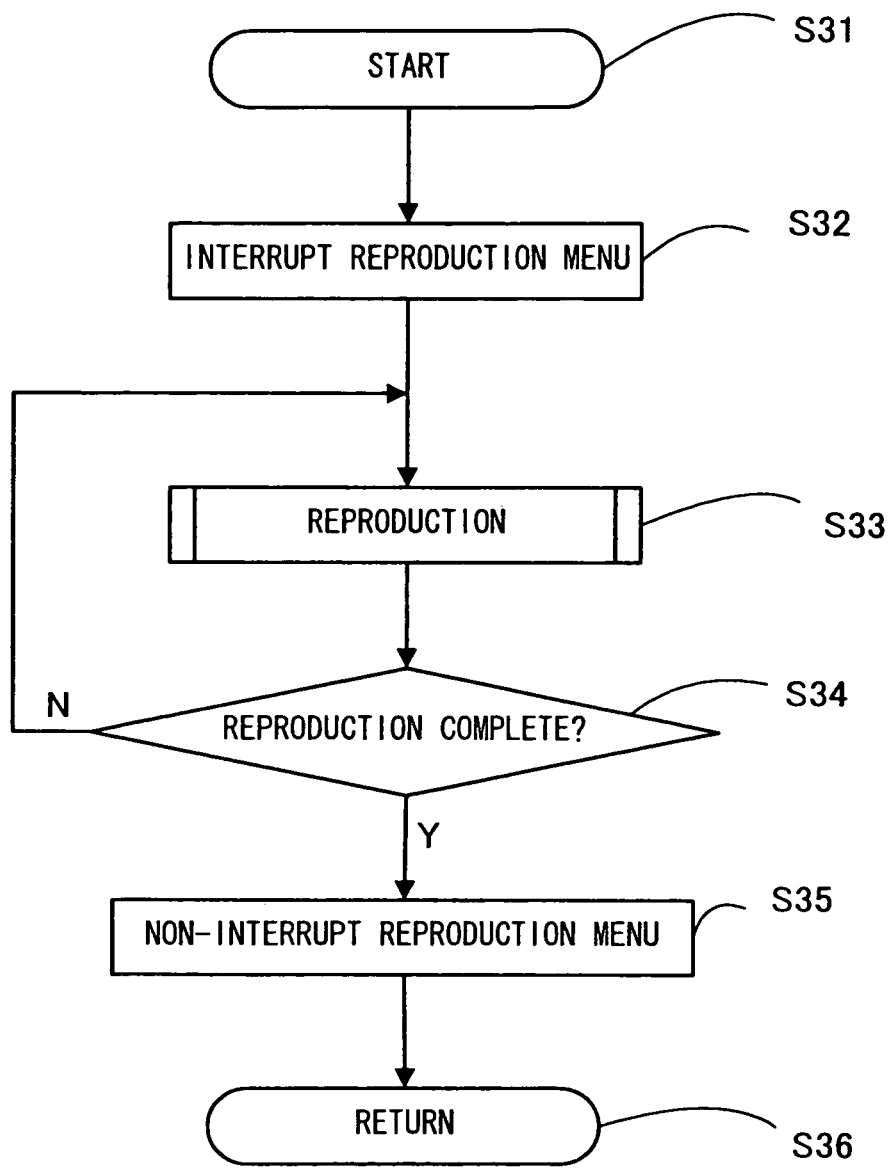
FIG. 4 is a flow chart of interrupt reproduction processing to be executed in the first embodiment.

Write-once storage medium 4 is basically the same configuration with overwritable storage medium 3 rather than an image quality stored in medium 4 getting deteriorated due to excessive overwriting beyond a performance warranty against repeated overwriting. Then, in step S24 of FIG. 3, write-once storage medium 4 is configured such that automatic protect processing via control/processor unit 5 inhibits a user from overwriting and deleting the image and does not confuse the user. But, the first embodiment is not limited to this example and, for example, when write-once storage medium 4 in itself is configured such that overwriting and deleting are banned, processing in steps S24 and S25 can be omitted.
(Processing of Interrupt Reproduction: FIG. 4)

Next, work in a case where a reproduction operation is performed with processing of the interrupt reproduction enabled in step S11 of the flow chart in FIG. 1 will be described using a flow chart of FIG. 4. FIG. 4 is the flow chart showing a processing procedure of the interrupt reproduction to be executed in control/processor unit 5. Selecting a reproduction mode via an operation of operation unit 7 lets this processing start from step S31.

In step S32, it is to enable an interrupt reproduction menu. The reproduction menu is various kind of an operation menu that can be set in the reproduction mode.

In step S33, it is to process a reproduction. A latest image stored in write-once storage medium 4 is reproduced on LCD panel unit 6. An image displayed on LCD display panel 6 can be changed at will via operation unit 7 and an image advance can be performed. When a thumbnail display is selected via operation unit 7, all of images stored in the storage medium are displayed on LCD display panel 6. Every time a single operation of the reproduction process is finished in step S33, the flow proceeds to step S34.

In step S34, it is judged if an operation to finish reproduction is performed via operation unit 7 and when the reproduction finishing operation is performed, the flow proceeds to step S35. In step S35, it is to make an interrupt reproduction menu disabled and then in step S36, the flow gets back to the main flow of FIG. 2. Then, a mode is changed from the reproduction mode to a record mode. When the operation to finish reproduction is not performed in step S34, the flow gets back to step S33 and processing in steps S33 and S34 is repeatedly performed until the operation to finish reproduction is implemented.

Figure 5:
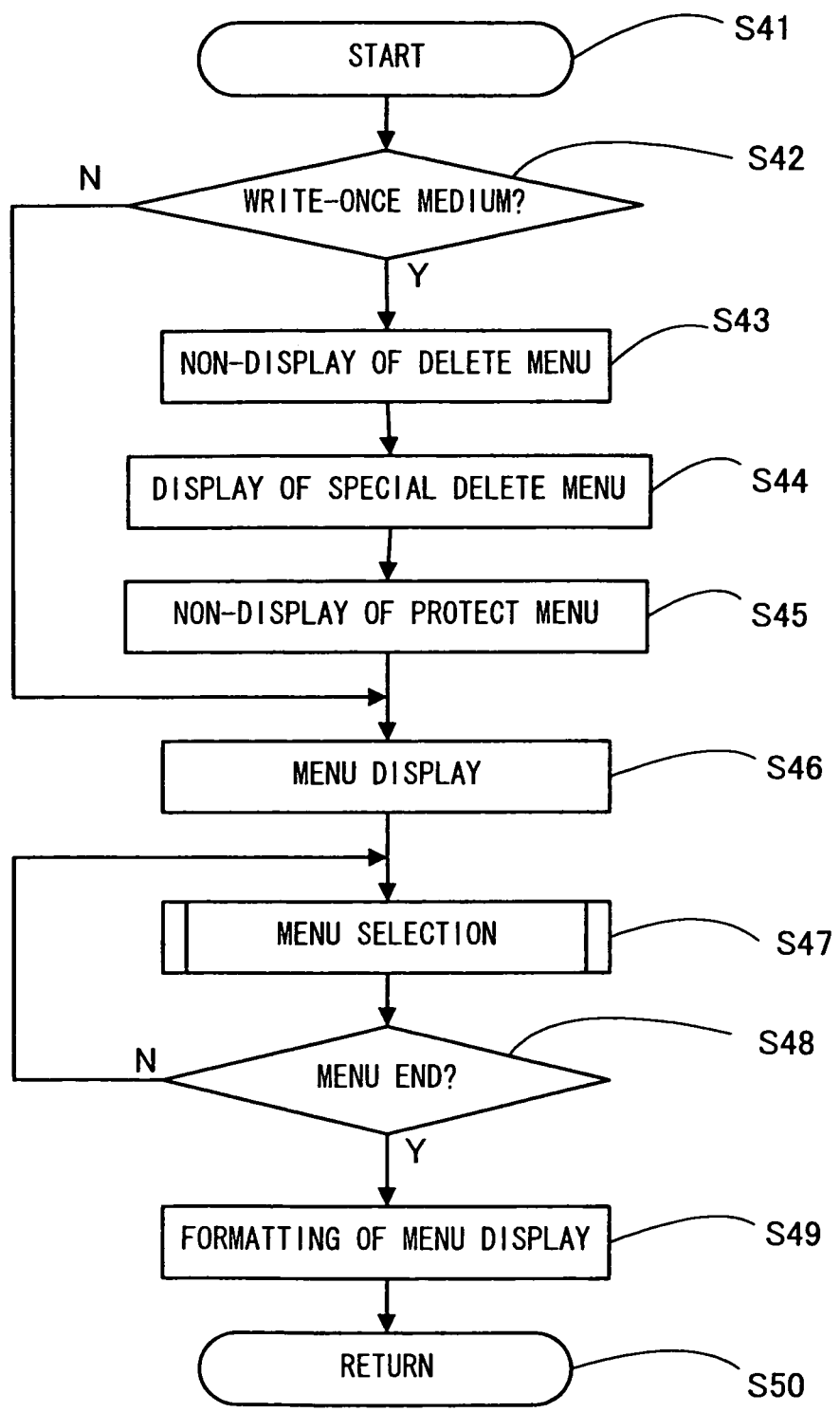
FIG. 5 is a flow chart of an interrupt reproduction menu to be executed in the first embodiment.

(Processing of an Interrupt Reproduction Menu: FIG. 5)

Next, work in a case where a reproduction menu is selected with processing of the interrupt reproduction menu enabled in step S32 of the flow chart in FIG. 4 will be described using a flow chart of FIG. 5. FIG. 5 is the flow chart showing a processing procedure of interrupt reproduction menu processing to be executed in control/processor unit 5. The reproduction menu is various kind of the operation menu that can be set in a reproduction mode and an operation item such as the thumbnail display, an enlarged display, a bulk delete of images, an individual delete of an image, a protect image and a release protect image delete is displayed on LCD display panel 6 as an itemized menu. One of items listed in the menu can be selected via operation unit 7. Selecting the reproduction mode via operation unit 7 lets this processing start from step S41.

In step S42, it is checked whether write-once storage medium 4 is inserted into card slot 2 and when write-once storage medium 4 is inserted, an item change processing of a display menu is performed in steps S43 through S45.

In step S43, it is to process a non-display of deleted menu and, more specifically, an operation item such as the bulk image delete and the single image delete is excluded from a reproduction menu so as not to be displayed on LCD display panel 6. In step S44, a special delete menu display processing is performed and, more specifically, a special delete is added to the menu as an operation item so that the special delete is displayed on LCD display panel 6. Also, in step S45, it is to process a non-display of a protect menu and, more specifically, an operation item such as a protect of an image and a release protect of an image is excluded from the reproduction menu so that such operation items are not displayed on LCD display panel 6. With the above processing in steps S43 to S45, menu items excluded from the reproduction menu cannot be selected via operation unit 7.

In step S46, the reproduction menu including a result of the item change performed in step S43 through step S45 is displayed. In step S42, on the other hand, when the storage medium in use is overwritable storage medium 3, not write-once storage medium 4, the flow proceeds to step S46, not changing an operation item. In this case, operation items such as the thumbnail display, the enlarged display, the bulk image delete, a single image delete, a protect image and the release protect image and so are displayed as the list menu on LCD display panel 6.

In step S47, from reproduction menu displayed on LCD display panel 6, an item in the list is selected via operation unit 7 and a selected operation item via operation unit 7 is executed. Every time processing of the selected operation item is complete, the flow proceeds to step S48. In step S48, it is checked if an operation of closing a reproduction menu is performed via operation unit 7. When the operation is performed, the flow proceeds to step S49.

In step s49, it is to format a menu display. In a case where the operation item change processing is performed in step S43 to step S45, a menu screen returns to the reproduction menu display of standard operation items such as thumbnail display, an enlarged display, the bulk image delete, the single image delete, the protect image and the release protect image and so forth. And then, the flow gets back to the flow of interrupt reproduction in step S50 of FIG. 4.

When the operation of closing the reproduction menu is not executed in step S48, the flow gets back to step S47 and processing in steps S47 and S48 is repeatedly performed until the operation to finish the reproduction menu is executed. After the reproduction menu display is performed in step S46, when the operation to finish the reproduction menu is executed not selecting the operation item, the flow gets back to step S49 to format the menu display.

In the interrupt reproduction menu processing like the foregoing, the processing to nullify the delete instruction and the release protect instruction in steps S6 and S7 of FIG. 2 is performed and further, the processing in steps S43 and S45 lets these operation items be deleted from the reproduction menu. Accordingly, the foregoing processing can avoid a user from being confused when the user operates and also becomes a safety measure just in case of an error.

However, in the event that processing of step S6 and step S7 are so configured as to be surely performed, processing of steps S43 and S45 can be omitted. In this case, the delete image and a protect-related operation item are displayed on LCD display panel 6 as a selectable operation item on the surface even when write-once storage medium 4 is inserted into card slot 2. However, even if the delete image and the protect-related operation item are selected, none of the delete image and the release protect can be executed since processing to nullify the instruction is performed in steps S6 and S7.

And in a case where processing in steps S43 and S45 of FIG. 5 are so configured as to be surely executed, steps S6 and S7 of FIG. 2 can be omitted. But, in this case, instead of step S6 of FIG. 2, it is preferable that there is provided a processing step to nullify a delete instruction from an outside via digital input/output terminal 12.

Also, it is possible that processing of an item change of the display menu in steps S43 to S45 is so configured as to be executed all at once in steps S6 and step S7.

(Interrupt Special Delete Processing)

Figure 6:
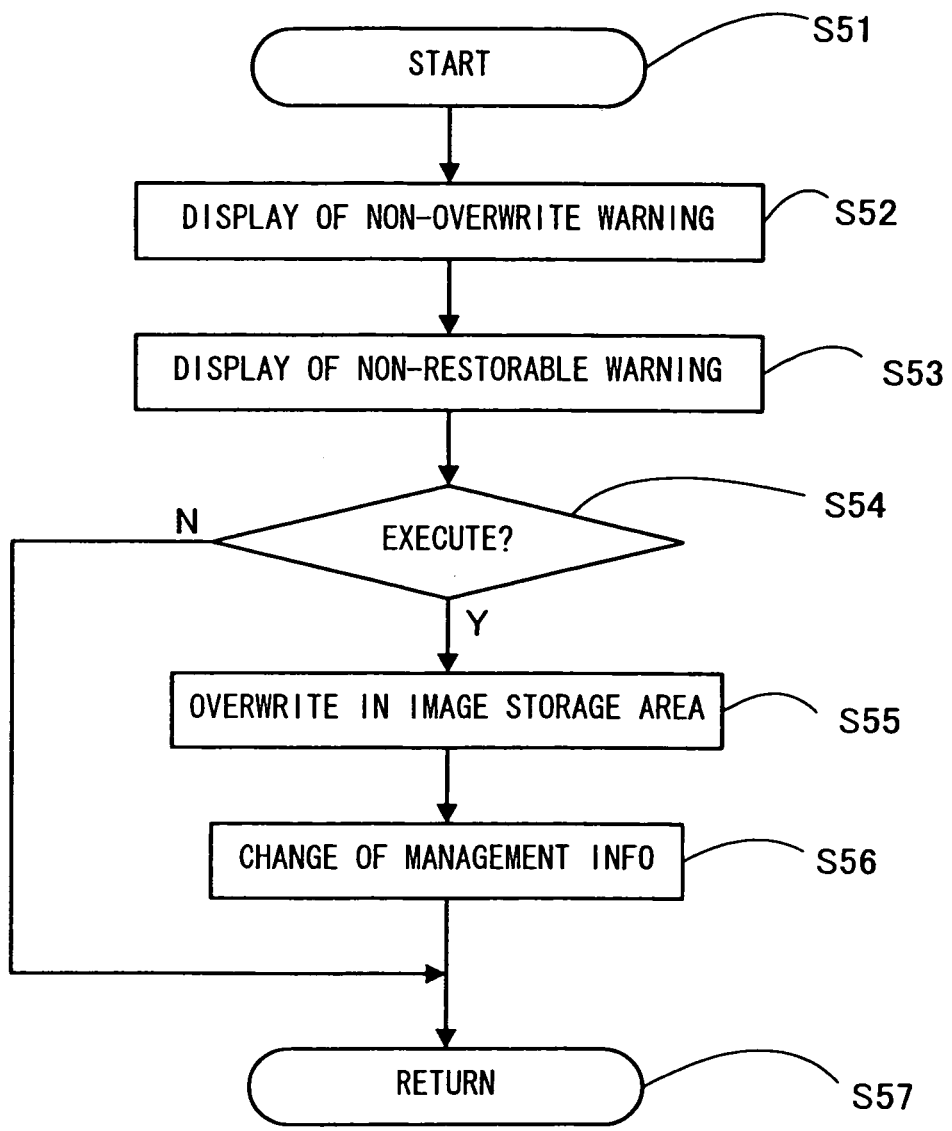
FIG. 6 is a flow chart of an interrupt special delete to be executed in the first embodiment.

Next, work in a case where a special delete operation is performed with processing of the interrupt special delete enabled in step S8 of the flow chart in FIG. 2 will be described using a flow chart of FIG. 6. FIG. 6 is the flow chart showing a processing procedure of interrupt special delete processing to be executed in control/processor unit 5. This processing will start from step S51 by selecting a special delete item from the reproduction menu with an image being reproduced on LCD display panel 6.

In step S52, overwrite disabled notice is displayed on LCD display panel 6. With this display, a user is notified that deletion of an image cannot secure new capacity in write-once storage medium 4. This overwrite disabled notice display notifies a user that a special delete operation is different from a normal delete operation against overwritable storage medium 3 not to confuse a user.

In step S53, a restore disable warning is displayed on LCD display panel 6. Deletion to be performed against overwritable storage medium 3 is not to delete image information itself from the storage medium. Namely, when the deletion of an image is instructed, data on management information corresponding to the image is caused to be in a deleted state and then a storage area of image information specified by management information is made enabled to be overwritten. Accordingly, even with the delete operation, unless an area actually storing the image information is overwritten by another information, it is possible to restore the image again using special restoration software. The management information herein is information such as FAT (File Allocation Table) data controlling image data stored in the storage medium.

On the other hand, if an image is deleted by overwriting management information against the write-once storage medium 4, there is a possibility that a new image is overwritten by utilizing a storage area of information about an image to be deleted. In this case, the image overwritten by the new image gets broken and cannot be restored. Accordingly, the first embodiment employs a deletion method with respect to write-once storage medium 4, which will be explained hereinafter. With this method, once an image of write-once storage medium 4 is deleted, it becomes impossible to restore the image. Thus, the restore disable warning display notifies a user that the image restoration is impossible. In this way, in the event that an image is deleted from write-once storage medium 4, the image restoration becomes impossible, which meets a user's intention that he or she does not want to have pictures viewed.

In step S54, it is checked if a delete execution is selected via operation unit 7 within a given period of time since the notice and the warnings in steps S52 and step S53 are displayed on LCD display panel 6. When the delete execution is selected in step S54, assuming that a user is convinced with the notice and the warnings displayed on LCD display panel 6 so that the user selects the delete operation, the flow proceeds to step S55.

In step S55, the storage area of the image to be deleted specified by management information is overwritten by meaningless information and the image information itself is deleted.

In step S56, it is to process a change of management information. More specifically, management information is so changed as to exclude an image to be deleted from a reproduction candidate. In a case of a normal delete against a overwritable storage medium, management information is so changed as to make a storage area corresponding to the image to be deleted capable of being overwritten. Like this, by changing management information so as to exclude an image to be deleted from a reproduction candidate, the image storage area corresponding to the changed management information is already occupied and overwriting cannot be performed in this area, so this area cannot be re-used for storing new image data. And, as information about the storage area of the image to be deleted is excluded from the reproduction candidate, the image overwritten by the meaningless information cannot be reproduced.

When the special delete operation of such the processing is complete, the flow proceeds to step S57 and returns to processing of the interrupt reproduction menu of FIG. 5. On the other hand, in step S54, when a user backs down on an intention of the special delete in response to the notice and the warnings displayed on LCD display panel 6 does not implement an execution within the given period of time via operation unit 7, the flow proceeds to step S57 and returns to processing of the interrupt reproduction menu of FIG. 5.

When write-once storage medium 4 is so configured as to inhibit a user from to overwriting and deleting, it is not necessary to consider from a standpoint of preventing the image storage area of the storage medium as described above from inadvertently being overwritten. But, when an image stored in write-once storage medium 4 is made capable of being deleted with reference to write-once storage medium 4, it is necessary to employ a delete method different from one applicable to overwritable storage medium 3. It is preferable that the notice and warning as described in steps S52 and S53 are given to the user. Therefore, in the event that write-once storage medium 4 so configured in advance as to inhibit a user from overwriting and deleting is used, the same processing like the interrupt special delete processing of FIG. 6 is needed.

Second Embodiment

Next, an explanation about a digital camera in accordance with a second embodiment of this invention will be given hereinafter using accompanying diagrams.

Figure 7:
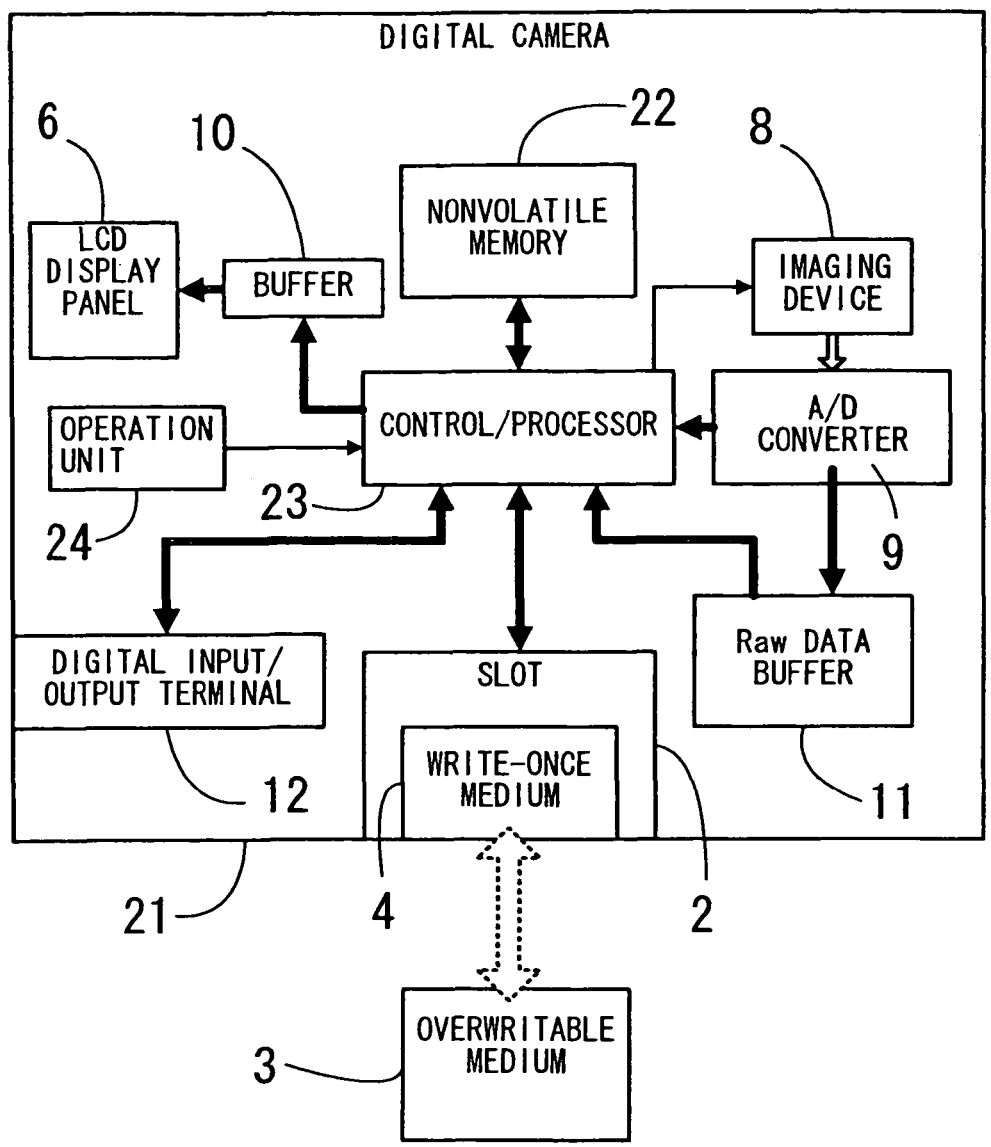
FIG. 7 is a block diagram showing a configuration of a digital camera in a second embodiment of this invention.

FIG. 7 is a block diagram showing a digital camera system in accordance with the second embodiment of this invention. In FIG. 7, the same numeral references are given to the same configuring unit and the like as the first embodiment of FIG. 1 and its explanation is omitted. Things different from the first embodiment will be mainly described hereinafter.

As shown in FIG. 7, digital camera 21 of the second embodiment has internal nonvolatile memory 22. Nonvolatile memory 22 stores image data processed by control/processor unit 23 along with write-once storage medium 4 or overwritable storage medium 3 inserted into card slot 2. The image data stored in nonvolatile memory 22 is transcribed to a storage medium inserted into card slot 2 and then can be retrieved outside. Also, the image data stored in nonvolatile memory 22 can be directly read out over a digital communication cable connected to digital input/output terminal 12.

Work of digital camera 21 in accordance with the second embodiment will be described hereinafter. First, its outline will be explained.

Figure 8:
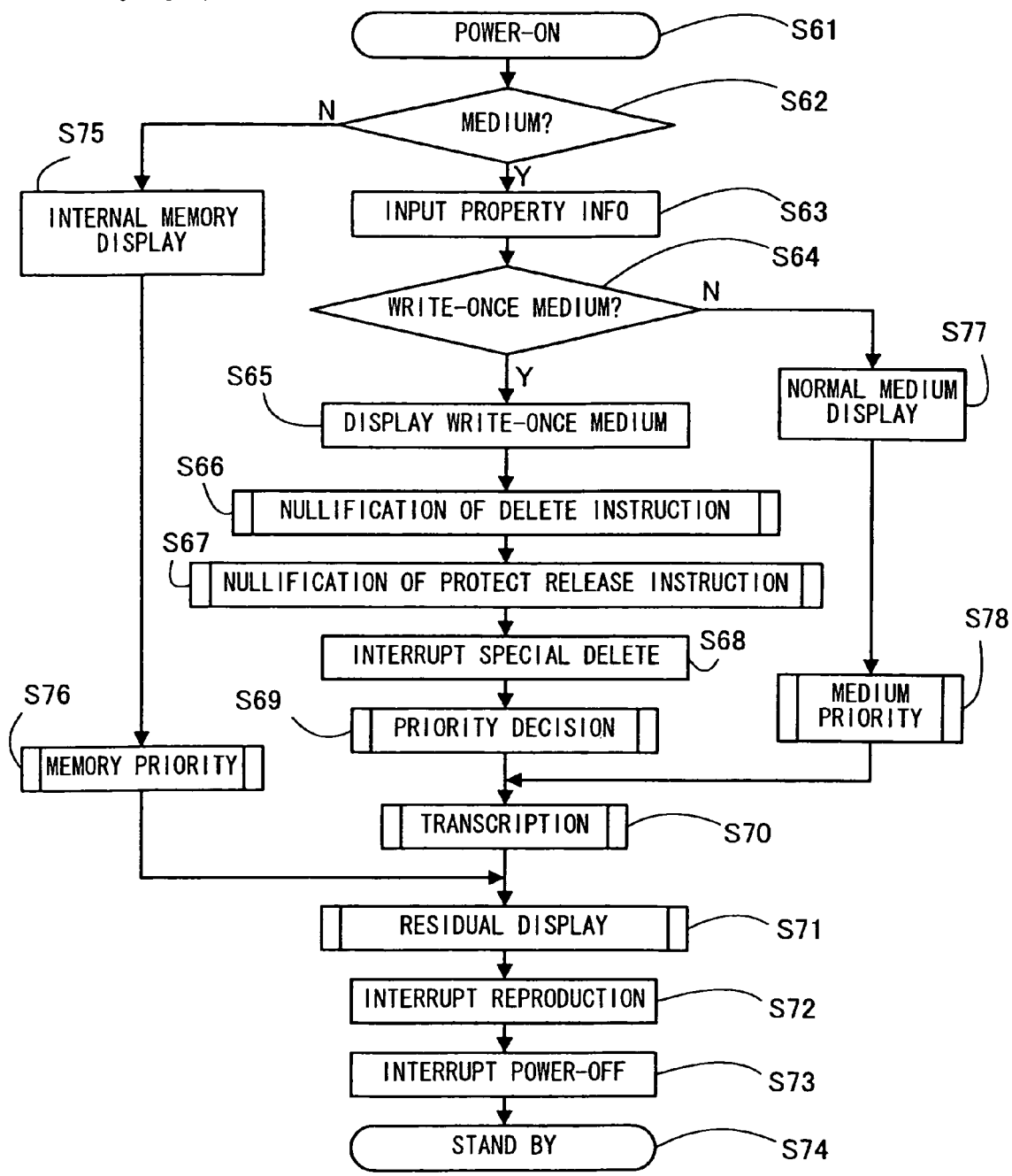
FIG. 8 is a main flow chart of control processing to be executed in the second embodiment.

FIG. 8 is a main flow chart showing a control processing by control/processor 23 of the second embodiment.

In step S61, when a power is ON via operation unit 24, digital camera 21 is booted in a record mode. In step S62, it is checked if a storage medium is inserted into card slot 2 and if the storage medium is inserted, the flow proceeds to step S63. In step S63, property information about the storage medium is read in via a connector of card slot 2.

In step S64, based upon the property information inputted in step S3, it is checked if write-once storage medium 4 is in use. If write-once storage medium 4 is in use, the flow proceeds to step S65, wherein a display showing that write-once storage medium 4 is in use appears on LCD display panel 6. This display runs on as long as the power is ON.

In step S66, it is to process nullification of the release protect instruction. Here, this processing is to nullify the delete instruction directed for image data stored in write-once storage medium 4. However, when a delete instruction is given to image data stored in nonvolatile memory 22, this delete instruction is effective.

In step S67, it is to process nullification of the release protect instruction. Herein, it is to make the release protect instruction given to the image data stored into write-once storage medium 4 invalid. However, when the release protect instruction is given to image data stored in nonvolatile memory 22, this release instruction is effective.

In step S68, it is to make an interrupt special delete enabled. Herein, it is to make the interrupt special delete against image data stored in write-once storage medium 4 enabled. But an interrupt special delete towards image data stored in nonvolatile memory 22 is disabled.

In Step S69, it is to process priority decision to decide a priority order of a storage location to store image data. Specifically, it is decided which process is used to store image data taken by imaging device 8 and image-processed by control/processor 23, "memory priority process" letting nonvolatile memory 22 have a storage priority or "medium priority process" letting an storage medium inserted into card slot 2 have a storage priority.

In the "memory priority process", image data is first stored in nonvolatile memory 22 even when a write-once storage medium has residual capacity and then with a user's operation and confirmation etc, image data is transcribed to write-once storage medium 4. Image cannot be overwritten in write-once storage medium 4, so image storage is carefully performed with the memory priority. In the "medium priority process", however, as long as the storage medium inserted into card slot 2 has memory capacity, image data is stored firstly in the storage medium and when memory capacity of the storage medium becomes empty, image data is then stored in nonvolatile memory 22. A detail of priority decision processing will be explained later.

In step S70, image data stored in nonvolatile memory 22, when the power is ON, is transcribed to the storage medium inserted into card slot 2. A detail about transcription processing will be described later, too. In step S71, it is to process residual capacity display. This process will start when the power is on, which will be also detailed later. In step S72, it is to make interrupt reproduction in response to a reproduction mode selection enabled. In step S73, it is to make an interrupt power-off operation in response to the power-off operation also enabled. Accordingly, the flow becomes on standby in step S74.

When no storage medium is inserted into card slot 2 in step S62, the flow proceeds to step S75 to display an internal memory on LCD display panel 6. This internal memory display shows a state in which there is no storage medium inside card slot 2 and image storage is to be executed with only internal nonvolatile memory 22. This display runs on as long as the power is on. And "memory priority process" is performed in step S76, then the flow proceeds to processing of residual capacity display of step S71.

In step S64, when the storage medium is not write-once storage medium 4, the flow proceeds to step S77 in which it is judged that overwritable storage medium 3 is inserted into card slot 2 and LCD display panel 6 displays that the storage medium is overwritable storage medium 3. This display runs on as long as the power is on. Then, "medium priority process" is performed in step S78, and then the flow proceeds to transcription processing of step S70.

Processing shown in FIG. 8 is executed not only when the power is on, but also when a storage medium inserted into card slot 2 is changed while the power is on, that is, write-once storage medium 4 is updated with a overwritable storage medium and vice versa.

Next, a detail about work of digital camera 21 in accordance with the second embodiment will be given hereinafter.

Figure 9:
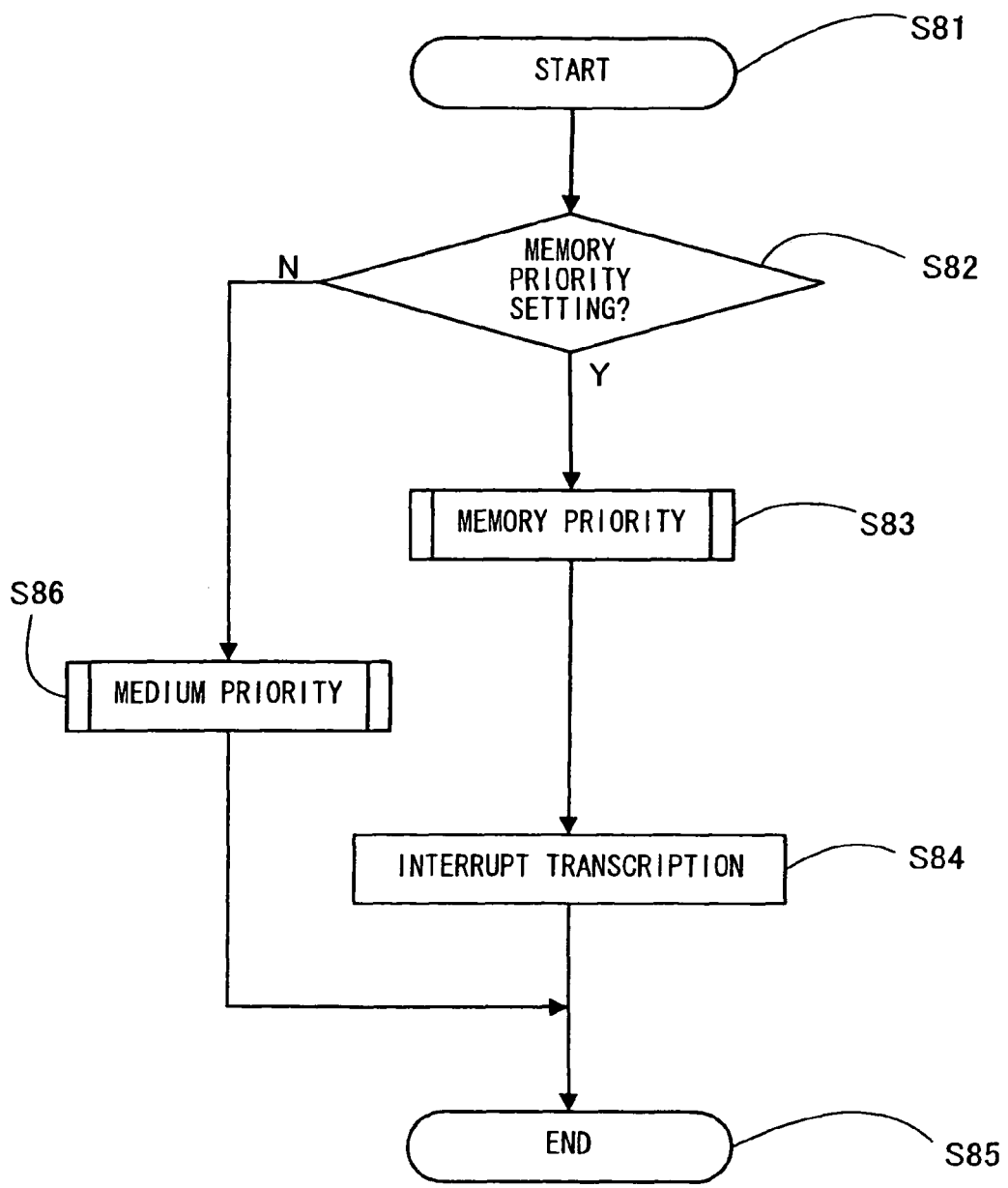
FIG. 9 is a flow chart showing priority decision processing of FIG. 8.

(Priority Decision Processing: FIG. 9)

A detail about priority decision processing in step S69 of FIG. 8 will be described hereinafter using a flow chart of FIG. 9. FIG. 9 is the flow chart showing a processing procedure of priority decision processing to be executed in control/processor 23.

Control/processor 23 has settings defaulted to perform "medium priority process" if nothing is set at a time of inserting write-once storage medium 4. Therefore, in a case where "memory priority process" is set, a setting change is performed via operation unit 24 at a time of inserting write-once storage medium 4. This setting change will be kept until write-once storage medium 4 is pulled out of card slot 2 or unless the setting change is performed again.

In FIG. 8, when the flow reaches step S69, priority decision processing starts from step S81 and in step S82, it is checked if "memory priority process" is set via operation unit 24. If memory priority process" is set, the flow proceeds to step S83. In step S83, it is to decide to perform "memory priority process". In step S84, when "memory priority process" is performed, as it is necessary to transcribe image data of nonvolatile memory 22 to write-once storage medium 4, an interrupt transcription is made enabled. In step S85, this processing is finished and the flow proceeds to step S70 of FIG. 8.

When "memory priority process" is not set in step S82, it is to decide to perform "medium priority process" in step S86 and the flow proceeds to step S85.

Figure 10:
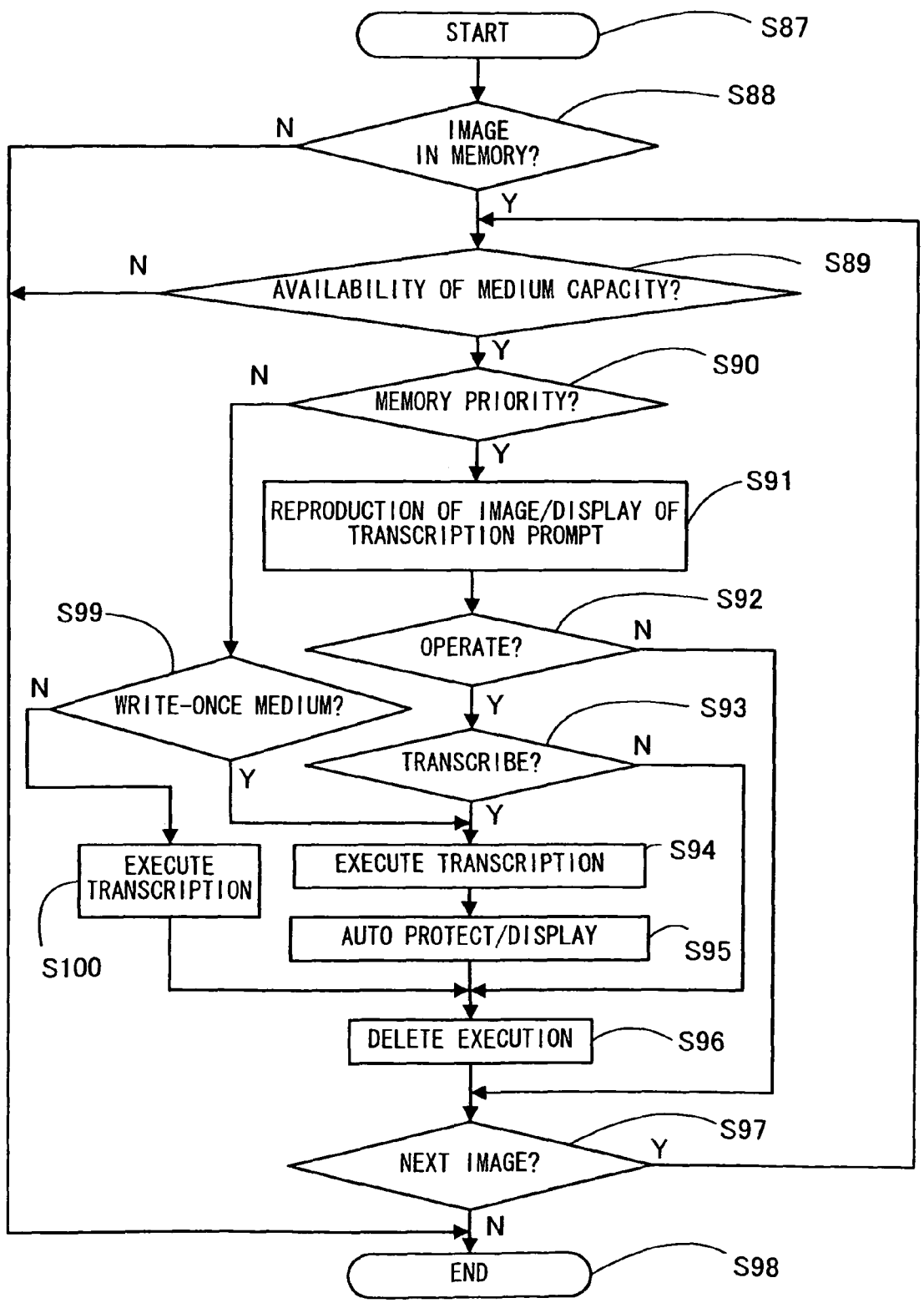
FIG. 10 is a flow chart showing a detail of transcription processing of FIG. 8.

(Transcription Processing: FIG. 10)

An explanation about a detail about transcription processing in step S70 of the flow chart of FIG. 8 will be given using a flow chart of FIG. 10. FIG. 10 is the flow chart showing the detail of transcription processing to be executed in control/processor 23.

In the flow chart of FIG. 8, wherein the flow reaches step S70, transcription processing will start from step S87. In step S88, it is checked if image data is stored in nonvolatile memory 22. As a case where there is image data stored in nonvolatile memory 22 at a time of turning a power on, it can be thought that image data stored by "memory priority process" remains intact without being transcribed or image data is stored in nonvolatile memory 22 due to emptiness of capacity of the storage medium in "medium priority process". In a latter case, the transcription becomes automatically performed when the medium inserted into card slot 2 is updated and the power is turned on.

In step S88, when image data is stored in nonvolatile memory 22, the flow proceeds to step S89. In step S89, it is checked if the medium inside card slot 2 has residual capacity. If there is residual capacity, the flow proceeds to step S90. In step S90, it is checked if "memory priority process" is set and if memory priority process" is set, the flow proceeds to step S91. When "memory priority process" is set, the storage medium inserted into card slot 2 is write-once storage medium 4.

In step S91, it is to reproduce an image stored in nonvolatile memory 22 and to be transcribed on LCD display panel 6 and further display a message asking if image to be transcribed is transcribed to the storage medium thereon. In step S92, it is checked if operation unit 24 is operated within a given period of time after the image to be transcribed was reproduced and the message asking for transcription was displayed on LCD display panel 6. If unit 24 is operated within the given period of time, the flow proceeds to step S93.

In step S93, it is detected whether the operation of operation unit 24 is the transcription operation or the delete operation. When the operation of operation unit 24 is the transcription operation, the flow proceeds to step S94, wherein it is to execute transcription of image data stored in nonvolatile memory 23 to write-once storage medium 4. Further, in step S95, it is to display that the same automatic protect processing and protect processing of image data with respect to write-once storage medium 4 as in steps S24 and S25 of FIG. 3 of the first embodiment were performed.

In step S96, it is to delete the image data of nonvolatile memory 22 whose transcription to the storage medium was complete and get an increase in residual capacity of nonvolatile memory 22.

In step S93, when the operation performed by operation unit 24 is not the transcription operation, it is presumed that operation unit 24 performs the delete operation and the flow proceeds to step S96. In step S96, it is to delete the image data of nonvolatile memory 22 without transcribing the image data to write-once storage medium 4 and then get an increase in residual capacity of nonvolatile memory 22 gets.

In step S97, it is checked if there is other data in nonvolatile memory 22 and if there is the other data in nonvolatile memory 22, the flow gets back to step S89 wherein processing of transcribing image data is continued. When there is no image data in nonvolatile memory 22, the flow proceeds to step S98 and this processing is ended. And then, the flow proceeds to the residual capacity display processing of step S71

In step S90, when it is not "memory priority process", the flow proceeds to step S99 without processing the confirmations in steps S91 and S92, assuming that "medium priority process" is set. In step S99, it is checked if the storage medium inserted into card slot 2 is write-once storage medium 4 and if the storage medium inserted into card slot 2 is write-once storage medium 4, the flow proceeds to step S94, wherein the image data stored in nonvolatile memory 22 is transcribed to write-once storage medium 4. Further, in step S95, it is to process an auto protect/display and also in step S96, it is to delete the image corresponding to the image stored in nonvolatile memory 22 and whose transcription to write-once storage medium 4 was complete. Accordingly, the image data transcription processing can be executed without user's transcription operation.

On the other hand, in step S99, when the medium is not write-once storage medium 4, the flow proceeds to step S100, assuming that overwritable storage medium 3 is inserted into card slot 2. In step S100, the image data stored in nonvolatile memory 22 is transcribed to overwritable medium 3 and the flow proceeds to step S96.

In step S92, when operation via operation unit 24 is not operated within the given period of time after the image to be transcribed was reproduced and the message asking for transcription was displayed on LCD display panel 6, the flow proceeds to step S97 skipping steps from S93 to S96, assuming that processing on the image is on hold. At this moment, the image to be transcribed remains in nonvolatile memory 22 intact. Image data put on hold is never handled as "next image data". When transcription processing re-starts from step S87, processing about transcription to the storage medium is newly performed on such the image data on hold.

In step S88, when there is no image data in nonvolatile memory 22 and in step S89, when there is no residual capacity in the storage medium inside card slot 2, the flow proceeds to step S98 and this processing is ended. When there is no storage medium inside card slot 2, it is judged in step S89 that there is no residual capacity in the storage medium and then this processing is ended.

As described in the foregoing, when "memory priority process" is set, processing of steps S91 and 92 prevents the unwanted image data from being stored in write-once storage medium 4 capable of being written one time only.

With such processing of steps S90 and S99, when "medium priority process" is set, image data, which is stored in nonvolatile memory 22 since the storage medium becomes full and nonvolatile memory 22 stores the image data, can be surely transcribed to the storage medium even when the storage medium of no residual capacity is updated and the power switch is turned on. Also, as described later, when image data in overwritable storage medium 3 full of images is deleted and capacity is secured to store image data, processing of steps S90 and S99 can surely let the image data in nonvolatile memory 22 be transcribed to the storage medium.

Figure 11:
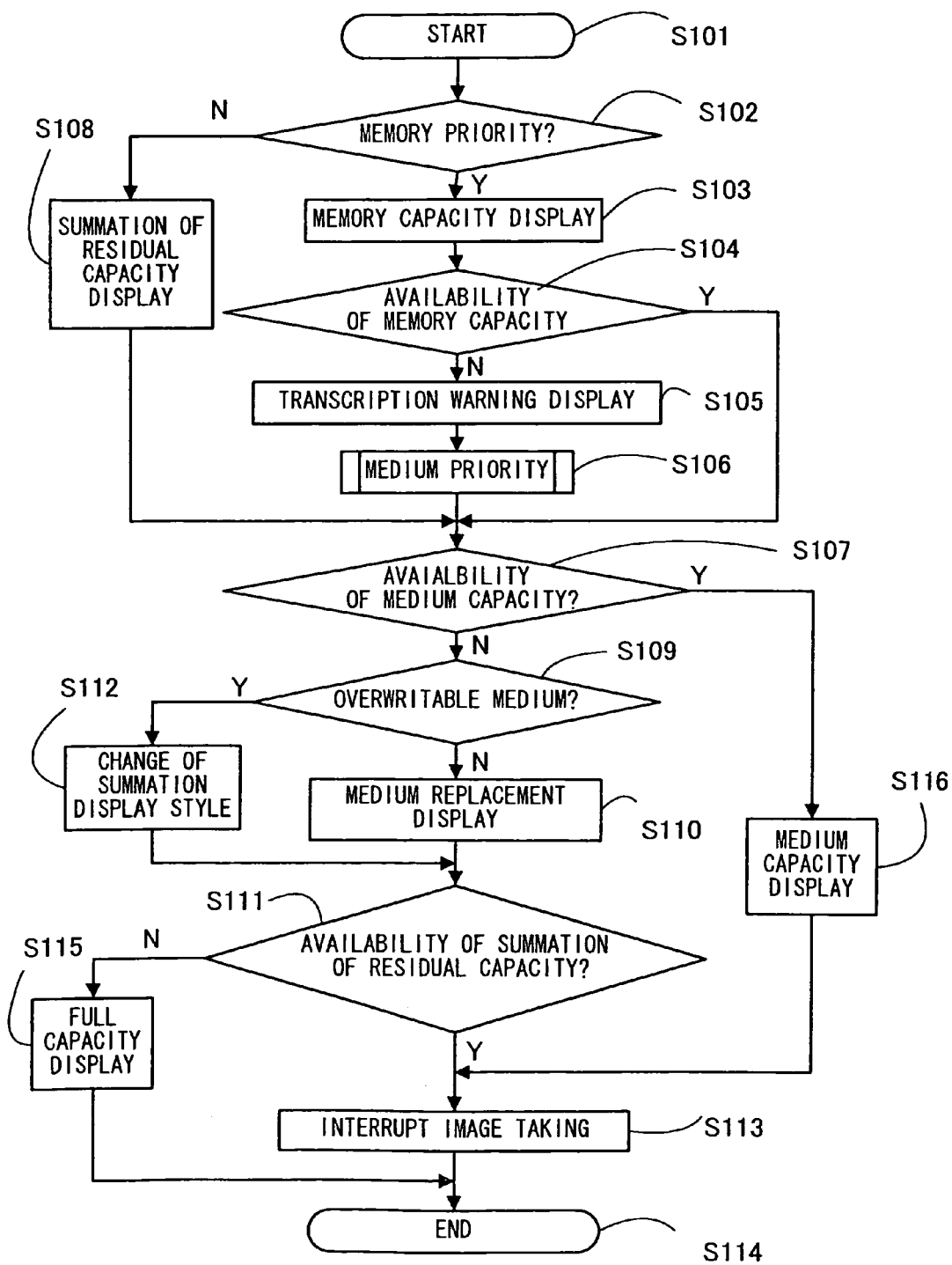
FIG. 11 is a flow chart showing residual capacity display processing of FIG. 8.

(Residual Capacity Display Processing: FIG. 11)

Next, an explanation about a detail of a residual capacity display processing in step S71 of FIG. 8 will be given hereinafter using a flow chart of FIG. 11. FIG. 11 is the flow chart showing a processing procedure of the residual capacity display processing to be executed in control/processor 23.

When the flow reaches step S71 of FIG. 8, the residual capacity display processing starts from step S101. In step S102, it is judged if "memory priority process" is set. If "memory priority process" is set, the flow proceeds to step S103.

In step S103, residual capacity of nonvolatile memory 22 is displayed on LCD display panel 6. When "memory priority process" is set, processing like image storage etc cannot be performed if there is no residual capacity in nonvolatile memory 22, even if the storage medium inside card slot 2 has residual capacity. Namely, to implement "memory priority process", information about residual capacity of nonvolatile memory 22 is required.

In step S104, it is checked if there is residual capacity in nonvolatile memory 22 and if there is not residual capacity, the flow proceeds to step s105 where a transcription warning display is performed. Specifically, what "memory priority process" cannot be executed anymore unless otherwise due to a lack of residual capacity of nonvolatile memory 22 is displayed on LCD display panel 6 and a message asking for an image transcription is brought up. And in step S106, after the "memory priority process" setting is forcefully switched to "medium priority process", the flow proceeds to step S107. When it is judged in step S104 that there is residual capacity in nonvolatile memory 22, the flow proceeds to step S107 with the "memory priority process" skipping processing of steps S105 and S106.

In step S102, when the "memory priority process" is not set, the flow proceeds to step S108, assuming that the setting is "medium priority process". In step S108, residual capacity of nonvolatile memory 22 and residual capacity of the medium inserted into card slot 2 are added together and a summation of residual capacity is displayed on LCD display panel 6. Then, the flow proceeds to step S107. When "medium priority process" is set, storage of image data begins from the storage medium sequentially without storing the image data in nonvolatile memory 22. Accordingly, with the display of the summation of residual capacity of nonvolatile memory 22 and the storage medium, a user can judge if image data can be stored.

In step S107, it is checked if there is residual capacity in the medium inserted into card slot 2. If there is not residual capacity, the flow proceeds to step S109 where it is checked if the medium inserted into card slot 2 is overwritable storage medium 3. If it is judged in step S109 that the medium is not overwritable storage medium 3, the flow proceeds to step S110. In step S110, it is judged that card slot 2 has write-once storage medium 4 inserted therein, message asking for medium replacement is displayed on LCD display panel 6.

In step S109, when overwritable storage medium 3 is inserted into card slot 2, the flow proceeds to step S112. In step S112, it is to modify a display style of the summation of residual capacity displayed in step S108. For example, by underlining a numeral figure of residual capacity or changing a display color of the numeral figure thereof, the display style of the summation of residual capacity is modified. Like this, when overwritable storage medium 3 is in use, a user is notified through modification of the display style of the summation of residual capacity that capacity of the storage medium gets fully occupied. That is, when overwritable storage medium 3 is in use as the storage medium, residual capacity is revived by deleting stored image data, so it is reasonable to give a notice with the display style modification, not displaying the message asking for medium replacement as performed to write-once storage medium 4 in step S110. When residual capacity in write-once storage medium 4 is revived by deletion of stored image data, the display style of the summation gets back to the normal display style too.

In step S111, it is checked if there is the summation of residual capacity of the storage medium inserted into card slot 2 and nonvolatile memory 22. When it is judged in step S111 that there is the summation of residual capacity, the flow proceeds to step S113, wherein it is to make an interrupt picture taking enabled. Namely, even if there is no residual capacity in the inserted storage medium, it is judged that the picture taking is possible when there is residual capacity in nonvolatile memory 22. Then, this processing is ended in step S114 and the flow proceeds to step S72 of FIG. 8.

When it is judged in step S111 that there is no residual capacity in the inserted storage medium and there is not capacity enough to store image data even if residual capacity of nonvolatile memory 22 is added to the inserted medium, the flow proceeds to step S115. In step S115, it is to display what a memory is full on LCD display panel 6 and the flow proceeds to step S114 to end this processing. Accordingly, when there is no summation of residual capacity, it is impossible to interrupt image taking unless the image data is deleted or the storage medium is updated.

When it is judged in step S107 that there is residual capacity in the medium, the flow proceeds to step S116. In step S116, after the residual capacity display is performed on LCD display panel 6, the flow proceeds to step S113. Even when there is residual capacity in the storage medium, a user can judge necessity for replacing the medium through the display of the medium residual capacity.

Figure 12:
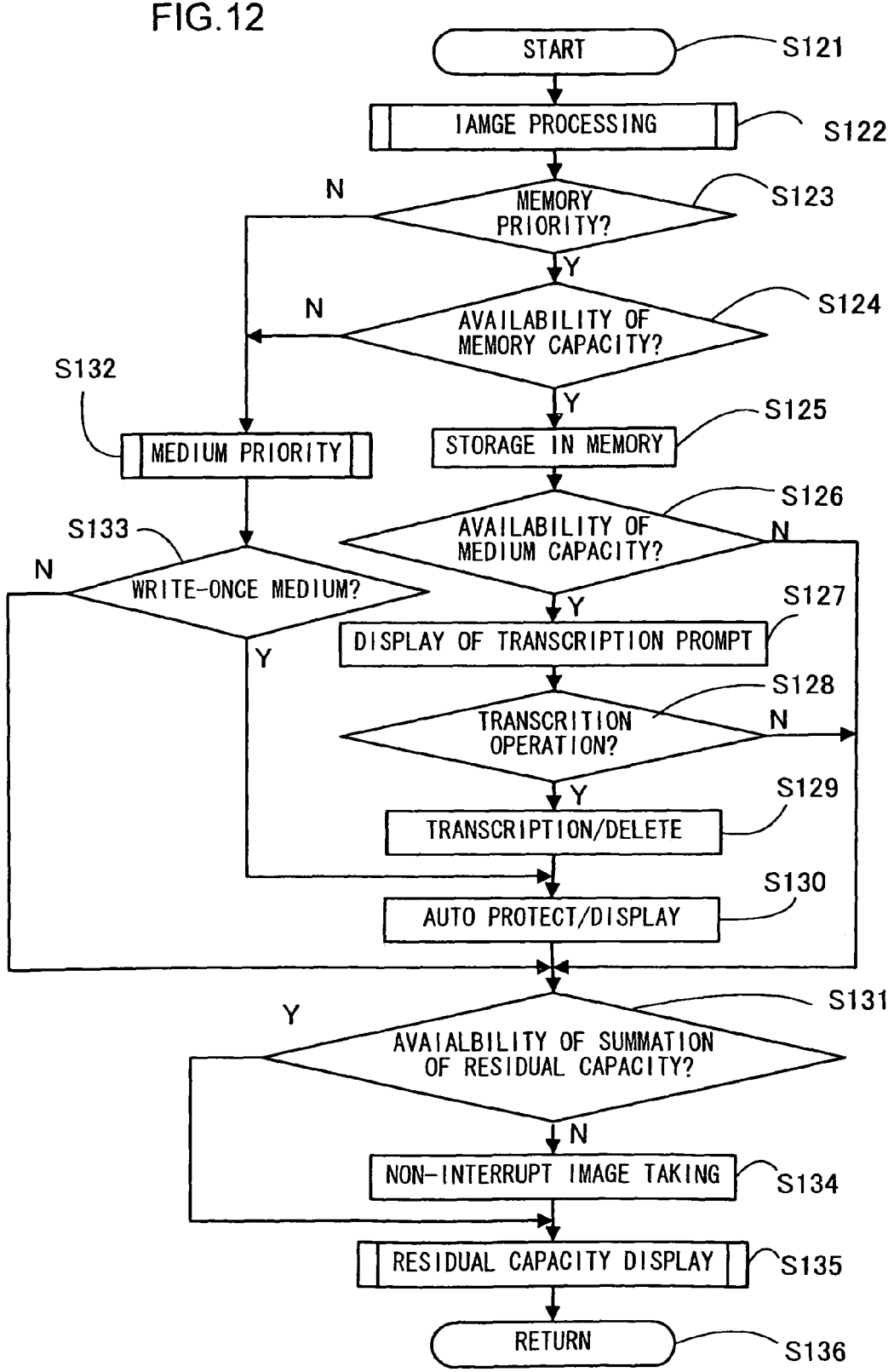
FIG. 12 is a flow chart of an interrupt image taking to be executed in the second embodiment.

(Processing to Interrupt Image Taking: FIG. 12)

Work in a case where an image taking operation is performed with processing of the interrupt image taking enabled will be described hereinafter using a flow chart of FIG. 12. FIG. 12 is the flow chart showing a processing procedure of the interrupt image taking to be executed in control/processor 23. This processing will start from step S121 by pressing a shutter release button of operation unit 24.

In step S122, it is to process an image control/processor 23 reads out an image via imaging device 8, A/D converter 9 and Raw data buffer 11 and performs processing like image interpolation and compression etc. In step S123, it is checked if "memory priority process" is set and when it is judged that "memory priority process" is set, the flow proceeds to step S124. In this case, card slot 2 has write-once storage medium 4 inserted therein. In step S124, it is judged if nonvolatile memory 22 has residual capacity and when the memory has capacity, the flow proceeds to step S125 to store the compressed image data in nonvolatile memory 22. Then, the flow proceeds to step S126 to perform processing to transcribe the image data.

In step S126, it is judged if write-once storage medium 4 inserted into card slot 2 has residual capacity to transcribe the image of nonvolatile memory 22. When the medium 4 has capacity, the flow proceeds to step S127. In step S127, a message asking if the image data is transcribed is displayed on LCD display panel 6. At this moment, an end result image appears on LCD display panel 6 for a given period of time with the message asking for transcription.

In step S128, it is judged if a transcription operation is performed via operation unit 24 within the given period of time since the end result image and the message asking for transcription appear on LCD display panel 6. In step S128, when it is judged that the transcription operation is performed within the given period of time, the flow proceeds to step S129. In step S129, transcription of the image data to write-once storage medium 4 is executed and further nonvolatile memory 22 gets an increase in residual capacity by deleting the image data of nonvolatile memory 22. In subsequent step S130, the same automatic protect processing of image data and display thereof are performed with respect to write-once storage medium 4 as in steps S24 and S25. Then, the flow proceeds to step S131.

On the other hand, when it is judged in step S126 that there is no residual capacity in write-once storage medium 4, it is unnecessary to consider transcription and thus the flow proceeds to step S131. Also when it is judged in step S128 that the transcription operation is not performed within the given period of time, the flow proceeds to step S131 too. Anyway, in step S128, it is to judge a presence or an absence of the transcription operation only and not to accept an image data delete operation right after the image is shot.

In step S123, when it is judged that "memory priority process" is not set, the flow proceeds to step S132. In step S132, the compressed image data is stored in "medium priority process". Namely, when there is residual capacity in the medium inserted into card slot 2, the image data is to be stored in the medium and when there is no capacity in the medium, the image data is to be stored in nonvolatile memory 22. In step S133, it is checked if write-once storage medium 4 is inserted into card slot 2 and when the medium 4 is inserted therein, the flow proceeds to step S130 and when overwritable storage medium 3 is inserted therein, the flow proceeds to step S131.

When it is judged in step S124 that there is no residual capacity in nonvolatile memory 22, "memory priority process" cannot be executed, so the flow proceeds to step S132 to switch over to "medium priority process".

In step S131, it is checked if there is summation of residual capacity of the storage medium inserted into card slot 2 and nonvolatile memory 22. When it is judged that there is no summation of residual capacity enough to store the image data, the flow proceeds to step S134. In step S134, it is to make the interrupt image taking disabled and the flow proceeds to step S135. When it is judged in step S131 that there is residual capacity, the flow proceeds to step S135. In step S135, based upon a latest image taking status after shot, it is to process a residual capacity display. This processing is ended in step S136 and the flow gets back to the main flow of FIG. 8 to stand by.

Figure 13:
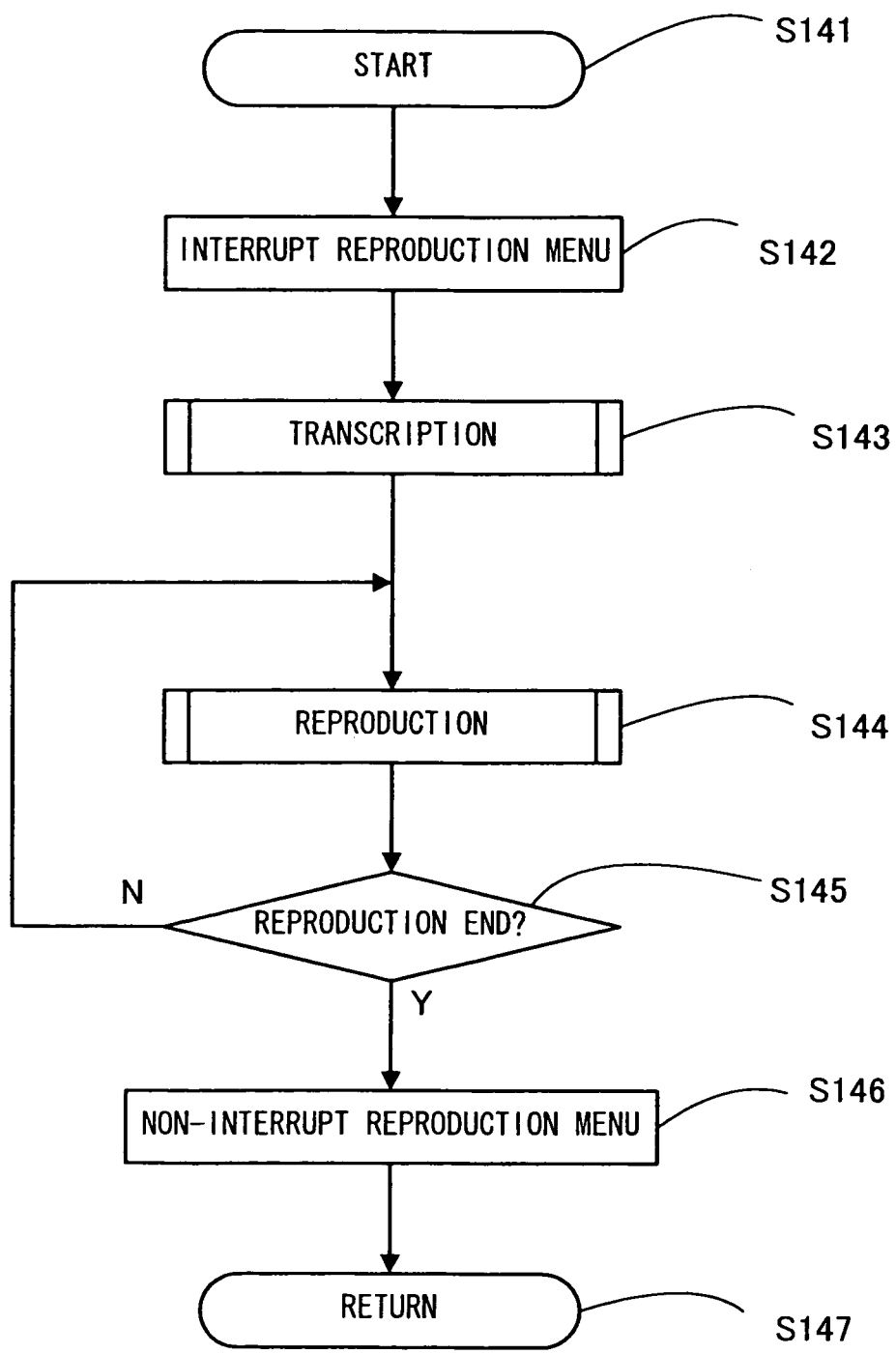
FIG. 13 is a flow chart of interrupt reproduction processing to be executed in the second embodiment.

(Processing to Interrupt Reproduction: FIG. 13)

Next, work in a case where a reproduction operation is performed with processing of the interrupt reproduction enabled will be described hereinafter using a flow chart of FIG. 13. FIG. 13 is the flow chart showing a processing procedure of the interrupt reproduction processing to be executed in control/processor 23. This processing will start from step S141 by selecting a reproduction mode via operation unit 24.

First, in step S142, it is to make the interrupt reproduction menu enabled.

In step S143, it is to process transcription of image data as shown in the flow chart of FIG. 10. Namely, when the reproduction mode is selected, the "memory priority process" is set and when the image data is stored in nonvolatile memory 22 and write-once storage medium 4 has residual capacity, transcription of the image data is asked (steps S91 through S97). Like this, when the "memory priority process" is set, residual capacity of nonvolatile memory 22 is configured so as to be secured as much as possible using selection of the reproduction mode. When the "medium priority process" is set, in the event that overwritable storage medium 3 has residual capacity by deletion of the image data etc, overwritable storage medium 3 is configured so as to be capable of retrieving as many image data as possible externally by transcribing image data of nonvolatile memory 22.

Processing from step S144 to step S147 is just the same as in steps from S33 to S36, so an explanation is omitted. A detail about reproduction processing in step S144 will be described hereinafter.

Figure 14:
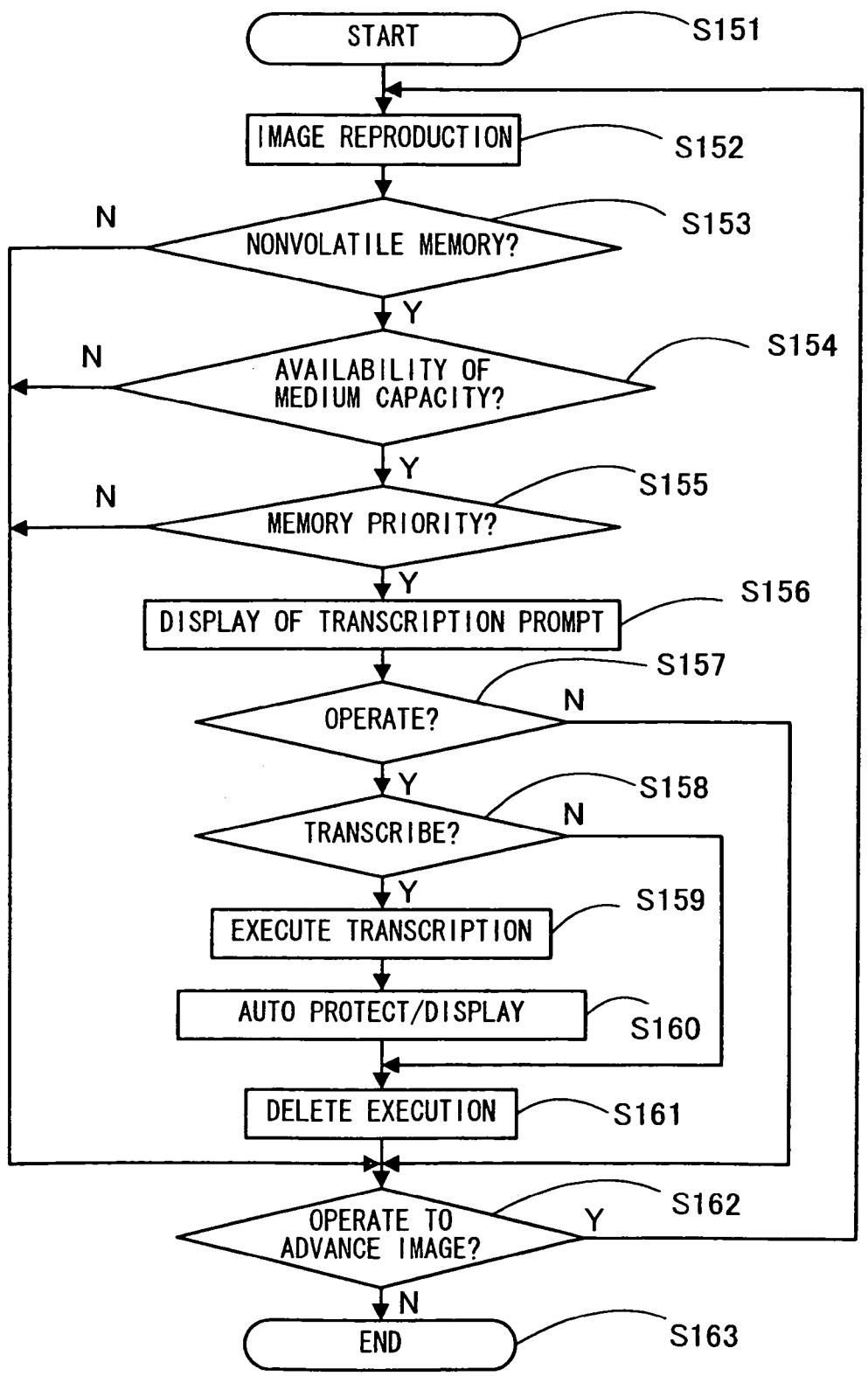
FIG. 14 is a flow chart showing a detail of the reproduction processing of FIG. 13.

(Reproduction Processing: FIG. 14)

The reproduction processing in step S144 of the flow chart of FIG. 13 will be described hereinafter using a flow chart of FIG. 14. FIG. 14 is the flow chart showing a processing procedure of the reproduction processing to be executed in control/processor 23. This processing will start from step S151 when transcription processing is ended in step S143 of FIG. 13 and the flow proceeds to step S141.

In step S152, it is to reproduce an image. When instruction etc does not come from operation unit 24, a latest image data taken recently is reproduced on LCD display panel 6. In step S153, it is checked whether the image data in reproduction is image data stored in nonvolatile memory 22. When the image data is the image data stored in nonvolatile memory 22, the flow proceeds to step S154. In step S154, it is judged if the storage medium inside card slot 2 has residual capacity. When the medium has capacity, the flow proceeds to step S155.

In step S155, it is checked if the "memory priority process" is set. When the "memory priority process" is set, the flow proceeds to step S156. When the "memory priority process" is set, card slot 2 has write-once storage medium inserted therein. In step S156, it is to display a message asking for transcription on LCD display panel 6. In step S157, it is checked if operation unit 24 is operated within a given period of time after the message asking for transcription is displayed on LCD display panel 6. When operation unit is operated within the given period of time, the flow proceeds to step S158 and it is judge if the operation is for transcription. When the transcription is operated, the flow proceeds to step S159.

In step S159, it is to implement transcription of the image data stored in nonvolatile memory 22 to write-once storage medium 4. In step S160, it is to process the same auto protect and display of image data with respect to write-once storage medium 4 as in steps S24 and S25 of FIG. 3. In step S161, it is to delete the image data that is stored in nonvolatile memory 22 and of which transcription to write-once storage medium 4 is complete and nonvolatile memory 22 gets an increase in residual capacity. Then, the flow proceeds to step S162.

On the other hand, when it is judged in step S158 that the operation is not for transcription, the operation by the operation unit 24 is judged to be the delete operation and then the flow proceeds to step S161. In this case, in step S161, the image data stored in nonvolatile memory 22 is deleted without transcription to write-once storage medium 4 and nonvolatile memory 22 gets an increase in residual capacity. Then the flow proceeds to step S162.

When it is judged in step 157 that operation unit 24 is not operated within the given period of time after the message asking for transcription is displayed on LCD display panel 6, the flow proceeds to step S162 assuming that processing on the image being reproduced on LCD display panel 6 is put on hold. At this moment, processing in steps from S158 to S161 is skipped, so the image to be transcribed remains still stored in nonvolatile memory 22.

When it is judged in step S153 that a reproduction image is not the image stored in nonvolatile memory 22, the flow proceeds to step S162. And when it is judged in step S154 that the storage medium inside card slot 2 has no residual capacity and in step S155 that the "memory priority process" is not set, the flow proceeds to step S162. Namely, in these cases, there is no need to ask for transcription of the image stored in nonvolatile memory 22 to the storage medium.

In step S162, it is checked if an image advancing operation is performed via operation unit 24 within a given period of time after the image is reproduced in step S152. When the image advancing operation is performed, the flow returns to step S152, wherein a next image, that is, an image taken right before an image right now being reproduced on LCD display panel 6 will be reproduced. Like this, when the image advancing operation is performed within the given period of time after the image is reproduced, processing from step S152 to step S162 is repeated.

Contrary, when it is judged in step S162 that the image advancing operation is not performed within the given period of time after reproduction of the image, the flow proceeds to step S163 to end this processing and then proceeds to step S145 of FIG. 3. When it is judged in step S145 of FIG. 13 that a reproduction end operation is not performed, reproduction processing described in FIG. 14 will start from step S151 once again. In this case, in step S152, reproduction of the same image now being displayed on LCD display panel 6 is continued.

With such processing, when reproducing the image data stored in nonvolatile memory 22 in the "memory priority process", processing to ask for transcription is performed as long as write-once storage medium 4 inside card slot 2 has residual capacity.

Figure 15:
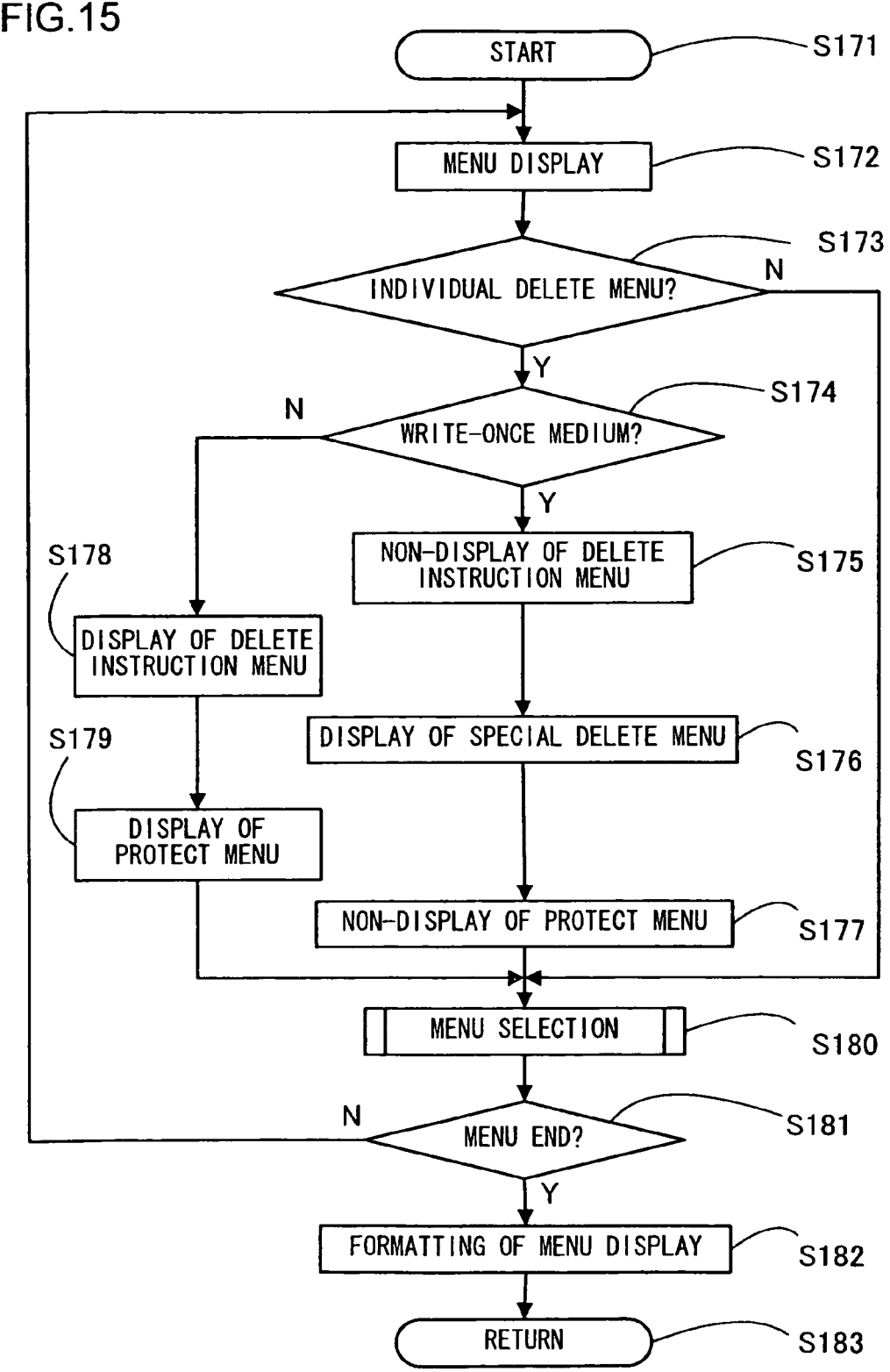
FIG. 15 is a flow chart showing of an interrupt reproduction menu to be executed in the second embodiment.

(Processing to Interrupt Reproduction Menu: FIG. 15)

Next, work in a case where a reproduction menu is selected with processing of the interrupt reproduction menu enabled in step S146 of the flow chart in FIG. 13 will be described hereinafter using a flow chart of FIG. 15. FIG. 15 is the flow chart showing a processing procedure of the interrupt reproduction menu to be executed in control/processor 23. A reproduction menu is a menu for a variety of operations available in a reproduction mode and an operation item such as a thumbnail display, an enlarged display, a bulk delete of an image, an individual delete of an image, a protect image and a release protect image is displayed on LCD display panel 6 as list of operations available in the menu. One of operations in the menu is selectable via operation unit 24. This processing will start from step S171 by selecting the reproduction menu via operation unit 24.

In step S173, it is checked if an individual delete menu is selected by an operation for operation unit 24 and when the individual delete menu is selected, a menu screen is advanced to a detailed menu tree of the individual delete and proceeds to step S174. In step S174, it is checked if image data for the individual delete is stored in write-once storage medium 4.

When it is judged in step S174 that the image data is stored in write-once storage medium 4, the flow proceeds to step S175 to process a change to a display menu item used for write-once storage medium 4.

In step S175, it is to process a non-display of a delete menu. Specifically, an operation item to delete an image is excluded from the detailed menu of the individual delete and is so configured as not to be displayed on LCD display panel 6. In step S176, it is to process a special delete menu display. Specifically, the special delete is added to the menu as the operation item and is so configured as to be displayed on LCD display panel 6. In step S177, it is to process a non-display of the protect menu. Specifically, operation items like a protect of an image and a release protect of an image are excluded from the menu and are so configured as not to be displayed on LCD display panel 6. With processing in step S43 to step S45, the operation items excluded from the detailed menu of the individual delete become not selectable.

On the other hand, when it is judged in step S174 that the image data to be deleted individually is not stored in write-once storage medium 4, the flow proceeds to step S178 assuming that image data stored in nonvolatile memory 22 or overwritable storage medium 3 is the image data for the individual delete. In step S178, a delete instruction menu is displayed on LCD display panel 6 as the detailed menu of the individual delete. Further, in step S179, a protect menu of an image data is displayed on LCD display panel 6. In this way, the operation item of the detailed menu of the individual delete is changed every each image to be deleted and the post-changed operation item is displayed on LCD display panel 6.

In step S180, it is to implement the operation item selected via operation unit 24 from the detailed menu of the individual delete displayed on LCD display panel 6. Every time processing of the selected operation item is complete, the flow proceeds to step S181. When it is judged in step S173 that the individual delete menu is not selected from the reproduction menu, the flow proceeds to step S180 and execution of a selected another menu is processed.

In step S181, it is checked if an operation to end a menu is executed via operation unit 24 and when the operation to end the menu is executed, the flow proceeds to step S182. In step S182, a menu display displayed on LCD display panel 6 is formatted and display contents etc of the individual delete menu changed in steps S174 to S179 return to a pre-changed state. Then, in step S183, the flow gets back to processing to interrupt reproduction of FIG. 13.

When it is judged in step S181 that the operation to end the menu is not executed, the flow gets back to step S172, wherein processing of steps S172 to S181 is repeated until the operation to end the menu is executed.

Figure 16:
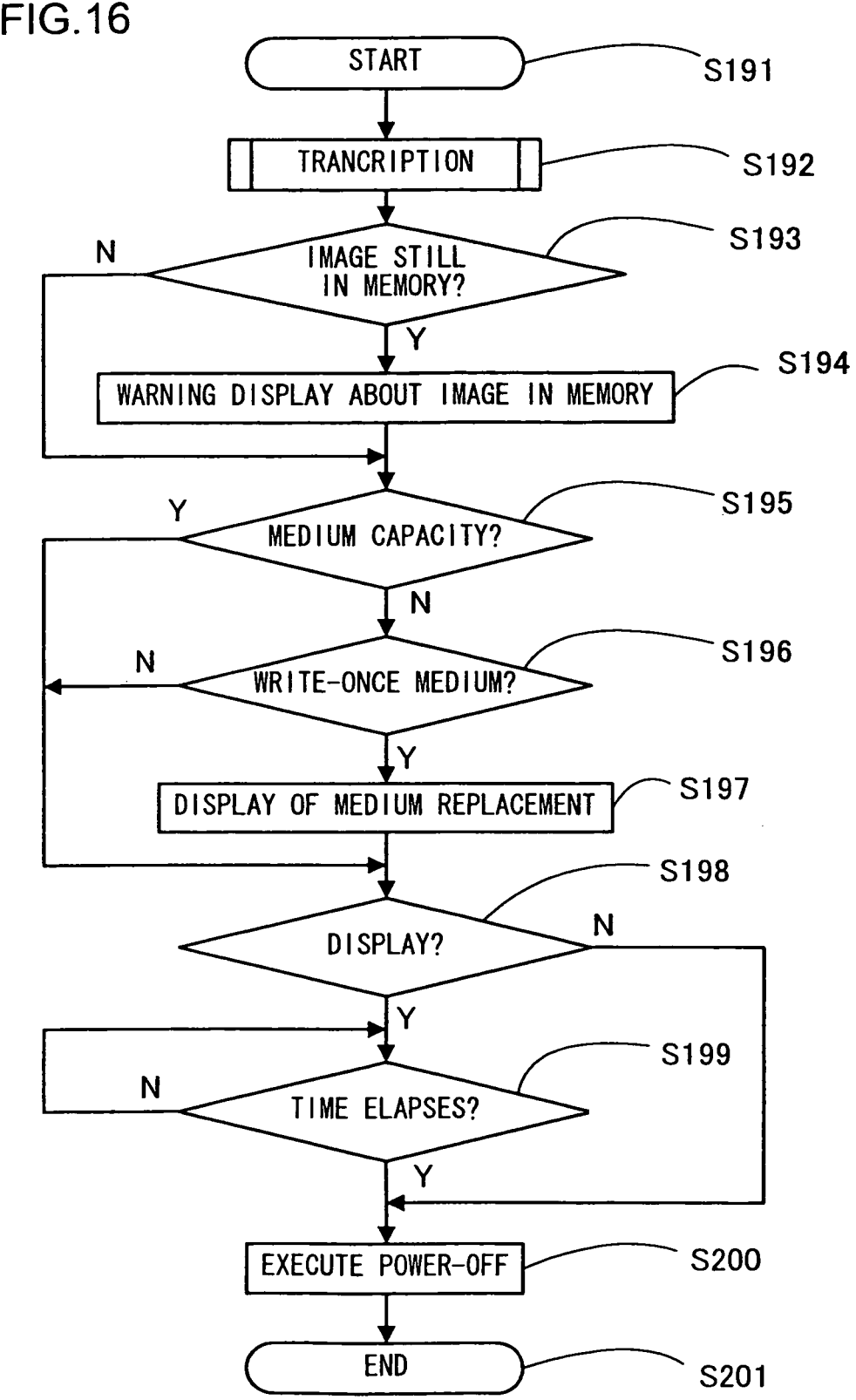
FIG. 16 is a flow chart of interrupt power-off processing to be executed in the second embodiment.

(Processing of Off-Interrupt: FIG. 16)

Next, work in a case where a power of digital camera 21 is turned off with processing of the interrupt power-off enabled in step S73 of the flow chart in FIG. 8 will be described hereinafter using a flow chart of FIG. 16. FIG. 16 is a flow chart showing a processing procedure of power-off interrupt processing to be executed in control/processor 23. This processing will start from step S191 by turning off the power of digital camera 21 via operation unit 24.

In step S192, it is to process image data transcription detailed in the flow chart of FIG. 10. According to this processing, when the image data is stored in nonvolatile memory 22, transcription of the image data to the storage medium inside card slot 2 is facilitated and when the storage medium gets full with transcribed image data, a quick replacement of the storage medium is realized. By implementing transcription processing prior to the power-off of digital camera 21, the storage medium can be updated before digital camera 21 is turned on to take a picture next time.

In step S193, it is to check if there is image data in nonvolatile memory 22 even after transcription processing is implemented in step S192. When there is the image data in nonvolatile memory 22, the flow proceeds to step S194.

In step S194, LCD display panel 6 displays a warning message that there is the image data in nonvolatile memory 22. Especially, when a picture is taken in the "memory priority process" setting, the display of this warning message prompts a user to update write-once storage medium 4 and transcribe image data. Namely, a user is prompted to update write-once storage medium 4 and transcribe image data very soon in preparation for an upcoming shooting operation by turning digital camera 21 on. When there is not the image data in nonvolatile memory 22 in step S193, processing in step S194 is not performed.

In step S195, it is checked if there is residual capacity in the storage medium inside card slot 2 and when there is not residual capacity in the storage medium, the flow proceeds to step S196, wherein it is checked if the storage medium inserted into card slot 2 is write-once storage medium 4. When the storage medium is inserted into card slot 2, the flow proceeds to step S197, wherein a message prompting a user to update the storage medium is displayed on LCD display panel 6. When it is judged in step S195 that there is residual capacity in the storage medium or in step S196 that overwritable storage medium 3 is inserted into card slot 2, processing in step S197 is not performed.

It step S198, it is to check if at least either of processing in step S194 and/or in step S197 are/is performed. Namely, it is checked if LCD display panel 6 displays the warning message about a presence of an image in memory and/or the medium replacement prompt. When LCD display panel 6 displays the warning message about a presence of an image in memory and/or the medium replacement prompt, the flow proceeds to step S199. In step S199, it is to check if a given period of time has elapsed since LCD display panel 6 starts displaying the warning message about a presence of an image in memory and/or the medium replacement prompt.

When the given period of time has elapsed since the display starts, the flow proceeds to step S200 to turn digital camera 21 off. Then, this processing is ended in step S201. When it is judged in step S199 that the given period of time does not elapse, the display on LCD display panel 6 is kept on until the given period of time will elapse. A user can update write-once storage medium 4 or delete the image data stored in overwritable storage medium 3 prior to the power-off digital camera 21. Accordingly, it becomes possible to transcribe the image data left in nonvolatile memory 22 to the storage medium.

When it is judged in step S198 that LCD display panel 6 does not display any of the warning messages about the presence of image data in memory or the medium replacement prompt, the flow proceeds to step S200 to power digital camera 21 off.

As described above, the power-off operation via operation unit 24 lets the image data in nonvolatile memory 22 be transcribed to the storage medium before digital camera 21 is actually turned off. When nonvolatile memory 22 has no image data after transcription processing is performed and write-once storage medium 4 is not full, digital camera 21 is switched off immediately after the transcription processing is performed.

When the "medium priority process" is set, the image data in nonvolatile memory 22 is automatically transcribed to the storage medium, so the transcription processing in step S192 is not substantially performed. Thus, even if the transcription processing of step S192 is performed, a time lag from a power-off instruction of operation unit 24 to an actual switch-off operation of digital camera 21 is almost next to nothing. Meanwhile, when the "memory priority process" is set, information about the image data and the storage medium is provided to a user by the displays of the transcription processing of step S192 and the warning etc on the "memory priority process". Accordingly, the quick transcription of the image data in nonvolatile memory 22 is prompted prior to the power-off of digital camera 21, which results in enhancing an operation ability at a time of switching the camera on and storing a taken image.

Figure 17:
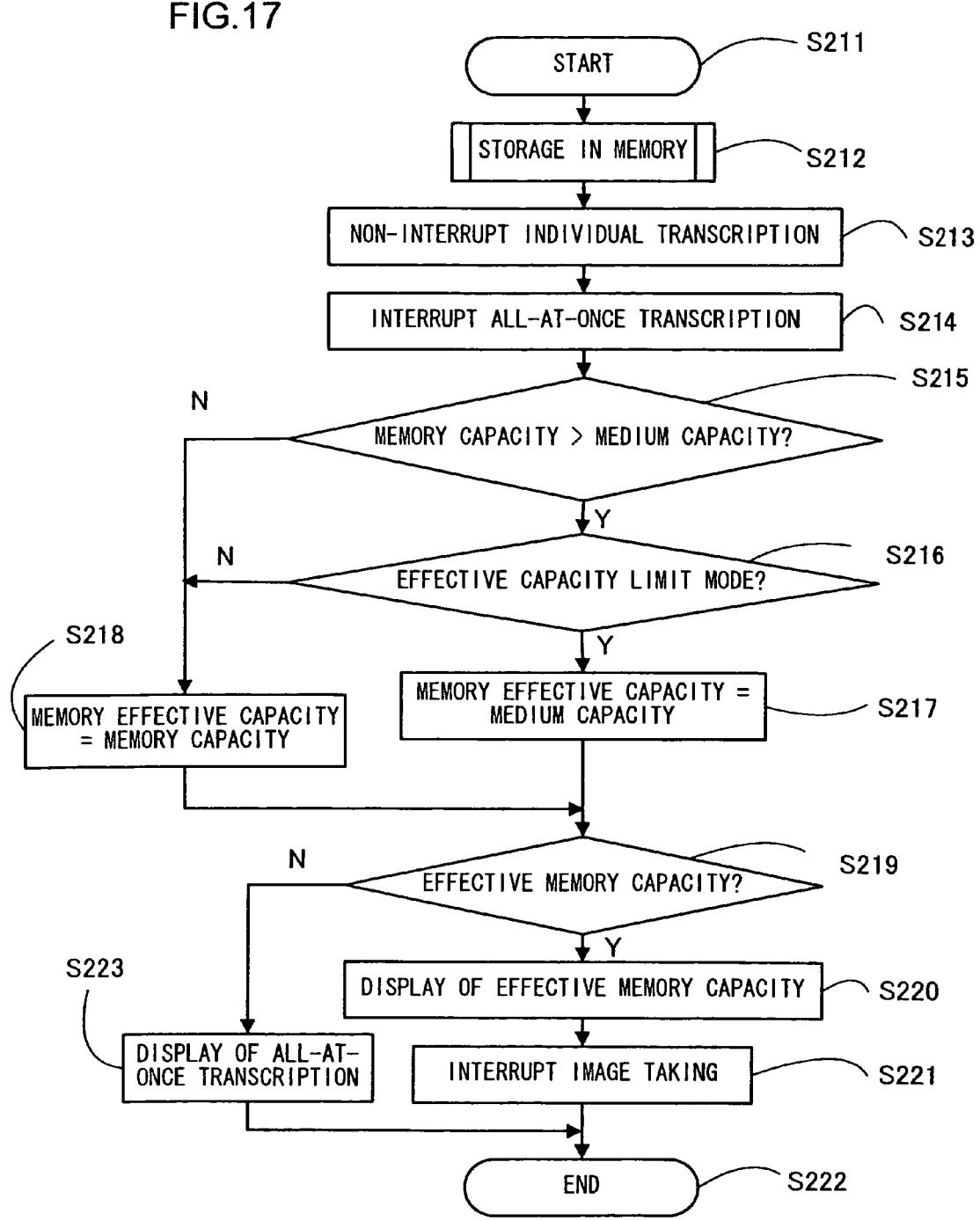
FIG. 17 is a flow chart of bulk transcription processing when an all-at-once transcription processing mode is set in the second embodiment.

(Bulk Transcription Processing Mode: FIG. 17)

Next, work in a case where a bulk transcription processing mode is set in digital camera 21 in accordance with the second embodiment will be described hereinafter using a flow chart of FIG. 17. FIG. 17 is the flow chart showing a processing procedure of the bulk transcription processing mode setting to be executed in control/processor 23.

When the bulk transcription processing mode is set, a taken image data is temporally stored in nonvolatile memory 22 only and then, all stored contents in nonvolatile memory 22, that is, management information about the image data like the image data and FAT (file Allocation Table) data is transcribed to write-once storage medium 4 in an integral way. This bulk transcription processing mode becomes settable only when write-once storage medium 4 is inserted into card slot 2. For example, the bulk transcription processing mode can be set via operation unit 24. The bulk transcription processing mode shown in FIG. 17 corresponds to the processing of step S69 to step S71 shown in FIG. 8. The processing of FIG. 17 will start from step S211 when digital camera 21 set with the bulk transcription processing mode is switched on and then the processing as shown in FIG. 8 proceeds to step S69.

In step S212, a "memory storage process" is so set as to let nonvolatile memory 22 have a priority to store image data processed by control/processor 23. The "memory storage process" is different from a "memory priority process" and when residual capacity of nonvolatile memory 22 gets empty, the storage medium does not store image data even if the medium has residual capacity. That is, at a time when residual capacity of nonvolatile memory 22 gets empty, it is judged that there is no residual capacity in digital camera 21 as a whole.

In step S213, it is to make an interrupt transcription of individual image data disabled, but in step S214, it is to make the bulk interrupt transcription enabled. An actual transcription work is not performed here. Processing after step S215 and on shows a processing procedure of a residual capacity display in the bulk transcription processing mode and corresponds to the processing of step S71 in FIG. 8.

In step S215, it is judged if usable residual capacity of nonvolatile memory 22 is larger than that of write-once storage medium 4 by comparison with write-once storage medium 4 inserted into card slot 2. Here, capacity of nonvolatile memory 22 or a storage medium usable to store image data is defined here as usable capacity. When it is judged in step S215 that usable residual capacity of nonvolatile memory 22 is larger than that of write-once storage medium 4, the flow proceeds to step S216.

In step S216, it is checked if an effective capacity limit mode is set. The effective capacity limit mode is a mode that limits capacity of nonvolatile memory 22 to store image data in. This mode is to be set together with the bulk transcription processing mode setting. When it is judged in step S216 that the effective capacity limit mode is set, the flow proceeds to step S217, wherein effective capacity of nonvolatile memory 22, namely, capacity used for actually storing image data in is set to capacity equal to usable capacity of write-once storage medium 4. That is, if image data is stored in nonvolatile memory 22 more than usable capacity of write-once storage medium 4, the image data stored in nonvolatile memory 22 cannot be transcribed to write-once storage medium 4 all at once, so the effective capacity of nonvolatile memory 22 is limited.

Generally, capacity of nonvolatile memory 22 is small in comparison with a storage medium inserted into card slot 2. As a case where usable capacity of write-once storage medium 4 is smaller than that of nonvolatile memory 22, there are cased where capacity of write-once storage medium 4 itself is relatively small and a partially used write-once storage medium 4 is utilized and so on. Setting to limit effective capacity enables all image data stored in nonvolatile memory 22 to be transcribed to a single piece of write-once storage medium 4 all at once.

When it is judged in step S215 that usable residual capacity of write-once storage medium 4 is equal to or larger than that of nonvolatile memory, the flow proceeds to step S218 and the usable capacity of nonvolatile memory 22 is set as the effective capacity of nonvolatile-memory 22 intact. That is, image data exceeding the usable capacity of write-once storage medium 4 is allowed to be stored in nonvolatile memory 22. When it is permissible to split all data in nonvolatile memory 22 and transcribe all the split data to a plurality of write-once storage medium 4, all the image data is stored by utilizing all usable capacity in nonvolatile memory 22, not setting the effective capacity limit mode.

In step S219, it is judged if nonvolatile memory 22 has effective residual capacity capable of storing image data based upon the effective capacity of nonvolatile memory 22 set in step S217 or Step S218. When it is judge in step S219 that nonvolatile memory 22 has effective residual capacity, the flow proceeds to step S220. In step S220, the effective residual capacity of nonvolatile memory 22 is displayed on LCD display panel 6. In step S221, it is to make the interrupt image taking enabled. In the step S222, this processing is ended and then the flow proceeds to step S72 of FIG. 8.

When it is judged in step S219 that nonvolatile memory 22 does not have effective residual capacity, the flow proceeds to step S223. In step S223, LCD display panel 6 displays a message prompting a user to transcribe data stored in non-volatile memory 22 all at once and the flow proceeds to step S222, wherein this processing is ended.

Figure 18:
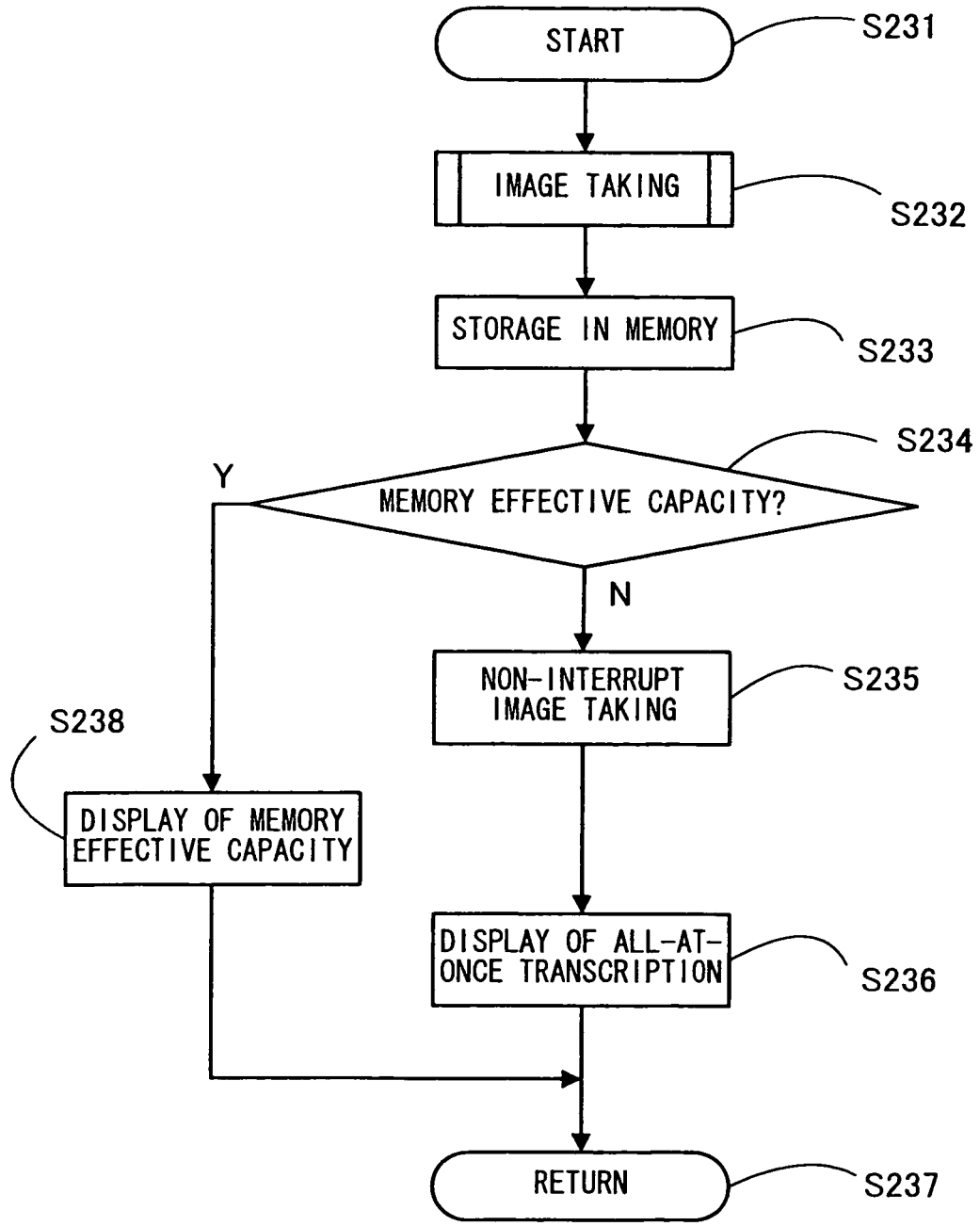
FIG. 18 is a flow chart of an interrupt image taking processing when the all-at-once transcription processing mode is set in the second embodiment.

(Processing to Interrupt Image Taking: FIG. 18)

Work in a case where an image taking operation is performed with processing of the interrupt image taking enabled in step S221 of the flow chart in FIG. 17 will be described hereinafter using a flow chart of FIG. 18. FIG. 18 is the flow chart showing a processing procedure of processing to interrupt image taking to be executed in control/processor 23. This processing will start from step S231 by pressing a shutter release button of operation unit 24.

In step S232, it is to process an image. Control/processor 23 reads an image via imaging device 8, A/D converter 9 and Raw data buffer 11 and performs processing like an image interpolation and compression etc. In step S233, it is to store the image data image-processed like the image interpolation and compression in step S232 in nonvolatile memory 22.

In step S234, it is checked if there is the effective residue capacity in nonvolatile memory 22 having stored the image data in step S232. When there is not the effective residue capacity in nonvolatile memory 22, the flow proceeds to step S235, wherein the interrupt image taking is changed to disabled. And in step S236, LCD display panel 6 displays a message asking for all-at-once transcription and in step S237, the flow gets back to the main flow of FIG. 8 and stands by until operation unit 24 is operated.

When it is judged in step S234 that there is the effective residue capacity in nonvolatile memory 22, the flow proceeds to step S238. In step S238, LCD display panel 6 displays the effective residue capacity in nonvolatile memory 22 and the flow proceeds to step S237.

Figure 19:
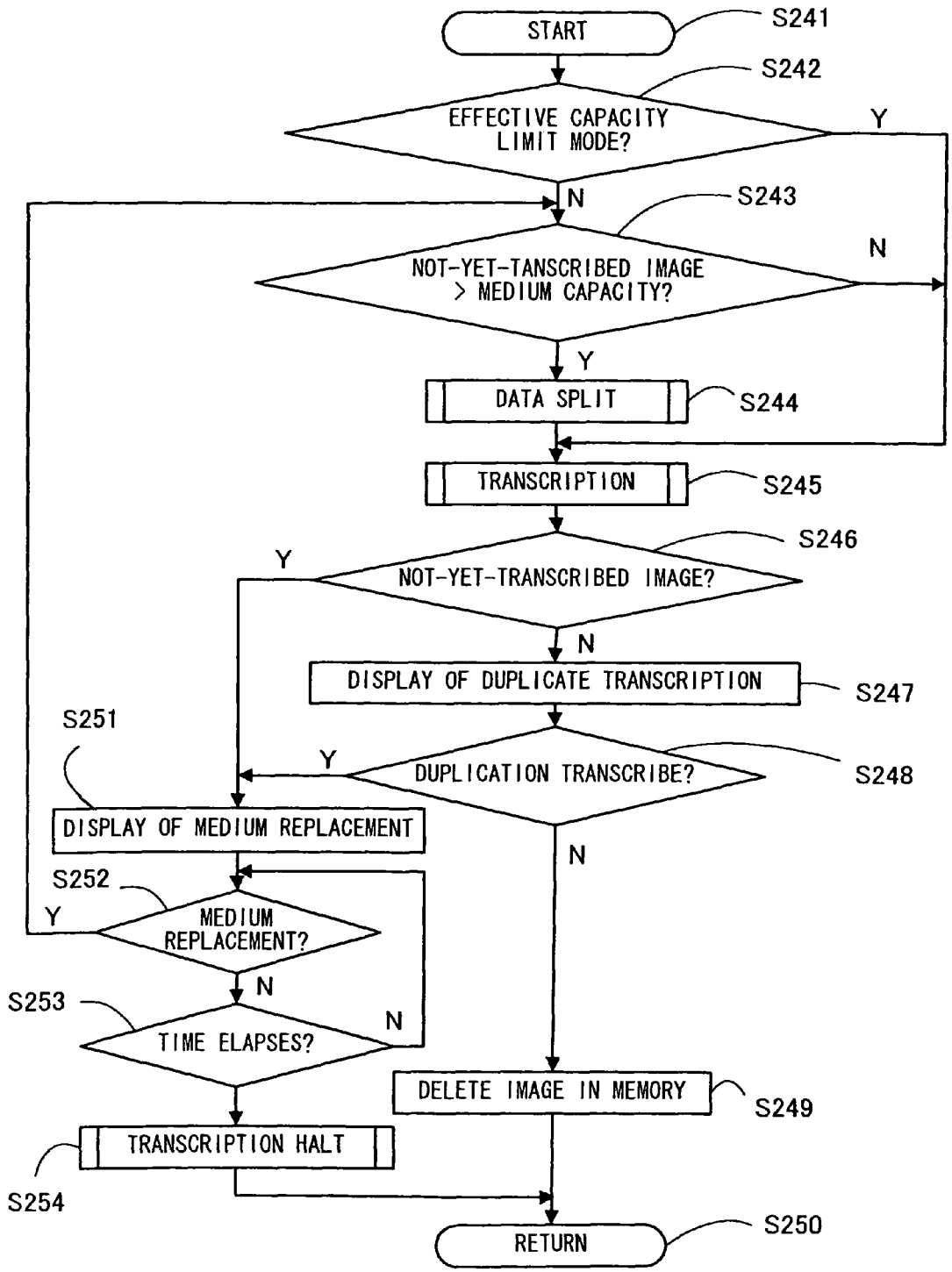
FIG. 19 is a flow chart of all-at-once transcription processing when the all-at-once transcription processing mode is set in the second embodiment.

(Processing to Interrupt all-at-Once Transcription: FIG. 19)

Work in a case where an all-at-once transcription operation is performed with an all-at-once transcription processing mode set will be described hereinafter using a flow chart of FIG. 19. FIG. 19 is the flow chart showing a processing procedure of the all-at-once transcription processing to be executed in control/processor 23. This processing will start from step S241 when the operation for all-at-once transcription is performed via control/processor 23.

In step S242, it is checked if the effective capacity limit mode is set and when the effective capacity limit mode is not set, the flow proceeds to step S243. In step S243, it is judged if a total data amount of a not-yet-transcribed to write-once storage medium 4 image stored in nonvolatile memory 22 is larger than that of the usable capacity of write-once storage medium 4. It should be noted that the total data amount of the not-yet-transcribed image stored in nonvolatile memory 22 includes image data and management information of the image data. When it is judged in step S243 that the total data amount of the not-yet-transcribed image is larger than that of the usable capacity of write-once storage medium 4, the flow proceeds to step S244.

In step S244, it is to process a data split. In step S244, the total data amount in nonvolatile memory 22 is split into a portion corresponding to usable capacity of write-once storage medium 4 now inserted into card slot 2 and other portion equivalent to the rest thereof. Further, management information is created to unit the split image data by reading out the data after the image data is stored in write-once storage medium 4. Here, there is a possibility that, of the split data, the other portion left in nonvolatile memory 22 is further split depending upon capacity of a next storage medium to be inserted into card slot 2.

In step S245, the data amount split in step S244 and transcribable to write-once storage medium 4 is transcribed to write-once storage medium 4. When it is judged in step S242 that the effective capacity limit mode is not set, processing in steps S243 and S244 are not performed and the flow proceeds to step S245. That is, when the effective capacity limit mode is set, the total data amount in nonvolatile memory 22 is limited within the usable capacity of write-once storage medium 4 now inserted into card slot 2, so the transcription processing is performed without splitting data.

In step S246, after the transcription processing is performed in step S245, it is judged if there is a not-yet-transcribed image in nonvolatile memory 22. When there is not in nonvolatile memory 22, the flow proceeds to step S247. In step S247, a message asking if duplicate transcription is performed is displayed on LCD display panel 6. Duplicate transcription is a transcription method in which one piece of data stored in nonvolatile memory 22 is transcribed to plural storage media and a duplicate of the storage medium to which the same data is transcribed is created. With the duplicate transcription, it becomes possible to easily give the same data of nonvolatile memory 22 plural participants in an event just like printed hard copies. LCD display panel 6 displays a message, for example, "Transcription is complete. Transcribe the same contents to other memory card?".

In step S248, it is checked if an operation to perform duplicate transcription via operation unit 24 is executed within a given period of time from a start of the duplicate transcription display in step S247. When the operation is not executed within the given period of time, the flow proceeds to step S249 judging that the duplicate transcription is not instructed. In step S249, when the duplicate transcription is not performed, as the data in nonvolatile memory 22 is not needed thereafter, stored contents in nonvolatile memory 22 is deleted.

In the meanwhile, when it is judged in step S246 that nonvolatile memory 22 has the not-yet-transcribed image, the flow proceeds to step S251 to further transcribe the data equivalent to the rest of the split data. In step S251, LCD display panel 6 displays a message prompting a user to update a storage medium. In step S252, it is checked if write-once storage medium 4 inserted into card slot 2 is updated and when it is judged that a fresh storage medium is inserted into card slot 2, the flow gets back to step S243. Then, processing of step S243 and subsequent steps will be so performed as to transcribe data left in nonvolatile memory 22 to the fresh storage medium inserted into card slot. The fresh storage medium to be inserted in step S252 may be not only write-once storage medium 4 but also overwritable storage medium 3 to process the all-at-once transcription.

In step S252, when it is judged that the medium replacement is not detected, the flow proceeds to step S253, wherein it is to check if the given period of time has elapsed from the medium replacement display. When it is judged in step S253 that the given period of time has not elapsed, the flow gets back to step S252 wherein it is to confirm replacement of the storage medium until the given period of time elapses. When it is judged in step S253 that the given period of time has elapsed with no storage medium updated, the flow proceeds to step S254, wherein processing to halt transcription is performed. Then, the flow proceeds to step S250 and stands by, getting back to the flow chart of FIG. 8. In transcription halt processing in step S254, a record of transcription processing in halfway is saved, for example, as management information about image data. With this saving, when the all-at-once transcription is performed once again with an updated medium, all-at-once transcription processing can be restarted from not-yet-transcribed data let in nonvolatile memory 22.

In step S248, when it is judged that the duplicate transcription operation is performed within the given period of time in response to the duplicate transcription display in step S247, the flow proceeds to step S251. At this moment, the management information is so changed as to cancel management information indicating that the image data stored in nonvolatile memory 22 was already transcribed and indicate that all the image data therein are not yet transcribed. In processing in step S251 and on, the all-at-once transcription processing of image data of nonvolatile memory 22 will be performed in the same way when not-yet-transcribed image is left in nonvolatile memory 22.

As long as there is no-yet-transcribed image left in nonvolatile memory 22 in step S246 and the storage medium is updated in step S252, the all-at-once transcription processing as described above is repeated. And in step S248, when the duplicate transcription operation is performed within the given period of time in response to the duplicate transcription display, image data of nonvolatile memory 22 is not deleted and a desired number of duplicates of the image data can be created by replacing a storage medium.

Third Embodiment

A digital camera in accordance with a third embodiment of this invention will be described using accompanying diagrams.

Figure 20:
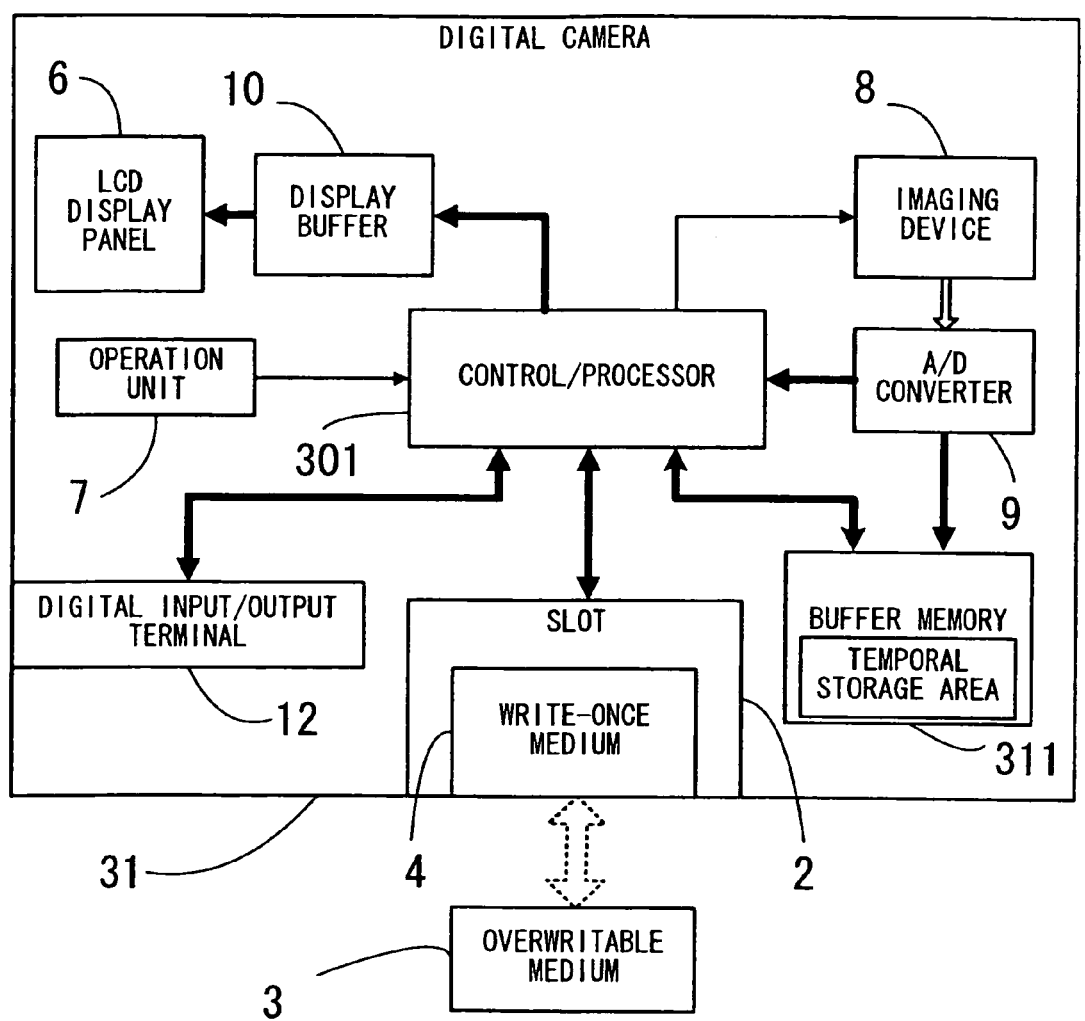
FIG. 20 is a block diagram showing a configuration of a digital camera in a third embodiment of this invention.

FIG. 20 is a block diagram showing a configuration of the digital camera system in accordance with third embodiment of this invention. In FIG. 20, the same numeral references are given to the same configuring unit and the like as the first embodiment of FIG. 1 and its explanation is omitted. Things different from the first embodiment will be mainly described hereinafter.

As shown in FIG. 20, digital camera 31 in accordance with the third embodiment is provided with buffer memory 311 instead of Raw data buffer 11. Buffer memory 31 temporally stores image data taken by imaging device 8 and variously processed by control/processor 301.

Digital camera 31 in accordance with the third embodiment prevents a user from storing unwanted image data in write-once storage medium 4 as much as possible when write-once storage medium 4 is inserted into card slot 2, by controlling so as to temporally store taken image data in buffer memory 311. And by utilizing a nonvolatile buffer memory used in a continuous shooting and for image processing as a memory for temporally storing image data, a cost can be held down.

Now, work of digital camera 31 in accordance with the third embodiment will be described hereinafter.

First, work at a time of a power-on of digital camera 31 will be explained. In the event that write-once storage medium 4 is inserted into card slot 2 when a power is turned on, digital camera 31 in accordance with the third embodiment warns that image data stored in a storage medium cannot be overwritten. When digital camera 31 is turned on, besides controls to be explained herein, several controls like, for example, formatting and checking etc are performed, but these explanations are omitted.

Figure 21:
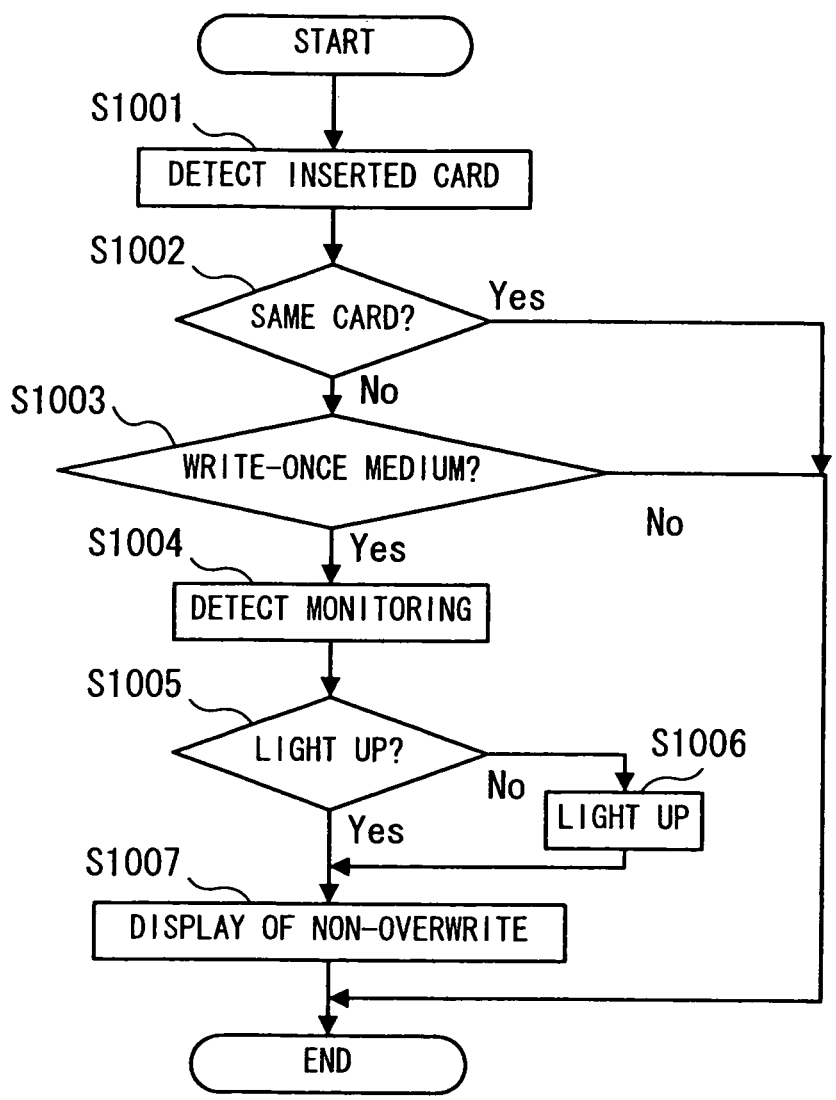
FIG. 21 is a flow chart showing control processing at a time of a power-on to be executed in the third embodiment.

FIG. 21 is the flow chart showing control processing by control/processor 301 at a time of the power-on in accordance with the third embodiment. This processing will start when operation unit 7 switches digital camera 31 on.

In step S1001, it is to obtain information about a storage medium inserted into card slot 2, namely, a memory card. Here, it is to detect information about property of a storage medium including whether the memory card is a write-once storage medium or a overwritable storage medium. In step S1002, it is judged whether a now inserted memory card is the same memory card as detected at a previous time, namely, inserted previously. This judgment is made by comparing property information about the previously detected memory card with property information about the detected memory card this time.

In step S1002, when it is judged that a different memory card is inserted, the flow proceeds to step S1003. In step S1003, based upon the property information about the memory card detected in step S1001, it is judged that the now inserted memory card is write-once storage medium 4. When write-once storage medium 4 is inserted, the flow proceeds to step S1004.

In step S1004, it is to obtain status information about LCD display panel 6. Specifically, it is to detect whether a display is performed on LCD display panel 6, that is, LCD display panel 6 is lit up. In step S1005, it is judged if LCD display panel 6 is lit up. When LCD display panel 6 is lit up, the flow proceeds to step S1007 and when LCD display panel 6 is not lit up, the flow proceeds to step S1006, wherein LCD display panel 6 is driven. Then, the flow proceeds to step S1007.

Figure 22:
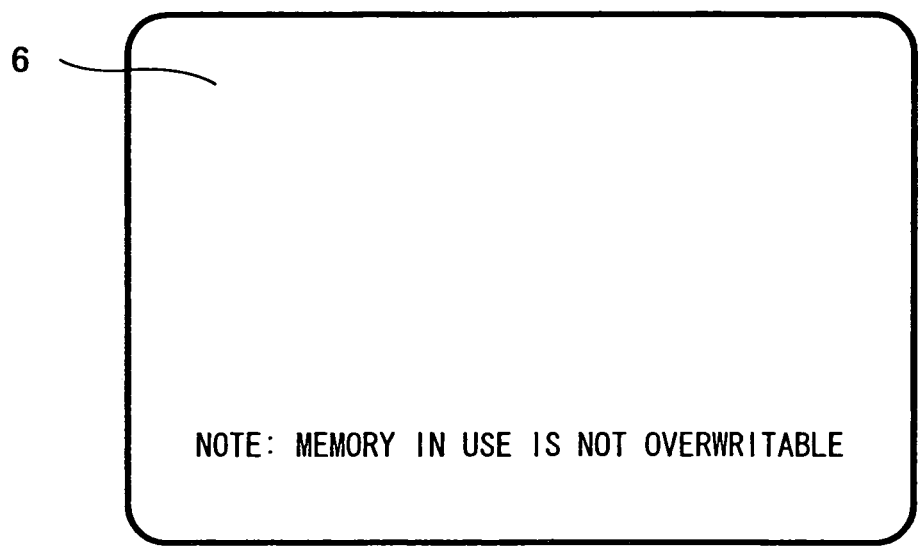
FIG. 22 is a view showing a display example displayed on a LCD display panel.

In step S1007, LCD display panel 6 displays that write-once storage medium 4 unable to overwrite image data is inserted into card slot 2. FIG. 22 shows a display example on LCD display panel 6. Only a warning message is displayed on the display example screen of FIG. 22, but this message may be displayed together with other information like a remaining number of frames of a memory card, residual capacity of a battery power in use and so.

Accordingly, this processing is ended.

When it is judged in step S1002 that the memory card now in use is the same as inserted at the previous time or in step S1003 that the inserted memory card is not write-once storage medium 4, this processing is ended.

Accordingly, when write-once storage medium 4 is in use, it is displayed, when digital camera 31 is switched on, that image data cannot be overwritten. Thus, a user can be notified that before actually storing image data in write-once storage medium 4, overwriting is unable. And when the same memory card as detected at the previous time is used, the warning message does not bring up, so a user frequently powering digital camera 31 on/off does not feel annoyed.

(Control at a Time of a Mode Change: FIG. 22)

Generally, a digital camera is provided with a picture taking mode to record taken image data, a reproduction mode to reproduce the taken image data and a mode change function to switch the picture taking mode and the reproduction mode. For example, an operation via operation unit 7 can change the mode. In the reproduction mode, as image data is not recorded in write-once storage medium 4, it is not important to warn a user using only the reproduction mode that the memory card now in use is not overwritable. Namely, when the reproduction mode is selected when a power is on, the warning that the memory card is not overwritable may not be needed. But, when the picture taking mode is selected or the mode of digital camera 31 is changed over from the reproduction mode to the picture taking mode when the power of digital camera 31 is on, it is preferable to warn that that overwriting of image data is not possible in the inserted write-once storage medium 4.

Figure 23:
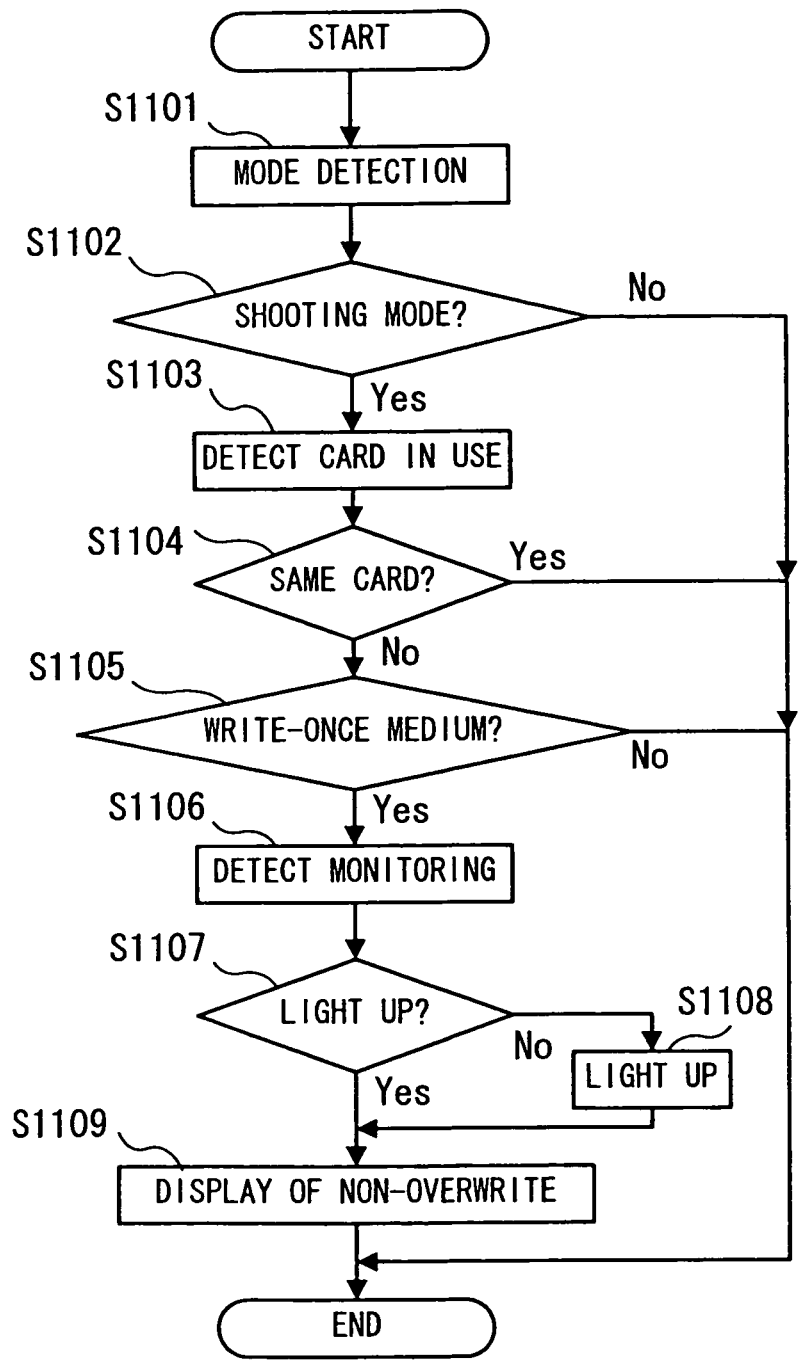
FIG. 23 is a flow chart showing of control processing at a time of changing a mode to be executed in the third embodiment.

Work of digital camera 31 at a time of the mode change will be described hereinafter using FIG. 23. FIG. 23 is the flow chart showing a processing procedure of control processing at the time of the mode change to be executed in control/processor 301. Execution of processing shown in FIG. 23 does not need execution of the control processing at the time of the power-on shown In FIG. 21. This processing will start when the mode of digital camera 31 is changed via operation unit 7.

In step s1101, it is to detect a mode set to digital camera 31. In step S1102, it is to judge whether the detected mode in step S1001 is the picture taking mode. When the picture taking mode is set, the flow proceeds to step s1103.

In step S1103, it is to obtain information about the property information of the memory card inserted into slot 2 and the like. In step S1104, it is to judge, based upon information about the memory card detected in step S1003, if the memory card now in use is the same one as detected at the previous time. When the memory card now in use is different from the previous card, the flow proceeds to step S1105, wherein it is to judge, based upon the information detected in step S1103, whether the memory card now in use is write-once storage medium 4. If write-once storage medium 4 is inserted, the flow proceeds to step S1106.

In step S1106, it is to obtain status information about whether LCD display panel 6 displays and in step S1107, it is to judge, based upon the information detected in step S1106, whether LCD display panel 6 is lit up. When LCD display panel 6 is lit up, the flow proceeds to step S1109. When LCD display panel 6 is not lit up, the flow proceeds to step S1108, wherein LCD display panel 6 is driven. Then, the flow proceeds to step S1109.

In step S1109, as shown in FIG. 22, a message that image data cannot be overwritten in write-once storage medium 4 is displayed on LCD display panel 6.

When it is judged in step S1102 that the picture taking mode is not set, namely, the reproduction mode is set, this processing is ended without warning that overwriting of image data is impossible in the memory card. When it is judged in step S1104 that the same memory card is inserted or the inserted memory card is not write-once storage medium 4, this processing is ended too without displaying the warning. When the picture taking mode is set at the time of the power-on of digital camera 31, processing will start from step S1101 judging that the mode is changed to the picture taking mode.

Figure 24:
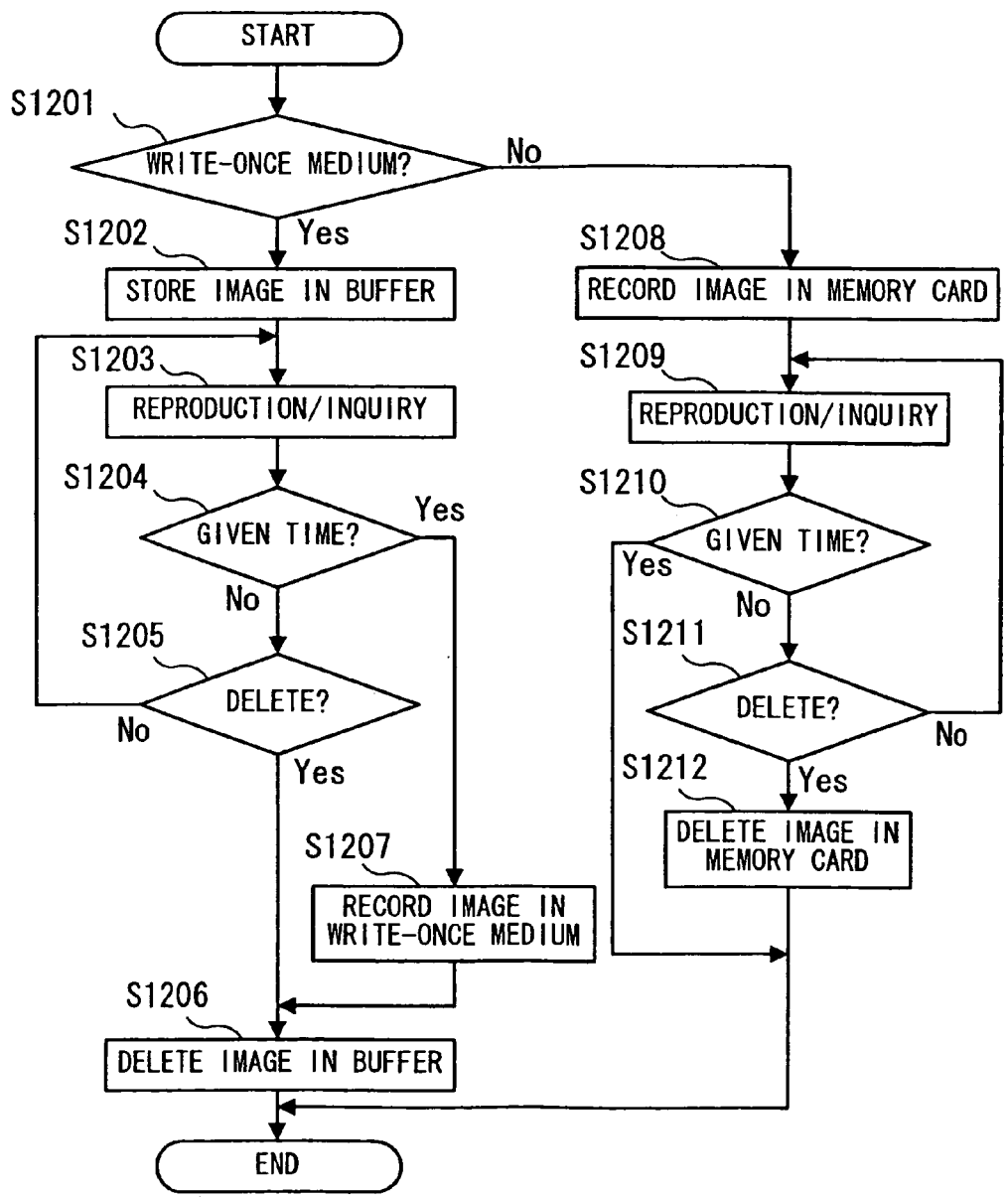
FIG. 24 is a flow chart showing record control processing to be executed in the third embodiment.

(Record Control: FIG. 24)

A record control of image data to be executed in digital camera 31 when a picture is shot will be described hereinafter.

Generally, a digital camera with display device such as a LCD monitor etc is provided with a function that displays a photographed image, which is confirmed by a user, and deletes it if it is an undesired image. And, there is a digital camera that has a function that reproduces the photographed image for a certain period of time on a monitor right after taking the picture and deletes the photographed image data now in reproduction from a memory card when a delete operation is executed within a given period of time. With use of such the image data delete function, it becomes easy that a pictured image can be viewed on a monitor soon after shot and, if an unsatisfactory image is found, the image is deleted and a picture is re-shot.

But, in the even that write-once storage medium 4 is inserted into digital camera 31, if image data is recorded in write-once storage medium 4 one time, the image data cannot be overwritten. Therefore, even if the image data is deleted, once written, namely, used memory capacity cannot be restored.

Thus, in the third embodiment, when write-once storage medium 4 is inserted, image data is temporally stored in buffer memory 311, not recorded in write-once storage medium 4 within a given period of time after shot. Then, after the given period of time has elapsed, the image data is copied from buffer memory 311 to write-once storage medium 4. Accordingly, even when write-once storage medium 4 is inserted, the image data can be deleted easily soon after shot without reducing capacity of the storage medium as in the case where overwritable storage medium 3 is in use.

FIG. 24 is the flow chart showing a processing procedure of a record control to be executed in control/processor 301. This processing will start by a shooting operation, namely, depressing a shutter release button of operation unit 7.

In step S1201, it is to detect information about a memory card in use and judge if the inserted memory is write-once storage medium 4 and if write-once storage medium 4 is inserted, the flow proceeds to step S1202. In step S1202, it is to create image data in Exif (Exchangeable Image File Format) by performing image processing etc and then store the created image data in a temporal storage area of buffer memory 311. The Exif image data includes information about a shooting date and a shooting situation along with image information.

Figure 26:
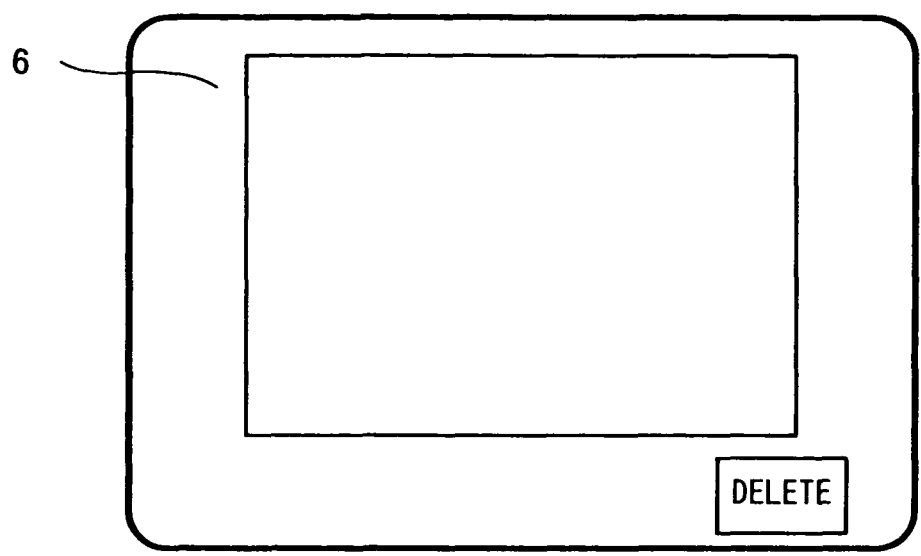
FIG. 26 is a view showing a display example displayed on a LCD display panel.

In step S1203, LCD display panel 6 displays a reproduction image of a taken image and a message asking if the reproduction image is deleted. FIG. 26 shows a display screen example on LCD display panel 6. In step S1204, it is to judge whether a given period of time has elapsed since the reproduction image is displayed on LCD display panel 6 and if the given period of time has not elapsed since the reproduction image is displayed, the flow proceeds to step S1205.

In step S1205, it is to detect whether a delete operation to delete the reproduction image is executed via operation unit 7. If the delete operation is executed, the flow proceeds to step S1206, wherein the taken image data temporally stored in buffer memory 311 is deleted. When the delete operation via operation unit 7 is not detected in step S1205, the flow gets back to step S1203, wherein LCD display panel 6 displays the reproduction image and the message inquiring into the deletion of the reproduction image.

In step S1204, when it is judged that the given period of time has elapsed since the reproduction image is displayed, the flow proceeds to step S1207, wherein the taken image data temporally stored in buffer memory 311 is recorded in write-once storage medium 4.

In step S1201, when it is judged that write-once storage medium 4 is not inserted, namely, overwritable storage medium 3 is inserted, the flow proceeds to step S1208. In step S1208, image data in Exif is created and the created image data is recorded in overwritable storage medium 3, not in buffer memory 311. In step S1209, LCD display panel 6 displays the reproduction image and the message inquiring into the deletion of the reproduction image as shown in FIG. 26.

In step S1210, it is judged whether the given period of time has elapsed since the reproduction image is displayed on LCD display panel 6 and if the given period of time has elapsed, this processing is ended. When the given period of time does not elapse, the flow proceeds to step S1211.

In step 1211, it is to judge whether the delete operation to delete the reproduction image is executed via operation unit 7 and if the delete operation to delete the reproduction image is executed, the flow proceeds to step S1212 and the taken image data recorded in overwritable storage medium 3 is deleted. But, if it is judged in step S1211 that the delete operation via operation unit 7 is not executed, the flow gets back to step S1209 and LCD display panel 6 displays the reproduction image and the message inquiring into the deletion.

Like the foregoing, in the event that write-once storage medium 4 is inserted, an image can be deleted without consuming memory capacity wastefully if a user wants to re-shoot.

In the record control shown in FIG. 24, a given period of time for which a taken image is displayed on LCD display panel 6 is set to, for example, a few seconds (4-5 sec). But this given period of time is not limited to this example and the image may stay on for a few minutes or hours.

In the record control as described in FIG. 24, the image data is temporally stored in buffer memory 311 until the given period of time has elapsed and then the image data will be automatically recorded in write-once storage medium 4 after the given period of time has elapsed. This control is not limited to this example and in response to a given operation of digital camera 31, the image data of buffer memory 311 may be recorded in write-once storage medium 4. For example, in response to a next shooting operation, image data may be recorded in write-once storage medium 4 and in response to a half depressing of the shutter release button, the image data may be so configured as to be recorded in write-once storage medium 4.

Figure 25:
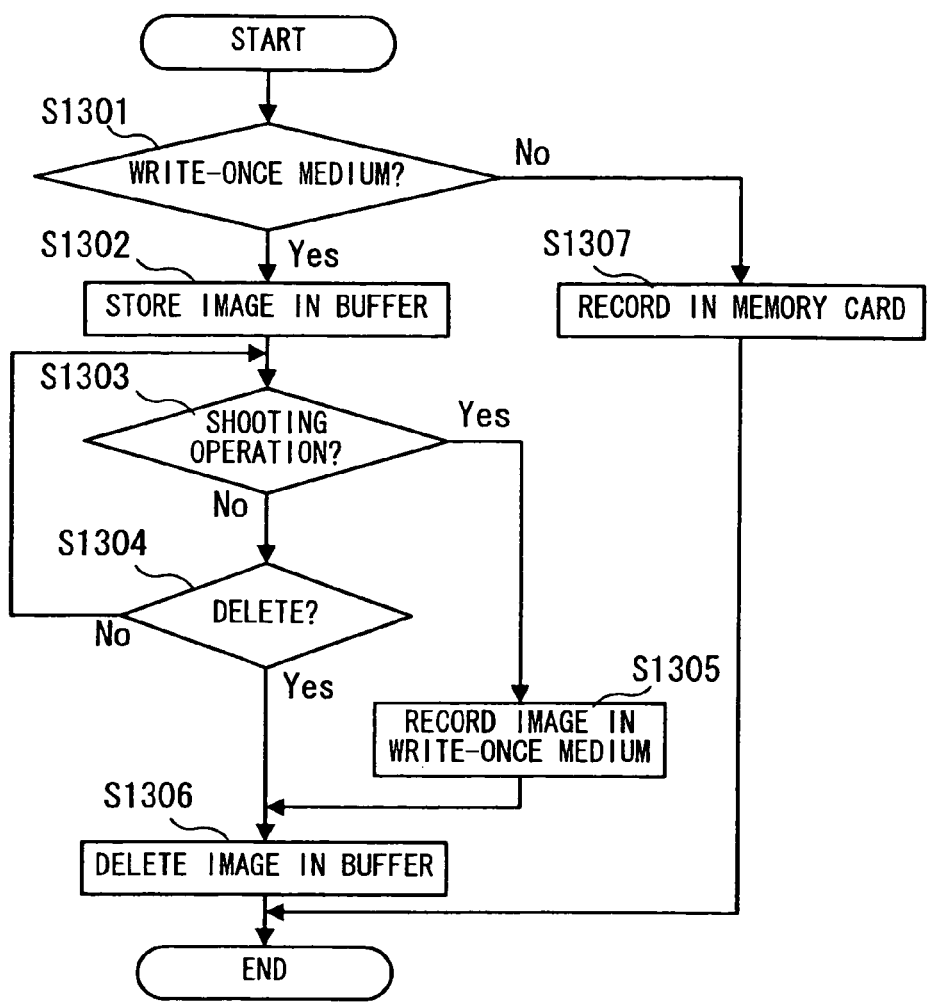
FIG. 25 is a flow chart showing record control processing to be executed in the third embodiment.

(Record Control Responding to Shooting Operation: FIG. 25)

Responding to a shooting operation, work in a case where the image data of buffer memory 311 is recorded in write-once storage medium 4 will be specifically described hereinafter.

FIG. 25 is the flow chart showing a processing procedure of a record control of image data in response to a shooting operation to be executed in control/processor 301. This processing will start when the shutter release button of operation unit 7 is depressed to start shooting.

In step S1301, it is to detect information about an inserted memory card and judge whether write-once storage medium 4 is inserted and when write-once storage medium 4 is inserted, the flow proceeds to step S1302. In step S1302, image processing etc is performed on a taken image to create image data in Exif and the created Exif image data is stored in a temporal storage area of buffer memory 311.

In step S1303, it is to judge whether a next shooting operation is performed, that is, the shutter release button of operation unit 7 is depressed. When a new shooting operation is performed, the flow proceeds to step S1305. In step S1305, the image data temporally stored in buffer memory 311 is recorded in write-once storage medium 4. In step S1306, the image data stored in the temporal buffer memory 311, which was already recorded in write-once storage medium 4, is deleted.

In step S1305, the image data to be recorded in write-once storage medium 4 is an image taken when this processing starts, not image data taken by a shooting operation in step S1303. The image taken in step S1303 is image-processed and as different image data, the image-processed image is stored in the temporal storage area.

In step S1303, when the next shooting operation is not detected, the flow proceeds to step S1304. In step S1304, it is to judge if a delete operation to delete the image data temporally stored in buffer memory 311 is performed. When the delete operation is not performed, the flow gets back to step S1303, wherein it is to judge again if a new shooting operation is performed. When the delete operation is performed, the flow proceeds to step S1306. In step S1306, the image data taken this time and temporally stored in buffer memory 311 is deleted.

In step s1301, when it is judged that write-once storage medium 4 is not inserted and when overwritable storage medium 3 is inserted, the flow proceeds to step S1307. In step S1307, image processing etc is performed on the taken image and image data in Exif is created and then, the created Exif image data in is recorded in overwritable storage medium 3, not in buffer memory 311.

It is preferable that the record control shown in FIG. 25 is employed into a digital camera with, for example, a function to reproduce an image taken just before with ease of simplicity, what is called a quick view function.

Although the record controls shown in FIGS. 24 and 25 are described, a record control can be implemented by combining two record controls. For example, of a given period of time elapse from the display of the reproduction image and a next shooting operation, responding to an earlier action thereof, image data can be so controlled as to be recorded in write-once storage medium 4.

Figure 27:
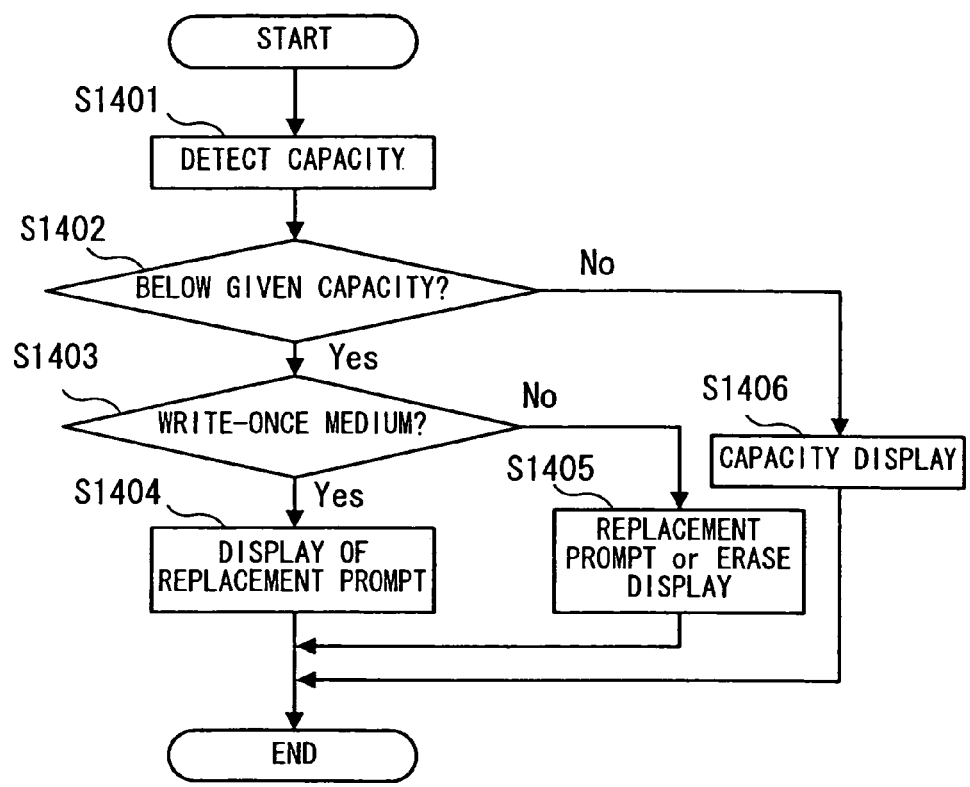
FIG. 27 is a flow chart showing a memory capacity detection control to be executed in the third embodiment.

(Memory Card Capacity Detection Control: FIG. 27)

Next, work to detect memory capacity of a memory card loaded into digital camera 31 will be described hereinafter. In the third embodiment, based upon detected memory capacity of the memory card, LCD display panel 6 displays residual capacity of the memory card and a warning message about memory card replacement.

FIG. 27 is the flow chart showing a processing procedure of a memory capacity detection control to be executed in control/processor 301. This processing is repeatedly executed as long as the power of digital camera 31 is ON.

In step S1401, it is to detect memory capacity of a loaded memory card. In step S1402, it is to judge whether residual capacity of the memory card is below a given capacity. Here, the given capacity of a memory card is capacity necessary to record image data equivalent to one frame. When the capacity is below the given capacity, the flow proceeds to step S1403.

In step S1403, it is to detect whether the loaded memory card is write-once storage medium 4 and if write-once storage medium 4 is inserted, the flow proceeds to step S1404, wherein LCD display panel 6 displays a message prompting a user to update a memory card. FIG. 28 (a) shows a display screen example of the replacement prompt. If write-once storage medium 4 is loaded, as image data cannot be overwritten, replacement of write-once storage medium 4 is prompted. In step S1403, when write-once storage medium 4 is not loaded, that is, a overwritable storage medium is loaded, the flow proceeds to step S1405. In step S1405, LCD display panel 6 displays a message asking if a memory card is updated or unnecessary data in a memory card is deleted. FIG. 28 (b) displays a display screen example.

When overwritable storage medium 3 is loaded, as new image data can be recorded by not only replacing the memory card but also deleting the recorded image data, the display screen example as shown in FIG. 28 (b) is displayed thereon.

In step S1402, when it is judged that memory capacity of the memory card is more than the given capacity, the flow proceeds to step S1406, wherein residual capacity of the memory card is displayed on LCD display panel 6.

Like this, when residual capacity of a memory card is getting less, an appropriate advice can be given to a user in response to the loaded memory card.

Figure 30:
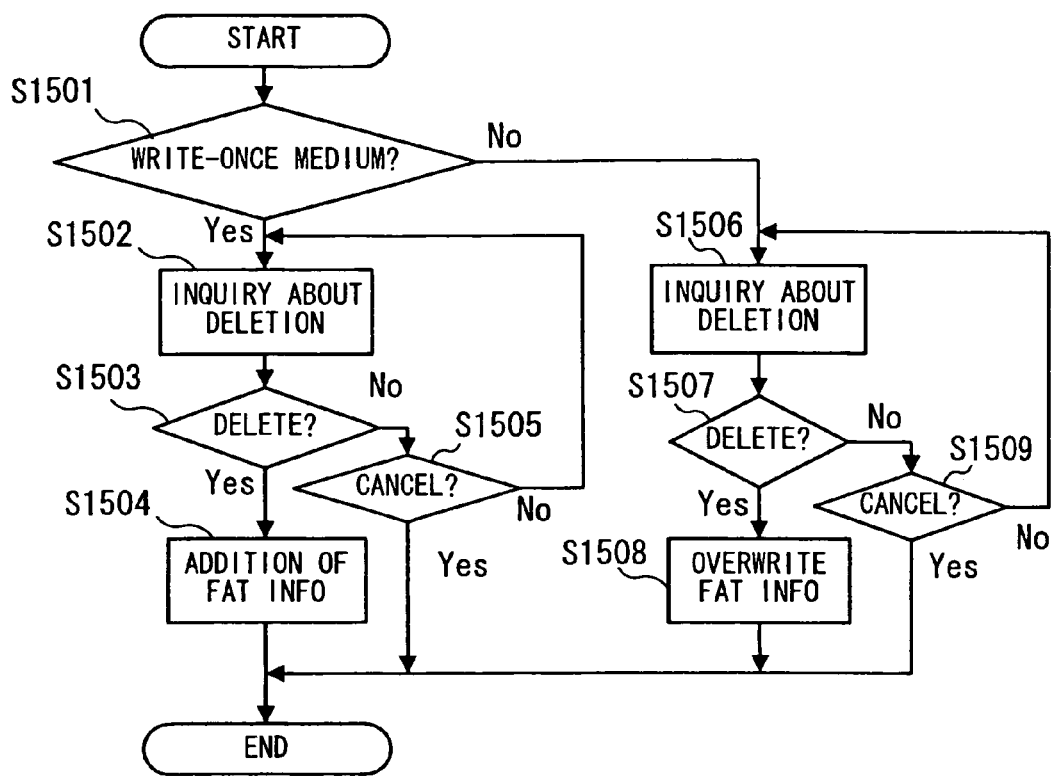
FIG. 30 is a flow chart showing a simple delete operation in the third embodiment.

(Image Data Simple Delete Control: FIG. 30)

Next, work at a time of deleting image data in digital camera 31 will be described hereinafter. When a delete operation is performed while image data is reproduced on LCD display panel 6 in a reproduction mode, LCD display panel 6 displays a delete menu. FIG. 29 (a) displays a display screen example of the delete menu. As shown in FIG. 29 (a), digital camera 31 in accordance with the third embodiment is provided with two image data delete methods of a simple delete and a complete delete.

A simple delete will be explained using FIG. 30. FIG. 30 is the flow chart showing a simple delete operation of digital camera 31. The flow will start by selecting a simple delete in a delete menu shown in FIG. 29(a).

In step S1501, it is to judge whether a loaded memory card is write-once storage medium 4 and if write-once storage medium 4 is inserted, the flow proceeds to step S1502. In step S1205, LCD display panel 6 displays a message asking if image data is deleted although the image deletion does not get an increase in memory capacity. FIG. 29(b) shows a display screen example of the message. In step S1503, when it is judged whether an operation to delete image data is executed. When the operation is executed, the flow proceeds to step S1504.

In step s1504, to indicate that image data to be deleted is deleted, FAT (File Allocation Tables) information is overwritten to create new FAT information. An instruction to nullify pre-overwritten old FAT information and record the created new FAT information is outputted to write-once storage medium 4. The FAT information is information to manage data recorded in a memory. Thus, by nullifying the old FAT information and recording the new FAT information indicative of data being deleted, it is shown therein that there is no data recorded. The new FAT information shows that a data area where image data to be deleted is recorded is overwritable, but here, in addition to the FAT information, other management information so as to make once written area disabled to be overwritten is provided.

In step S1503, when it is not judged that the delete operation is performed, the flow proceeds to step S1505. In step S1505, it is to judge if a cancel operation is performed. When the cancel operation is performed, this processing is ended. When the operation is not performed, the flow proceeds to step S1502.

When it is judged in step S1501 that the loaded memory card is not write-once storage medium 4, that is, overwritable storage medium 3 is inserted, the flow proceeds to step S1506. In step S1506, LCD display panel 6 displays a message asking if the image data is deleted. In step S1507, it is to judge if the delete operation is executed and if the delete operation is executed, the flow proceeds to step S1508.

In step S1508, it is to output an instruction to overwritable storage medium 3 so as to overwrite to FAT information indicating that the image data to be deleted was deleted. When the delete operation is not detected, the flow proceeds to step S1509 and it is judged if a cancel operation is executed. When the cancel operation is executed, this flow is ended. When the cancel operation is not executed, the flow gets back to step S1506.

As described in the above, when the simple delete is selected, delete processing of the image data can be quickly ended by overwriting FAT information so as to indicate deletion of the image data.

(Image Data Complete Delete Control: FIG. 30)

Next, a complete delete of image data will be described hereinafter.

When the simple delete is performed as shown in FIG. 30, only FAT information is overwritten, so the image data still exists in write-once storage medium 4. Thus, there is a risk that the deleted image data will be reproduced. Then, when a user wants to delete the recorded image data completely, a complete delete operation to delete image data completely is performed. For example, when reproduction of deleted image data by other person is embarrassing to a user, a complete delete is selected in the delete menu shown in FIG. 29(a).

Figure 31:
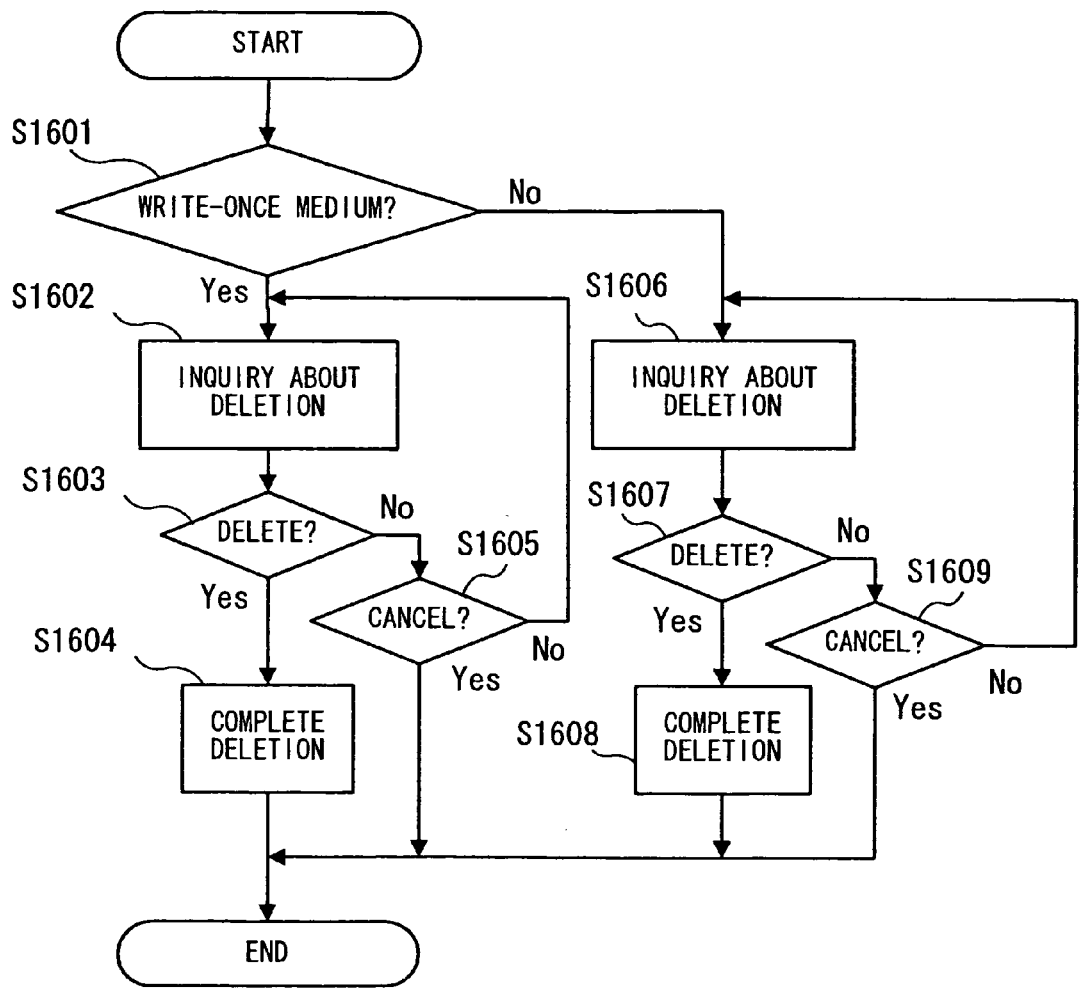
FIG. 31 is a flow chart showing a complete delete operation to be executed in the third embodiment.

FIG. 31 is the flow chart showing a processing procedure of a complete delete operation to be executed in control/processor 6. This processing will start when the complete delete operation is selected via operation unit 7 form the delete menu shown in FIG. 29(a).

In step S1601, it is judged if a memory card in use is write-once storage medium 4 and if write-once storage medium 4 is inserted, the flow proceeds to step S1602. In step S1602, like the simple delete control shown in FIG. 30, LCD display panel 6 displays a message asking if image data is deleted although deletion of image data cannot get an increase in memory capacity. In step S1603, it is to judge if a delete operation to delete image data is executed and if the delete operation is executed, the flow proceeds to step S1604.

In step S1604, FAT information is so corrected as to indicate that there is no existed image data to be deleted and an instruction to make old FAT information invalid is outputted to write-once storage medium 4. At the same time, an instruction to overwrite with given data is outputted to write-once storage medium 4 so as to nullify an image data area to be deleted.

In step S1603, when the delete operation is not detected, it is judged if the cancel operation is executed and if the cancel operation is executed, this processing is ended. When the cancel operation is not executed, the flow gets back to step S1602.

In step S1601, when it is judged that a memory card in use is not write-once storage medium 4 and overwritable storage medium 3 is inserted, the flow proceeds to step S1606. In step S1606, LCD display panel 6 displays a message asking if image data is deleted. In step S1607, it is to judge if the delete operation is executed and if the delete operation is executed, the flow proceeds to step S1608. In step S1608, an instruction to overwrite to FAT information indicative of the image data to be deleted having been deleted is outputted to overwritable storage medium 3. Also, at the same time, an instruction to overwrite given data in an image data area to be deleted is outputted to overwritable storage medium 3.

In step S1607, when the delete operation is not detected, the flow proceeds to step S1609 and it is judged if the cancel operation is performed. When the cancel operation is performed, this processing is ended. When the cancel operation is not performed, the flow gets back to step S1606.

As in the above, selection of the complete delete in the delete menu can make image data invalid completely. Here, an overall image data area is configured to be overwritten with given data and whole image data is configured to be made invalid, but image data can be partially overwritten. In this case, although the whole image data to be deleted cannot be made invalid, a time to overwrite the data can be shortened.

Figure 32:
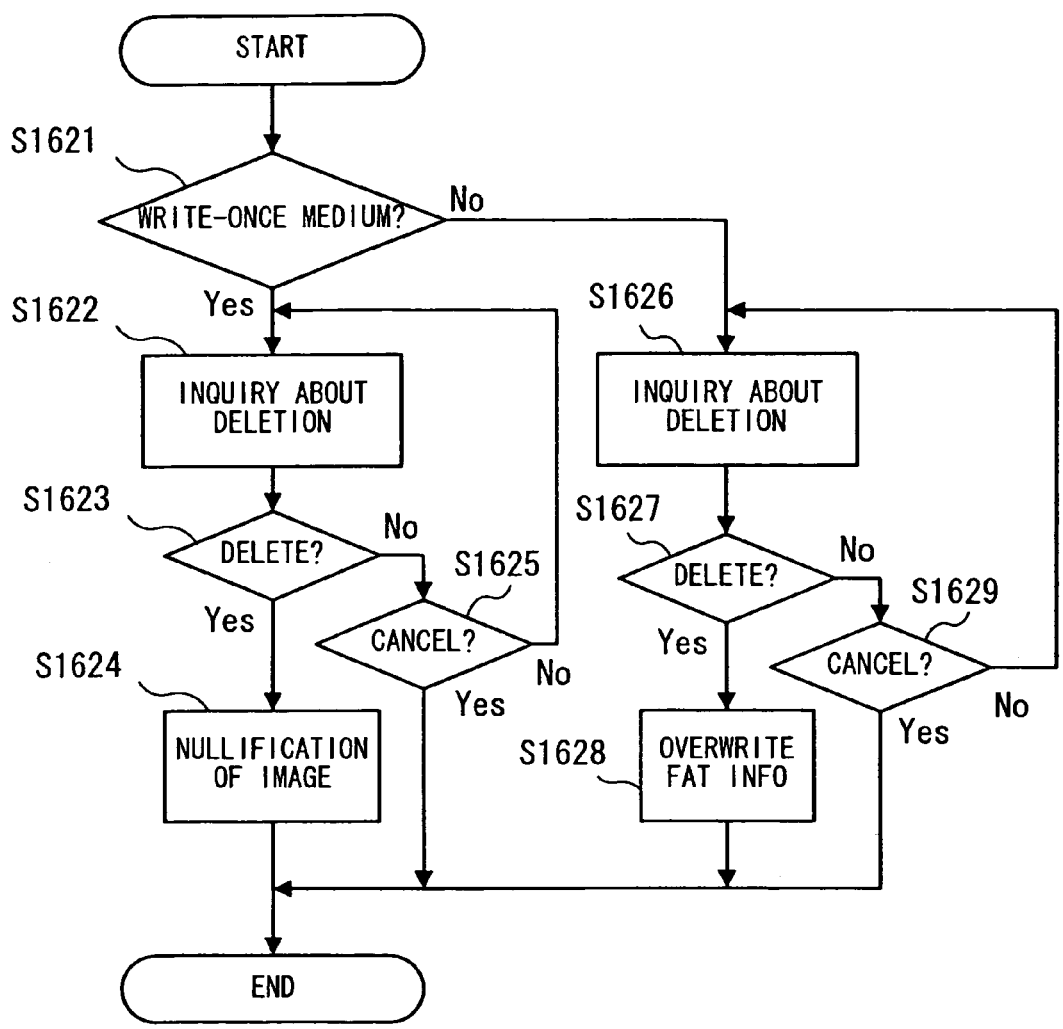
FIG. 32 is a flow chart showing delete control processing to be executed in the third embodiment.

(Other Example 1 of Image Data Delete Control: FIG. 32)

Next, other example 1 of image data delete processing in digital camera 31 will be explained. Here, an image data delete control combining the simple delete and the complete delete will be performed.

In a case of overwritable storage medium 3, there is possibility that image data itself on which the delete processing was performed by overwriting FAT information is overwritten with other image data. Contrary to this, in a case of write-once storage medium 4, image data itself on which the delete processing was performed by adding FAT information is not overwritten with other image data. Thus, when delete processing is performed by overwriting FAT information, the image data remains recorded in write-once storage medium 4. As an ordinary operation cannot check what the deleted image data looks like, a user hesitates to hand over the storage medium to someone
for fear of abuse.

Therefore, in the case where a memory card in use is write-once storage medium 4, the delete operation to make image data itself invalid (complete delete) is performed and in the case of overwritable storage medium 3 in use, a delete operation to overwrite FAT information only (simple delete) is performed.

FIG. 32 is the flow chart showing a processing procedure of other sample 1 of the delete operation to be executed in control/processor 301. This processing will start by performing the delete operation via operation unit 7 in a reproduction mode.

In step S1621, it is to detect if a memory card in use is write-once storage medium 4 and if write-once storage medium 4 is inserted, the flow proceeds to step S1622 and in step S1622, as shown in FIG. 29(b), LCD display panel 6 displays a message asking if an operation to delete image data is performed although deletion cannot get an increase in memory capacity. In step S1623, it is to judge if the delete operation is performed. When the delete operation is performed, the flow proceeds to step S1624.

In step S1624, FAT information is overwritten to create new FAT information indicative of the image data to be deleted having been deleted by nullifying the old FAT information and an instruction to record the new FAT information is outputted to write-once storage medium 4. At the same time, an instruction to overwrite with given data so as to make an image data area to be deleted invalid is outputted to write-once storage medium 4. In step S1623, when the delete operation is not detected, the flow proceeds to step S1625 and it is judged if a cancel operation is executed and if the cancel operation is executed, the flow is ended. If the cancel operation is not executed, the flow gets back to step S1622.

When it is judged in step S1621 that the memory card in use is overwritable storage medium 3, not write-once storage medium 4, the flow proceeds to step S1626. In step S1621, LCD display panel 6 displays a message asking if image data is deleted. In step S1627, it is to judge if the delete operation is executed and if the delete operation is executed, the flow proceeds to step S1628. In step S1628, an instruction to overwrite to FAT information indicative of the image data to be deleted having been deleted is outputted to overwritable storage medium 3. On the other hand, when the delete operation is not detected, the flow proceeds to step S1629 and it is judged if the cancel operation is performed. When the cancel operation is performed, this processing is ended and if the cancel operation is not performed, the flow gets back to step S1626.

As described above, when the image data stored in write-once storage medium 4 is deleted, the complete delete operation cannot reproduce the image data completely. Thus, a user can hand over the memory card to other people with worry-free.

Figure 33:
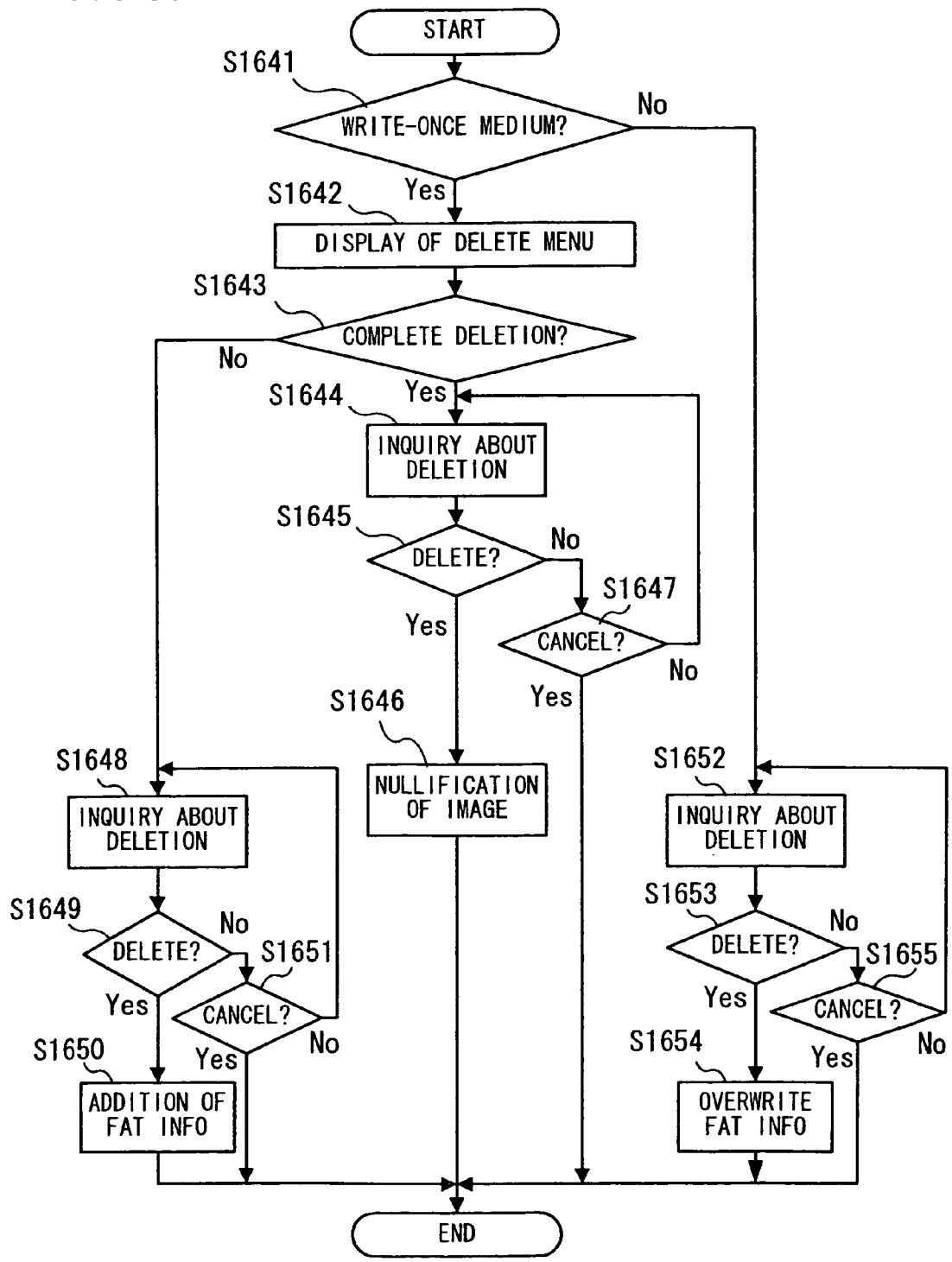
FIG. 33 is a flow chart showing delete control processing to be executed in the third embodiment.

(Other Example 2 of Image Data Delete Control: FIG. 33)

Next, other example 2 of image data delete processing in digital camera 31 will be explained. Here, an image data delete control combining the simple delete and the complete delete will be performed. Specifically, only in a case where write-once storage medium 4 is inserted, any of the simple delete or the complete delete is controlled so as to be selected.

FIG. 33 is the flow chart showing a processing procedure of a delete control of other example 2 to be executed in control/processor 301. This processing will start when the delete operation is operated via operation unit 7 in a reproduction mode.

In step S1641, it is to judge if a memory card in use is write-once storage medium 4 and if write-once storage medium 4 is inserted, the flow proceeds to step S1642, wherein LCD display panel 6 displays the delete menu as shown in FIG. 29(a). In step S1643, it is judged that "complete delete" is selected from the delete menu via operation unit 7. When the "complete delete" is selected, the flow proceeds to step S1644.

In step S1646, FAT information is created to indicate that there is no image data to be deleted and an instruction to nullify old FAT information is outputted to write-once storage medium 4. At the same time, an instruction to overwrite an image data area with given data so as to nullify an image data area to be deleted is outputted to write-once storage medium 4.

When the delete operation is not detected in step S1645, the flow proceeds to step S1647 and it is to judge if a cancel operation is performed. When the cancel operation is performed, this processing is ended. When the cancel operation is not performed, the flow gets back to step S1644.

In step S1643, when the "complete delete" is not selected from the delete menu, that is, the "simple delete" is selected, the flow proceeds to step S1648. In step S1648, as shown in FIG. 29 (b), LCD display panel 6 displays a message asking if the image data is deleted although deletion of the image data does cannot get an increase in memory capacity. In step S1649, it is to judge if the delete operation is executed and if the delete operation is executed, the flow proceeds to step S1650.

In step S1650, new FAT information is created by overwriting FAT information so as to indicate that image data to be deleted was deleted and an instruction to record the new FAT information and nullify the old FAT information is outputted to write-once storage medium 4. On the contrary, in step S1649, when the delete operation is not detected, the flow proceeds to step S1651 and it is to judge if a cancel operation is executed. If the cancel operation is executed, the flow is ended and if a cancel operation is not executed, the flow gets back to step S1648.

In step S1641, when a memory card in use is overwritable storage medium 3, not write-once storage medium 4, the flow proceeds to step S1652. In step S1652, LCD display panel 6 displays a message asking if the image data is deleted. In step S1653, it is judged if a delete operation is executed and if the delete operation is executed, the flow proceeds to step S1654. In step 1654, an instruction to overwrite to FAT information indicative of the image data to be deleted having been deleted is outputted to overwritable storage medium 3. In step S1653, when the delete operation is not detected, the flow proceeds to step S1655 and it is to judge if a cancel operation is performed. When the cancel operation is performed, this processing is ended and when the cancel operation is not performed, the flow gets back to step S1652.

As in the above, by controlling so as to be able to select any of the complete delete or the simple delete only when write-once storage medium 4 is inserted, a user can choose any of the complete delete or the simple delete, for instance, when confidentiality etc is a top priority, the complete delete or when a deleting time is to be shortened, the simple deletion.

Figure 34:
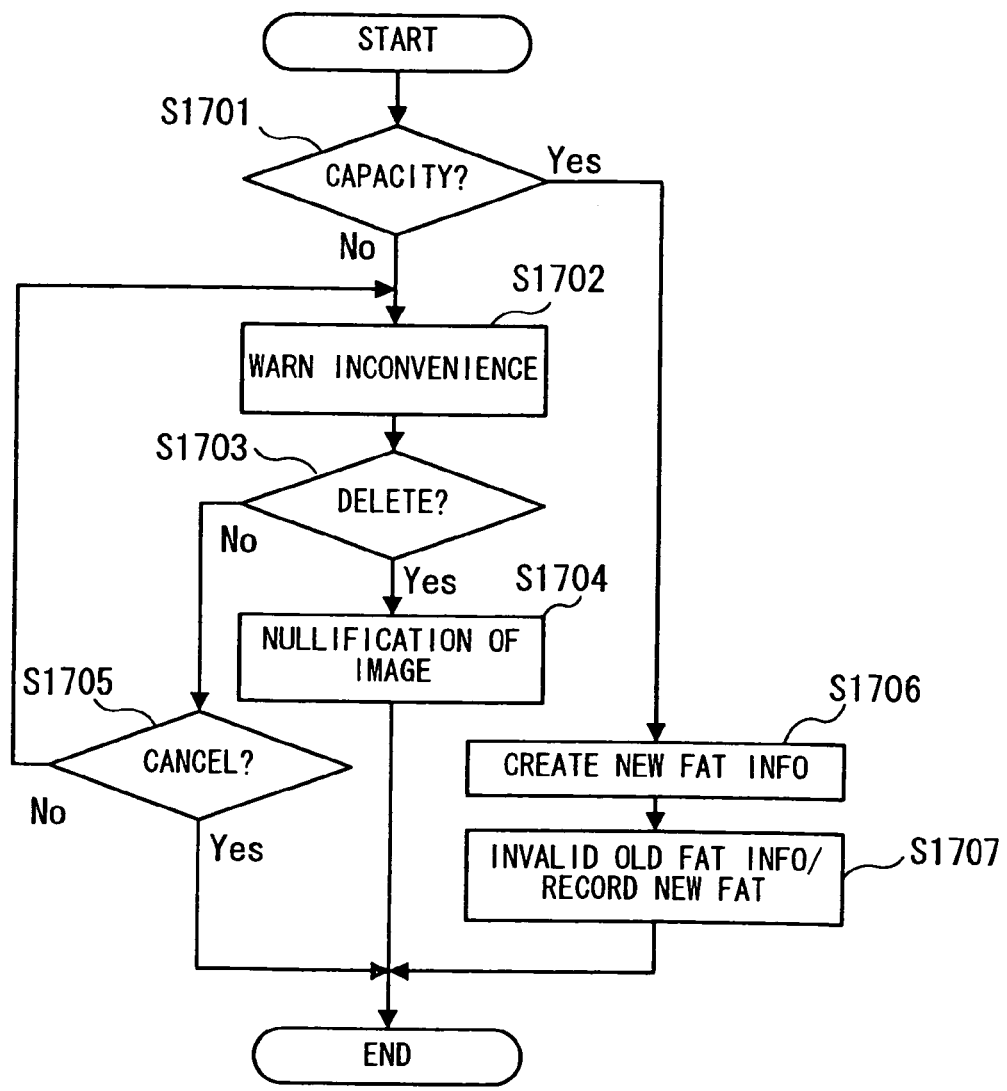
FIG. 34 is a flow chart showing delete control processing to be executed in the third embodiment.

(Image Data Delete Control in Response to Memory Capacity: FIG. 34)

As described in the foregoing, when delete processing is performed on the image data recorded in write-once storage medium 4, it becomes necessary to nullify the old FAT information and additionally record new FAT information. But, if there is no residual capacity in write-once storage medium 4 and new FAT information to be created cannot be recorded, the image data cannot be deleted. To avoid this inconvenience, it is conceivable to perform a record control so as to ensure memory capacity in preparation for a plurality of overwrites of FAT information. However, it is not preferable to a user that memory capacity gets reduced for overwriting FAT information.

Therefore, image data is configured to be deleted even when there is no residual capacity in a storage medium without preparing vacant memory capacity for overwriting FAT information. More specifically, data is nullified by leaving FAT information intact in which image data to be deleted is recorded and overwriting given data in a record area of the image data to be deleted.

FIG. 34 is the flow chart showing a processing procedure of a delete control in response to residual capacity of a memory card to be executed in control/processor 301. This processing will start by performing an operation to delete image data in write-once storage medium 4 via operation unit 7.

Figure 35:
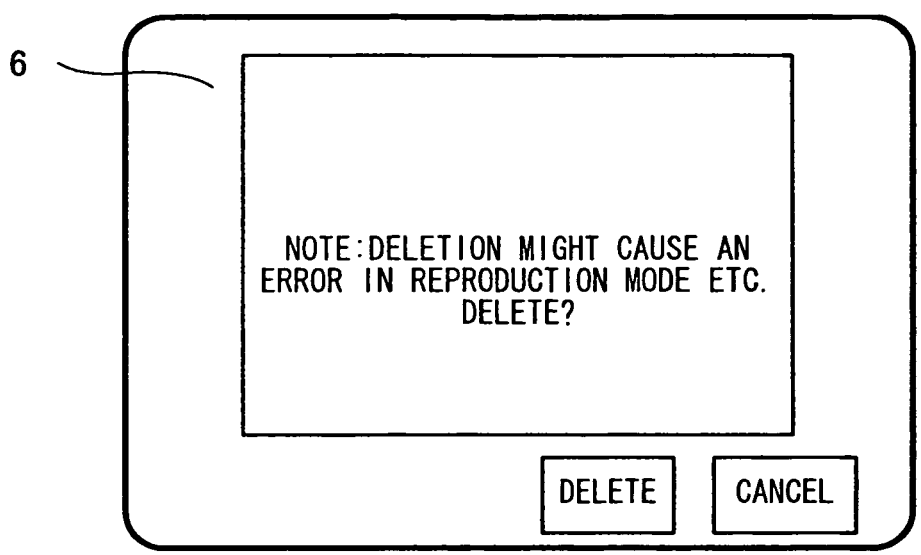
FIG. 35 is a view showing a display example of a warning on a LCD display panel.

In step S1701, it is to judge if residual capacity of write-once storage medium 4 is enough to record FAT information to be newly created. When the residual capacity is not enough, the flow proceeds to step S1702. In step s1702, LCD display panel 6 displays a message warning that inconvenience takes place as well as asking if a delete operation is executed. FIG. 35 shows a display screen example of the warning message. In step S1703, it is to judge if the delete operation is executed and if the delete operation is executed, the flow proceeds to step S1704.

In step S1704, FAT information remains intact and given data is overwritten in image data area to be deleted, and then data is nullified. In this case, along with image data, data about its thumbnail image and additional information is nullified too. Contrary, in step S1703, when the delete operation is not detected, the flow proceeds to step S1705, wherein it is to judge if a cancel operation is performed. If the cancel operation is performed, the flow is ended and if cancel operation is not performed, the flow gets back to step S1702.

In step S1701, when it is judged that there is residual capacity for recording FAT information, the flow proceeds to step S1706. In step S1706, new FAT information indicative of the image data to be deleted having been deleted is created. In step S1707, the new FAT information is recorded by nullifying old FAT information.

Accordingly, the image data which is overwritten by the given data and deleted in step S1704 still exists in accordance with FAT information, so reproduction of the deleted image data is tried in digital camera 31 or other image playback apparatus. But, since there is no image data existed actually, the image data is never reproduced by displaying what an image data file is broken. FAT information does not meet a presence of actual image data and thus this mismatching causes a user some inconvenience a little bit in a file management, but image data a user is eager to delete can be deleted without fail even when residual capacity is getting smaller.

Figure 37:
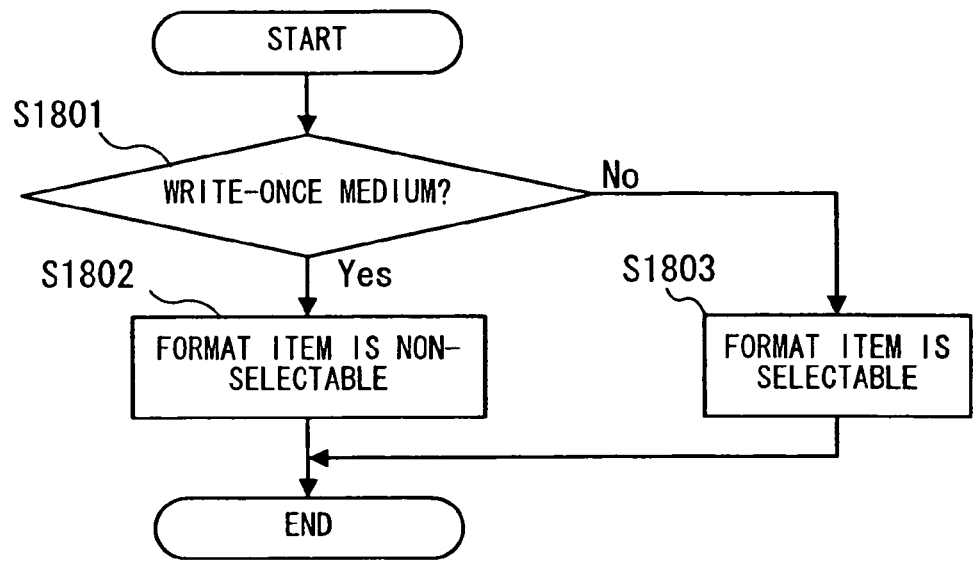
FIG. 37 is a flow chart showing a format control to be executed in the third embodiment.

(Format Control: FIG. 37)

A format control of a memory card in digital camera 31 will be explained hereinafter.

Figure 36:
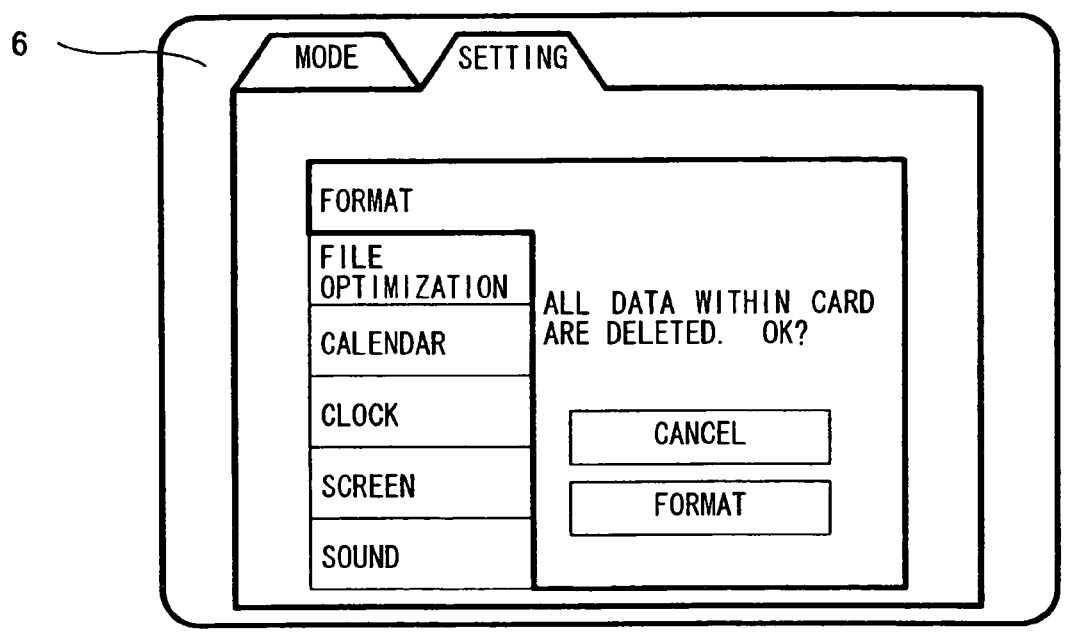
FIG. 36 is a view showing a display example of a setting menu on a LCD display panel.

FIG. 36 shows a display screen sample of a setting menu to be displayed on LCD display panel 6. The setting menu has a menu of selections such format, a file sorting etc and FIG. 36 shows that the "format" is selected from the setting menu via operation unit 7. Selecting of the "format" makes a memory card enabled to be formatted.

Formatting of the loaded memory card deletes all image data recorded therein.

However, physical format processing on write-once storage medium 4 makes all capacity unable to be used. Thus, when write-once storage medium 4 is inserted, it is to inhibit format. More specifically, a format menu is so controlled as not to be selected. Or LCD display panel 6 may display that a format processing cannot be executed even if the format menu is selected.

FIG. 37 is the flow chart showing a format control to be executed in control/processor 301. This processing will start when the setting menu as shown in FIG. 36 is displayed by an operation of operation unit 7.

In step S1801, it is to judge if a memory card in use is write-once storage medium 4 and if write-once storage medium 4 is inserted, the flow proceeds to step S1802. In step S1802, format processing in a setting menu screen is made unable to be selected. With this, the format processing on write-once storage medium 4 is inhibited. On the other hand, in step S1801, when it is judged that write-once storage medium 4 is not inserted and overwritable storage medium 3 is inserted, the flow proceeds to step S1803. In step S1803, the format processing in the setting menu screen is made enabled to be selected.

Like this, with such the control of the format processing depending upon a memory card, when write-once storage medium is inserted, an inadvertent format processing can be prevented.

Figure 38:
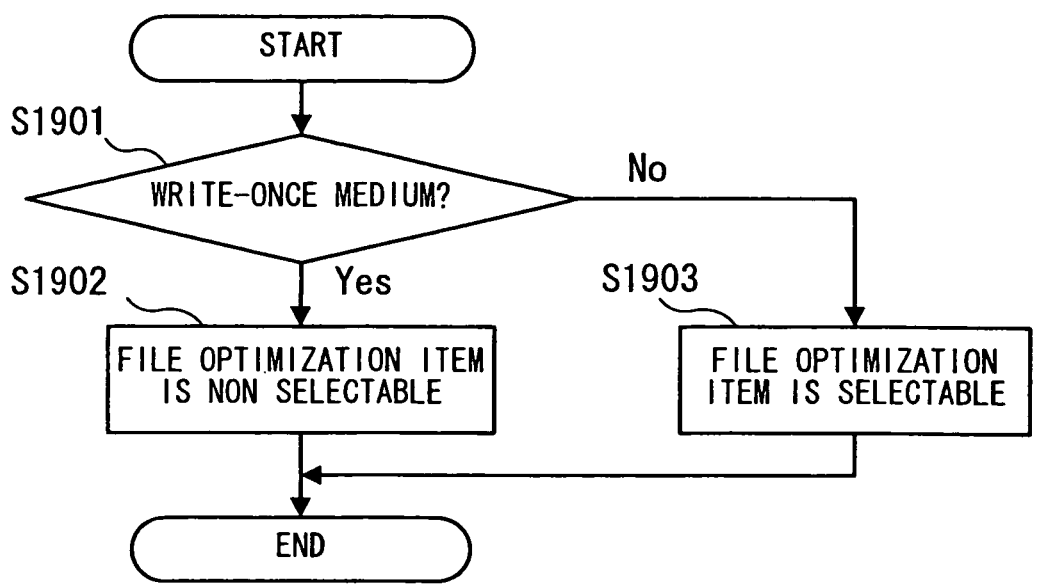
FIG. 38 is a flow chart showing file optimization control processing to be executed in the third embodiment.

(File Optimization Processing: FIG. 38)

A file optimization processing of a memory card inserted into card slot 2 of digital camera 31 will be described hereinafter.

A file optimization is a way of re-arranging files from the beginning and resolving fragmentation of a memory space area. But, since write-once storage medium 4 is non overwritable, a file might be mislaid at not-yet-used area.

Like the format processing, the file optimization processing on write-once storage memory 4 might reduce memory capacity.

FIG. 38 is the flow chart showing a processing procedure of a file optimization control to be executed in control/processor 301. This processing will start when the setting menu as shown in FIG. 36 is displayed by an operation of operation unit 7.

In step S1901, it is to judge if an inserted memory card is write-once storage medium 4 and if write-once storage medium 4 is inserted, the flow proceeds to step S1902. In step S1902, file optimization processing in the setting menu screen is made unable to be selected. In step S1901, when it is judged that write-once storage medium 4 is not inserted and overwritable storage medium 3 is inserted, the flow proceeds to step S1903 wherein the format processing in the setting menu screen is made enabled to be selected.

Accordingly, when write-once storage medium 4 is inserted, the file optimization processing cannot be performed.

Figure 39:
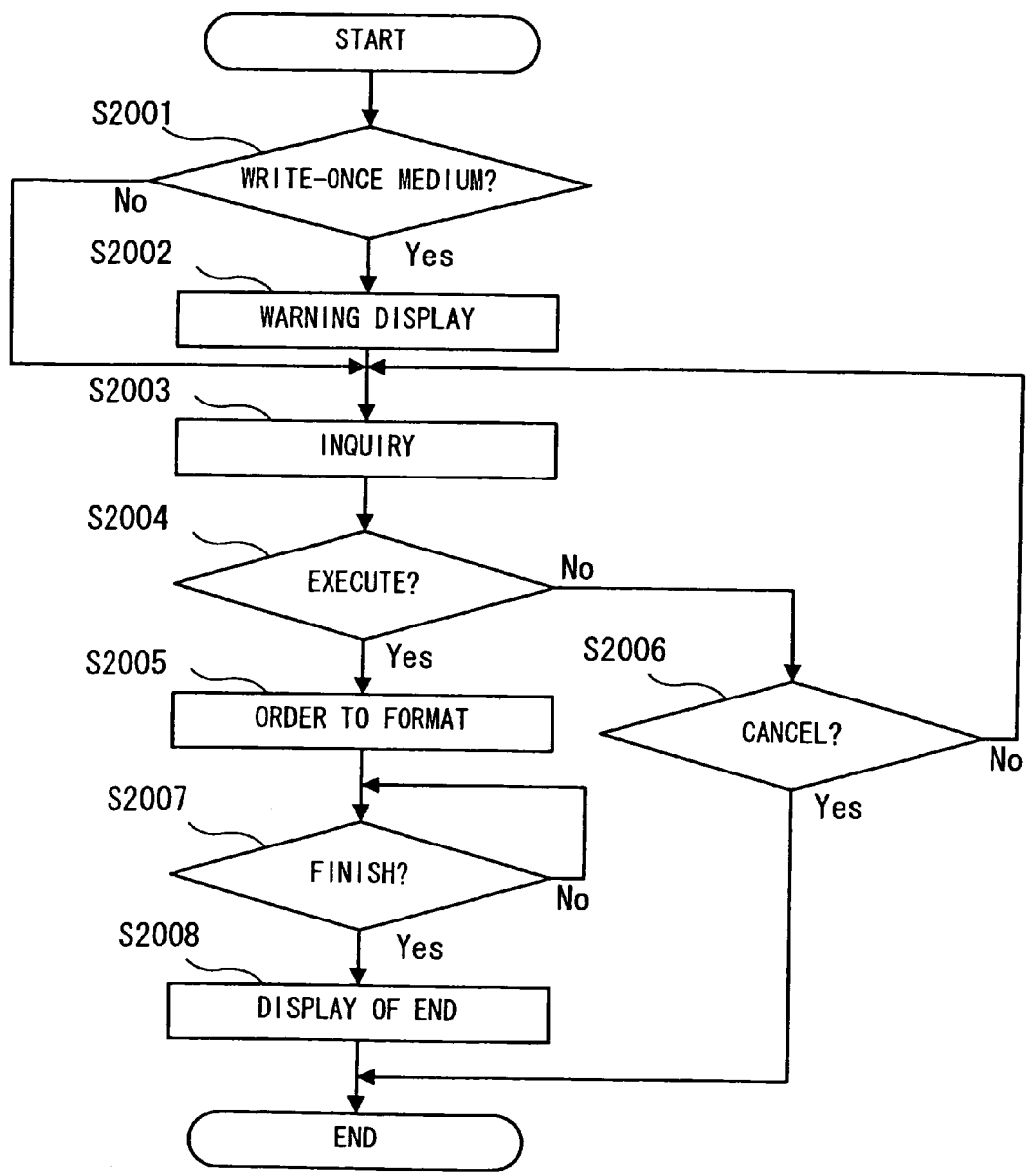
FIG. 39 is a flow chart showing format processing to be executed in the third embodiment.

(Fake Format Processing: FIG. 39)

As described in the foregoing, the format control of FIG. 37 controls such that the format processing is inhibited when write-once storage medium 4 is inserted.

Here, if an operation is executed to perform the format processing on write-once storage medium 4, fake format processing is so controlled as to be performed. More specifically, in the event that the format processing is selected via operation unit 7, a controller within a memory card of write-once storage medium 4 receives a format instruction from digital camera 31 and then processing is performed to make data invalid against a used area. And, the controller within the memory card does not perform the format processing on a not-yet-used area. Such the processing is called the fake format processing. With this processing, data stored in the used area is unable to be read out and data in the not-yet-used area remains still recordable. In this case, memory capacity in the used area where the format processing was performed cannot be restored.

Here, when the format processing is selected in the setting menu shown in FIG. 36, the fake format processing is controlled to be performed on write-once storage medium 4. Also, when the format processing is selected, a normal format processing is controlled to be performed on a memory card rather than write-once storage medium 4.

FIG. 39 is the flow chart showing a processing procedure of a format control to be executed in control/processor 301. This processing will start when the format processing is selected from the setting menu screen shown in FIG. 36.

In step S2001, it is to judge if an inserted memory card is write-once storage medium 4 and if write-once storage medium 4 is inserted, the flow proceeds to step S2002. In step S2002, a message warning that formatting does not get an increase in memory capacity is displayed on LCD display panel 6. In step S2003, a warning that execution of the formatting will delete recorded data and a message asking if the formatting is executed or cancelled are also displayed on LCD display panel 6.

In step S2004, it is to judge if an operation to format is executed and if the operation is executed, the flow proceeds to step S2005. In step S2005, a controller within a memory card is ordered to format the memory card. In step S2004, if the operation is not executed, the flow proceeds to step S2006 and it is to judge if a cancel operation is executed. If the cancel operation is executed, the flow is ended and if the cancel operation is not executed, the flow gets back to step S2003.

In step S2007, it is judged if the format processing is finished and if the format processing is finished, the flow proceeds to step S2008. In step S2008, a message saying that the formatting is over is displayed on LCD display panel 6. In step S2007, judgment is kept on until completion of the format processing is detected.

In step s2001, it is judged that write-once storage medium 4 is not inserted and overwritable storage medium 3 is inserted, the flow proceeds to step S2003 without a measurement display in step S2002 and a message asking if the format processing is executed is displayed on LCD display panel 6.

The control shown in FIG. 39 configures the controller within the memory card to perform the fake format processing and the normal format processing, so digital camera 31 only outputs a format processing order to the memory card.

But, when the format processing is performed on a memory card having no internal controller, digital camera 31 is so configured as to perform the fake format processing on write-once storage medium 4 and the normal format processing on overwritable storage medium 3.

Figure 40:
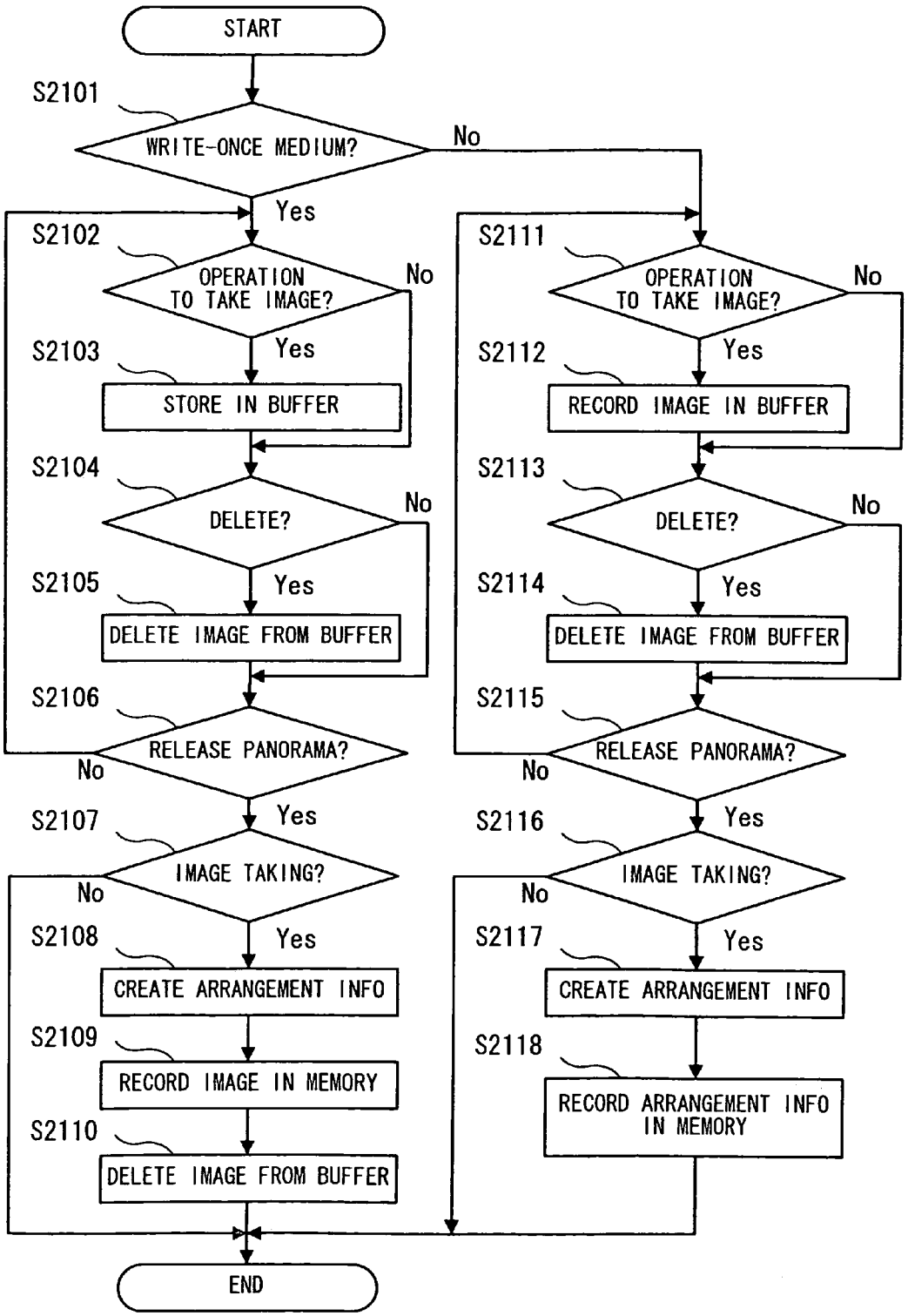
FIG. 40 is a flow chart showing panorama shooting control processing to be executed in the third embodiment.

(Panorama Shooting Process: FIG. 40)

Next, work in a case where a panorama shooting is performed by digital camera 31 will be described hereinafter.

A panorama shooting mode is a mode of shooting to make a composite picture with a plurality of image data, wherein information showing where to arrange each image data is recorded along with the image data so that the image data can be automatically composed.

In the panorama shooting mode, in order to enable to re-shoot a picture until a series of panorama shots are finished, image data taken in the panorama shooting mode is stored in the provisional storage area in buffer memory 311. Also, arrangement information about a series of panorama image data is stored in the provisional storage area in buffer memory 311 since the information does not come into completion until the panorama shooting is complete. After the panorama shooting is complete, the image data and arrangement information are moved to write-once storage medium 4 from buffer memory 311.

More specifically, a panorama shooting control will be explained hereinafter.

FIG. 40 is the flow chart showing a processing procedure of a panorama shooting control to be executed in control/processor 301. This processing will start when the panorama shooting mode is set.

In step S2101, it is to judge if an inserted memory card is write-once storage medium 4 and if write-once storage medium 4 is inserted, the flow proceeds to step S2102. In step S2102, it is to judge if a shooting operation is executed with the shutter release button of operation unit 7 and if the shooting operation is executed, the flow proceeds to step S2103. In step S2103, image data gained by the shooting operation is stored in the temporal storage area of buffer memory 311 and the flow proceeds to step S2104. In step S2102, when the shooting operation is not executed, the flow proceeds to step S2104.

In step S2104, it is to judge if a delete operation with respect to the image data shot in step S2102 is executed and if the delete operation is executed, the flow proceeds to step S2105, wherein an image data taken just while ago, that is, the image data shot in step S2102 is deleted from buffer memory 311. Then, the flow proceeds to step S2106. When the delete operation is not detected in step S2104, the flow proceeds to step S2106.

In step S2106, it is to judge if the panorama shooting mode is released. If the panorama shooting mode is released, the flow proceeds to step S2107 and if the panorama shooting mode is not released, the flow goes back to step S2102.

In step S2107, it is to judge if there is the image data taken in the panorama shooting mode in buffer memory 311 has and if there is the image data in buffer memory 311, the flow proceeds to step S2108 and if there is not the image data in buffer memory 311, this flow is ended. In step S2108, it is to create arrangement information used to make a composite picture with a series of the image data taken in the panorama shooting mode. The arrangement information is information necessary to decide how to put the series of the image data together into one picture to make a composite picture.

In step S2109, the created arrangement information is recorded in write-once storage medium 4 together with the image data. In step S2110, the image data recorded in write-once storage medium 4 is deleted from buffer memory 311.

When it is judged in step S2101 that the memory card is not write-once storage medium 4 and overwritable storage medium 3 is inserted, the flow proceeds to step S2111.

In step S2111, it is to judge if the shooting operation is executed and if the shooting operation is executed, the flow proceeds to step S2112. In step S2112, it is to perform image processing on the image data gained by the shooting operation in buffer memory 311 and record the processed image data in the memory card. Then the flow proceeds to step S2113. In step S2111, if the shooting operation is not yet executed, the flow proceeds to step S2113.

In step S2113, it is to judge if the delete operation is executed and if the delete operation is executed, the flow proceeds to step S2114. In step S2114, a taken image data just while ago, that is, the image data shot in step S2111 is deleted from the memory card. And then, the flow proceeds to step S2115. In step S2113, if the delete operation is not detected, the flow proceeds to step S2115.

In step S2115, it is to judge if the panorama shooting mode is released. If the panorama shooting mode is released, the flow proceeds to step S2116 and if the panorama shooting mode is not released, the flow gets back to step S2111.

In step S2116, it is to judge if there is the image data taken in the panorama shooting mode in buffer memory 311 has the image data taken in the panorama shooting mode and if there is the image data in buffer memory 311, the flow proceeds to step S2117 and if there is no image data, the flow is ended. In step S2117, the arrangement information about the series of the image data taken in the panorama shooting mode is created. Then, in step S2118, the created arrangement information is recorded in the memory card with link to the image data.

FIG. 40 describes the embodiment in which the panorama shooting control can be executed only when write-once storage medium 4 is inserted. But, regardless of a kind of a memory card, a panorama shooting mode setting may be configured to implement the processing described in FIG. 40 at all times. With this configuration, it is not necessary to prepare two different programs to execute two different controls for use in a case where write-once storage medium 4 is inserted or other memory card rather than medium 4 is inserted The control of FIG. 40 may be applied to a shooting mode in which a plurality of image data is shot and related information relevant to image data like the arrangement information is created.

Figure 41:
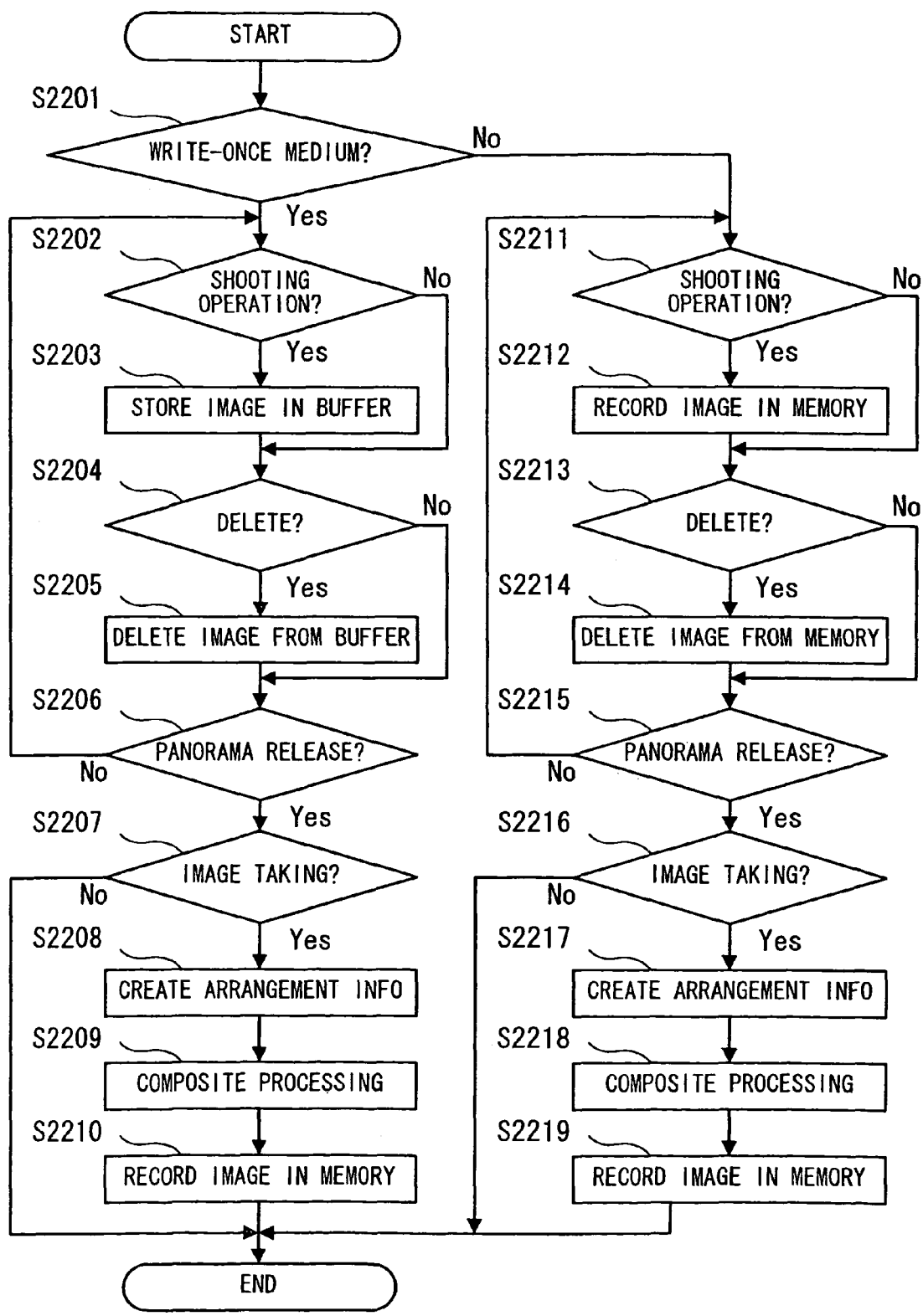
FIG. 41 is a flow chart showing panorama composition control processing to be executed in the third embodiment.

(Panorama Composite Control: FIG. 41)

In the panorama shooting control described in FIG. 40, an example that composition processing of image data is not performed within digital camera 31 and the series of the image data and the arrangement information are recorded in the memory card is explained herein. In this case, software installed in PC etc enables to create image data in order to put a series of image data together into one picture and create a panorama image based upon the arrangement information. However, composite processing can be performed within digital camera 31 to the extent that image data taken in a panorama shooting is composite-processed to create a panorama image.

Specifically, digital camera 31 temporally stores image data each taken in buffer memory 311 until an image composition is complete and records panorama image data obtained by the image composition in write-once storage medium 4.

FIG. 41 is the flow chart showing a processing procedure of a panorama composition control to be executed in control/processor 301. This processing will start when the panorama shooting mode is set via operation unit 7.

In step S2201, it is to judge if an inserted memory card is write-once storage medium 4 and if write-once storage medium 4 is inserted, the flow proceeds to step S2202. In step S2202, it is to judge if the shooting operation is executed with the shutter release button of operation unit 7 depressed. When the operation is executed. In step S2203, image data gained by the shooting operation in step S2202 is stored in buffer memory 311. And then, the flow proceeds to step S2204. When the operation is not detected in step S2202, the flow proceeds to step S2204.

In step S2204, it is to judge if a delete operation to delete the image data is operated and if the delete operation is operated, the flow proceeds to step S2205. In step S2205, the image data gained in step S2202 is deleted from buffer memory 311. Then, the flow proceeds to step S2206. When the delete operation is not detected in step S2204, the flow proceeds to step S2206.

In step S2206, it is to judge if the panorama shooting mode is released. If the panorama shooting mode is released, the flow proceeds to step S2207 and if the panorama shooting mode is not released, the flow gets back to step S2202.

In step S2207, it is to judge if there is the image data taken in the panorama shooting mode in buffer memory 311 and if there is the image data, the flow proceeds to step S2208 and if there is not the image data, the flow is ended. In step S2208, it is to create arrangement information for use in putting a series of image data taken in the panorama shooting mode together into one picture. The arrangement information is information necessary to decide how a series of image data are composed to make a composite photograph. In step S2209, it is to perform composite processing on the series of the image data based upon the created arrangement information to create panorama image. At this stage, the panorama image is so processed as to be sized to a size of normal image data. In step S2210, the panorama image data composite-processed and created in step S2209 is recorded in write-once storage medium 4 and at the same time the series of the image data and the arrangement information are deleted from buffer memory 311.

In step S2201, when it is judged that the inserted memory card is overwritable storage medium 3, not write-once storage medium 4, the flow proceeds to step S2211. In step S2211, it is to judge if the shooting operation is executed with the shutter release button of operation unit 7 and if the shooting operation is executed, the flow proceeds to step S2212. In step S2212, it is to process image data gained by the shooting operation in buffer memory 311 and record the processed image data in a memory card. Then, the flow proceeds to step S2213. When the shooting operation is not detected in step S2211, the flow proceeds to step S2213.

In step S2213, it is to judge if a delete operation is executed and if the delete operation is executed, the flow proceeds to step S2214. In step S2214, a taken image data just while ago, that is, the image data taken in step S2211 is deleted from the memory card. Then, the flow proceeds to step S2215. When the delete operation is not detected in step S2213, the flow proceeds to step S2215.

In step S2215, it is to judge if the panorama shooting mode is released. If the panorama shooting mode is released, the flow proceeds to step S2216 and if the panorama shooting mode is not released, the flow gets back to step S2211.

In step S2116, it is to judge if there is image data taken in the panorama shooting mode in a memory card and if there is the image data, the flow proceeds to step S2217 and if there is not the image data, the flow is ended. In step S2217, arrangement information about a series of the image data taken in the panorama mode is created. At step S22 18, it is to perform composite processing on the series of the image data based upon the created arrangement information to create a panorama image. The panorama image is so processed as to be sized to a size of normal image data. Further, in step 2219, the panorama image data is recorded in the memory card and at the same time the series of the image data and the arrangement information are deleted from the memory card.

A size of the composite image data created in steps S2209 and S2218 as described in the foregoing is so configured as to correspond to a image size set in a normal shooting, so the composite image can be treated in the same way as other image data.

Figure 42:
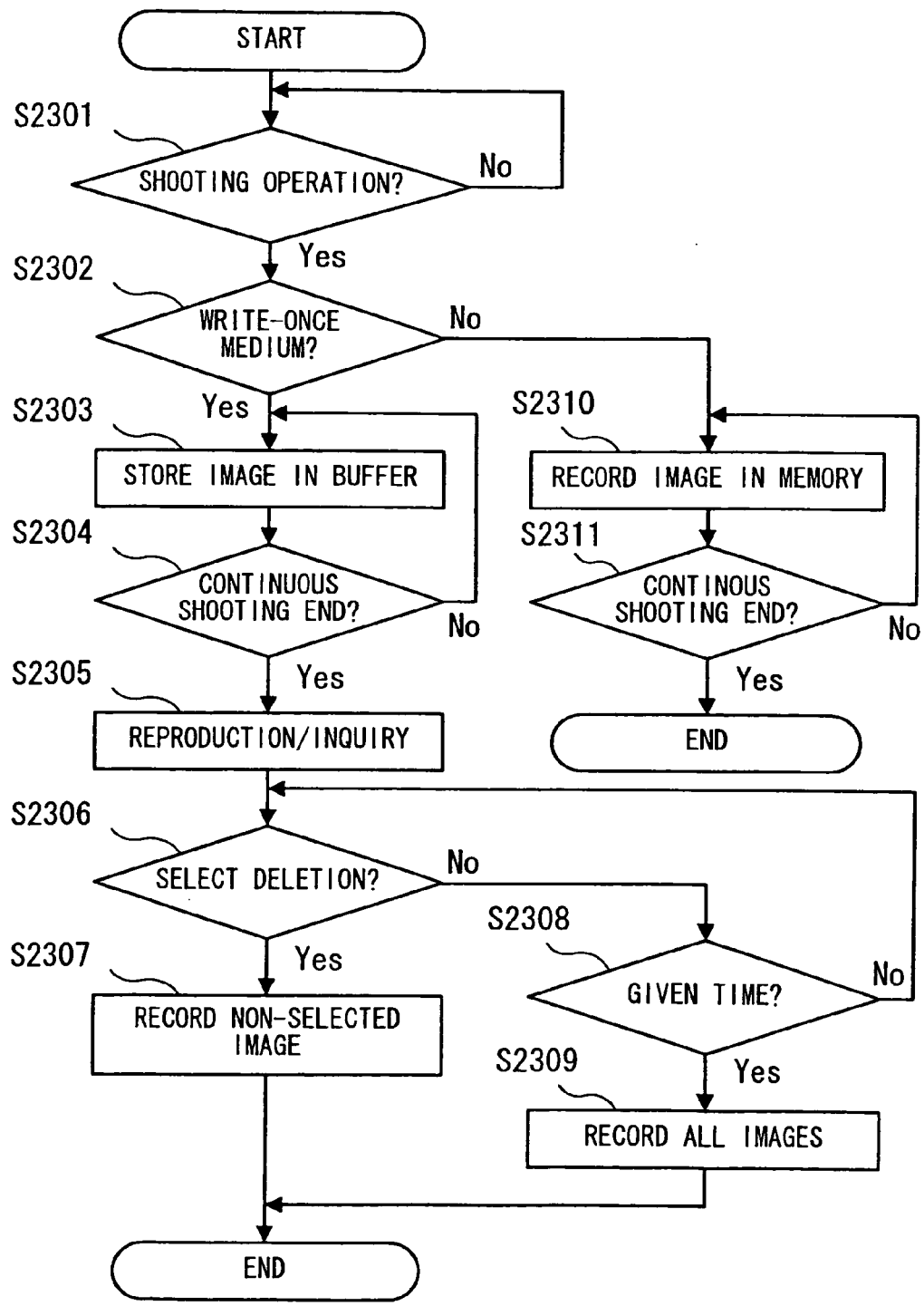
FIG. 42 is a flow chart showing continuous shooting control processing to be executed in the third embodiment.

(Continuous Shooting Control: FIG. 42)

Work in a case of a continuous shooting in digital camera 31 will be explained.

In a continuous shooting, there is high possibility that unnecessary image data comes out as a few frames are consecutively shot. Thus, digital camera 31 is so controlled as to ask if image data is recorded before the image data is recorded in write-once storage medium 4 when the continuous shooting is performed.

FIG. 42 is the flow chart showing a processing procedure of a continuous shooting control to be executed in control/processor 301. This flow will start when the continuous shooting mode is set by an operation of operation unit 7.

In step S2301, it is to judge if the continuous shooting is performed with the shutter release button of operation unit 7 and if the continuous shooting is performed, the flow proceeds to step S2302. When the continuous shooting is not performed, processing of S2301 is continued.

In step S2302, it is to judge if an inserted memory card is write-once storage medium 4 and when write-once storage medium 4 is inserted, the flow proceeds to step S2303. In step S2303, image data taken in step S2301 is stored in buffer memory 311. At this moment, the image data is created in file format to be recorded in a memory card.

In step S2304, it is to detect if the continuous shooting is over. When the continuous shooting is over, the flow proceeds to step S2305 and when the continuous shooting is still on, the flow gets back to step S2303. In step S2305, a taken image is reproduced on LCD display panel 6 and a message asking if the reproduced image is deleted without recording the image in write-once storage medium 4 is displayed on LCD display panel 6.

In step S2306, it is to detect if image to be deleted is selected without recording the image in write-once storage medium 4 and if the image to be deleted is selected, the flow proceeds to step S2307. In step S2307, it is to record image data that is not selected as the image data in step S2306 in write-once storage medium 4 and at the same time delete the image data from buffer memory 311.

In step S2306, when the image data to be deleted is not selected, the flow proceeds to step S2308. In step S2308, it is to judge if a given period of time has elapsed since reproduction of the image is displayed on LCD display panel 6. When the given period of time has elapsed, the flow proceeds to step S2309, wherein all images taken in the continuous shooting mode are recorded in write-once storage medium 4 and the image data thereof is deleted form buffer memory 311. When the given period of time does not elapse in step S2308, the flow gets back to step S2306.

In step S2302, when it is judged that overwritable storage medium 3 is inserted, not write-once storage medium 4, the flow proceeds to step S2310. In step S2310, it is to temporally store the image data taken in step S2301 in buffer memory 311, process the image data and at the same time record image data ready for being recorded in a memory card successively in the memory card. In step S2311, it is to judge if the continuous shooting is over and if the continuous shooting is over, the flow is ended and if the continuous shooting is still on, the flow gets back to step S2310.

Herein, the continuous shooting to be executed in a continuous shot mode has been described so far. But, rather than the continuous shooting, the same control as shown in FIG. 42 can be applied to a bracket shooting in which pictures are shot consecutively at plural times by varying exposure settings or white balance etc.

Like this, when a shooting mode is to take a picture at a plurality of times consecutively, a user is caused to make a choice of an image to be recorded, so a favorite image only can be selected and recorded in write-once storage medium 4.

Figure 43:
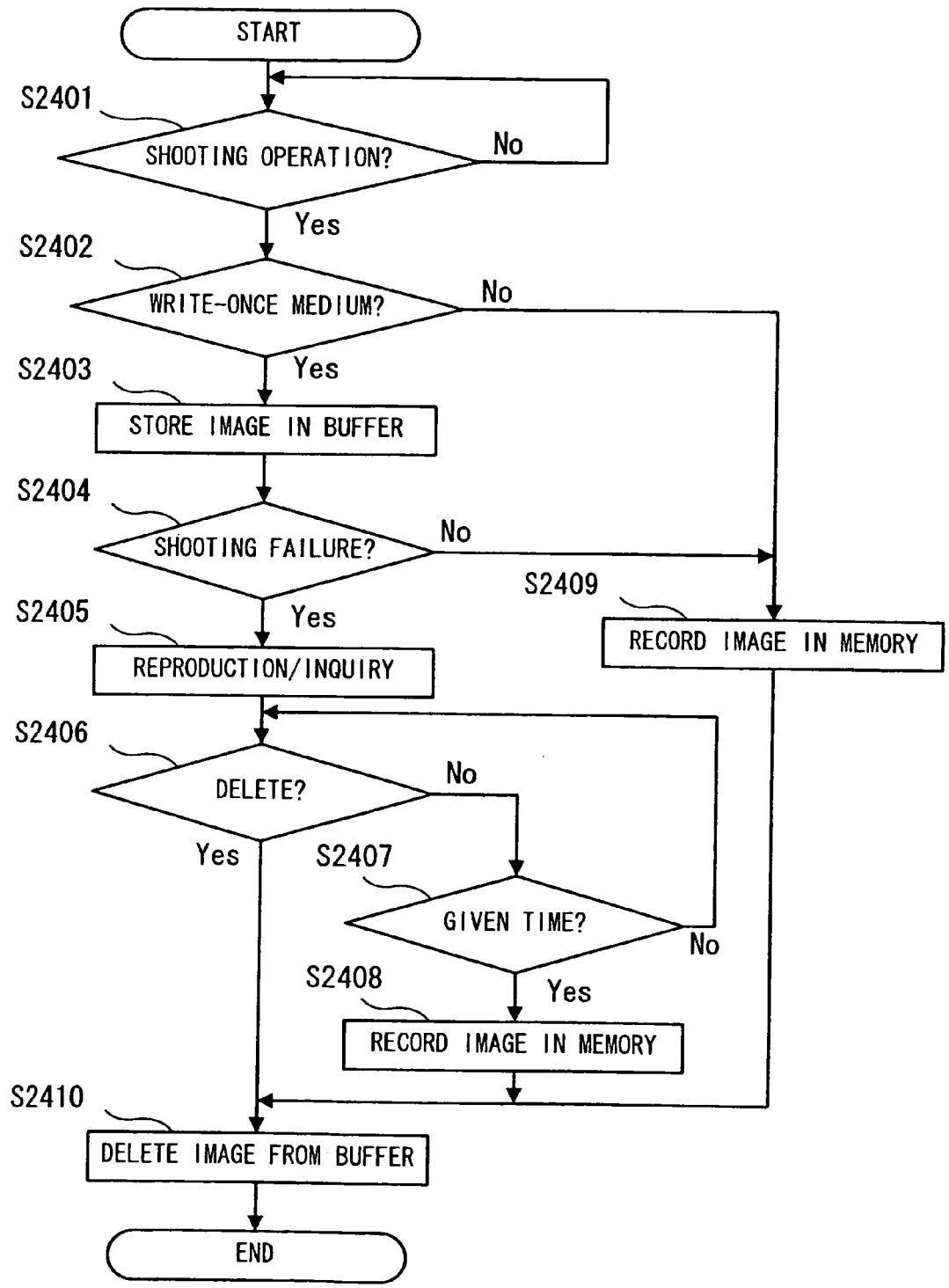
FIG. 43 is a flow chart showing record inquiry control processing to be executed in the third embodiment.

(Record Inquiry Control: FIG. 43)

In the continuous shooting mode, digital camera 31 can be controlled to analyze taken image data and automatically select suitable image data and automatically record only the selected image data in write-once storage medium 4.

A record inquiry control in digital camera 31 will be explained hereinafter. A record inquiry control is a control in which, when digital camera 31 judges that taken image data is a failure image, digital camera 31 prompts a user to cancel record of the image data before the image data is recorded in write-once storage medium 4.

FIG. 43 is the flow chart of a processing procedure of a record inquiry control to be executed in control/processor 301. This flow will start when the shooting mode is set by an operation of operation unit 7.

In step S2401, it is to judge if a shooting operation is executed with the shutter release button of operation unit 7 and if the shooting operation is executed, the flow proceeds to step S2402 and if the shooting operation is not executed, processing of step S2401 is continued. In step S2402, it is judged if an inserted memory card is write-once storage medium 4 and if write-once storage medium 4 is inserted, the flow proceeds to step S2403.

In step S2403, it is to perform image-processing etc on the image data taken in step S2401 and temporally store the processed image data in buffer memory 311. In step S2404, it is to judge if the image stored in buffer memory 311 in step S2403 is the failure image. For instance, an image such as an out-of-focus image, under-exposed image just taken before a battery is not fully charged, a blurred picture etc is generally judged as the failure image. And it may be judged if a taken image is a failure by analyzing the taken image. If it is judged in step S2404 that the image in step S2403 is the failure image, the flow proceeds to step S2405.

In step S2405, the failure image judged in step S2404 is reproduced on LCD display panel 6 and at the same time, a message inquiring if the image is deleted without recording it in write-once storage medium 4. In step S2406, it is to judge if the delete operation is executed with respect to the reproduction image and if the delete operation is executed, the flow proceeds to step S2410, wherein the image to be deleted is deleted from buffer memory 311.

In step S2406, when the delete operation is not executed, the flow proceeds to step S2407. In step S2407, it is to judge if a given period of time has elapsed since the failure image is reproduced on LCD display panel 6. If the given period of time has elapsed, the flow proceeds to step S2408 and the image data stored in buffer memory 31 is recorded in write-once storage medium 4. When it is judged in step S2407 that the given period of time does not elapse, the flow gets back to step S2406.

In step S2402, when overwritable storage medium 3 is inserted, not write-once storage medium 4, the flow proceeds to step S2409. In step S2409, it is to perform image-processing etc on the image data taken in step S2401 and record the processed image data in overwritable storage medium 3. When it is judged in step S2404 that the image is not the failure image, the flow proceeds to step S2409 and the image data taken in step S2401 is recorded in a memory card.

As described in the foregoing, regarding a failure image of high possibility to be deleted, a user is inquired if the image is recorded. This inquiry prevents the failure image from being recorded in write-once storage medium 4 and its memory capacity from being wastefully reduced. And this record inquiry control can prompt the user to re-shoot with respect to the failure image by reproducing the failure image.

The control shown in FIG. 43 lets the user be inquired if the failure image is deleted only when it is judged that a taken image is a failure. Therefore, the inquiry into deletion of an image is not performed unless the taken image is the failure, so the user is not frustrating by frequent inquiries.

Figure 45:
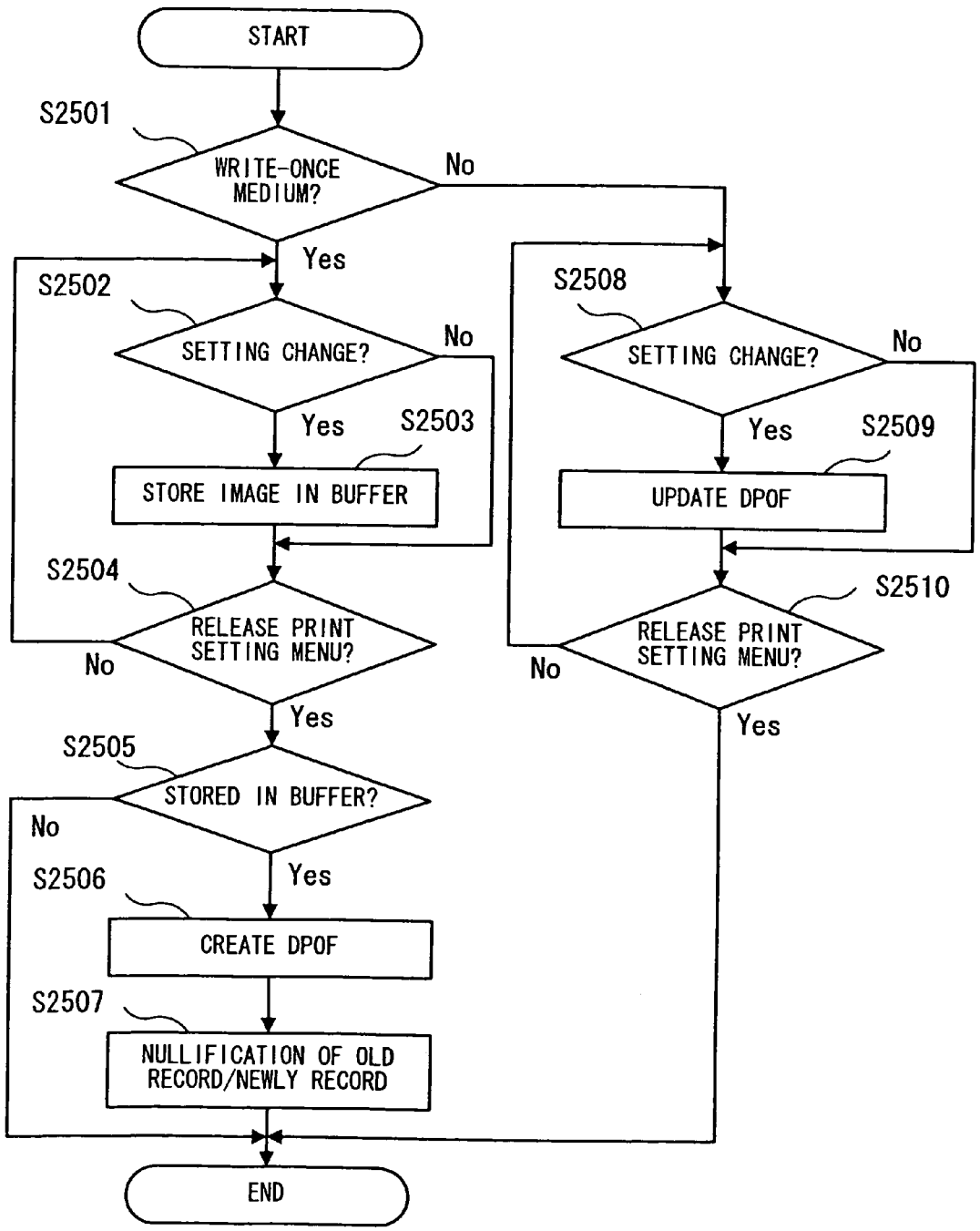
FIG. 45 is a flow chart showing print setting control processing to be executed in the third embodiment.

(Print Setting Control: FIG. 45)

An explanation about a change control of related information about image data will be given hereinafter.

There are recorded varieties of information related to each other in image data gained by shooting. For example, a DPOF (Digital Print Order Format) file is configured in text file format describing information about printing of image data. In the DPOF file, information about a number of prints, a print size, a trimming, a rotation (right/left) etc is described.

As described in the foregoing, when image data recorded in write-once storage medium 4 is deleted, new FAT information is created and the new FAT information is recorded again by nullifying old FAT information. Similarly, when print information about image data recorded in write-once storage medium 4 is changed, it is necessary to create a new DPOF file and record the new DPOF file again by nullifying old DPOF file. In this case, every time print information is changed, write-once storage medium 4 is getting a decrease in memory capacity.

A print setting to set a number of prints in digital camera 31 will be explained hereinafter.

Figure 44:
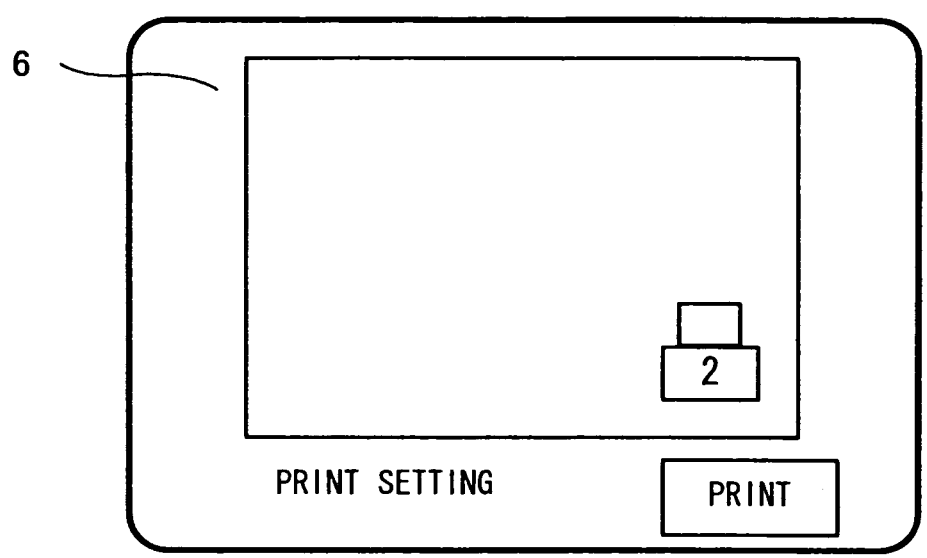
FIG. 44 is a view showing a display example of a print setting menu on a LCD display panel.

In digital camera 31, print copies become settable by selecting a print setting menu enables to set a number of print copies. FIG. 44 shows a display example of the print setting menu on LCD display panel 6. In the print setting menu, image data recorded in write-once storage medium 4 is reproduced and at the same time, a present print setting is displayed too. An example shown in FIG. 44 sets a camera so as to print out two copies of the reproduction image data. When this print setting menu is set, a user can select image data for the print setting and set the number of print copies against the selected image data via an operation of operation unit 7.

But, if the DOPF file recorded in write-once storage medium 4 is renewed ever time the print setting of each image data is changed, memory capacity will get decreased.

Therefore, in digital camera 31, setting change information about the print setting of each image data is kept stored in buffer memory 311 and when the print setting menu is released, a DPOF file is created from the setting change information and the DOPF file is recorded.

FIG. 45 is the flow chart showing a processing procedure of a print setting control to be executed in control/processor 301. This processing will start when the print setting menu is selected via an operation of operation unit 7.

In step S2501, it is to judge if an inserted memory card is write-once storage medium 4 and if write-once storage medium 4 is inserted, the flow proceeds to step S2502. In step S2502, it is to judge if the print setting is changed and if the print setting is changed, setting change information is stored in buffer memory 311. Then, the flow proceeds to step S2504. In step S2502, when it is judged that the setting is not changed, the flow proceeds to step S2504.

In step S2504, it is to judge if the print setting menu is released and if the print setting menu is released, the flow proceeds to step S2505 and if the print setting menu is still on, the flow gets back to step S2502.

In step S2505, it is to judge if the print setting change information is stored in buffer memory 311 and if the print setting change information is stored, the flow proceeds to step S2506 and if the print setting change information is not stored, the flow is ended. In step S2506, the DOPF file is created again in accordance with the print setting change information. In step S2507, the created DOPF file is recorded in write-once storage medium 4 by nullifying the old DOPF file.

When an inserted memory card is overwritable storage medium 3, not write-once storage medium 4, the flow proceeds to step S2508. In step S2508, the DOPF file in the memory card is renewed in accordance with the setting change information and the flow proceeds to step S2510. In step S2508, when it is judged that the print setting is not changed, the flow proceeds to step S2510.

In step S2510, it is to judge if the print setting menu is released and if the print setting menu is released, the flow is ended and if the print setting menu is still on, the flow gets back to step S2508.

Like this, when the inserted memory card is write-once storage medium 4, renewal processing of the DPOF file is not performed in response to each setting change and instead when the print setting menu is released, the DPOF file is configured to be renewed collectively so that the memory capacity is not decreased wastefully.

According to this embodiment, setting change information about each changed print setting is controlled to be stored in buffer memory 311 and when the print setting menu is released, a DPOF file is controlled to be created based upon information stored in buffer memory 311 and the created DPOF file is controlled to be recorded in write-once storage medium 4. But, buffer memory 311 may read in a DPOF file and the DPOF file in buffer memory 311 may be renewed at every time of a setting change and then the DPOF file stored in buffer memory 311 may be recorded in write-once storage medium 4 when the print setting menu is released.

Figure 46:
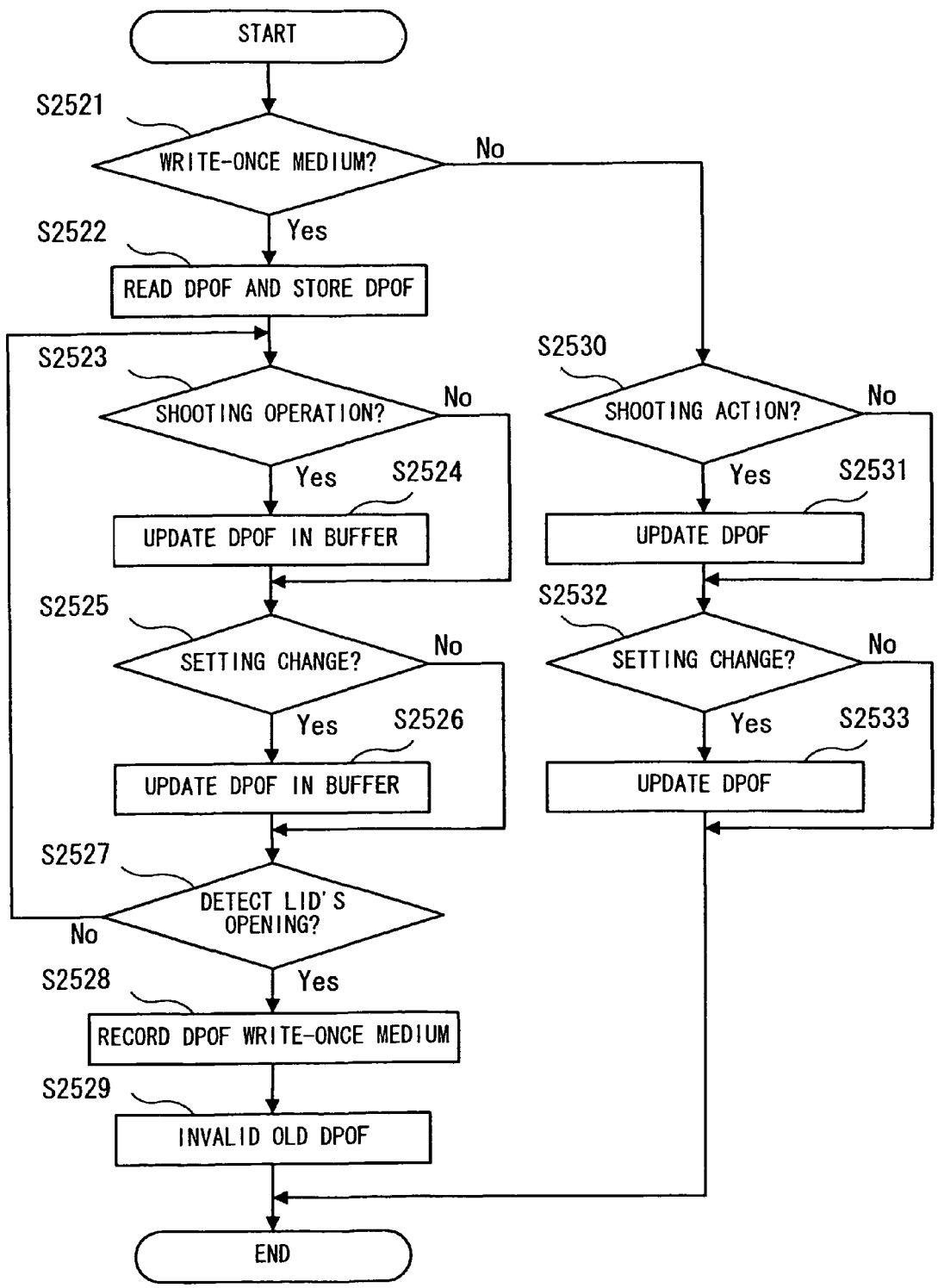
FIG. 46 is a flow chart showing setting change control processing to be executed in the third embodiment.

(Digital Camera Setting Change Control: FIG. 46)

Work when a setting change control is performed in digital camera 31 will be described hereinafter. In the foregoing DPOF file, a setting to transfer image data can be described therein. For example, a transfer setting can be set per each image data so that image data is automatically transferred to a given memory of PC when a memory card is connected to the PC etc. Further, with digital camera 31, when image data is recorded in a memory card, a transfer setting description of the DPOF file can be automatically overwritten. Thus, this eliminates the necessity of a transfer setting with respect to each image data afterward.

But, in the event that write-once storage medium 4 is inserted into card slot 2, if the transfer setting description of the DPOF file is overwritten at each shooting, an old DPOF file continues to increase at each shot. This will use memory capacity wastefully.

Therefore, in digital camera 31, the DPOF file is not recorded at each shot and is so controlled as to be collectively recorded via a given operation. In addition to the automatic renewed transfer setting by a shooting operation, all changes of the DPOF file inclusive of the foregoing print setting etc are so controlled as to be processed collectively.

FIG. 46 is the flow chart showing a processing procedure of a setting change control to be executed in control/processor 301. This process repeats itself at any time as long as a power of digital camera 31 is on. And a power is turned on when a cover of card slot 2 is opened even without the power of digital camera 31 and the DPOF file in buffer memory 311 is recorded in write-once storage medium 4.

In step S2521, it is to judge if an inserted memory card is write-once storage medium 4 and if write-once storage medium 4 is inserted, the flow proceeds to step S2522. In step S2522, the DPOF file recorded in write-once storage medium 4 is read out and stored in buffer memory 311. In step S2523, it is to judge if a shooting operation is executed with the shutter release button depressed and if the shooting operation is executed, the flow proceeds to step S2524. In step S2524, it is to update a DPOF file stored in buffer memory 311 with a renewed DPOF file describing a transfer setting of image data taken by this shooting. Then, the flow proceeds to step S2525. When the shooting operation is not detected in step S2523, the flow proceeds to step S2525.

In step S2525, it is to judge if a setting such as a print setting or so is changed and if the setting is changed, the flow proceeds to step S2526. In step S2526, it is to update the DPOF file stored in buffer memory 311 with a renewed DPOF file describing a changed setting. Then, the flow proceeds to step S2527. If the setting is changed, the flow proceeds to step S2527.

In step S2527, it is to detect if a lid covering card slot 2 is opened and if the lid is opened, the flow proceeds to step S2528 and if the lid opening is not detected, the flow gets back to step S2523. In step S2528, it is to record the DOPF file stored in buffer memory 311 in write-once storage medium 4. In step S2529, the old DOPF file is nullified.

In step S2521, when the inserted memory card is overwritable storage medium 3, not write-once storage medium 4, the flow proceeds to step S2530. In step S2530, it is to judge if a shooting operation is executed and if the shooting operation is executed, the flow proceeds to step S2531. In step S2531, it is to update a DPOF file stored in buffer memory 311 with a renewed DPOF file describing a transfer setting of image data taken by this shooting. Then, the flow proceeds to step S2532. In step S2530, if the shooting operation is not executed, it proceeds to step S2532.

In step S2532, it is to judge if a setting such as a print setting etc is changed and if the setting is changed, the flow proceeds to step S2533 and if the setting is not changed, the flow is ended. In step S2533, it is to update a DPOF file stored in buffer memory 311 with a renewed DPOF file describing a changed setting.

Like this, through detection of opening the lid covering a memory card, the DPOF file is so controlled as to be recorded in write-once storage medium 4. But, the DPOF file may be controlled to be recorded in write-once storage medium 4 by detecting a power switch-OFF, not through detection of opening the lid. Also, by detecting a connection to an external device such as PC etc, a DPOF file may be controlled to be recorded in write-once storage medium 4. Namely, It is preferable that a DPOF file is recorded in write-once storage medium 4 before image data stored in a memory card is read out outside. And by providing a dedicated or a common button for recording the DPOF file in write-once storage medium 4, the DPOF file may be recorded in write-once storage medium 4 via an operation of this button.

And, an explanation about the print setting and the transfer setting in the DPOF file has been explained so far, but the same control can be applied to other setting in the DPOF file or management data of other image rather than the DPOF file.

Figure 47:
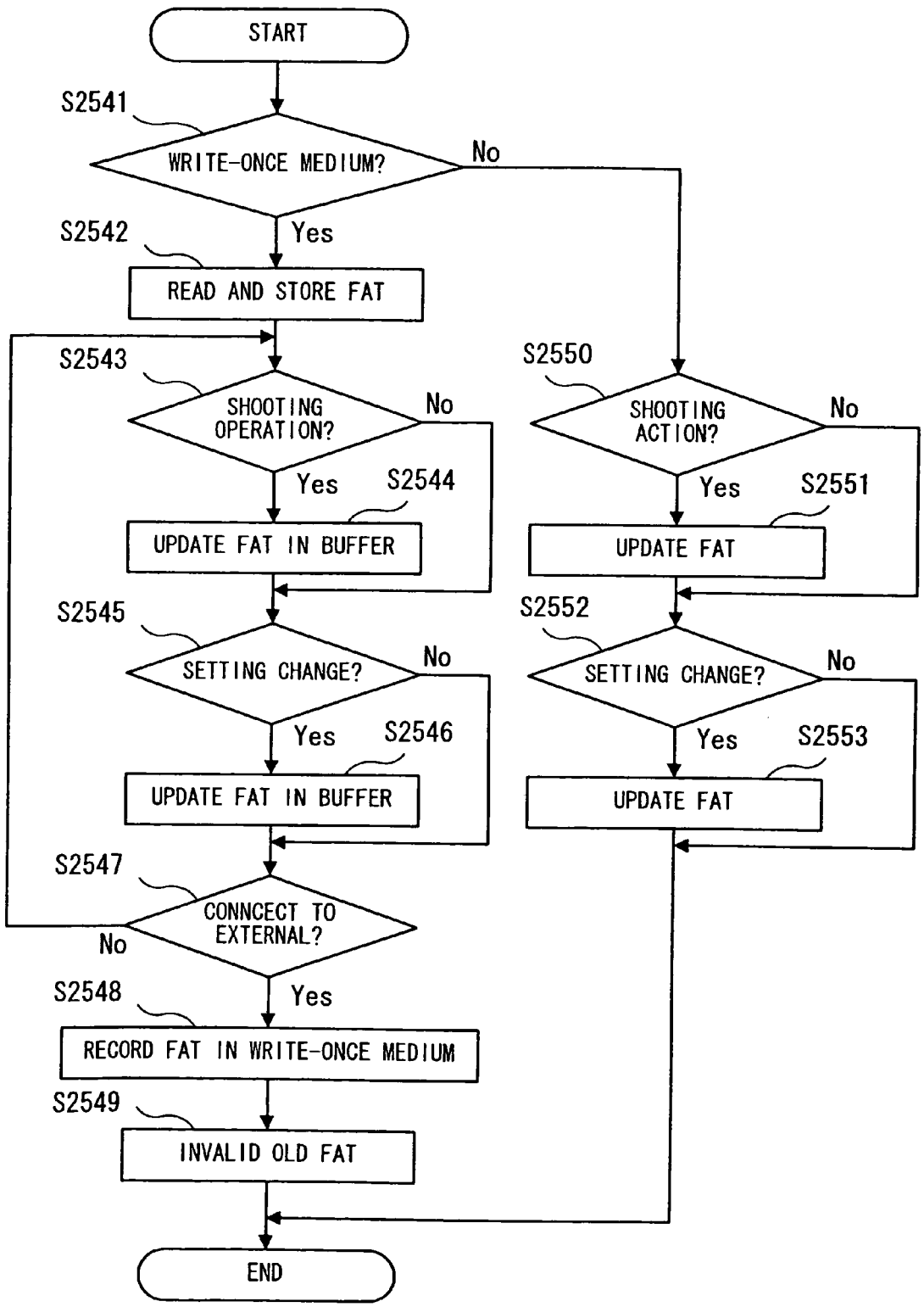
FIG. 47 is a flow chart showing setting change control processing to be executed in the third embodiment.

(Setting Change Control of Digital Camera 31: FIG. 47)

Work in a case where FAT information stored in buffer memory 311 is recorded in write-once storage medium 4 when digital camera 31 is connected to an external device will be described hereinafter.

FIG. 47 is the flow chart showing a processing procedure of a setting change control to be executed in control/processor 301. This processing repeats itself as long as the power of digital camera 31 is on. But, even if the power thereof is not turned on, the power thereof is supplied when digital camera 31 is connected to the external device and the FAT information stored in buffer memory 311 is recorded in write-once storage medium 4.

In step S2541, it is to judge if an inserted memory card is write-once storage medium 4 and if write-once storage medium 4 is inserted, the flow proceeds to step S2542. In step S2542, it is read out the FAT information recorded in write-once storage medium 4 and store the read FAT information in buffer memory 311. In step S2543, it is to judge if a shooting operation is executed with the shutter release button of operation unit 7 and if the shooting operation is executed, the flow proceeds to step S2544. In step S2544, it is to update the FAT information stored in buffer memory 311 with renewed FAT information adding file management information of image data taken by this shooting. Then, the flow proceeds to step S2545. In step S2543, when the shooting operation is not executed, the flow proceeds to step S2545.

In step S2545, it is to judge if a setting of digital camera 31 such as a delete setting is changed and if the setting is changed, the flow proceeds to step S2546. In step S2546, it is to update the FAT information stored in buffer memory 311 with renewed FAT information describing a changed setting. In step S2545, if the setting is not changed, the flow proceeds to step S2547.

In step S2547, it is to detect if a communication cable etc is connected to DIGITAL INPUT/OUTPUT TERMINAL 12 and digital camera 31 is connected to an external device like PC or so and if digital camera 31 is connected externally, the flow proceeds to step S2548 and if digital camera 31 is not connected externally, the flow gets back to step S2543. In step S2548, it is to record FAT information stored in buffer memory 311 in write-once storage medium 4. In step S2549, old FAT information is nullified.

In step S2541, when an inserted memory card is overwritable storage medium 3, not write-once storage medium 4, the flow proceeds to step S2550. In step S2550, it is to judge if a shooting operation is executed and if the shooting operation is executed, the flow proceeds to step S2551. In step S2551, it is to update FAT information stored in buffer memory 311 with renewed FAT information adding file management control information of image data taken by this shooting. Then, the flow proceeds to step S2552. In step S2550, if the shooting operation is not executed, the flow proceeds to step S2552.

In step S2552, it is to judge if a setting such as a delete setting is changed and if the setting is changed, the flow proceeds to step S2553 and if setting is not changed, the flow is ended. In step S2553, FAT information stored in buffer memory 311 is updated with renewed FAT information corresponding to a changed setting.

Like this, when write-once storage medium 4 is inserted, the DPOF file and the FAT information are controlled to be collectively recorded in write-once storage medium 4. But, regardless of a kind of a memory card, the DPOF file and the FAT information may be collectively recorded.

And as explained in the delete operation of image data in FIG. 34, when memory capacity is getting smaller, there is a case where the DPOF file and the FAT information cannot be recorded. In this case, via a message displayed on LCD display panel 6, a user is notified that the setting cannot be changed.

Figure 48:
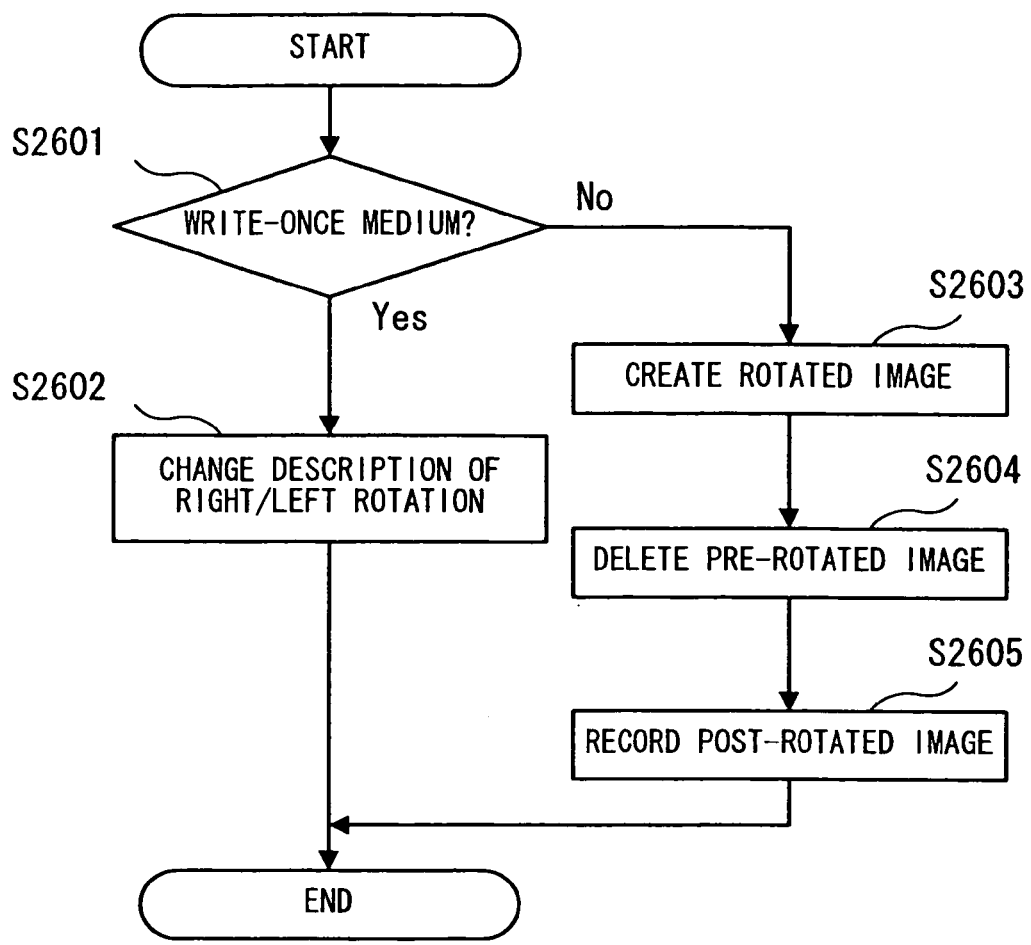
FIG. 48 is a flowchart showing right/left rotation control processing to be executed in the third embodiment.

(Right/Left Rotation Control of Image Data: FIG. 48)

Work in a case where a right/left rotation control of image data is performed in digital camera 31 will be described hereinafter.

Digital camera 31 herein controls so as to process a right/left rotation control using buffer memory 311, delete pre-right/left rotation control-processed image data recorded in a memory card and then record post-right/left rotation control-processed image data. When write-once storage medium 4 is inserted, as memory capacity does not increase even if the pre-right/left rotation control-processed image data is deleted, there is a case where the post-right/left rotation control-processed image data cannot be recorded in the memory. Therefore, when write-once storage medium 4 is inserted, a DPOF file is processed to change a right/left description instead of actually implementing a right/left rotation control of image data. Processing of a right/left rotation control will be specifically described hereinafter.

FIG. 48 is the flow chart showing a processing procedure of a right/left rotation control to be executed in control/processor 301. This processing will start when the right/left rotation control is executed.

In step S2601, it is to judge if an inserted memory card is write-once storage medium 4 and if write-once storage medium 4 is inserted, the flow proceeds to step S2602. In step S2602, it is to create a DPOF file that changes a description of a right/left rotation and record the file in write-once storage medium 4. At this moment, an old DPOF file is nullified. In step S2601, if the inserted memory card is overwritable storage medium 3, not write-once storage medium 4, the flow proceeds to step S2603. In step S2603, it is to create image data that performs a right/left rotation using buffer memory 311. In step S2604, the pre-rotated image data is deleted from the memory card and, in step S2605, it is record the post-rotated image data in the memory card.

Accordingly, without decreasing memory capacity of write-once storage medium 4, processing of the right/left rotation of image data can be performed. The image data changing a description of a right/left rotation in the DPOF file in step S2602 can be reproduced using software corresponding to the right/left rotation control of the DPOF file.

Figure 49:
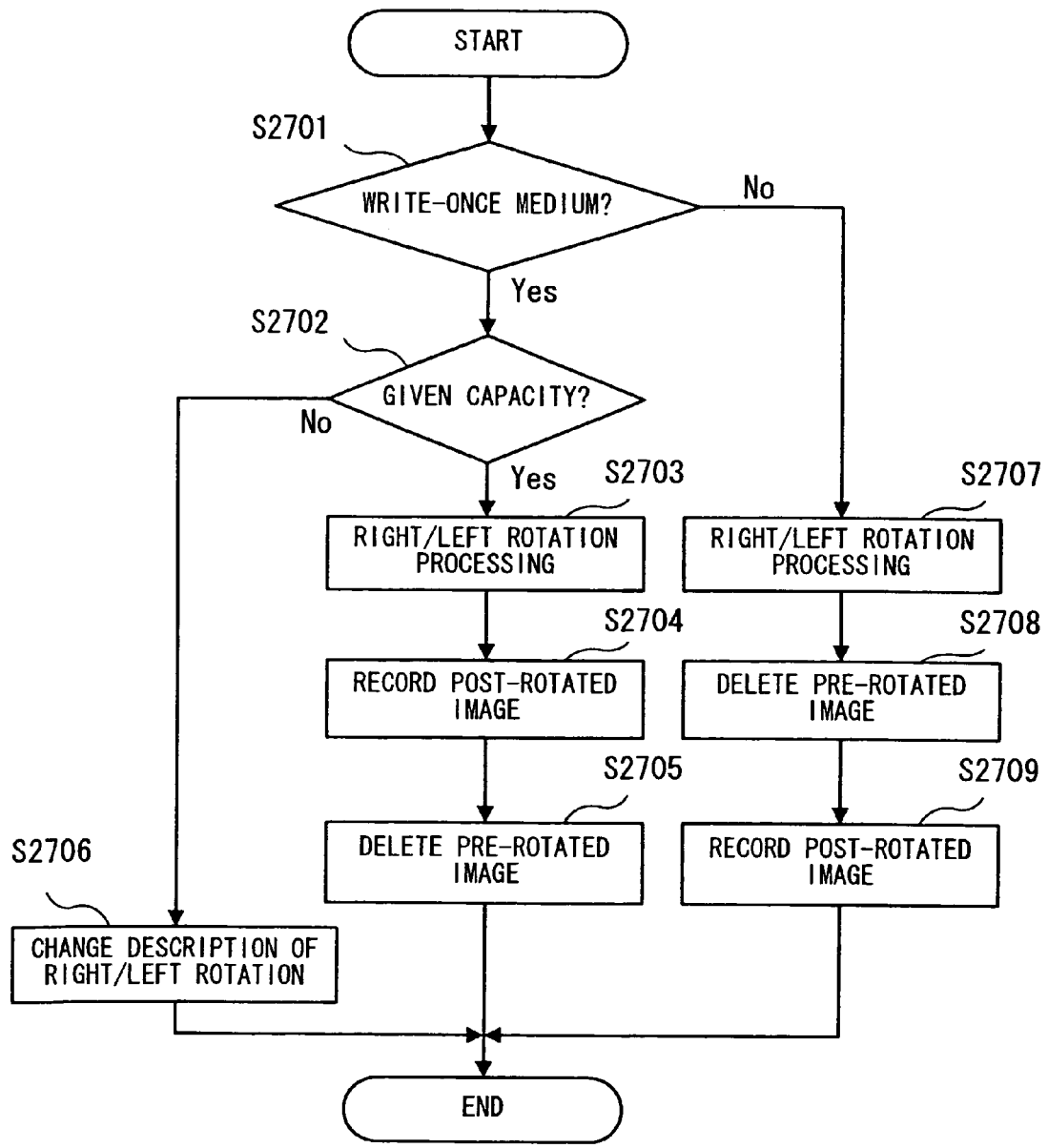
FIG. 49 is a flowchart showing right/left rotation control processing to be executed in the third embodiment.

(Right/Left Rotation of Image Data 2: FIG. 49)

Another example of right/left rotation control processing in digital camera 31 will be described hereinafter. Digital camera 31 controls so as to perform a right/left rotation processing on image data when memory capacity of write-once storage medium 4 is more than given capacity and, when the memory capacity is not more than the given capacity, digital camera 31 controls so as to change a right/left rotation description in the DPOF file, not to perform the right/left rotation processing.

FIG. 49 is the flow chart showing a processing procedure of a right/left rotation control to be executed in control/processor 301. This flow will start when an operation of a right/left rotation is executed via operation unit 7.

In step S2701, it is to judge if an inserted memory card is write-once storage medium 4 and if write-once storage medium 4 is inserted, the flow proceeds to step S2702. In step S2702, it is to judge if memory capacity of write-once storage medium 4 is equal to and more than that of image data of which the right/left rotation will be performed and when the memory capacity thereof is equal to and more than that of the image data, the flow proceeds to step S2703 and when the memory capacity thereof is not equal to and more than that of the image data, the flow proceeds to step S2706. In step S2703, the right/left rotation is processed using buffer memory 311. In step S2704, it is record the post-rotated image data in write-once storage medium 4. In step S2705, it is to delete the pre-rotated image data recorded in write-once storage medium 4.

In step S2702, when the memory capacity thereof is less than that of the image data, the flow proceeds to step S2706. In step S2706, as there is no memory capacity to record the post-rotated image data, it is to create a DPOF file that changes a description of a right/left rotation is created and record the created file in write-once storage medium 4. At this moment, an old DPOF file is nullified.

In step S2701, when it is judged if the inserted memory card is overwritable storage medium 3, not write-once storage medium 4, the flow proceeds to step S2707. In step S2707, it is to create image data processed with the right/left rotation using buffer memory 311. In step S2708, it is to delete the pre-rotated image data. In step S2709, it is to record the post-rotated image data in the memory card.

In this way, if memory capacity of write-once storage medium 4 is small, the description of the right/left rotation of the DPOF file is changed, not processing the right/left rotation. Accordingly, even if the memory capacity thereof is small, the image data processed with the right/left rotation can be accurately reproduced using software corresponding to the description of the right/left rotation of the DPOF file.

Figure 50:
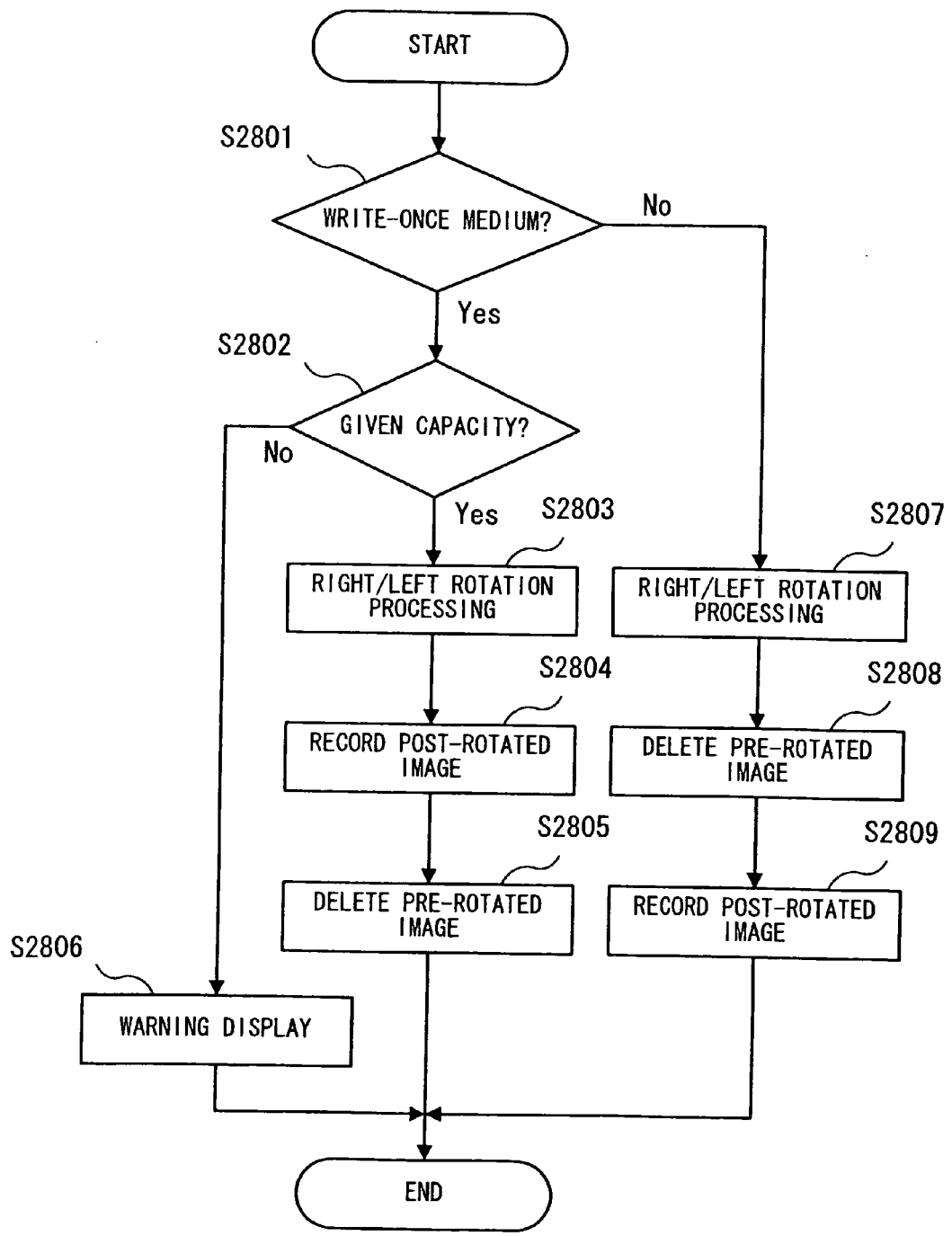
FIG. 50 is a flow chart showing right/left rotation control processing to be executed in the third embodiment.

(Right/Left Rotation Control of Image Data 3: FIG. 50)

Further, another example of the right/left rotation control in digital camera 31 will be described hereinafter.

Herein, digital camera 31 warns a user that, when memory capacity of write-once storage medium 4 is less than given capacity, the right/left rotation is inhibited and the right/left rotation processing cannot be performed.

FIG. 50 is the flow chart showing a processing procedure of a right/left rotation control to be executed in control/processor 301. This processing will start when the right/left rotation operation is executed via operation unit 7.

In step S2801, it is to judge if an inserted memory card is write-once storage medium 4 and if write-once storage medium 4 is inserted, the flow proceeds to step S2802 and if write-once storage medium 4 is not inserted, it proceeds to step S2807. In step S2802, it is to judge if memory capacity of write-once storage medium 4 is equal to and more than that of image data of the right/left rotation to be processed and when the memory capacity thereof is equal to and more than that of the image data, the flow proceeds to step S2803. In step S2803, it is to perform the right/left rotation processing using buffer memory. In step S2804, it is to record the post-rotated image data in write-once storage medium 4 and delete the pre-rotated image data recorded in write-once storage medium 4.

In step S2802, when the memory capacity thereof is less than that of the image data, the flow proceeds to step S2806. In step S2806, as there is no memory capacity to record the post-rotated image data, it is to warn that the right/left rotation cannot be processed. For example, a message that the right/left rotation cannot be processed is displayed on LCD display panel 6.

In step S2801, when the inserted memory card is overwritable storage medium 3, not write-once storage medium 4, the flow proceeds to step S2807. In step S2807, it is to create image data processed with the right/left rotation using buffer memory 311. In step S2808, it is to delete the pre-rotated image data. In step S2809, it is to record the post-rotated image data in the memory card.

In this way, when memory capacity of write-once storage medium 4 gets small, a user can be notified that the right/left rotation processing cannot be performed.

Figure 51:
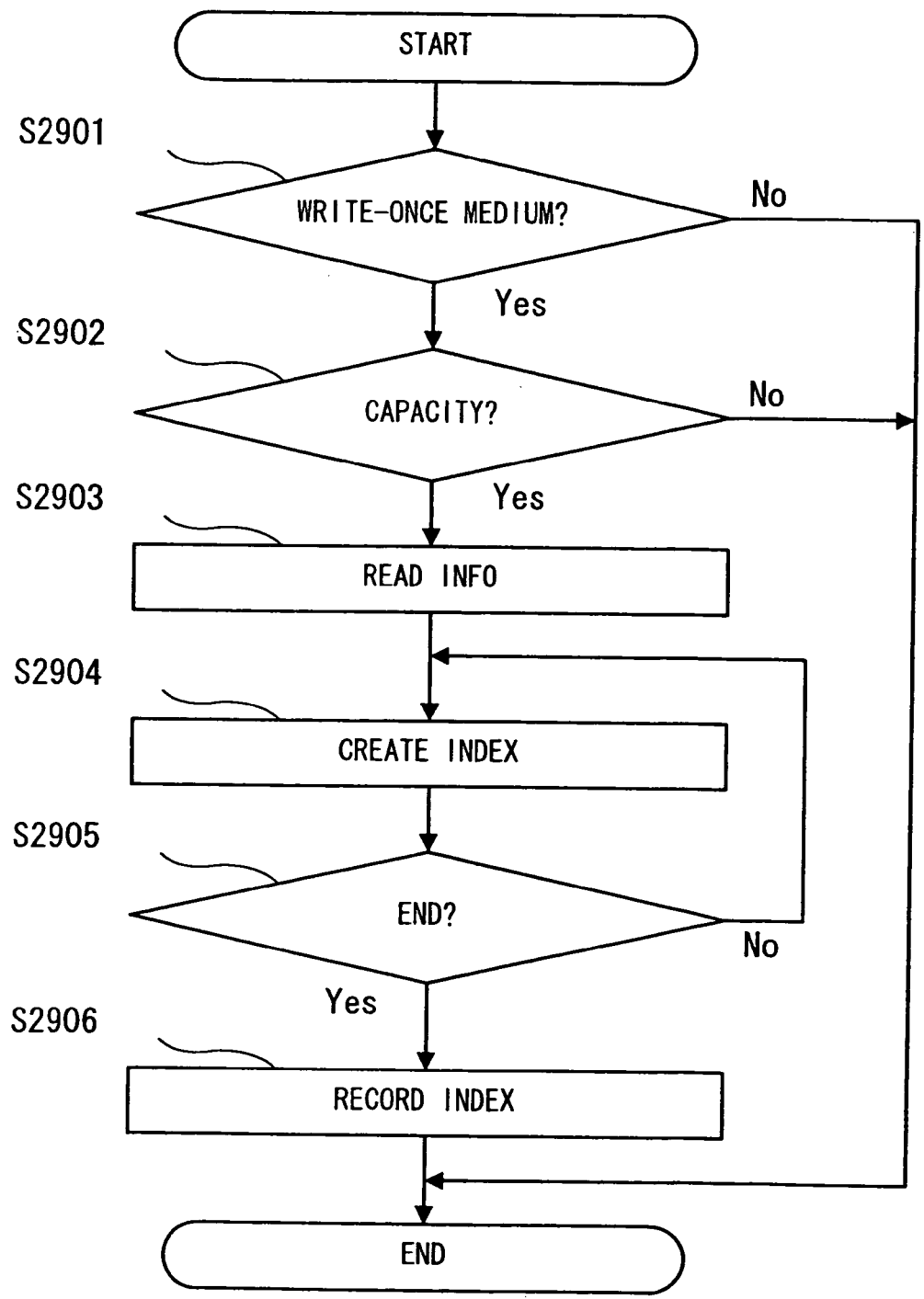
FIG. 51 is a flow chart showing index data creation control processing to be executed in the third embodiment.

(Index Creation Control: FIG. 51)

An explanation about work in a case where an index creation control in digital camera 31 is performed will be given hereinafter.

Digital camera 31 automatically creates index data when memory capacity of write-once storage medium 4 is equal to and less than given capacity and records the index data in write-once storage medium 4. The index data is to make image data information recorded in write-once storage medium 4 readily understood. The index data is created from information about a thumbnail of image data, a shooting date/time etc and is configured so that contents of recorded image data can be viewed. Data format of the index data is created in, for example, HTML format or format equivalent to HTML, so that the index data is so created as to be capable of being viewed with browsing software available on the market.

Like this, by recording index data on write-once storage medium 4, contents of the memory card can be confirmed readily even when there are several write-once storage media 4.

Digital camera 31 automatically starts creating index data when the memory capacity of write-once storage medium 4 becomes equal to and less than the given capacity thereof and records the created index data in write-once storage medium 4.

FIG. 51 is the flow chart showing a processing procedure of an index data creation control to be executed in control/processor 301. This processing repeats itself as long as the power of digital camera 31 is on.

In step S2901, it is to judge if an inserted memory card is write-once storage medium 4 and if write-once storage medium 4 is inserted, the flow proceeds to step S2902 and if write-once storage medium 4 is not inserted, the flow is ended.

In step S2902, the memory capacity of write-once storage medium 4 is detected and it is to judge if the memory capacity thereof is equal to and less than given capacity. When the memory capacity thereof is equal to and less than the given capacity, the flow proceeds to step S2903 and when the memory capacity thereof is not equal to and less than given capacity, the flow is ended.

In step S2903, it is read in a thumbnail of image data recorded in write-once storage medium 4 and related information. In step S2904, the index data is created based upon information read in step S2903. In step S2905, it is to judge if the index data creation is over and if the index data creation is over, the flow proceeds to step S2906 and if the index data creation is not over, the flow gets back to step S2904 to continue the creation of the index data.

In step S2906, the created index data is recorded in write-once storage medium 4.

Herein, the index data is so controlled as to be created depending upon capacity of write-once storage medium 4. However, a button to instruct the index data creation may be provided so that an operation of the button can create the index data.

Also, although the index data is controlled to be automatically created in the control of FIG. 51, a user may be inquired about the index data creation.

Figure 52:
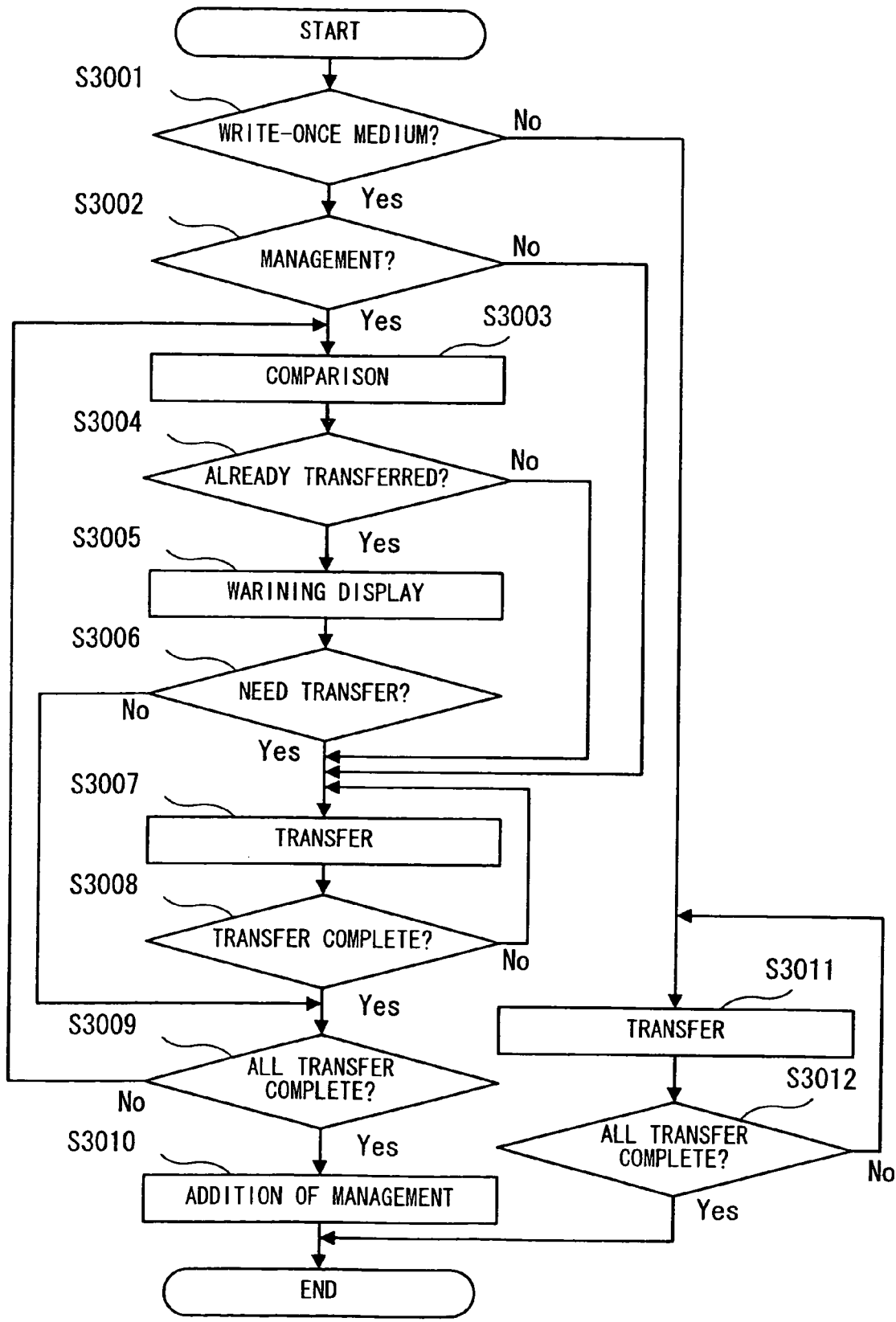
FIG. 52 is a flow chart showing transfer management control processing to be executed in the third embodiment.

(Transfer Management Control: FIG. 52)

Work at a time of a transfer management control in digital camera 31 will be described hereinafter.

Generally, a overwritable memory card used in a digital camera is used again in the digital camera after image data is transferred to an image storage unit like PC etc and the transferred image data is deleted. Although write-once storage medium 4 cannot be used again deleting image data, it is conceivable that image data is transferred to the image storage unit.

As described in the above, in the event that the overwritable memory card is in use, the transferred image data is deleted after image data is transferred to the image storage unit. Or as the transferred image data is set to be automatically deleted, there is small possibility that the once transferred image data will be transferred again. But, in write-once storage medium 4, as image data is not deleted after it is transferred, a user might forget that a recorded image data was already transferred after the image was transferred. In this case, there are cases where a once transferred image data is transferred again and gain and a user feels annoying to confirm many times if image data was transferred.

Therefore, digital camera 31 creates and records management data to manage an image data transfer when an inserted memory card is write-once storage medium 4. In the management data, there is described transfer information about a presence or an absence of a transfer, transfer date/time information and receiver information etc per each recorded image data. The transfer management data may be managed as independent management data or be recorded on an Exif maker note or so. Image data of a memory card is outputted via DIGITAL INPUT/OUTPUT TERMINAL 12 of digital camera 31 and the image data is transferred to an image storage unit. DIGITAL INPUT/OUTPUT TERMINAL 12 and the image storage unit is electrically connected to each other via a cable or so. An explanation about a transfer management control will be specifically given hereinafter.

FIG. 52 is the flow chart showing a processing procedure of a transfer management control to be executed in control/processor 301. This processing will start when a transfer of image data is started via a DIGITAL INPUT/OUTPUT TERMINAL.

In step S3001, it is to judge if an inserted memory card is write-once storage medium 4 and if write-once storage medium 4 is inserted, the flow proceeds to step S3002. In step S3002, it is to detect if management data is recorded in write-once storage medium 4. When the management data is recorded, the flow proceeds to step S3003.

In step S3003, image data instructed to be transferred is compared with management data in order to check that the image data instructed to be transferred was already transferred. In step S3004, it is to judge from a comparison result if the image data instructed to be transferred was transferred and if the image data was transferred, the flow proceeds to step S3005. In step S3005, a message that the image data instructed to be transferred was already transferred and its previous transfer receiver are displayed on LCD display panel. And further a message inquiring if a transfer of the image data is needed is displayed thereon.

In step S3006, it is to judge if an operation to transfer the image data is executed and if the operation is executed and is needed, the flow proceeds to step S3007.

In step S3002, when it is judged that the management data is not recorded in write-once storage medium 4, the flow proceeds to step S3007. In step S3004, when it is judged that the image data is not yet transferred, the flow proceeds to step S3007.

In step S3007, the image data instructed to be transferred is transferred to an image storage unit. In step S3008, it is to judge if a transfer of the image data is complete and if the transfer of the image data is complete, the flow proceeds to step S3009 and if the transfer of the image data is not complete, the flow gets back to step S3007, wherein it is to keep on transferring the image data. In step S3006, when an operation not to transfer the image data is executed and the transfer of the image data is not needed, the flow proceeds to step S3009.

In step S3009, it is to check if all transfers of all image data instructed to be transferred are complete and if the transfers are complete, the flow proceeds to step S3010 and if the transfers are not complete, the flow gets back to step S3003 to perform processing on image data to be transferred next time. In step S3010, it is to create transfer management data describing transfer information about this transferred image data and to record the created transfer management data in write-once storage medium 4.

In step S3001, when an inserted memory card is not write-once storage medium 4, the flow proceeds to step S3011. In step S3011, the image data instructed to be transferred is transferred to the image storage unit. In step S3012, it is to check if all transfers of all image data instructed to be transferred are complete and if the transfers are complete, the flow is ended and if the transfers are not complete, the flow gets back to step S3011 to keep on the transfer.

As described in the above, when the image data is already transferred, the inquiry is displayed to get a confirmation from a user so that the same image data can be prevented from being transferred many times.

Fourth Embodiment

A digital camera system in accordance with a fourth embodiment of this invention will be described hereinafter. A configuration of the digital camera of the fourth embodiment is the same as in the third embodiment shown in FIG. 20.

As write-once storage medium 4 is not rewritable once overwritten, a user using digital camera 31 loaded with write-once storage medium 4 can tend to be careful in shooting. Due to this carefulness, the user can miss a shooting chance, which erodes a merit of a digital camera enabling to shoot anytime anywhere at ease.

Therefore, the fourth embodiment, even when write-once storage medium 4 is inserted, enables to realize a shooting at ease. An explanation about a variety of controls in digital camera 31 will be given hereinafter.

Digital camera 31 in accordance with the fourth embodiment stores image data in buffer memory 311 until the image is instructed to be recorded in write-once storage medium 4 or be deleted without being recorded in write-once storage medium 4. In digital camera 31, an area within buffer memory 311 is divided into two parts. One area is used for image processing etc as a working area to function as a normal buffer memory and the other is for use as a temporary storage area to temporarily store the image data after image-processed.

When a shooting operation is executed, pre-processed image data and image data in process are stored by using a working area of buffer memory 311. The finished image data through image-processing etc is also stored in the temporary storage area. At this time, the image data stored in the temporary storage area is being created in Exif format which enables the image data to be recorded in write-once storage medium 4 as it is.

With the image data created in the Exif format, when the image data is recorded in write-once storage medium 4, the image data stored in buffer memory 311 is simply copied. Thus, a file creation date/time and a serial number attached to somewhere in a file name are those at a time of storing the image data. Accordingly, even if a sequence order to transfer the image data from buffer memory 311 to write-once storage medium 4 is different from a shooting sequence order, the file creation date/time and the serial number are assigned in the shooting sequence order so that an operation to re-arrange or reproduce the image data in the shooting order can be easily executed. In the image data stored in buffer memory 311, however, if there is image data that is not recorded in write-once storage medium 4, a missing number will occur in a serial number.

When the image data is stored in buffer memory 311, folder information about a memory card set as a record location to record the image data in the memory card at a shooting is stored too. And when the image data is recorded from buffer memory 311 to write-once storage medium 4, this folder information is used. Accordingly, even when a folder now set as the record location is different from a folder set as the record location at a shooting, the image data can be recorded in the folder set as the record location at the shooting. Therefore, a series of taken image data so as to be recorded in a same folder will never be recorded in a different folder.

A control in digital camera 31 in accordance with the fourth embodiment will be explained hereinafter.

Figure 53:
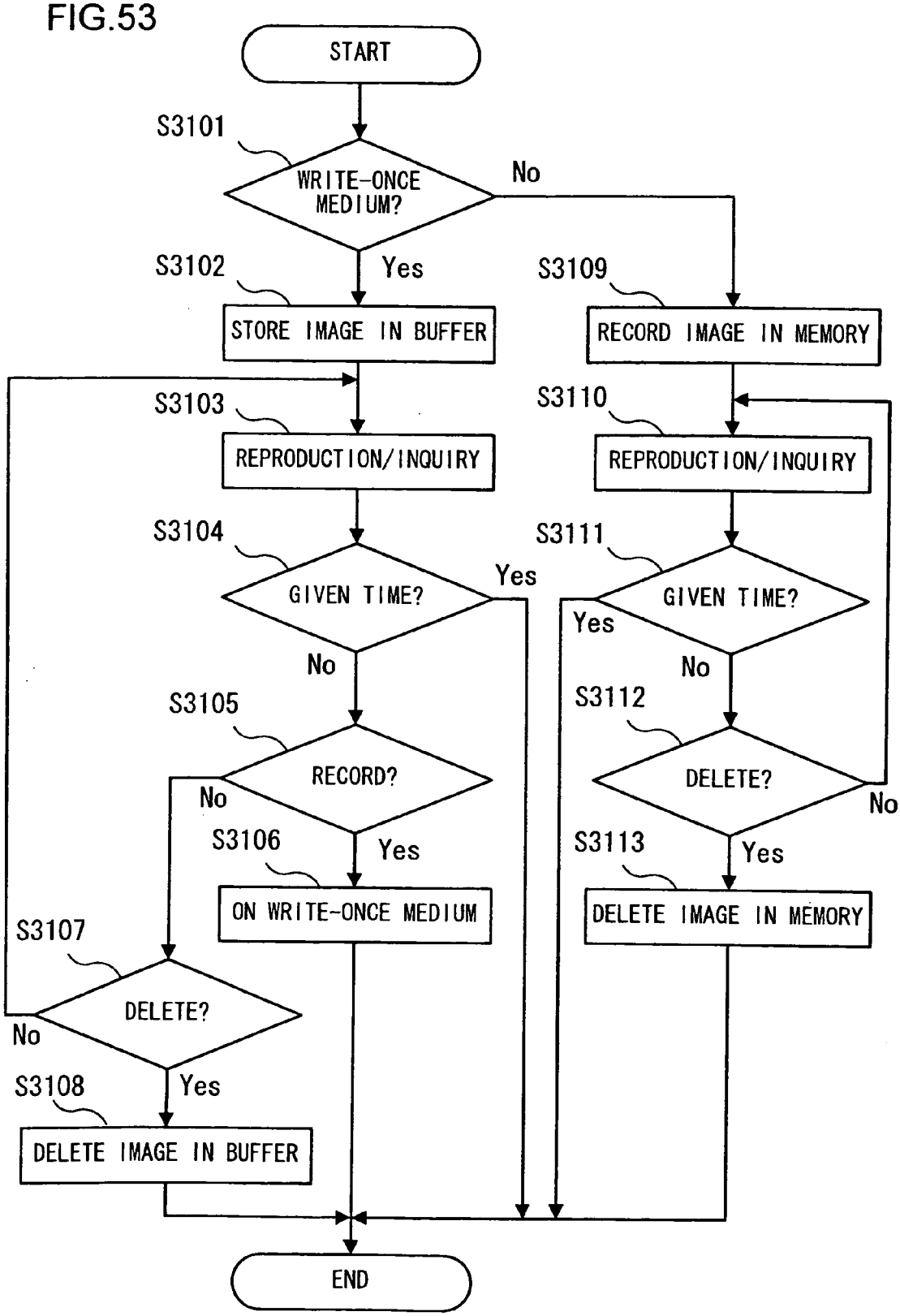
FIG. 53 is a flow chart showing record control processing to be executed in a fourth embodiment.

(Record Control of Image Data: FIG. 53)

FIG. 53 is the flow chart showing a processing procedure of a record control to be executed in control/processor 301. This processing will start when an image taking is complete.

In step S3101, it is to judge if an inserted memory card is write-once storage medium 4 and if write-once storage medium 4 is inserted, the flow proceeds to step S3102 and if write-once storage medium 4 is not inserted, it proceeds to step S3109. In step S3102, image data is created in the Exif format and the created image data is stored in the temporary storage area in buffer memory 311. Folder information about the record location in a memory card is stored in the temporary storage area in buffer memory 311 at the same time.

Figure 54:
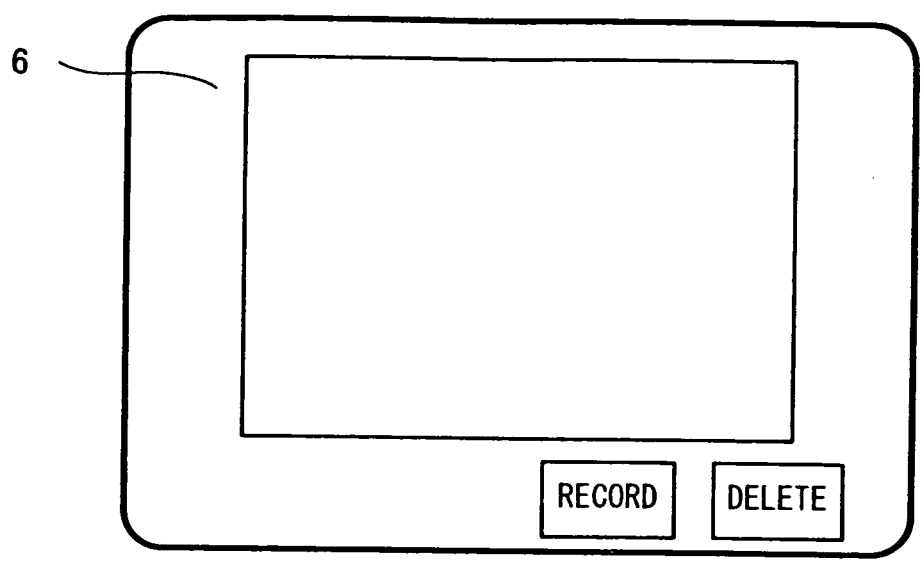
FIG. 54 is a view showing a display example of reproducing an image on a LCD display panel.

In step S3103, the image data is reproduced on LCD display panel 6 and at the same time, a message inquiring if the reproduced image data is recorded or deleted is displayed thereon. FIG. 54 shows a display example on LCD display panel 6. In step S3104, it is to check if a given period of time has elapsed since the image is displayed on LCD display panel 6 and if the given period of time has elapsed, the flow is ended and if the given period of time does not elapse, the flow proceeds to step S3105.

In step S3105, it is to check if an operation is executed to record the image data in reproduction. If the operation is executed, the flow proceeds to step S3106 and if the operation is not executed, the flow proceeds to step S3107.

In step S3106, it is to order this taken image data temporarily stored in buffer memory 311 to be recorded in write-once storage medium 4 and delete the image data in buffer memory 311 that was recorded in write-once storage medium 4.

In step S3107, it is to check if an operation is executed to delete the image data in reproduction and if the delete operation is checked, the flow proceeds to step S3108 and if the delete operation is not checked, the flow gets back to step S3103. In step S3108, it is to delete this taken image data temporarily stored in buffer memory 311.

When it is judged that an inserted memory card is not write-once storage medium 4, the flow proceeds to step S3109. In step S3109, it is to create image data in Exif format and order an image file in Exif to be recorded in the memory card. In step S3110, the image data is reproduced on LCD display panel 6 and at the same time, a message inquiring if the reproduced image data is deleted is displayed thereon. Herein, as the image data was already recorded in the memory card, a user is not inquired if the image data is recorded.

In step S3111, it is to check if the given period of time has elapsed since the reproduced image is displayed on LCD display panel 6 and if the given period of time has elapsed, the flow is ended and if the given period of time has not elapsed, the flow proceeds to step S3112.

In step S3112, it is to check if a delete operation to delete the image data is executed and if the delete operation is executed, the flow proceeds to step S3113 and if the delete operation is not executed, the flow gets back to, step S3110. In step S3113, it is to delete this taken image data stored in the memory card.

As described in the foregoing, by reproducing the taken image and checking if the taken image is recorded in write-once storage medium 4, a user can take a picture at ease forgetting write-once storage medium 4.

Figure 55:
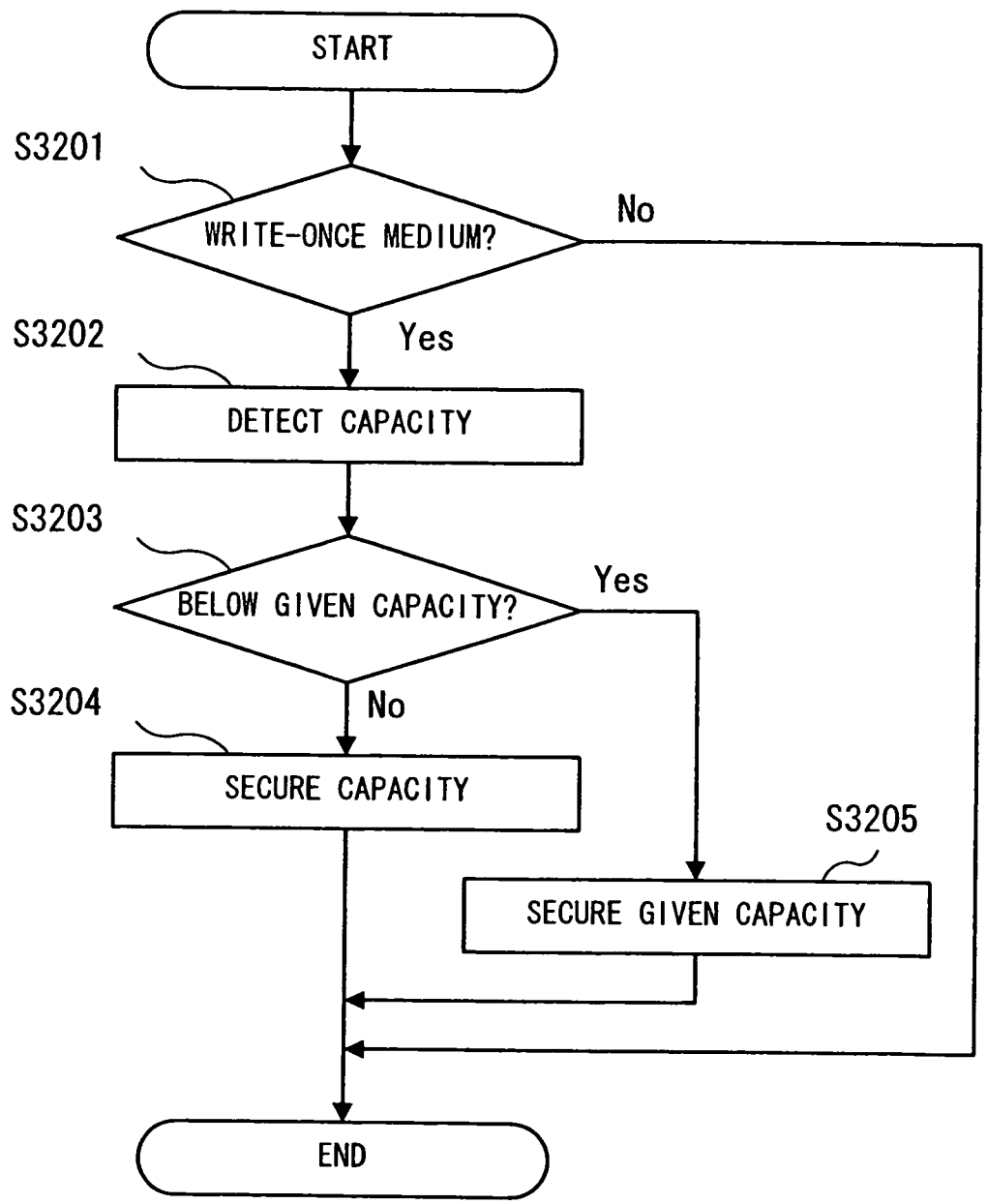
FIG. 55 is a flow chart showing capacity secure control processing to be executed in the fourth embodiment.

(Capacity Secure Control of Buffer Memory: FIG. 55)

There is a limit to a number of image data that can be temporarily stored in buffer memory 311 and buffer memory 311 is volatile. Thus, without losing the image data temporarily stored in buffer memory 311, the image data is needed to be so controlled as to be recorded in write-once storage medium 4 without fail.

Herein, capacity of the temporary storage area in buffer memory 311 is controlled to vary with residual capacity of write-once storage medium 4 in use. Specifically, the temporary storage area of buffer memory 311 is secured as an upper limit of residual capacity of write-once storage medium 4. With this securing, all of image data stored in buffer memory 311 can be recorded in write-once storage medium 4. Thus, there is no situation that taken image data cannot be recorded in write-once storage medium 4.

A capacity secure control in digital camera 31 will be explained hereinafter using FIG. 55.

FIG. 55 is the flow chart showing a processing procedure of a capacity secure control to be executed in control/processor 301. This processing is repeated as long as the mode is set to the shooting mode.

In step S3201, it is to check if an inserted memory card is write-once storage medium 4 and if write-once storage medium 4 is inserted, the flow proceeds to step S3202 and if write-once storage medium 4 is not inserted, the flow is ended.

In step S3202, it is check capacity of write-once storage medium 4. In step S3203, it is to check if the capacity of write-once storage medium 4 is equal to and less than given capacity. When the capacity of write-once storage medium 4 is equal to and less than given capacity, the flow proceeds to step S3204. In step S3204, it is to secure an area of buffer memory 311 with the same residual capacity of write-once storage medium 4 as the temporary storage area for image data.

In step S3203, when the capacity of write-once storage medium 4 is above the given capacity, the flow proceeds to step S3205. In step S3205, it is to secure an area of buffer memory 311 with the given capacity as the image data temporary storage area. Herein, the given capacity is determined after securing trouble-free capacity as the working area of buffer memory 311.

As described in the foregoing, the capacity of the temporal storage area in buffer memory 311 is set so that image data cannot be shot exceeding residual capacity of write-once storage medium 4. Thus, taken image data can be recorded in write-once storage medium 4 without fail.

Figure 56:
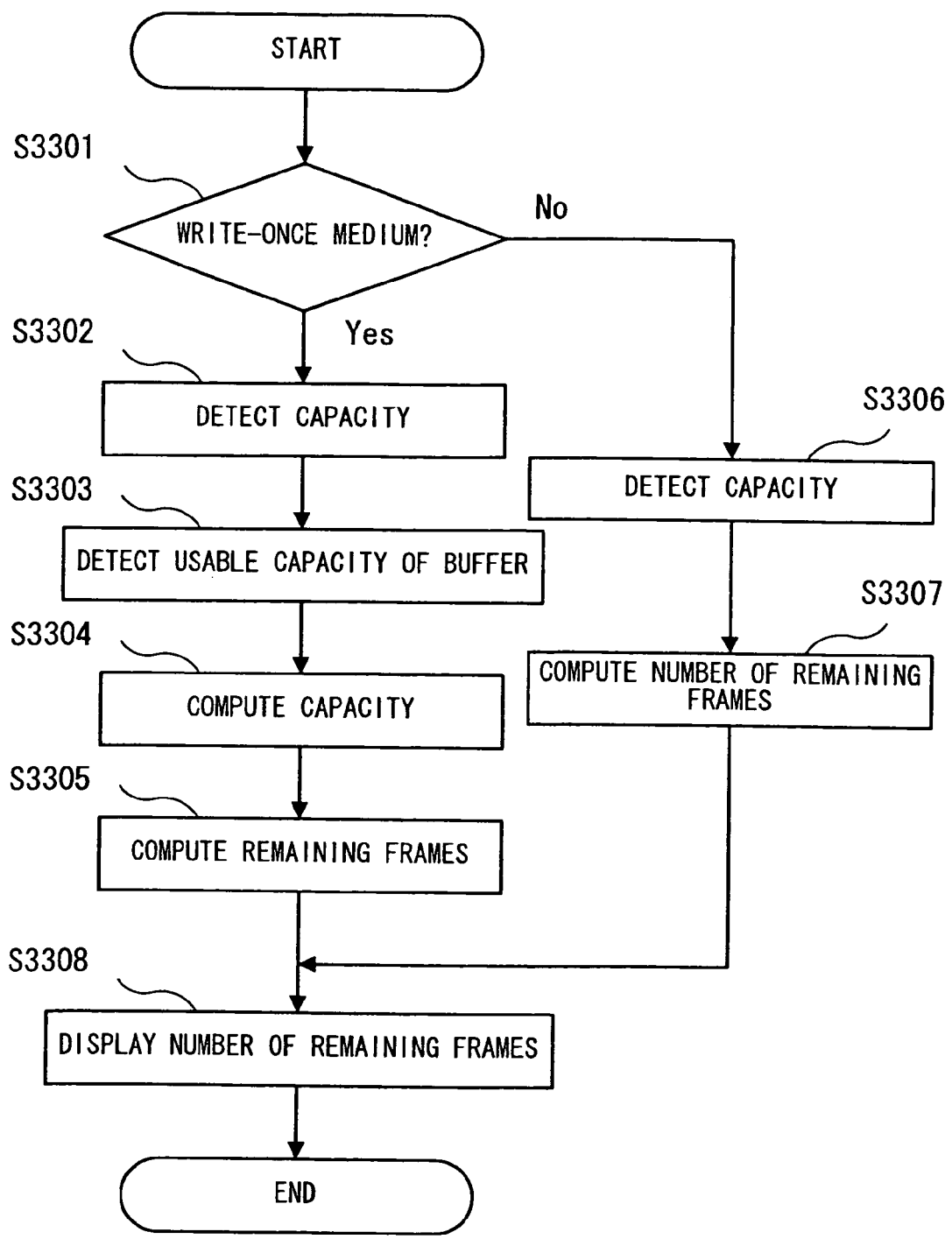
FIG. 56 is a flow chart showing residual capacity display control processing to be executed in the fourth embodiment.

(Residual Capacity Display Control: FIG. 56)

If taken image data is stored in buffer memory 311, the residual capacity of write-once storage medium 4 does not decrease. Thus, if only a detected amount of residual capacity in write-once storage medium 4 is displayed, a picture taking does not get decreased in the displayed residual capacity when buffer memory 311 stores image data. Further, there is a case where a picture cannot be taken even with residual capacity of write-once storage medium 4, so a user get confused.

Therefore, digital camera 31 displays a value subtracting a data amount of the image temporarily stored in buffer memory 311 from residual capacity of write-once storage medium 4 as residual capacity on LCD display panel 6.

FIG. 56 is the flow chart showing a processing procedure of a residual capacity display control to be executed in control/processor 301. This processing is repeated as long as the shooting mode is set.

In step S3301, it is to check if an inserted memory card is write-once storage medium 4 and if write-once storage medium 4 is inserted, the flow proceeds to step S3302 and if write-once storage medium 4 is not inserted, the flow proceeds to step S3306.

In step S3302, capacity of write-once storage medium 4 is detected. In step S3303, it is to detect the data amount of the image temporarily stored in buffer memory 311. In step S3304, it is to make a calculation to subtract the data amount of the image temporarily stored in buffer memory 311 from residual capacity of write-once storage medium 4. In step S3305, it is to calculate a number of remaining frames corresponding to the capacity calculated in step S3304.

In step S3306, it is to detect residual capacity of the memory card. In step S3307, it is to calculate a number of remaining frames corresponding to the residual capacity thereof.

Figure 57:
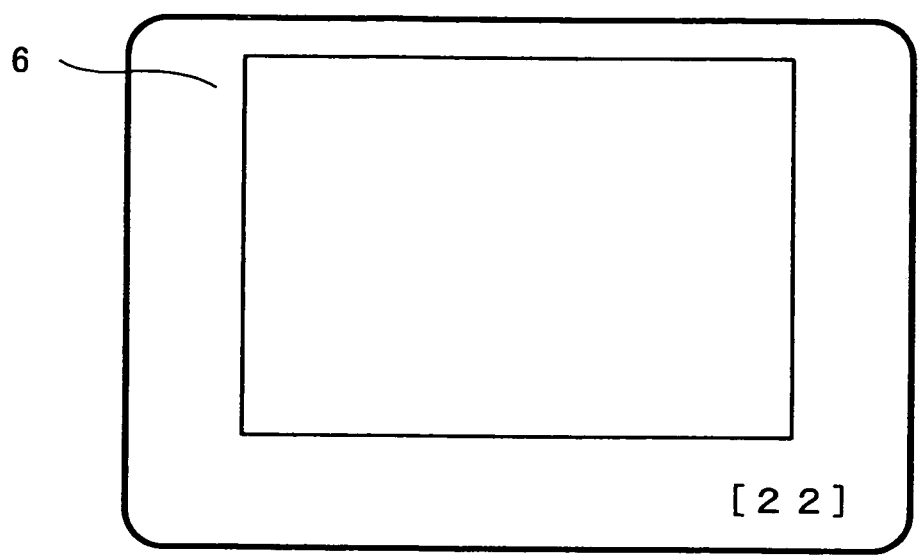
FIG. 57 is a view showing a display example of a number of remaining frames on a LCD display panel.

In step S3308, it is to display the number of remaining frames calculated in step S3305 or S3307 on LCD display panel 6. FIG. 57 shows a display example of the number of remaining frames on LCD display panel 6. FIG. 57 shows that there are 22 frames left.

With this control, residual capacity available for an actual shooting is displayed, so a user can concentrate on a picture taking.

Figure 58:
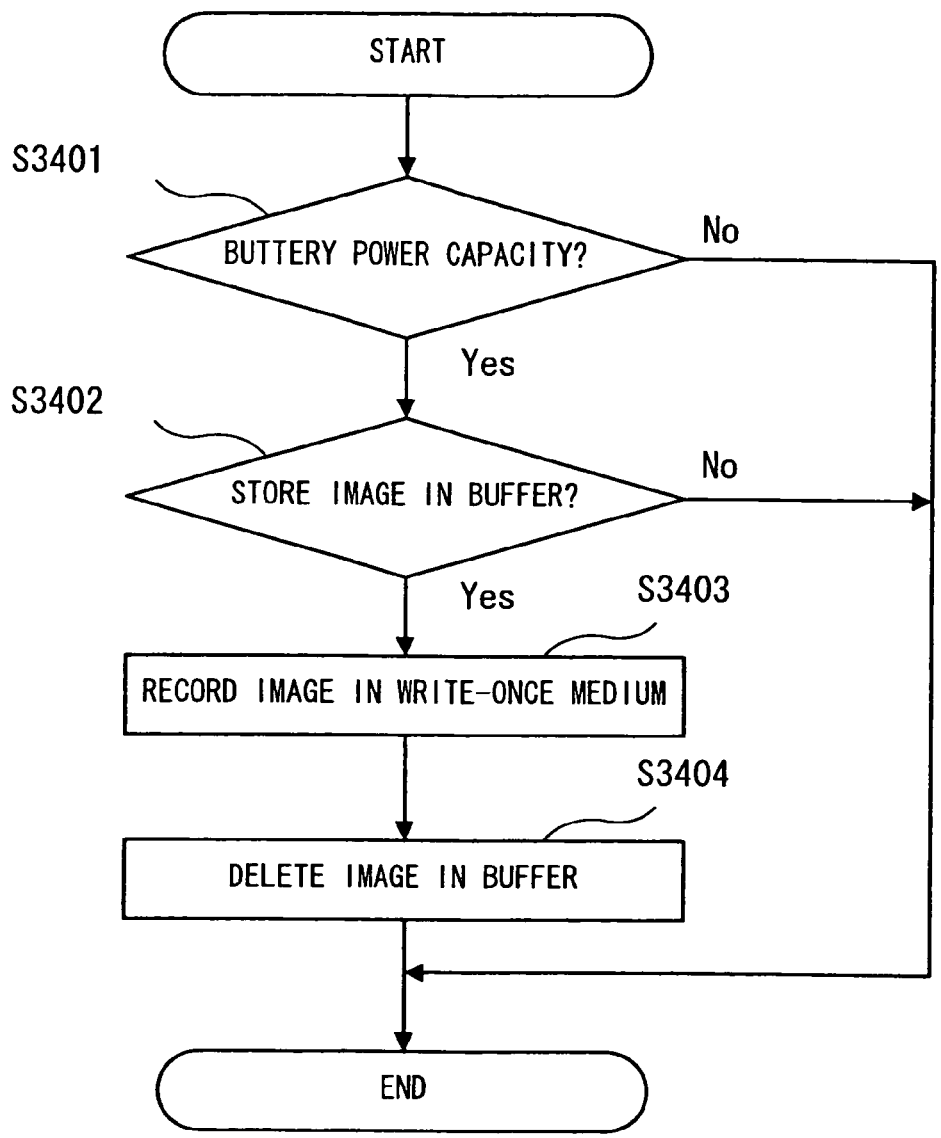
FIG. 58 is a flow chart showing battery related control processing to be executed in the fourth embodiment.

(Battery-Related Control: FIG. 58)

An explanation about a battery related control in digital camera 31 will be given hereinafter.

Buffer memory 311 used in digital camera 31 is a volatile memory, so image data temporarily stored in buffer memory 311 will disappear when the battery becomes dead.

Thus, digital camera 31 controls so as to check residual capacity of a battery driving digital camera 31 and, when it is detected that the battery capacity becomes below a given level, digital camera 31 controls so as to automatically record image data temporarily stored in buffer memory 311 in write-once storage medium 4 so that a disappearance of the image data is avoided.

FIG. 58 is the flow chart showing a processing procedure of a battery related control to be executed in control/processor 301. This flow is repeatedly executed at any time.

In step S3401, it is to detect residual capacity of a battery and when the residual capacity of the battery is below given capacity, the flow proceeds to step S3402 and the flow is ended when the capacity is above the given capacity. In step S3402, it is to check if image data is stored in the temporary storage area in buffer memory 311 and if the image data is stored, the flow proceeds to step S3403 and if the image data is not stored, this flow is ended. In step S3403, it is to automatically record image data stored in buffer memory 311 in write-once storage medium 4. Further, in step S3404, it is to delete the temporarily stored image data from buffer memory 311.

With this control, the image data temporarily stored in buffer memory 311 is recorded on write-once storage medium 4 before the battery becomes exhausted, so a taken image data can be prevented from disappearing.

Figure 59:
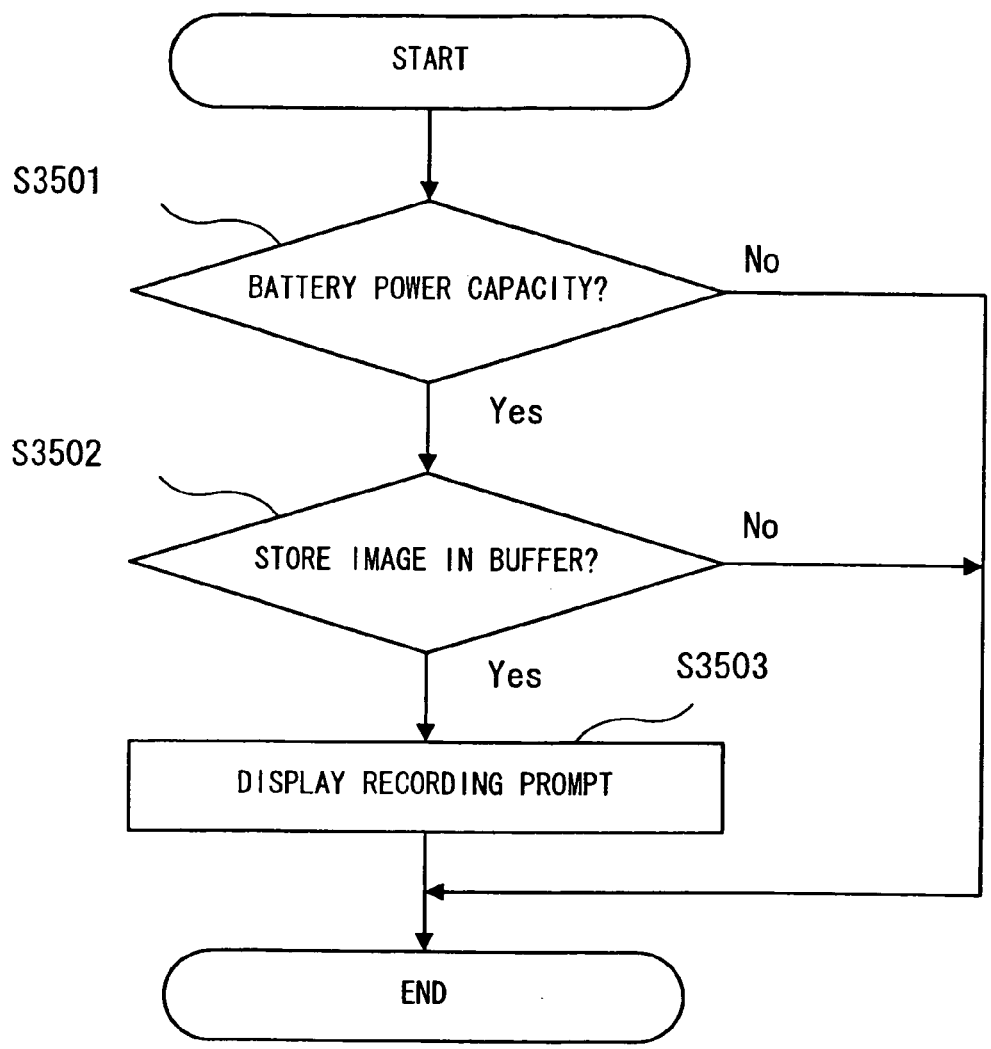
FIG. 59 is a flow chart showing battery-related control processing to be executed in the fourth embodiment.

(Battery-Related Control 2: FIG. 59)

Another example of a battery related control in digital camera 31 will be explained hereinafter.

FIG. 58 shows the control in which the image data temporarily stored in buffer memory 311 is automatically recorded in write-once storage medium 4. But, herein, a user is prompted to transcribe image data temporarily stored in buffer memory 311 to write-once storage medium 4.

FIG. 59 is the flow chart showing a processing procedure of a battery-related control to be executed in control/processor 301. This processing is repeatedly executed at any time.

Figure 60:
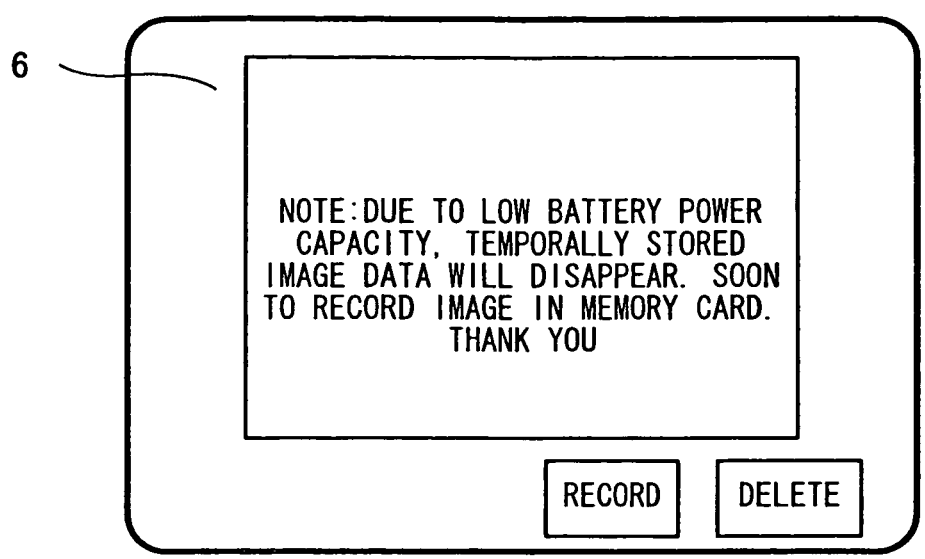
FIG. 60 is a view showing a message display example on a LCD display panel.

In step S3501, it is to detect residual capacity of a battery and when the residual capacity of the battery is below given capacity, the flow proceeds to step S3502 and when the capacity is above the given capacity, the flow is ended. In step S3502, it is to check if image data is stored in the temporary storage area in buffer memory 311 and if the image data is stored, the flow proceeds to step S3503 and if the image data is not stored, this flow is ended. In step S3503, it is to display a message prompting a user to record image data stored in buffer memory 311 in write-once storage medium 4. FIG. 60 shows a message display example.

Like this, with the display of the message depending upon the residual capacity of the battery, a user's attention can be attracted.

Figure 61:
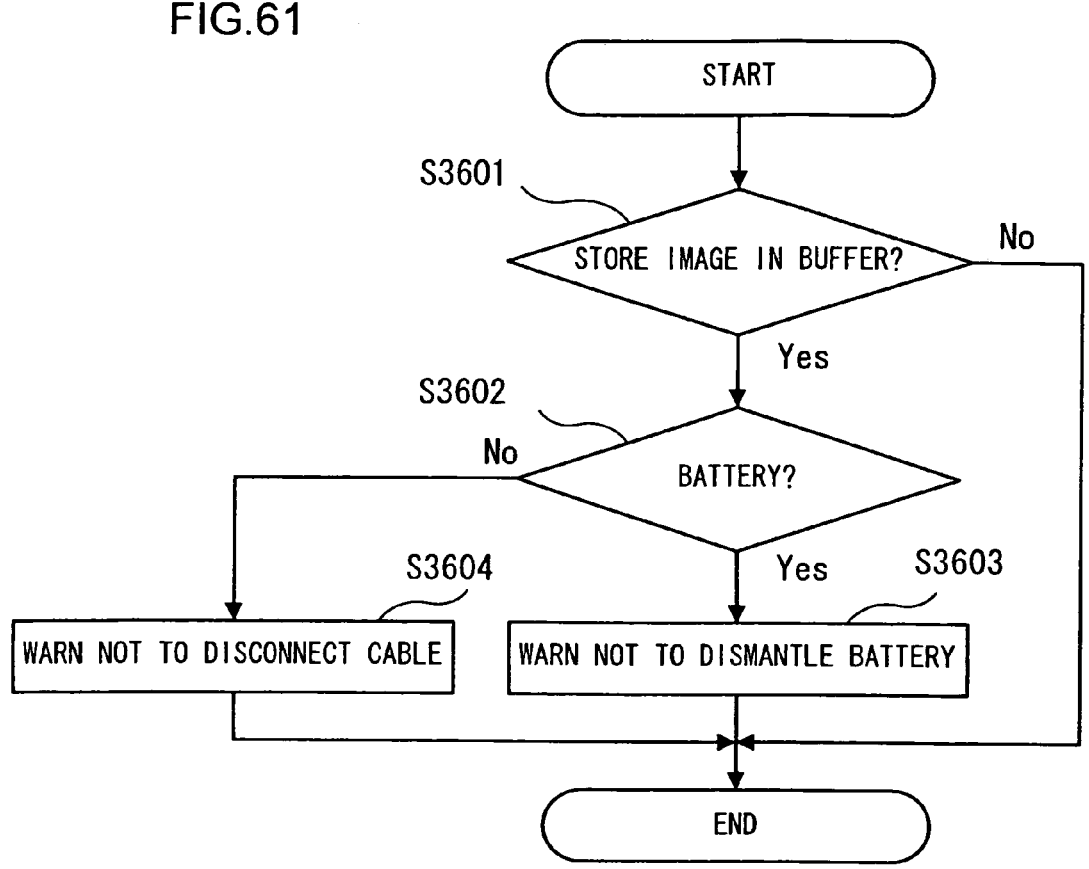
FIG. 61 is a flow chart showing battery-related control processing in the fourth embodiment.

(Battery-Related Control 3: FIG. 61)

Further, another examples of a battery-related control in digital camera 31 will be explained.

As buffer memory 311 is the volatile memory, so, when a battery in use with digital camera 31 is pulled out of digital camera 31 or a power cable connected to digital camera 31 is unplugged, image data stored in buffer memory 311 gets disappeared. Thus, in this case, a user is warned that a battery should not be pulled out of a camera or a power cord should not be unplugged from a camera when image data is stored in buffer memory 311.

FIG. 61 is the flow chart showing a processing procedure of a battery-related control to be executed in control/processor 301. This flow is repeatedly executed at any time.

In step S3601, it is to judge if image data is stored in buffer memory 311 and if the image data is stored, the flow proceeds to step S3602 and if the image data is not stored, the flow is ended. In step S3602, it is to check a power source in use with digital camera 31 and if the power source is a battery power, the flow proceeds to step S3603 and if an AC power is used, the flow proceeds to step S3604.

In step S3603, LCD display panel 6 displays a warning message that a battery should not be pulled out of a camera otherwise image data stored in the temporal storage area in buffer memory 311 gets disappeared. In step S3604, also a warning message that an AC power cable should not be unplugged from a camera is displayed on LCD display panel 6.

It is preferable that a warning message to be displayed on LCD display panel 6 is displayed on a display device that always stays turned on.

Figure 62:
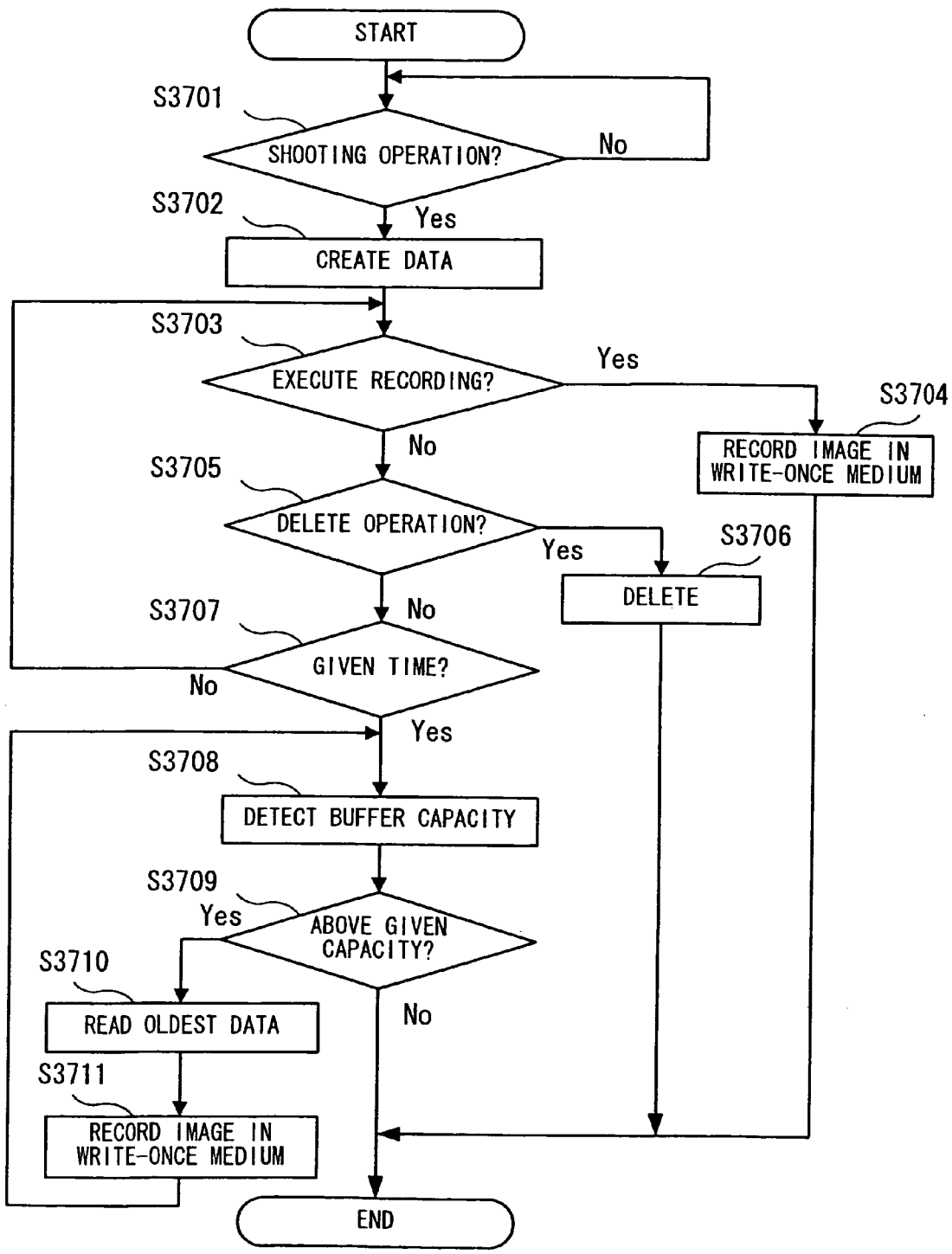
FIG. 62 is a flow chart showing battery-related control processing in the fourth embodiment.

(Record Control: FIG. 62)

A record control in digital camera 31 in accordance with the fourth embodiment of this invention will be described hereinafter.

Herein, digital camera 31 automatically records image data in write-once storage medium 4 without waiting for a user's decision when capacity of the image data stored in buffer memory 311 becomes above given capacity.

FIG. 62 is the flow chart showing a processing procedure of a record control to be executed in control/processor 301. This processing will be executed when a shooting mode is set with write-once storage medium 4 in use.

In step S3701, it is to detect if a shooting operation is executed with the shutter release button of operation unit 7 depressed. If the shooting operation is executed, the flow proceeds to step S3702 and if the shooting operation is not executed, the detection in step S3701 is continued. In step S3702, it is to process a taken image to create image data and to store the created image data in the temporary storage area in buffer memory 311. And a reproduced image is displayed on LCD display panel 6. At this moment, a user is inquired if the reproduced image is recorded in write-once storage medium 4 or deleted as shown in FIG. 54.

In step S3703, it is to check if a record operation is executed and if the record operation is executed, the flow proceeds to step S3704 and if the record operation is not executed, the flow proceeds to step S3705. In step S3704, it is to record a taken image data being reproduced on LCD display panel 6 in write-once storage medium 4 and to delete the taken image data from the temporary storage area in buffer memory 311.

In step S3705, it is to check if a delete operation is executed and if the delete operation is executed, the flow proceeds to step S3706 and if the delete operation is not executed, the flow proceeds to step S3707. In step S3706, it is to delete the reproduced taken image data from the temporary storage area in buffer memory 311. In step S3707, it is to check if a given period of time has elapsed since the reproduced image is displayed on LCD display panel 6 and if the given period of time has elapsed, the flow proceeds to step S3708 and if the given period of time does not elapse, the flow gets back to step S3703.

In step S3708, it is to detect capacity of the image data stored in the temporary storage area in buffer memory 311 and in step S3709, it is to judge if the capacity of the image data is above given capacity and if the capacity of the image data is above the given capacity, the flow proceeds to step S3710 and when the capacity of the image data is below the given capacity, the flow is ended.

In step S3710, out of image data stored to the temporary storage area in buffer memory 311, it is to reads out an oldest taken image data. In step S3711, it is to record the read-out image data in write-once storage medium 4 and delete this image data from buffer memory 311. The processing is executed between step S3708 and step S3711 repeatedly until the capacity of the image data stored in the temporary storage area in buffer memory 311 becomes small below the given capacity.

Accordingly, this control prevents a user from being unable to take a picture although write-once storage medium 4 has residual capacity. Also, when the capacity of the image data stored in buffer memory 311 becomes above the given capacity, the image data is automatically recorded in write-once storage medium 4, so capacity of buffer memory 311 can be secured without deleting the image data stored in buffer memory 311 automatically.

According to the control shown in FIG. 62, it is judged, in response to the capacity of the image data stored in the temporary storage area in buffer memory 311, if the image data is automatically recorded in write-once storage medium 4. But, the image data may be automatically recorded when a number of the stored image data exceeds a given number of image data, not responding to the capacity of the image data stored in buffer memory 311.

FIG. 62 describes the control in which the image data is recorded in write-once storage medium 4 preferentially from the oldest taken image data out of the image data stored in buffer memory 311. However, a priority order of image data to be recorded in write-once storage medium 4 is not limited to a shooting order, but may be in order of a data amount of the image data.

When the data amount of the image data stored in buffer memory 311 becomes large, a taken image data may be directly recorded in write-once storage medium 4, leaving the image data stored in buffer memory 311 intact.

Also, depending upon the data amount of the image data stored in buffer memory 311, the image data is not automatically recorded in write-once storage medium 4, but a message prompting a user to record the image data in write-once storage medium 4 may be displayed.

Figure 63:
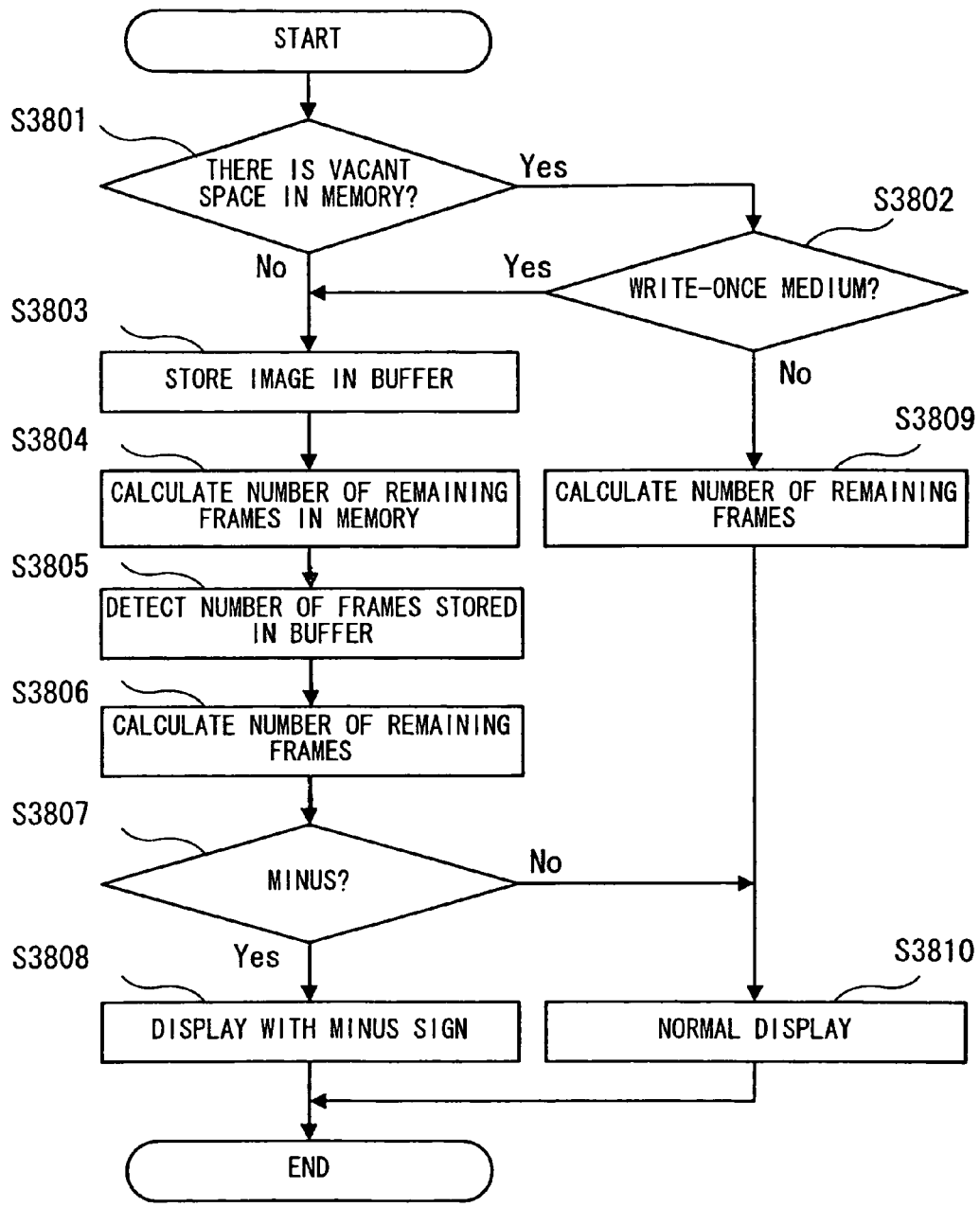
FIG. 63 is a flow chart showing memory capacity display control processing in the fourth embodiment.

(Memory Capacity Display Control: FIG. 63)

An explanation about a memory capacity display control will be given hereinafter.

Herein, this control permits to store image data in buffer memory 311 beyond capacity capable of recording in a memory card. With this control, image data can be shot in the event of an emergency. More specifically, when image data is stored in the temporary storage area in buffer memory 311 exceeding residual capacity of the memory card, a minus indication is added in displaying a number of remaining frames. This display lets a user know that memory capacity now in use exceeds the residual capacity. This capacity display control may be applied to not only write-once storage medium 4 but also other memory card in use.

FIG. 63 is the flow chart showing a processing procedure of a memory capacity display control to be executed in control/processor 301. This processing will start when a shooting operation is executed with the shutter release button of operation unit 7 depressed.

In step S3701, it is to detect memory capacity of a memory card in use and judge if the memory card has capacity to record taken image data. If the memory card has the capacity to record the image data, the flow proceeds to step S3802 and if the memory card does not have the capacity, the flow proceeds to step S3803. In step S3802, it is to check if the memory card in use is write-once storage medium 4. If the memory card is write-once storage medium 4, the flow proceeds to step S3803 and if the memory card is not write-once storage medium 4, the flow proceeds to step S3809.

In step S3803, the taken image data is stored in the temporary storage area in buffer memory 311. In step S3804, a number of remaining frames are calculated from residual capacity of the memory card. When the memory card in use is other memory card rather than write-once storage medium 4 and when it is judged that there is no capacity even in write-once storage medium 4 in use, the number of remaining frames becomes O-frame.

In step s3804, it is to check a number of storing frames of image data stored in buffer memory 311. In step S3806, it is to calculate a number of remaining frames by deducting the number of storing frames in buffer memory 311 calculated in step S3804 from the number of remaining frames of the memory card calculated in step S3804. This is the same number of remaining frame calculation control as in the residual capacity display control of FIG. 56.

Figure 64:
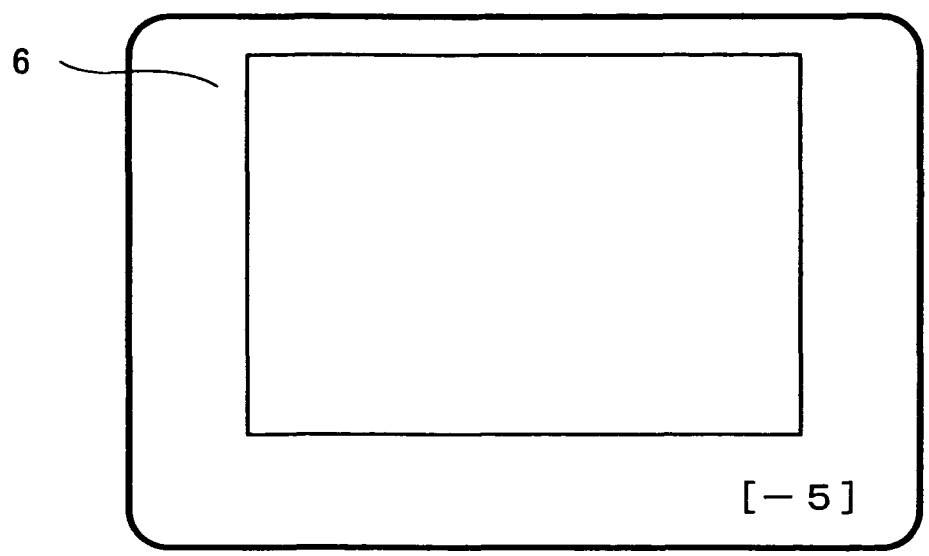
FIG. 64 is a view showing a display example of a number of remaining frames on a LCD display panel.

In step S3807, it is to judge if the number of remaining frames calculated in step S3806 is minus and if the number of remaining frames is minus, the flow proceeds to step S3808 and if the number of remaining frames is not minus, the flow proceeds to step S3810. In step S3808, it is to display the number of remaining frames with the minus indication on LCD display panel 6 as shown in FIG. 64. It is preferable that the minus display is displayed in different color from a display color of a normal number of remaining frames. In step S3810, as shown in FIG. 57, it is to display the number of remaining frames on LCD display panel 6.

When the memory card has capacity to record image data and a memory card in use is not write-once storage medium 4, in step S3809, it is to calculate the number of remaining frames from residual capacity. In step S3810, it is to display the number of remaining frames as shown in FIG. 57.

Accordingly, even if there is no capacity in the memory card, a shooting is permitted. At this moment, by displaying the number of remaining frames with the minus indication, a user can be informed that a shooting is under the emergency. It may be enough to attract a user's attention even if the minus-indicated number of remaining frames is not displayed. Also, a warning comment may be displayed on LCD display panel 6.

Figure 65:
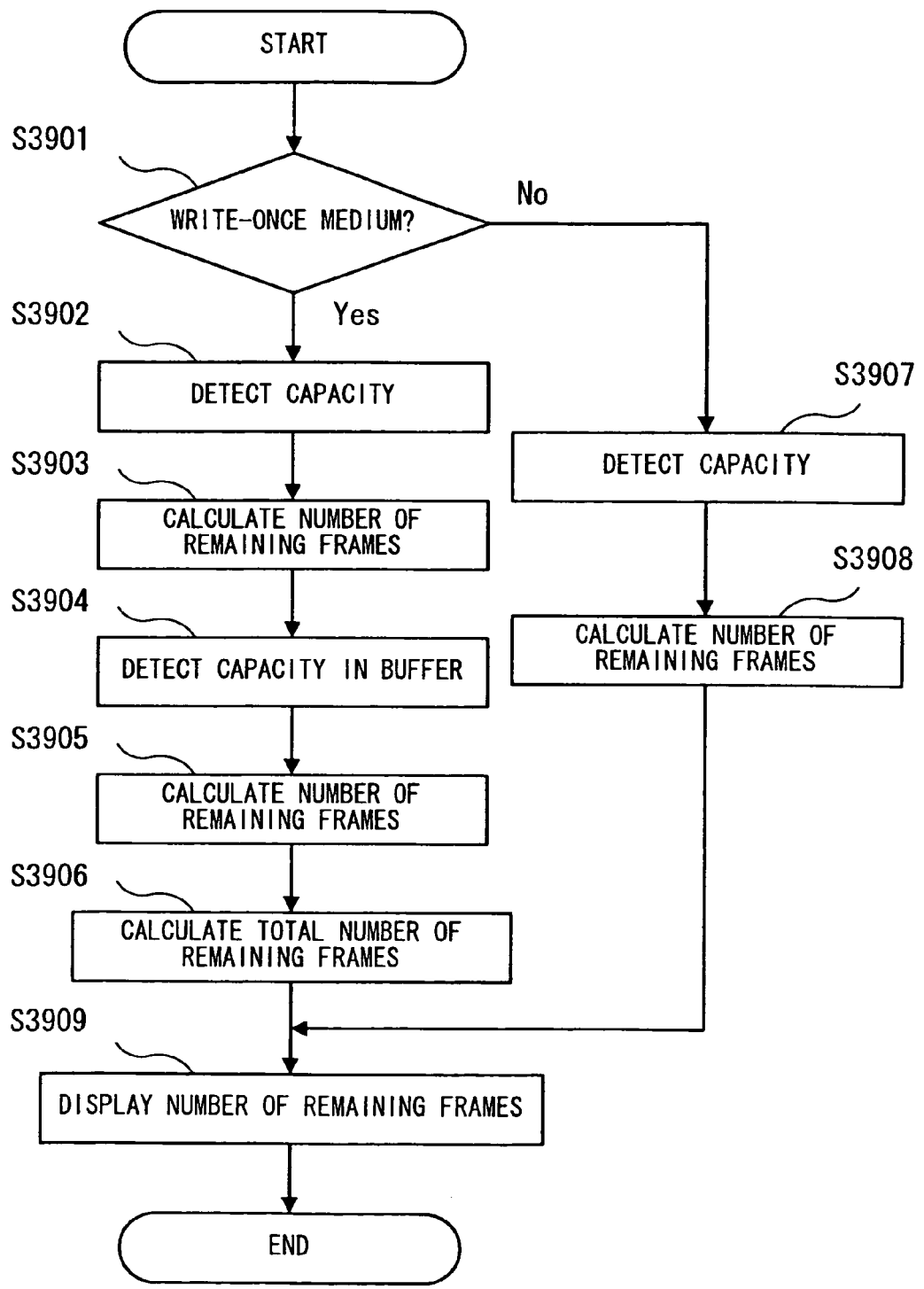
FIG. 65 is a flow chart showing memory capacity display control processing to be executed in the fourth embodiment.

(Memory Capacity Display Control 2: FIG. 65)

Another example of a memory capacity display control in digital camera 31 will be described hereinafter.

FIG. 65 is the flow chart showing a processing procedure of a memory capacity display control to be executed in control/processor 301.

In step S3901, it is to judged f an inserted memory is write-once storage medium 4 and if write-once storage medium 4 is inserted, the flow proceeds to step S3902 and if the inserted memory is not write-once storage medium 4, the flow proceeds to step S3907.

In step S3902, it is to check residual capacity of write-once storage medium 4 and in step S3903, it is to calculate the number of remaining frames from residual capacity of write-once storage medium 4. In step S3904, it is to detect capacity of the temporary storage area in buffer memory 311. In step S3905, it is to calculate the number of remaining frames from the residual capacity of the temporary storage area in buffer memory 311 detected in step S3904.

In step S3906, it is to calculate a total number of the remaining frames in write-once storage medium 4 calculated in step S3903 and remaining frames in buffer memory 311 calculated in step S3905. And in step S3309, it is to display the total number of the remaining frame calculated in step S3906 on LCD display panel 6.

In step S3907, it is to detect capacity of the memory card is detected and in step S3908, it is to calculate a number of remaining frames from residual capacity of the memory card. The number of remaining frames calculated in step S3908 is displayed on LCD display panel 6.

As described in the foregoing, when displaying the summation of residual capacity adding together residual capacity of the memory card inserted into card slot 2 and residual capacity of buffer memory 311, the number of remaining frames are not simply calculated from the total of each residual capacity, but a number of remaining frames capable of recording in each memory is calculated respectively and then a summation of the remaining frames are displayed. This control enables to display a number of frames capable of recording image data without fail.

In the fourth embodiment, wherein, only when write-once storage medium 4 is loaded into digital camera 31, buffer memory 311 is used as the temporal storage memory, so the display of the residual capacity is so controlled as to be the summation of the residual capacity in combining write-once storage medium 4 and buffer memory 311. But, this calculation control of the summation of the residual capacity explained herein with reference to FIG. 65 may be applied to any digital camera if the digital camera records image data in a plurality of memories regardless of a kind of a memory.

Digital camera 31 enables to display any of a number of remaining frames or a number of undecided frames respectively by change over the number of the remaining frames and the number of the undecided frames. The number of the undecided frames is a number of image data stored in buffer memory 311 which a user does not yet decide to record in write-once storage medium 4 or delete without recording.

Displaying the number of the undecided frames lets the user know presence of the undecided image data and enables to prompt the user to decide whether to record the data in write-once storage medium 4 or delete it without recording.

An explanation about a memory capacity change control in digital camera 31 will be given hereinafter.

Figure 66:
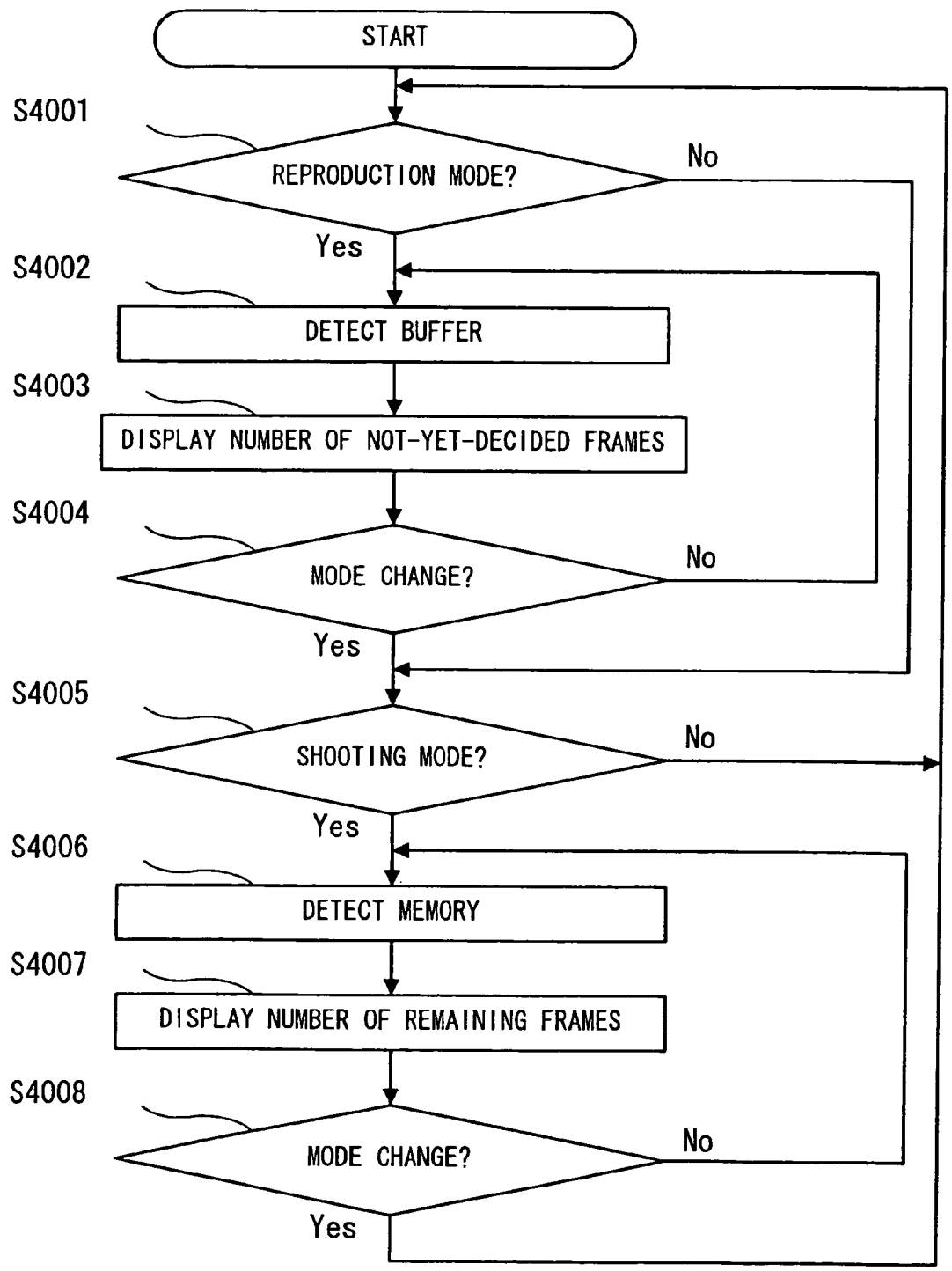
FIG. 66 is a flowchart showing memory capacity display change control processing to be executed in the fourth embodiment.

FIG. 66 is the flow chart showing a processing procedure of a memory capacity change control to be executed in control/processor 301.

This processing is repeatedly executed as long as the power of digital camera is ON.

In step S4001, it is to detect if a shooting mode of digital camera 31 is set to a reproduction mode. If the shooting mode is set to the reproduction mode, the flow proceeds to step S4002 and if the shooting mode is not set to the reproduction mode, the flow proceeds to step S4005. In step S4002, it is to detect a memory status of the temporary storage area in buffer memory 311 and obtain a number of stored image data. In step S4003, it is to display the number of image data obtained in step S4002 as an undecided frame on LCD display panel 6. At this moment, a number of the undecided frame is displayed on LCD display panel 6 like the display of the number of the remaining frames as shown in FIG. 57.

In step S4004, it is to check if the mode is changed with an operation of operation unit 7. If the mode is changed, the flow proceeds to step S4005 and if the mode is not changed, the flow gets back to step S4002.

In step S4005, it is to check if the mode is changed to a shooting mode and if the mode is changed to the shooting mode, the flow proceeds to step S4006 and if the mode is not changed to the shooting mode, the flow gets back to step S4001. In step S4006, it is to calculate a number of remaining frames by detecting memory status of buffer memory 311 and write-once storage medium 4. In step S4007, it is to display a total number of the remaining frames of buffer memory 311 and write-once storage medium 4 on LCD display panel 6 as shown in FIG. 57.

In step S4008, it is to check if the mode is changed again. When the mode change is detected, the flow proceeds to step S4001. When the mode change is not detected, the flow gets back to step S4006.

Like this, when the reproduction mode is set, displaying the number of the undecided frames enables to let a user know the presence of the undecided image data in buffer memory 311.

Although this control controls so as to display the number of the undecided frames in the reproduction mode and the number of the remaining frames in the shooting mode, instead of the mode change, a changeover button may be provided to select either the number of the undecided frames or the number of the remaining frames. Also, the control of FIG. 66 displays only a number of a frame, but a display indicating that a number of a frame displayed with the display of the number of the frame is a number of an undecided frame may be displayed.

Figure 67:
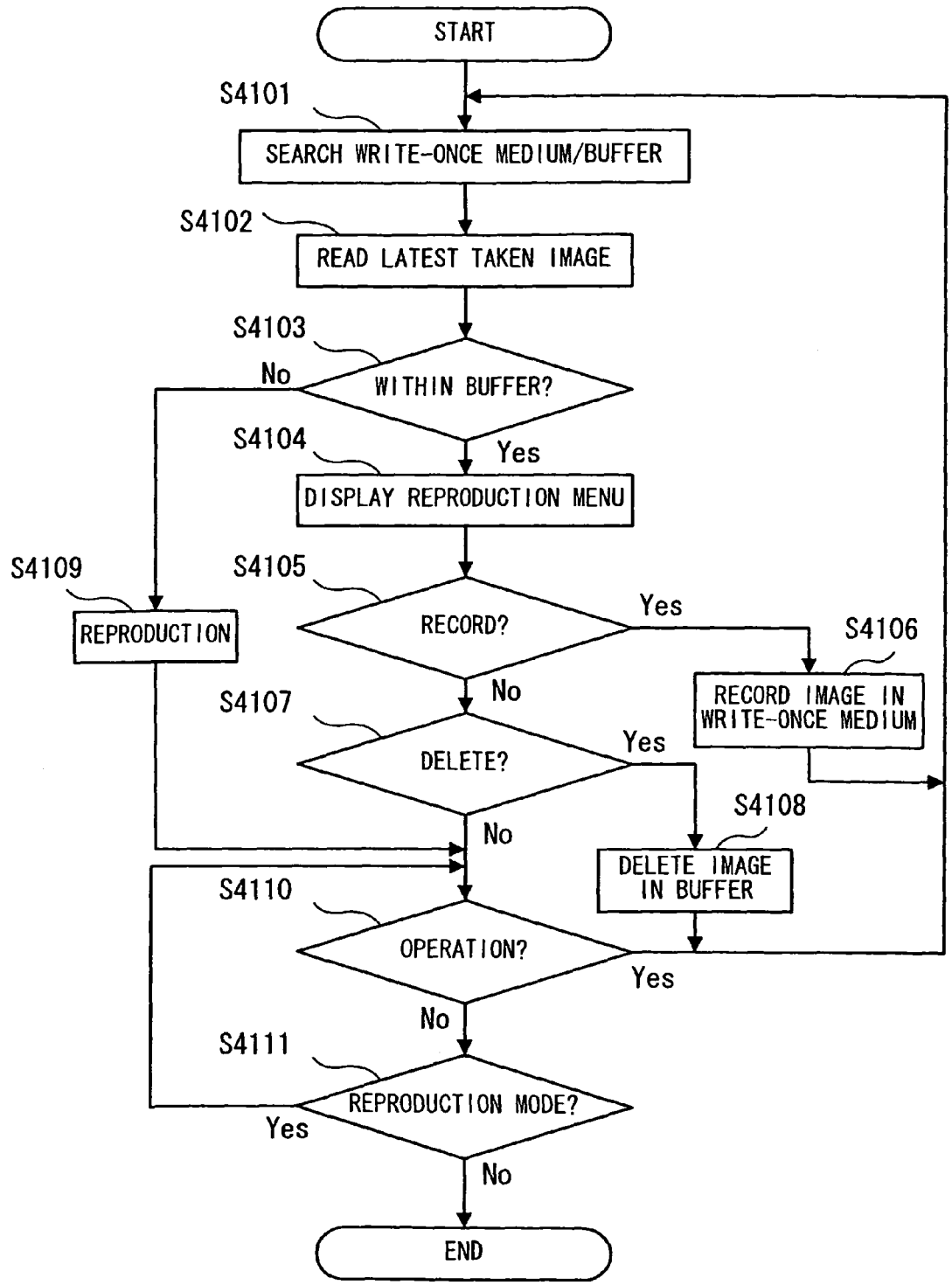
FIG. 67 is a flow chart showing image reproduction control processing to be executed in the fourth embodiment.

(Reproduction Control: FIG. 67)

A reproduction control in digital camera 31 will be explained.

In digital camera 31, when the mode is changed from the shooting mode to the reproduction mode, digital camera 31 reads out image data that was shot just before and displays the image data on LCD display panel 6. An operation of a cross-marked button provided in operation unit 7 of digital camera 31 enables to change image data and reproduce different image data. In this case, regardless of image data recorded in write-once storage medium 4 or stored in buffer memory, image data is reproduced in shooting order.

As shown in FIG. 54, when image data stored in buffer memory 311 is being reproduced, a message prompting a user to record image data in write-once storage medium 4 is displayed at the same time. With this message, a user can judge whether reproduced image data is image data recorded in write-once storage medium 4 or temporally stored in buffer memory 311.

FIG. 67 is the flow chart showing a processing procedure of an image reproduction control to be executed in control/processor 301. This processing will start when the mode is changed to the reproduction mode with an operation of operation unit 7.

In step S4101, it is to search for image data in write-once storage medium 4 and the temporary storage area of buffer memory 311. In step S4102, it is read out image data that is recently taken except for displayed image data. Accordingly, no image data is displayed on LCD display panel 6 right after the mode is changed to the reproduction mode, so recently taken image data is read out.

In step S4103, it is to detect if the read-out image data is read out from buffer memory 311 and if the read-out image data is read out from buffer memory 311, the flow proceeds to step S4104. If the read-out image data is not read out from buffer memory 311, the flow proceeds to step S4109.

In step S4104, it is to display the read-out image data on LCD display panel 6 and, at the same time, it is to display a message inquiring if the image data is recorded in write-once storage medium 4 or deleted from buffer memory 311 on LCD display panel 6 by overlapping the reproduced image. In step S4105, it is to detect if a record operation is executed in response to the display in step S4104 and if the record operation is executed, the flow proceeds to step S4106 and if the record operation is not executed, the flow proceeds to step S4107.

In step S4106, it is to record the image data being reproduced and temporarily stored in buffer memory 311 in write-once storage medium 4. At this moment, the image data is recorded in a folder of write-once storage medium 4 in accordance with the folder information about a record location stored simultaneously when the image data is stored in buffer memory 311. The image data recorded in write-once storage medium 4 and the folder information are deleted from buffer memory 311. The flow gets back to step S4101.

In step S4107, it is to detect if a delete operation is executed and if the delete operation is executed, the flow proceeds to step S4108 and if the delete operation is not executed, the flow proceeds to step S4111. In step S4108, it is to delete image data being reproduced from buffer memory 311. The flow gets back to step S4101.

In step S4103, when it is judged that the read-out image data is image data in write-once storage medium 4, not in buffer memory 311, in step S4109, it is to display the read-out image data on LCD display panel 6. Here, a message inquiring about deletion of the image data etc is not displayed.

In step S4110, it is to check if an operation of a cross-marked button of operation unit 7 etc is executed so as to instruct reproduction of other image data. If the reproduction is instructed, the flow gets back to step S4101 and if the reproduction is not instructed, the flow proceeds to step S4111. In step S4111, it is to detect if the reproduction mode is set and if the reproduction mode is set, the flow gets back to step S4110 and if the mode is changed from the reproduction mode to other mode, the flow is ended releasing the reproduction mode.

Like this, when the reproduced image data being reproduced in the reproduction mode is image data temporarily stored in buffer memory 311, a message prompting a user to decide whether to record the image data in write-once storage medium 4 or delete the image data from buffer memory 311 is displayed.

Figure 68:
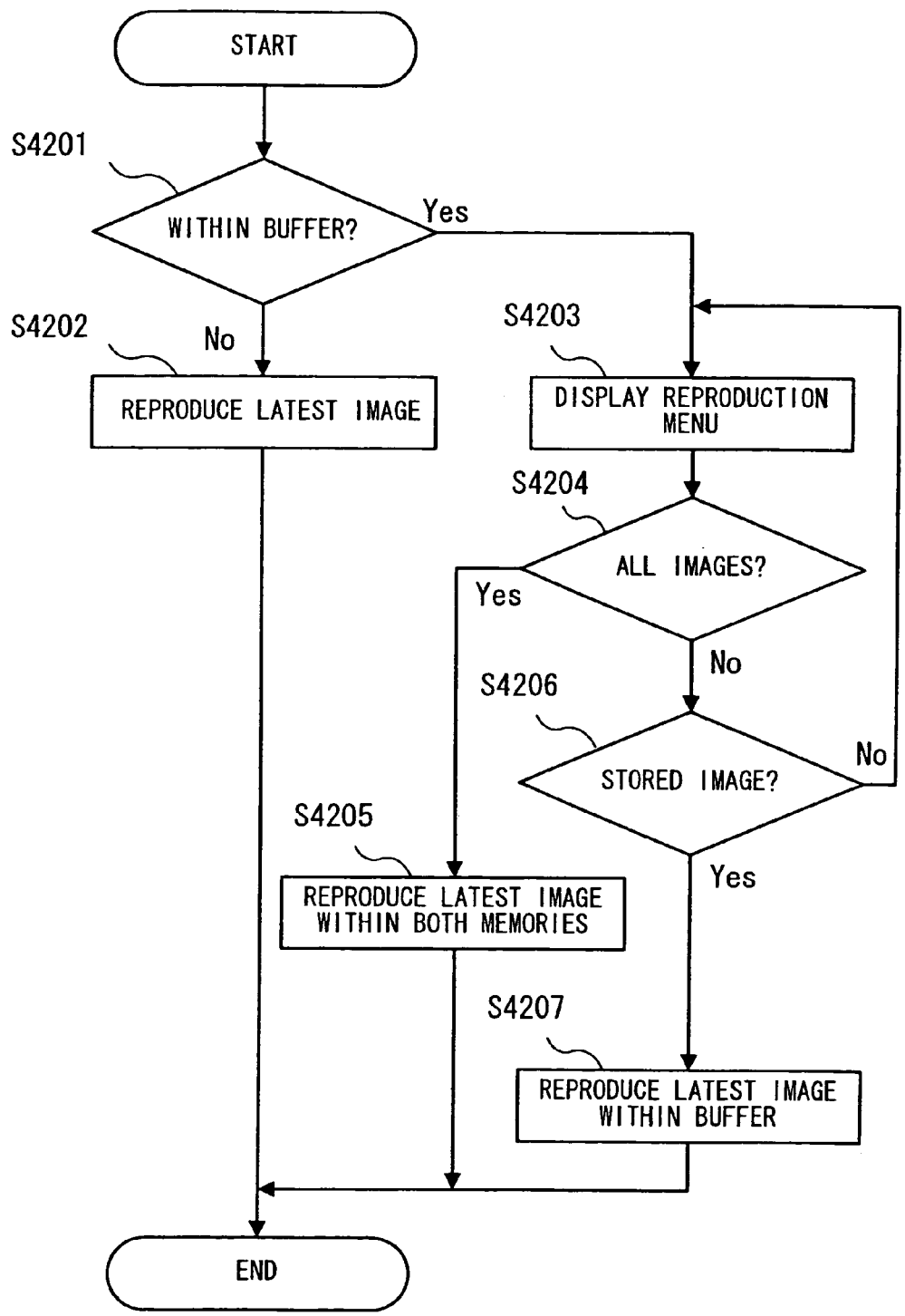
FIG. 68 is a flow chart showing reproduction change control processing to be executed in the fourth embodiment.

(Reproduction Change Control: FIG. 68)

Digital camera 31 is provided with a function to reproduce only an image data of buffer memory 311 in the event that the image data is stored in buffer memory 311 when the mode is changed to the reproduction mode.

A reproduction mode change control in digital camera 31 will be explained hereinafter.

FIG. 68 is the flow chart showing a processing procedure of a reproduction mode change control to be executed in control/processor 301. This processing will start when the mode is changed to the reproduction mode.

In step S4201, it is to detect if image data is stored in buffer memory 311 and if the image data is stored in buffer memory 311, the flow proceeds to step S4203 and if the image data is not stored, the flow proceeds to step S4202. In step S4202, it is to read out image data taken just before from image data recorded in write-once storage medium 4 and display the image data on LCD display panel 6.

Figure 69:
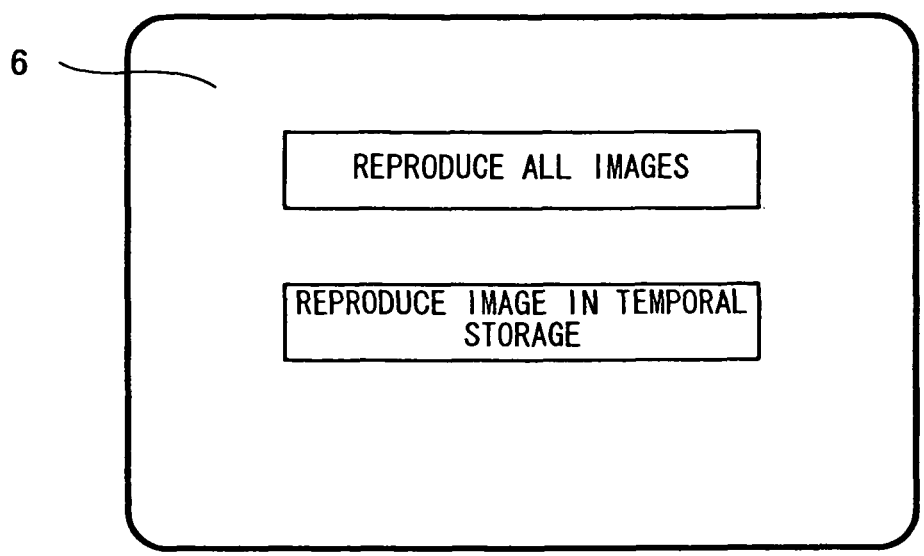
FIG. 69 is a view showing a display example of a reproduction menu on a LCD display.

In step S4203, LCD display panel 6 shows a selection menu to reproduce any of all image data or image data only stored in buffer memory 311 for a reproduction. FIG. 69 shows a selection menu screen display example on LCD display panel 6. In step S4204, it is to check if "all reproduction" is selected. If the "all reproduction" is selected, the flow proceeds to step S4205 and if the "all reproduction" is not selected, the flow proceeds to step S4206. In step S4205, out of image data stored in write-once storage medium 4 and buffer memory 311, it is to read out image data taken just before and display the read-out image data on LCD display panel 6.

In step S4206, it is to check if "temporary storage" is selected and if the "temporary storage" is selected, the flow proceeds to step S4207 and if the "temporary storage" is not selected, the flow gets back to step S4203. In step S4207, out of image data stored in buffer memory 311, it is to readout image data taken just before and reproduce the read-out image data on LCD display panel 6.

In a case where a reproduction image is displayed in any of step S4202, step S4205 or step S4207, a message such that the reproduction image is to be recorded in write-once storage medium 4 or deleted from buffer memory 311 is displayed at the same time.

Figure 70:
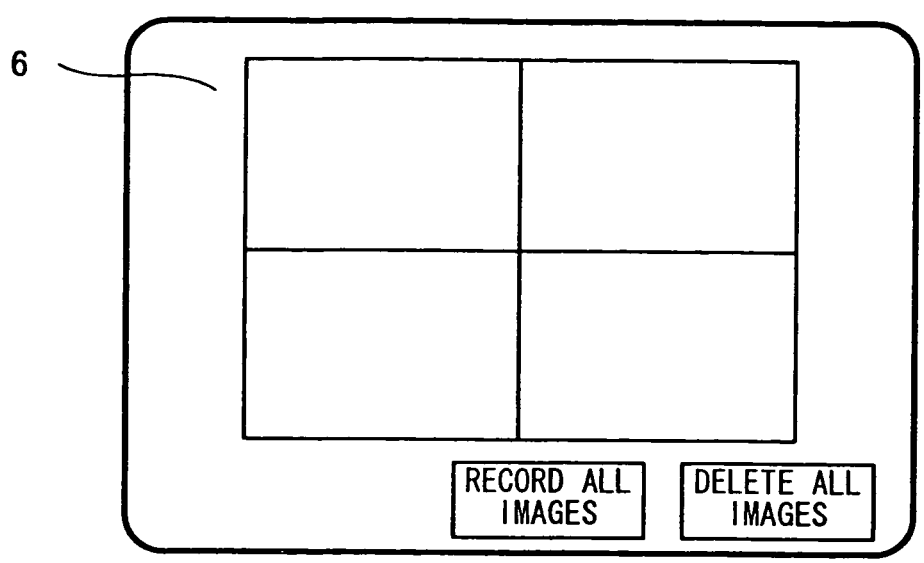
FIG. 70 is a view showing a display example of reproducing plural image data on a LCD display panel.

In the control shown in FIG. 68, recently taken image data is not read out, but plural image data may be so displayed as to be viewed at once as shown in FIG. 70. In this case, a message inquiring if the image data is recorded in write-once storage medium 4 or deleted from buffer memory 311 is displayed. In a case where all image data is displayed at once as shown in FIG. 70, in addition to an individual record or delete operation per each image data, all image data of buffer memory 311 may be caused to be recorded in write-once storage medium 4 or deleted from buffer memory 311.

Like this, by providing a reproduction function to reproduce only image data in buffer memory 311, image data can be reproduced without confirming each time whether the image data is image data in buffer memory 311 or write-once storage medium 4. The reproduction menu is controlled to be displayed as shown in FIG. 69 only when image data is stored in buffer memory 311, so an image can be instantaneously reproduced when image data is not stored in buffer memory 311. Therefore, a user does not feel annoying.

Figure 71:
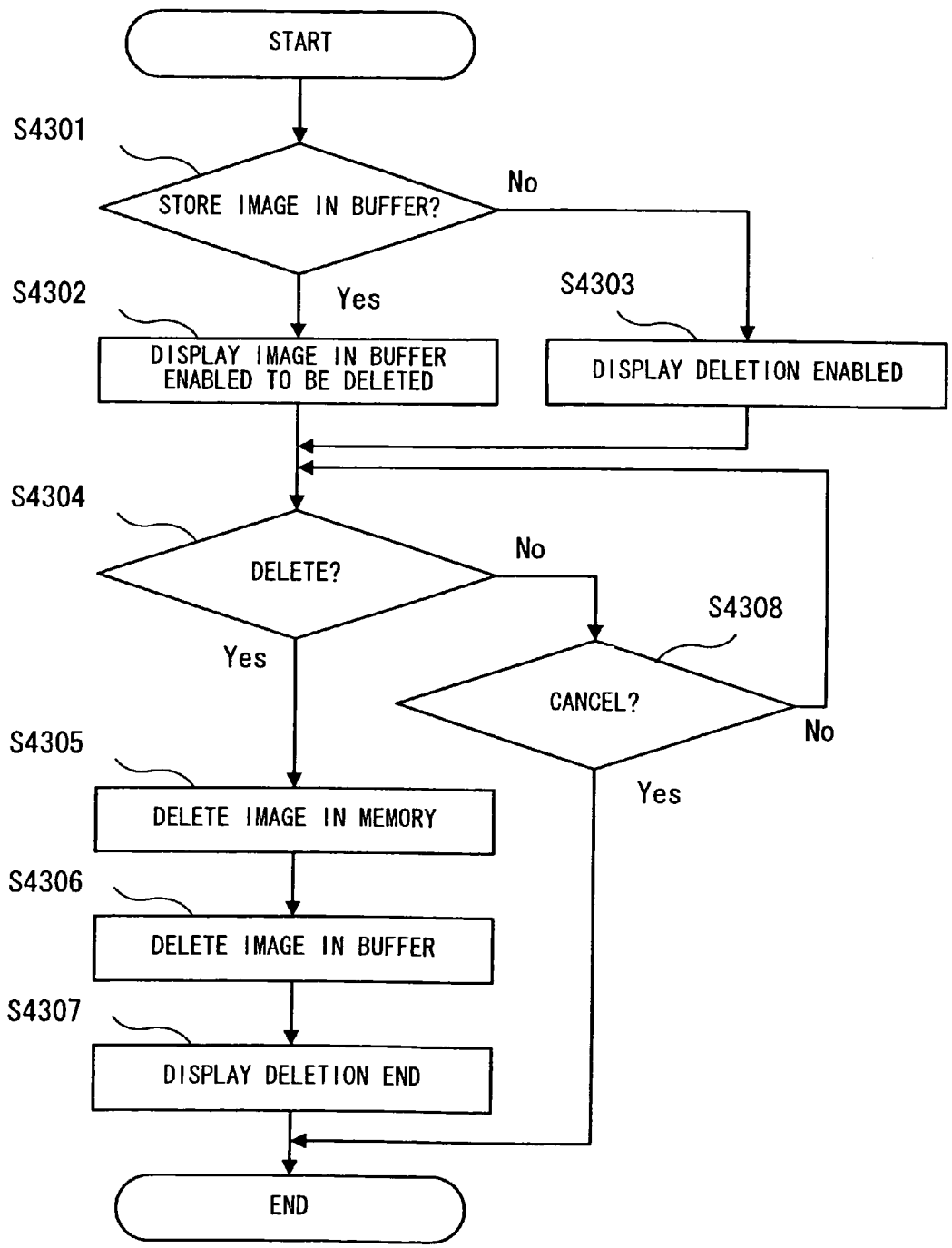
FIG. 71 is a flow chart showing image delete control processing to be executed in the fourth embodiment.

(Image Data Delete Control: FIG. 71)

An image data delete operation in digital camera 31 will be explained hereinafter. Digital camera 31 of the fourth embodiment stores image data in buffer memory 311 continuously, so the image data stored in buffer memory 311 also becomes a target to be deleted when an operation to delete all image data is executed. A more specific operation will be explained as follow.

FIG. 71 is the flow chart showing a processing procedure of an image delete control to be executed in control/processor 301. This processing will start when an operation to delete all image data is executed with operation unit 7.

In step S4301, it is to detect if image data is stored in buffer memory 311 and if the image data is stored, the flow proceeds to step S4302 and if the image data is not stored, the flow proceeds to step S4303. In step S4302, it is to display a message saying that the image data in buffer memory 311 is also deleted on LCD display panel 6. At the same time, it is to display a message inquiring if the image data in buffer memory 311 is deleted simultaneously or the delete operation is cancelled.

In step S4303, it is to display a comment saying that the image data is deleted and an inquiry about an image delete or a delete cancel on LCD display panel 6.

In step S4304, it is to detect if a delete operation is executed and if the delete operation is executed, the flow proceeds to step S4305 and if the delete operation is not executed, the flow proceeds to step S4308. In step S4308, it is to detect if the cancel operation is executed. When the cancel operation is executed, this flow is ended and when the cancel operation is not executed, the flow gets back to step S4304.

In step S4305, when image data is stored in a memory card, all the image data is deleted. In step S4306, when image data is stored in buffer memory 311, all the image data is deleted. In step S4307, LCD display panel 6 displays that all the image data was deleted.

In this way, a selection of a delete operation of all image data enables to delete image data stored in a memory card and in buffer memory 311 easily. When image data is stored in buffer memory 311, a user is notified that the image data stored in buffer memory 311 is deleted so that an inadvertent deletion of the image data can be avoided.

Fifth Embodiment

A fifth embodiment of this invention will be described using accompanying diagrams. In the fifth embodiment, an image storage apparatus that stores image data taken with digital cameras in accordance with the first to the fourth embodiments as described so far will be described. The image storage apparatus is not an apparatus dedicated for storing image data, but may be an information device like PC etc.

Figure 72:
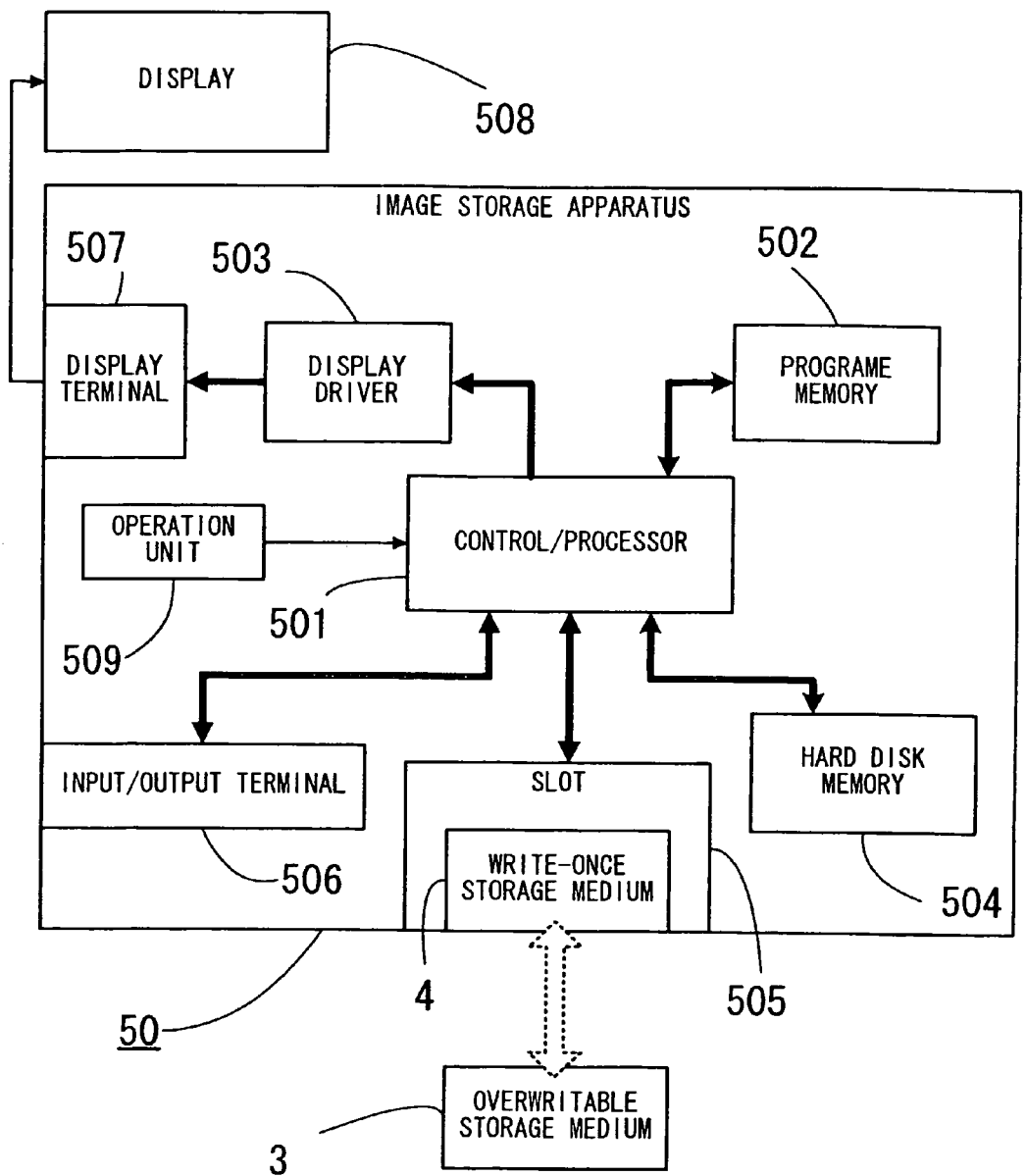
FIG. 72 is a block diagram showing a configuration of an image storage apparatus in a fifth embodiment of this invention.

FIG. 72 is a block diagram showing a configuration of image storage apparatus 50 in accordance with the fifth embodiment.

Image storage apparatus 50 consists of control/processor unit 501, program memory 502, display driver 503, hard disk memory 504, slot 505, connector terminal 506, display output terminal 507 and operation unit 509 etc. Control/processor unit 501 is provided with a calculating unit like CPU etc and commands image storage apparatus 50. Program memory 502 stores a control program to be executed at control unit 501. Display driver 503 outputs picture image data to display 508 via display output terminal 507. Hard disk memory 504 is bulk memory to store image data. Slot 505 has a slot enabling a memory card to be inserted into and is an interface when reading out data of a memory card and recording data in a memory card. Connector terminal 506 is an interface to input/output data by connecting digital camera 31 or so hereto. Operation unit 509 is operated in order for a user to enter various orders to image storage apparatus 50. Operation unit 509 may be an external keyboard, not be directly attached to image storage apparatus 50.

Figure 73:
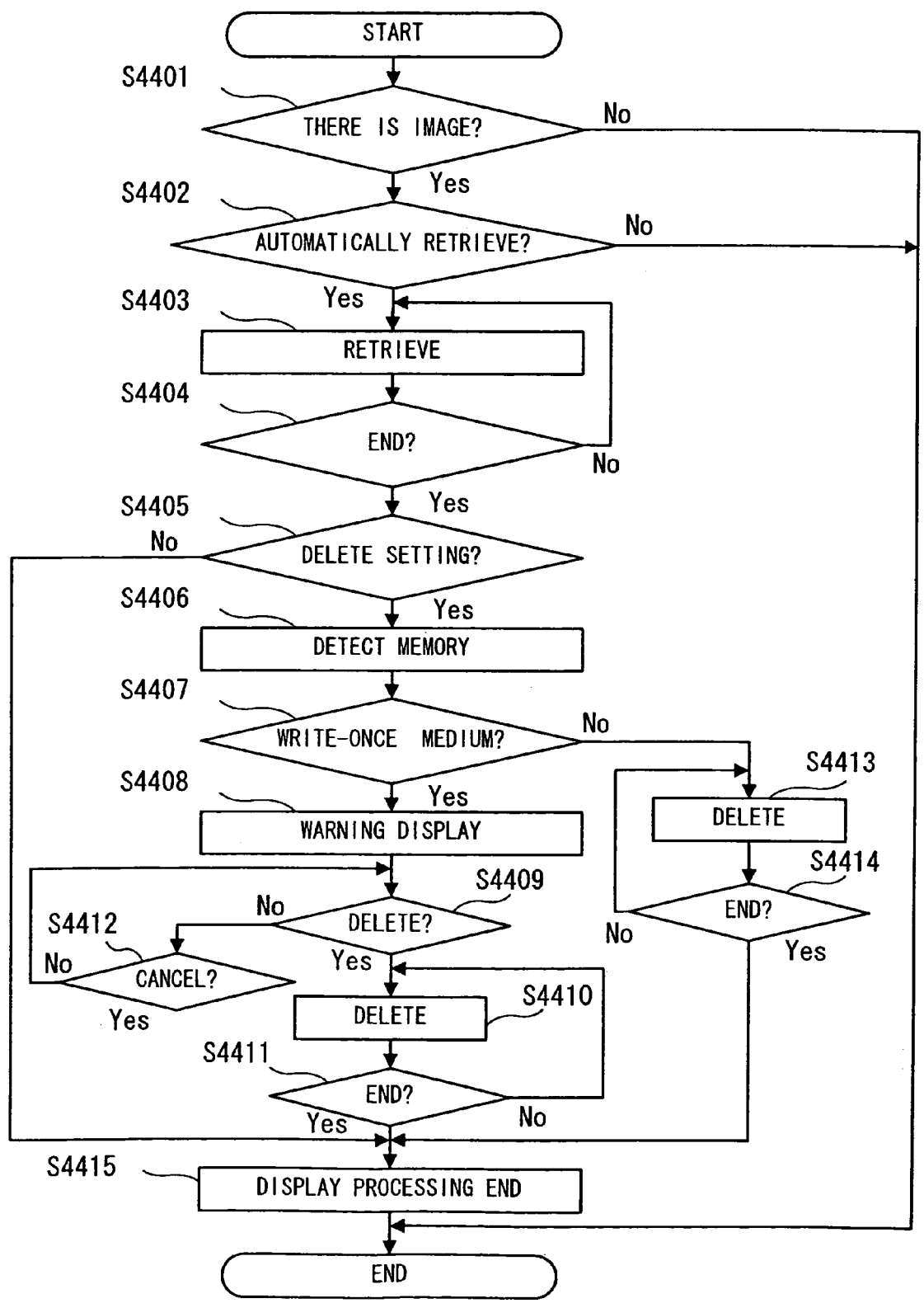
FIG. 73 is a flow chart showing image management control processing to be executed in the fifth embodiment.

(Image Data Management Control 1: FIG. 73)

An image data management control to be executed in image storage apparatus 50 will be explained. The image data management control can retrieve image data of a memory card, namely, reads in and stores image data and delete it.

FIG. 73 is the flow chart showing a processing procedure of an image management control to be executed in control/processor 501. This processing will start by detecting a connection of digital camera 31 thereto or insertion of a memory card into slot 505 of image storage apparatus 50.

In step S4401, it is to detect if there is image data in a memory card and if there is the image data, the flow proceeds to step S4402 and if there is not the image data, the flow is ended.

Figure 74:
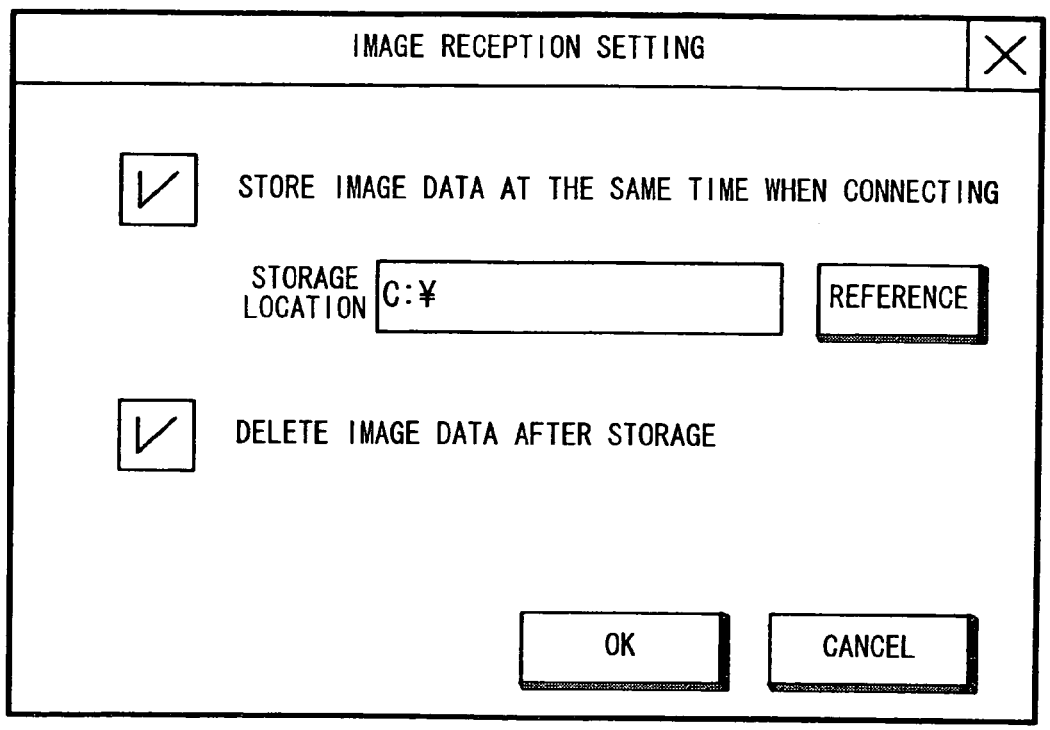
FIG. 74 is a view showing a display example of a setting menu to be executed in the fifth embodiment.

In step S4402, it is to detect if image data is set to be automatically stored at the same time when digital camera 31 is connected or a memory card is inserted. This setting is set by a user via an operation of operation unit 509 with reference to a setting menu displayed on display 508. FIG. 74 shows a display example of the setting menu on display 508. A setting menu shown in FIG. 74 is to set how image data recorded in a memory card in use is processed.

When the image data is set to be stored at the same time when the memory card is connected, the flow proceeds to step S4403 and if the image data is not set to be stored, the flow is ended.

In step S4403, it is to retrieve the image data. The retrieved image data is stored in a storage medium set via a setting menu shown in FIG. 74. In step S4404, it is to detect if retrieving of all image data is finished and if the retrieving of all the image data is finished, the flow proceeds to step S4405 and if the retrieving of all image data is not finished, the flow gets back to step S4403.

In step S4405, it is to detect if the retrieved image data is set to be deleted from the memory card in the setting menu. If the deletion of the image data is set, the flow proceeds to step S4406 and if the image data is not set, the flow proceeds to step S4415.

In step S4406, it is to obtain information about a connected memory card, for instance, property information. In step S4407, it is to detect if the memory card is write-once storage medium 4 based upon the information obtained in step S4406. If the memory card is write-once storage medium 4, the flow proceeds to step S4408 and if the memory card is not write-once storage medium 4, the flow proceeds to step S4412.

In step S4408, it is to display a message warning that deletion of image data can not get an increase in memory capacity on display 508 and along with this message, an inquiry if the image data is deleted or not is displayed thereon. In step S4409, it is to detect if the delete operation is executed and if the delete operation is executed, the flow proceeds to step S4410 and if the delete operation is not executed, the flow proceeds to step S4412.

In step S4410, it is to perform delete processing on the image data already retrieved in the memory card. In step S4411, it is to detect if the delete processing is complete with respect to all the image data already retrieved. If the delete processing is complete, the flow proceeds to step S4415 and if the delete processing is not complete, the flow gets back to step S4410.

In step S4412, it is to detect if a cancel operation is executed and if the cancel operation is executed, the flow proceeds to step S4415 and if the cancel operation is not executed, the flow gets back to step S4409.

In step S4413, FAT information is renewed to indicate that the image data is deleted. In step S4414, it is to detect if the delete processing on all the image data is complete and if the delete processing is complete, the flow proceeds to step S4415 and if the delete processing is not complete, the flow gets back to step S4413.

In step S4415, it is to display a message saying that the processing is ended on display 508.

Figure 75:
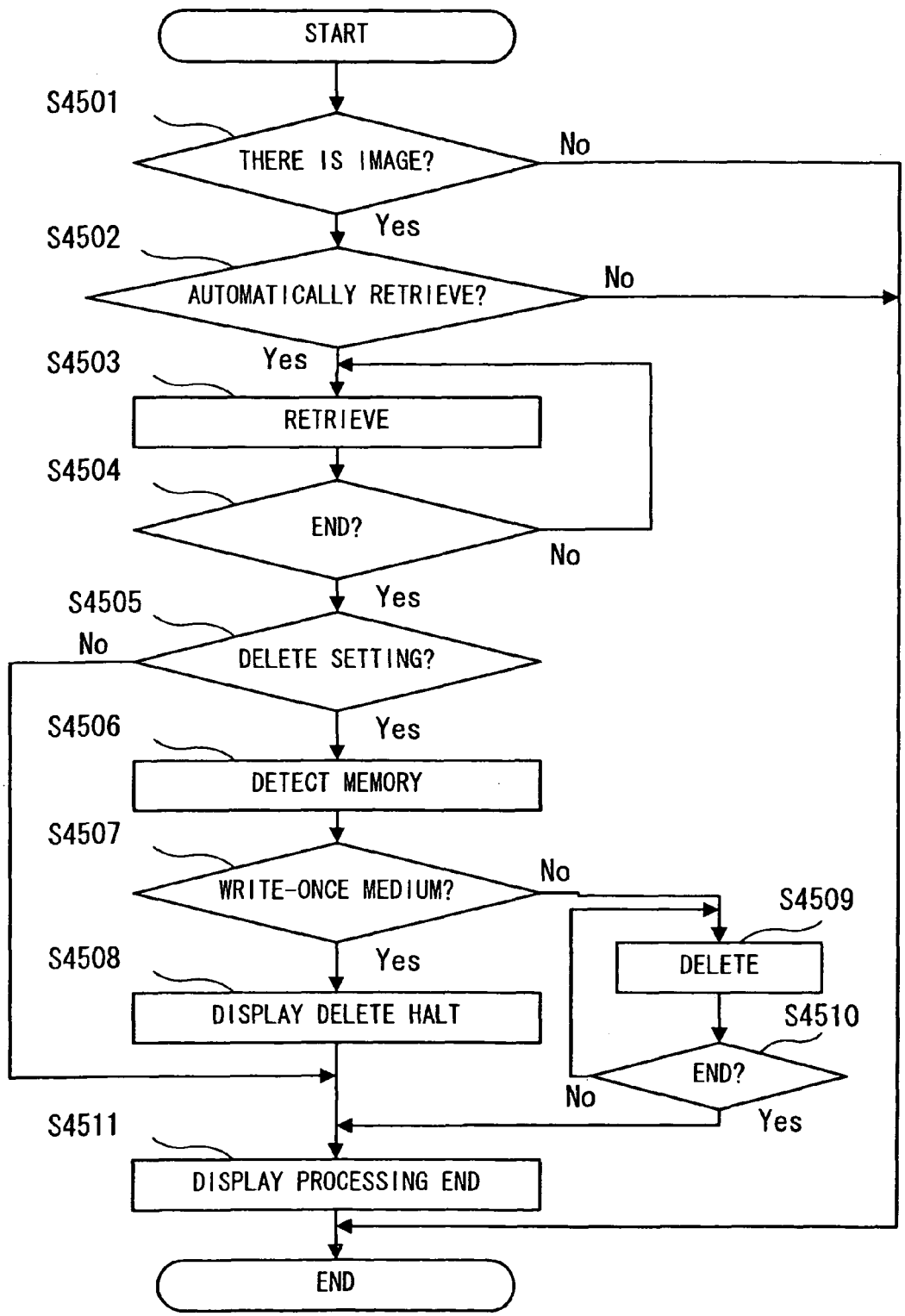
FIG. 75 is a flow chart showing image management control processing to be executed in the fifth embodiment.

Like this, even if the retrieved image data from the memory card is set to be automatically deleted, the inquiry about deletion with respect to write-once storage medium 4 prevents a user from deleting image data without knowing that the deletion does not lead to an increase in memory capacity.
(Image Data Management Control 2: FIG. 75)

Another example of the image management control in image storage apparatus 50 will be explained.

In this control, when the inserted memory card is write-once storage medium 4, this control does not delete image data at a time of an automatic transfer and displays that a delete operation is halted.

FIG. 75 is the flow chart showing a processing procedure of an image management control to be executed in control/processor 501 of image storage apparatus 50. This processing will start when detecting a connection of digital camera 31 or insertion of a memory card into slot 505 of image storage apparatus 50.

In step S4501, it is to detect if there is image data in a memory card and if there is the image data, the flow proceeds to step S4502 and if there is not the image data, the flow is ended. In step S4502, it is to detect if image data is set to be automatically retrieved at the same time when connecting in a setting menu. When the automatic retrieve is set, the flow proceeds to step S4503 and when the automatic retrieve is not set, this processing is ended.

In step S4503, it is to retrieve image data in the memory card. In step S4504, it is to detect if retrieving of all the image data is finished and if the retrieval of all the image data is finished, the flow proceeds to step S4505 and if the retrieval is not finished, the flow gets back to step S4503.

In step S4505, it is to detect if the retrieved image data is set to be deleted from the memory card in the setting menu and if the deletion of the image data is set, the flow proceeds to step S4506. If the deletion of the image data is not set, the flow proceeds to step S4511.

In step S4506, it is to obtain information about the connected memory card. In step S4507, it is to detect if the memory card is write-once storage medium 4 based upon the information obtained in step S4506. If the memory card is write-once storage medium 4, the flow proceeds to step S4508 and if the memory card is not write-once storage medium 4, the flow proceeds to step S4509.

In step S4508, display 508 displays what an image data deletion is halted due to write-once storage medium 4 in use. In step S4509, FAT information is renewed to indicate that the image data is deleted. In step S4510, it is to detect if the delete processing on all the image data is finished and if the delete processing is finished, the flow proceeds to step S4511 and if the delete processing is not finished, the flow gets back to step S4509.

In step S4511, it is to display a message saying that the processing is ended on display 508.

Figure 76:
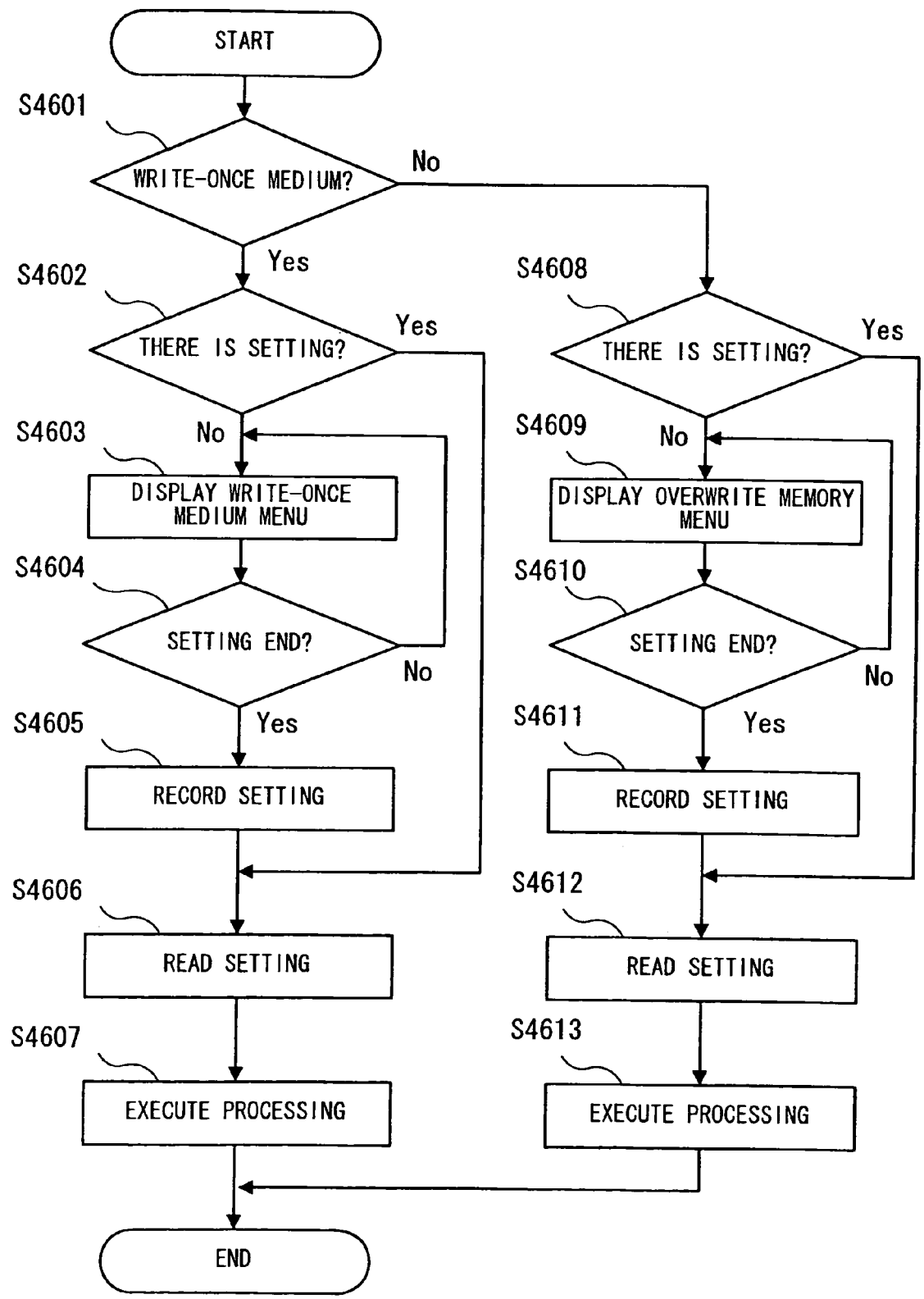
FIG. 76 is a flow chart showing image management control processing to be executed in the fifth embodiment.

A control in which image data is retrieved from a memory card and then the retrieved image data is automatically deleted is often executed for the purpose of increasing memory capacity capable of recording in preparation for a next shooting. When the memory card is write-once storage medium 4, deletion of image data cannot get an increase in memory capacity capable of recording. Automatic deletion of image data is not performed in write-once storage medium 4, so a user does not need meaningless wasteful delete processing.
(Image Management Setting Control: FIG. 76)

An image management setting control to be executed in image storage apparatus 50 will be described hereinafter.

Image storage apparatus 50 sets image management setting processing in a case where a memory card is overwritable storage medium 3 and image management setting processing in a case where a memory card is write-once storage medium 4 independently and the processing is executed respectively in accordance with each setting.

FIG. 76 is the flow chart showing a processing procedure of an image management setting control to be executed in control/processor 501 of image storage apparatus 50. This processing will start when insertion of a memory card or a connection of a digital camera is detected.

In step S4601, it is to detect if an inserted memory card is write-once storage medium 4 and if write-once storage medium 4 is inserted, the flow proceeds to step S4602 and if write-once storage medium 4 is not inserted, the flow proceeds to step S4608. In step S4602, it is to detect if setting information for write-once storage medium 4 is recorded in program memory 502 and if the setting information is recorded, the flow proceeds to step S4606 and if the setting information is not recorded, the flow proceeds to step S4603.

Figure 77:
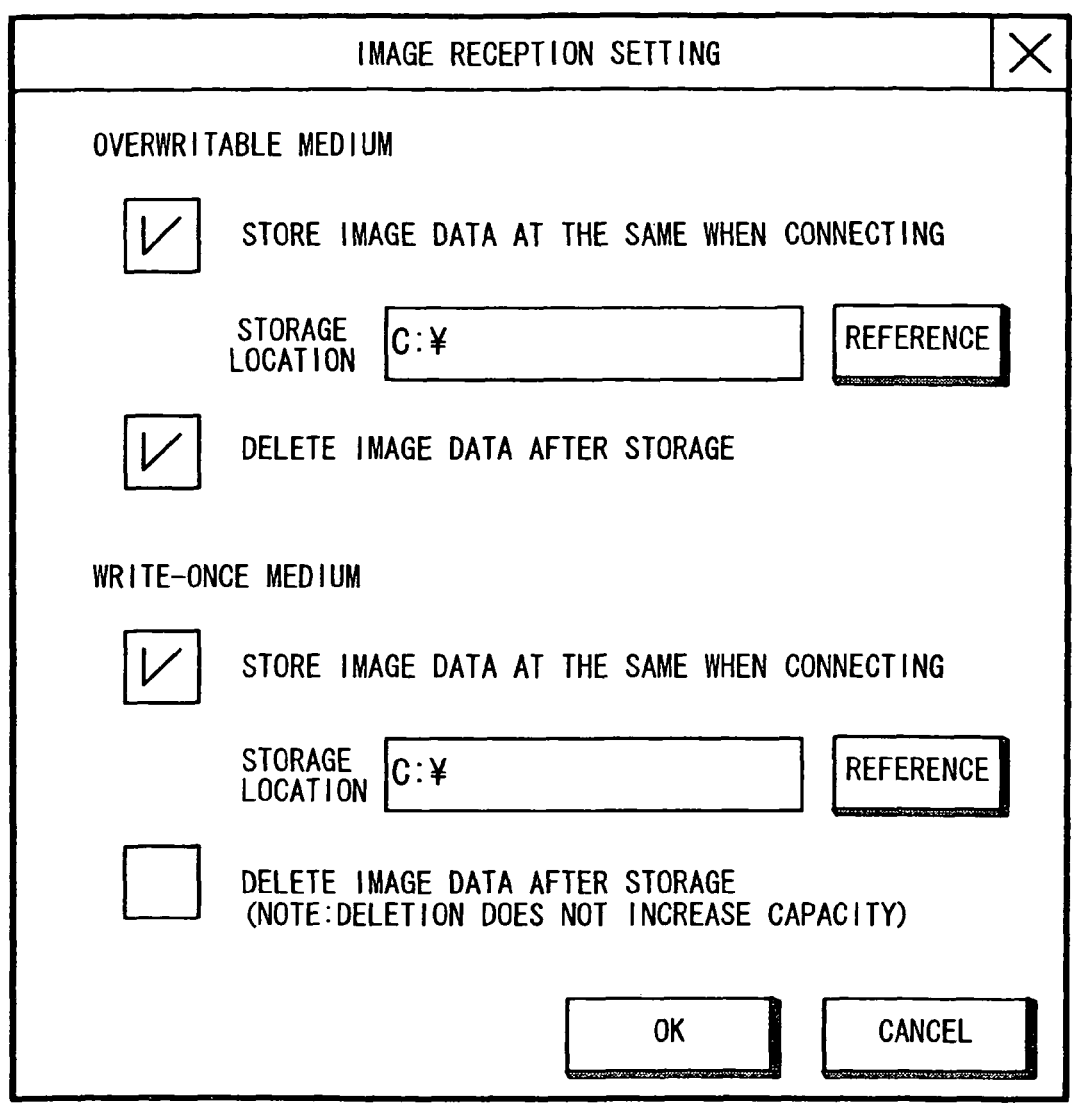
FIG. 77 is a view showing a display example of a setting menu in the fifth embodiment.

In step S4603, it is to display a setting menu for a write-once storage medium on display 508. FIG. 77 shows a display example of the setting menu for the write-once storage medium. Though the display example of FIG. 77 shows two setting menus in a single window, each setting menu may be displayed separately in a different window.

In step S4604, it is to detect if a setting operation is finished via operation unit 509 and if the setting operation is finished, the flow proceeds to step S4605 and if the setting operation is not finished, the flow gets back to step S4603. In step S4605, it is to record setting information entered via the setting menu in program memory 502. In step S4606, it is read out the setting information recorded in program memory 502. In step S4607, processing is executed according to the recorded setting.

When an inserted memory card is overwritable storage medium 3, in step S4608, it is to detect if program memory 502 records setting information about the overwritable storage medium. If program memory 502 records the setting information, the flow proceeds to step S4612 and if program memory 502 does not record the setting information, the flow proceeds to step S4609. In step S4609, it is to display the setting menu for the overwritable storage medium on display 508 as shown in FIG. 77. FIG. 77 shows a display example.

In step S4610, it is to detect if a setting operation is finished via operation unit 509 and if the setting operation is finished, the flow proceeds to step S4611 and if the setting operation is not finished, the flow gets back to step S4609. In step s4611, it record the setting information entered via the setting menu in program memory 502. In step S4612, it is to read out the setting information recorded in program memory 502. In step S4613, processing is executed according to the recorded setting.

As described in the foregoing, the settings for the overwritable storage medium and the write-once storage medium are so controlled as to be independently set, a user can set a setting suitable for each memory card.

The image management setting control in image storage apparatus 50 explained by using FIG. 77 can be applied to digital camera 31. An image management setting control in digital camera 31 will be explained hereinafter.

A setting menu example displayed on LCD display panel 6 of digital camera 31 is shown in FIGS. 78 (a) and (b). When a memory card inserted into slot 2 of digital camera 31 is overwritable storage medium 3, a setting menu shown in FIG. 78(a) is displayed. When write-once storage medium 4 is inserted, a setting menu shown in FIG. 78(b) is displayed. Although FIG. 78 shows separately the setting menus for the overwritable storage medium and the write-once storage medium, both setting menus can be displayed at the same time as shown in FIG. 77.

The processing procedure of the image management control in digital camera 31 is the same as the one to be executed in image storage apparatus 50 explained using FIG. 76, so the explanation about the procedure thereof is omitted.

As described in the foregoing, the image management settings for the overwritable storage medium and the write-once storage medium are so controlled as to be independently set, so the setting suitable for each storage medium can be set in digital camera 31.

Such the control in image storage apparatus 50 can be realized by a computer application program. In this case, a computer installing the application program and its peripheral apparatus connected when needed corresponds to each configuring element of image storage apparatus 50. Therefore, in order to realize a function of this invention, an application program itself and a storage medium like CD-ROM recording the program available for sale via the Internet etc are also included in a scope of this invention.

So far, the explanation about the digital camera recording image data using the write-once storage medium and the overwritable storage medium has been given, but this invention may be applied to the digital camera using only the write-once storage medium.

What is claimed is:

1. A digital camera comprising:
an insertion port into which a storage medium is inserted;
an imaging device;
a controller that stores an image taken by the imaging device in the storage medium inserted into the insertion port;
a medium detector that detects if the storage medium inserted into the insertion port is a storage medium limiting a number of overwrite;
a display device that displays an executable instruction in the digital camera; and
a display change processing device that changes a display of the display device based upon a kind of the storage medium detected by the medium detector, wherein:
the display device displays the instruction including a delete disable release instruction that lets an image to be stored in the storage medium disabled to be deleted become capable of being deleted, and
when the medium detector detects that the storage medium limiting a number of overwrite is inserted into the insertion portion, the display change processing device changes a display of the display device so as not to display the delete disable release instruction.

2. A digital camera comprising:
an insertion port into which a storage medium is inserted;
an imaging device;
a controller that stores an image taken by the imaging device in the storage medium inserted into the insertion port;
a medium detector that detects if the storage medium inserted into the insertion port is a storage medium limiting a number of overwrite;
a delete instruction device that instructs to delete an image stored in the storage medium; and
a delete method change processing device that changes a method of deleting the image based upon an instruction of the delete instruction device corresponding to a kind of the storage medium detected by the medium detector, wherein
when the medium detector detects that the storage medium limiting a number of overwrite is inserted into the insertion port and also deletion of the image is instructed by the delete instruction device, the delete method change processing device creates new data management information showing a state in which image data corresponding to image data for which deletion of the storage medium limiting a number of overwrite is instructed and management information which does not allow writing in an area that has been once recorded, and records the data management information and the management information in the storage medium limiting a number of overwrite, and invalidates data management information that existed prior to the deletion instruction.

3. The digital camera according to claim 2, wherein:
when the medium detector detects that the storage medium limiting a number of overwrite is inserted into the insertion port and also deletion of the image is instructed by the delete instruction device, the delete method change processing device writes data in a storage area of information about an image to be deleted in the storage medium limiting a number of overwrite.

4. A digital camera comprising:
an insertion port into which a storage medium is inserted;
an imaging device;
a controller that stores an image taken by the imaging device in the storage medium inserted into the insertion port;
a medium detector that detects if the storage medium inserted into the insertion port is a storage medium limiting a number of overwrite;
a delete instruction device that instructs to delete image data stored in the storage medium; and
a capacity detector that detects memory capacity of the storage medium inserted into the insertion port, wherein:
when the medium detector detects that the storage medium limiting a number of overwrite is inserted into the insertion port, the delete instruction device instructs a different delete method corresponding to memory residual capacity of the storage medium limiting a number of overwrite detected by the capacity detector, wherein
when the capacity detector detects that the storage medium limiting a number of overwrite has memory residual capacity not enough to record new data management information in the storage medium limiting a number of overwrite, the delete instruction device instructs so as to nullify the image data area.

5. An apparatus comprising:
an insertion port into which a storage medium is inserted;
a controller that stores a data file in the storage medium inserted into the insertion port;
a medium detector that detects if the storage medium inserted into the insertion port is a storage medium limiting a number of overwrite;
a display device that displays an executable instruction in the apparatus; and
a display change processing device that changes a display of the display device based upon a kind of the storage medium detected by the medium detector, wherein:
the display device displays the instruction including a delete disable release instruction that lets a data file to be stored in the storage medium disabled to be deleted become capable of being deleted, and
when the medium detector detects that the storage medium limiting a number of overwrite is inserted into the insertion portion, the display change processing device changes a display of the display device so as not to display the delete disable release instruction.

6. An apparatus comprising:
an insertion port into which a storage medium is inserted;
a controller that stores a data file in the storage medium inserted into the insertion port;
a medium detector that detects if the storage medium inserted into the insertion port is a storage medium limiting a number of overwrite;
a delete instruction device that instructs to delete a data file stored in the storage medium; and
a delete method change processing device that changes a method of deleting the data file based upon an instruction of the delete instruction device corresponding to a kind of the storage medium detected by the medium detector, wherein
when the medium detector detects that the storage medium limiting a number of overwrite is inserted into the insertion port and also deletion of the data file is instructed by the delete instruction device, the delete method change processing device creates new data management information showing a state in which data corresponding to the data file for which deletion of the storage medium limiting a number of overwrite is instructed and management information which does not allow writing in an area that has been once recorded, and records the data management information and the management information in the storage medium limiting a number of overwrite, and invalidates data management information that existed prior to the deletion instruction.

7. The apparatus according to claim 6, wherein:
when the medium detector detects that the storage medium limiting a number of overwrite is inserted into the insertion port and also deletion of the data file is instructed by the delete instruction device, the delete method change processing device writes data in a storage area of information about the data file to be deleted in the storage medium limiting a number of overwrite.

8. An apparatus comprising:
an insertion port into which a storage medium is inserted;
a controller that stores a data file in the storage medium inserted into the insertion port;
a medium detector that detects if the storage medium inserted into the insertion port is a storage medium limiting a number of overwrite;
a delete instruction device that instructs to delete the data file stored in the storage medium; and
a capacity detector that detects memory capacity of the storage medium inserted into the insertion port, wherein:
when the medium detector detects that the storage medium limiting a number of overwrite is inserted into the insertion port, the delete instruction device instructs a different delete method corresponding to memory residual capacity of the storage medium limiting a number of overwrite detected by the capacity detector, wherein
when the capacity detector detects that the storage medium limiting a number of overwrite has memory residual capacity not enough to record new data management information in the storage medium limiting a number of overwrite, the delete instruction device instructs so as to nullify the data file area.

* * * * *